US006472093B2

(12) United States Patent
Faris et al.

(10) Patent No.: US 6,472,093 B2
(45) **Date of Patent: *Oct. 29, 2002**

(54) METAL-AIR FUEL CELL BATTERY SYSTEMS HAVING A METAL-FUEL CARD STORAGE CARTRIDGE, INSERTABLE WITHIN A FUEL CARTRIDGE INSERTION PORT, CONTAINING A SUPPLY OF SUBSTANTIALLY PLANAR DISCRETE METAL-FUEL CARDS, AND FUEL CARD TRANSPORT MECHANISMS THEREIN

(75) Inventors: Sadeg M. Faris, Pleasantville; Tsepin Tsai, Peekskill, both of NY (US)

(73) Assignee: Reveo, Inc., Elmsford, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 13 days.

(21) Appl. No.: 09/074,337

(22) Filed: May 7, 1998

(65) Prior Publication Data

US 2001/0014416 A1 Aug. 16, 2001

Related U.S. Application Data

(63) Continuation-in-part of application No. 08/944,507, filed on Oct. 6, 1997, now Pat. No. 6,296,960.

(51) Int. Cl.[7] .......................... H01M 12/06; H01M 8/04
(52) U.S. Cl. ............................ 429/27; 429/22; 429/25; 429/68; 429/127
(58) Field of Search ............................. 429/22, 25, 27, 429/127, 68

(56) References Cited

U.S. PATENT DOCUMENTS

| | | | | |
|---|---|---|---|---|
| 3,252,838 A | | 5/1966 | Huber et al. | |
| 3,260,620 A | * | 7/1966 | Gruber | 429/127 |

(List continued on next page.)

FOREIGN PATENT DOCUMENTS

| | | | |
|---|---|---|---|
| GB | 1176488 | 1/1970 | H01M/29/02 |

OTHER PUBLICATIONS

Convert 3V to 5V Without Inductors by , Maxim Integrated Products; http://www.maxim–ic.com, vol. 92, 2000, p. 1–3, (Month unknown).

(List continued on next page.)

*Primary Examiner*—Stephen Kalafut
(74) *Attorney, Agent, or Firm*—Thomas J. Perkowski, PC; Ralph J. Crispino, Esq.

(57) ABSTRACT

Disclosed are various types of metal-air FCB-based systems comprising a housing having an insertion port; a discharging subsystem disposed within the housing for generating electrical power from at least one metal-fuel card in a discharging mode of operation; and a tray-shaped cartridge, insertable within said insertion port, containing a supply of substantially planar discrete metal-fuel cards. When the tray-shaped cartridge is inserted within the insertion port, one or more of the metal-fuel cards are loadable into the discharging subsystem for generating and discharging electrical power during the discharging mode of operation. The system may include a recharging subsystem disposed within the housing for recharging at least one metal-fuel card in a recharging mode of operation. These inventive features allow automatic management of the supply (and recharge) of metal-fuel in a metal-air fuel cell battery system so as to obtain improvements in both operating efficiency and system performance.

34 Claims, 79 Drawing Sheets

U.S. PATENT DOCUMENTS

| | | | | | |
|---|---|---|---|---|---|
| 3,357,864 | A | | 12/1967 | Huber | |
| 3,432,354 | A | | 3/1969 | Jost | |
| 3,436,270 | A | | 4/1969 | Oswin et al. | |
| 3,454,429 | A | | 7/1969 | Gruber | |
| 3,532,548 | A | | 10/1970 | Stachurski | |
| 3,536,535 | A | * | 10/1970 | Lippincott | 429/127 X |
| 3,577,281 | A | * | 5/1971 | Pountney et al. | 429/127 X |
| 3,663,298 | A | | 5/1972 | McCoy et al. | |
| 3,717,505 | A | | 2/1973 | Unkle, Jr. et al. | |
| 3,822,149 | A | | 7/1974 | Hale | |
| 3,845,835 | A | | 11/1974 | Petit | |
| 3,909,685 | A | | 9/1975 | Baker et al. | |
| 3,928,072 | A | | 12/1975 | Gerbler et al. | |
| 3,963,519 | A | | 6/1976 | Louie | |
| 3,977,901 | A | | 8/1976 | Buzzelli | |
| 4,052,541 | A | | 10/1977 | von Krusenstierna | |
| 4,152,489 | A | | 5/1979 | Chottiner | |
| 4,172,924 | A | | 10/1979 | Warszawski | |
| 4,246,324 | A | | 1/1981 | de Nora et al. | |
| 4,331,742 | A | | 5/1982 | Lovelace et al. | |
| 4,341,847 | A | | 7/1982 | Sammells | |
| 4,551,399 | A | | 11/1985 | Despic | |
| 4,560,626 | A | | 12/1985 | Joy | |
| 4,626,482 | A | | 12/1986 | Hamlen et al. | |
| 4,689,531 | A | | 8/1987 | Bacon | |
| 4,693,946 | A | | 9/1987 | Niksa et al. | |
| 4,714,662 | A | | 12/1987 | Bennett | |
| 4,828,939 | A | | 5/1989 | Turley et al. | |
| 4,913,983 | A | | 4/1990 | Cheiky | |
| 4,916,036 | A | * | 4/1990 | Cheiky | 429/127 |
| 4,950,561 | A | | 8/1990 | Niksa et al. | |
| 4,957,826 | A | | 9/1990 | Cheiky | |
| 4,968,396 | A | | 11/1990 | Harvey | |
| 5,121,044 | A | | 6/1992 | Goldman | |
| 5,185,218 | A | | 2/1993 | Brokman et al. | |
| 5,190,833 | A | | 3/1993 | Goldstein et al. | |
| 5,196,275 | A | | 3/1993 | Goldman et al. | |
| 5,242,765 | A | | 9/1993 | Naimer et al. | |
| 5,250,370 | A | * | 10/1993 | Faris | 429/27 X |
| 5,260,144 | A | | 11/1993 | O'Callaghan | |
| 5,306,579 | A | | 4/1994 | Shepard, Jr. et al. | |
| 5,312,701 | A | | 5/1994 | Khasin et al. | |
| 5,318,861 | A | | 6/1994 | Harats et al. | |
| 5,328,777 | A | | 7/1994 | Bentz et al. | |
| 5,328,778 | A | | 7/1994 | Woodruff et al. | |
| 5,354,625 | A | | 10/1994 | Bentz et al. | |
| 5,360,680 | A | | 11/1994 | Goldman et al. | |
| 5,362,577 | A | | 11/1994 | Pedicini | |
| 5,366,822 | A | | 11/1994 | Korall et al. | |
| 5,387,477 | A | | 2/1995 | Cheiky | |
| 5,389,456 | A | | 2/1995 | Singh et al. | |
| 5,405,713 | A | | 4/1995 | Pecherer et al. | |
| 5,411,592 | A | | 5/1995 | Ovshinsky et al. | |
| 5,418,080 | A | | 5/1995 | Korrall et al. | |
| 5,439,758 | A | | 8/1995 | Stone et al. | |
| 5,447,805 | A | | 9/1995 | Harats et al. | |
| 5,462,816 | A | | 10/1995 | Okamura et al. | |
| 5,486,429 | A | | 1/1996 | Thibault | |
| 5,512,384 | A | | 4/1996 | Celeste et al. | |
| 5,525,441 | A | | 6/1996 | Reddy et al. | |
| 5,532,086 | A | | 7/1996 | Thibault et al. | |
| 5,536,592 | A | * | 7/1996 | Celeste et al. | 429/127 X |
| 5,554,452 | A | | 9/1996 | Delmolino et al. | |
| 5,569,551 | A | | 10/1996 | Pedicini et al. | |
| 5,582,931 | A | | 12/1996 | Kawahami | |
| 5,599,637 | A | | 2/1997 | Pecherer et al. | |
| 5,691,074 | A | | 11/1997 | Pedicini | |
| 5,711,648 | A | | 1/1998 | Hammerslag | |
| 5,721,064 | A | | 2/1998 | Pedicini et al. | |
| 5,726,551 | A | | 3/1998 | Miyazaki et al. | |
| 5,756,228 | A | * | 5/1998 | Roseanou | 429/127 X |
| 5,771,476 | A | | 6/1998 | Mufford et al. | |
| 5,904,999 | A | | 5/1999 | Kimberg et al. | |
| 5,978,283 | A | | 11/1999 | Hsu et al. | |
| 6,057,052 | A | | 5/2000 | Shrim et al. | |

OTHER PUBLICATIONS

Derive 5V From Four AA Cells by , Maxim Integrated Products; http://www.maxim–ic.com, vol. 128, 2000, p. 1–2 (Month unknown).

Boost/Linear Regulator Derives 5B From Four Cells by, Maxim Integrated Products, http://www.maxim–ic.com, 2000, (Month unknown).

Fuel Cell Technology & Applications, http://www.metallicpower.com/rtfuel.htm by, Metallic Power, Inc., 1999 (Month unknown).

Fuel Cells and their Applications by Karl Kordesch and Gunter Simader, VCH Publishers, Inc., New York NY, Chapters 4.8.1–4.8.2, 1996, p. 158–162, (Month N.A.).

LBL Researchers Work on New Generation of Batteries by Jeffrey Kahn, www.lbl.gov/Science–Articles/Archive/battery–development–at–lbl.html, 1990, p. 1–6 (Month N.A.

Fabrication of Thin–Film LIMN204 Cathodes for Rechargable Microbatteries by F.K. Shokoohi, et. al., Applied Physics Letters, 1991, p. 1260–1262, (Sep.).

Battery Chargers by Mike Allen, Popular Mechanics, 1991, p. 30–31 (Sep.).

New Age EVs by Herb Schuldner, Popular Mechanics, 1991, p. 27–29, (Sep.).

Marketing Study for AER Energy Resources, Inc. by Authors not indicated, AER Energy Resources, Inc., 1991, p. 6–28, (Month unknown).

Electric Car Showdown in Phoenix by Rick Cook, Popular Science, 1991, p. 64–65,82 (Jul.).

Batteries for Cordless Appliances, by Ralph J. Brodd, Ch. 3 of Batteries for Cordless Appliances, 1987, p. 49–59, (Month N/A).

PCT/US98/21257 Search Report, Apr. 1999.

PCT/US98/21260 Search Report, Feb. 1999.

PCT/US98/21256 International Search Report, Feb. 1999.

* cited by examiner

FIG.2A1
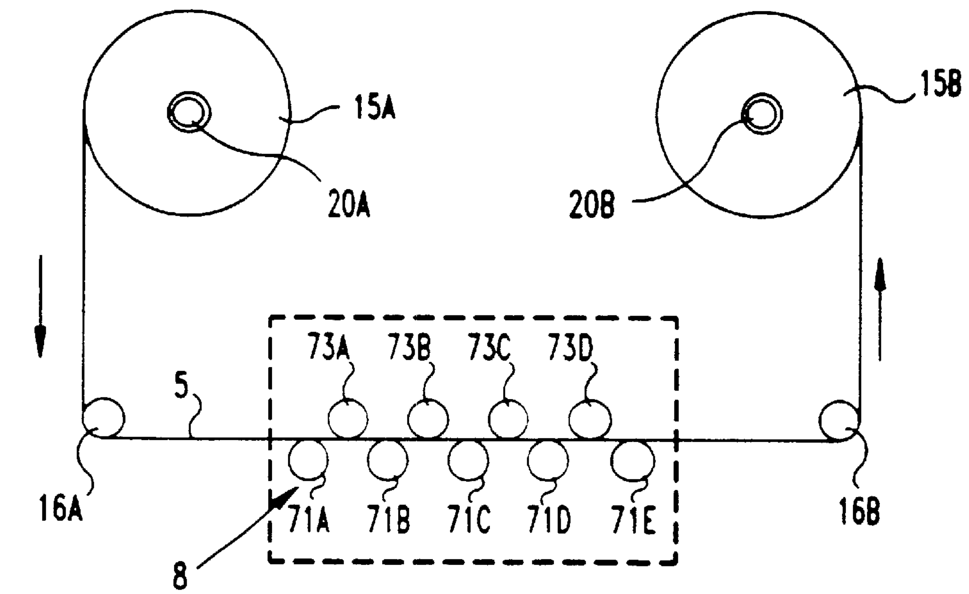
FIG.2A2
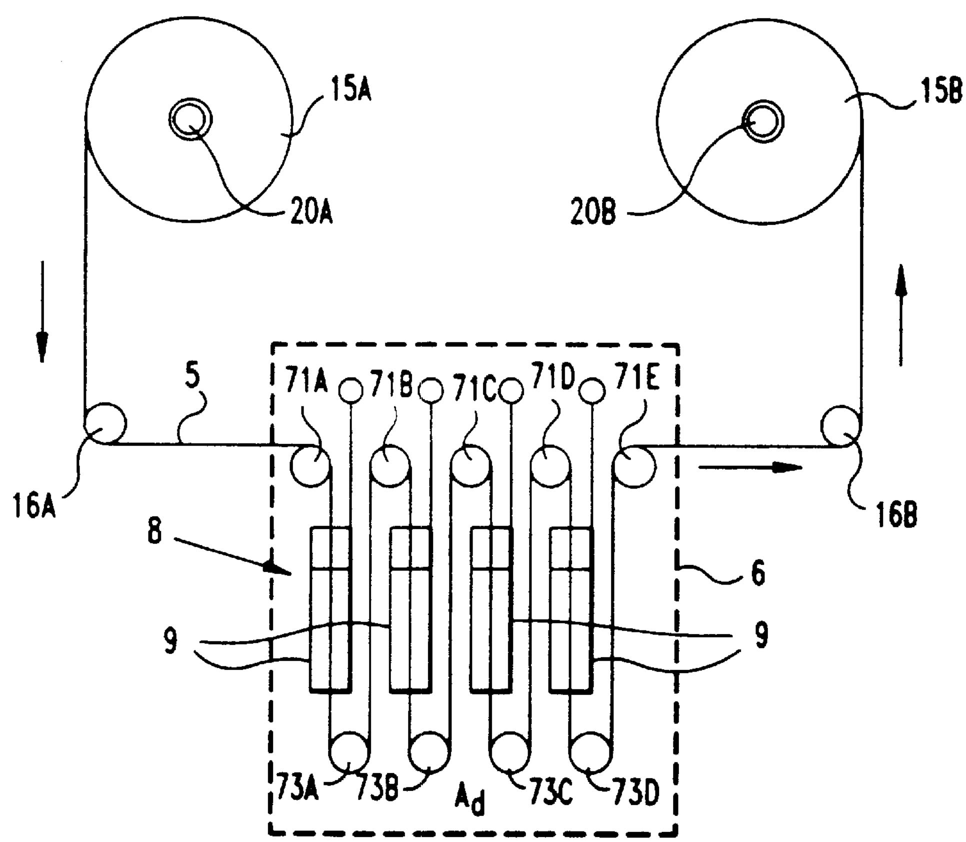

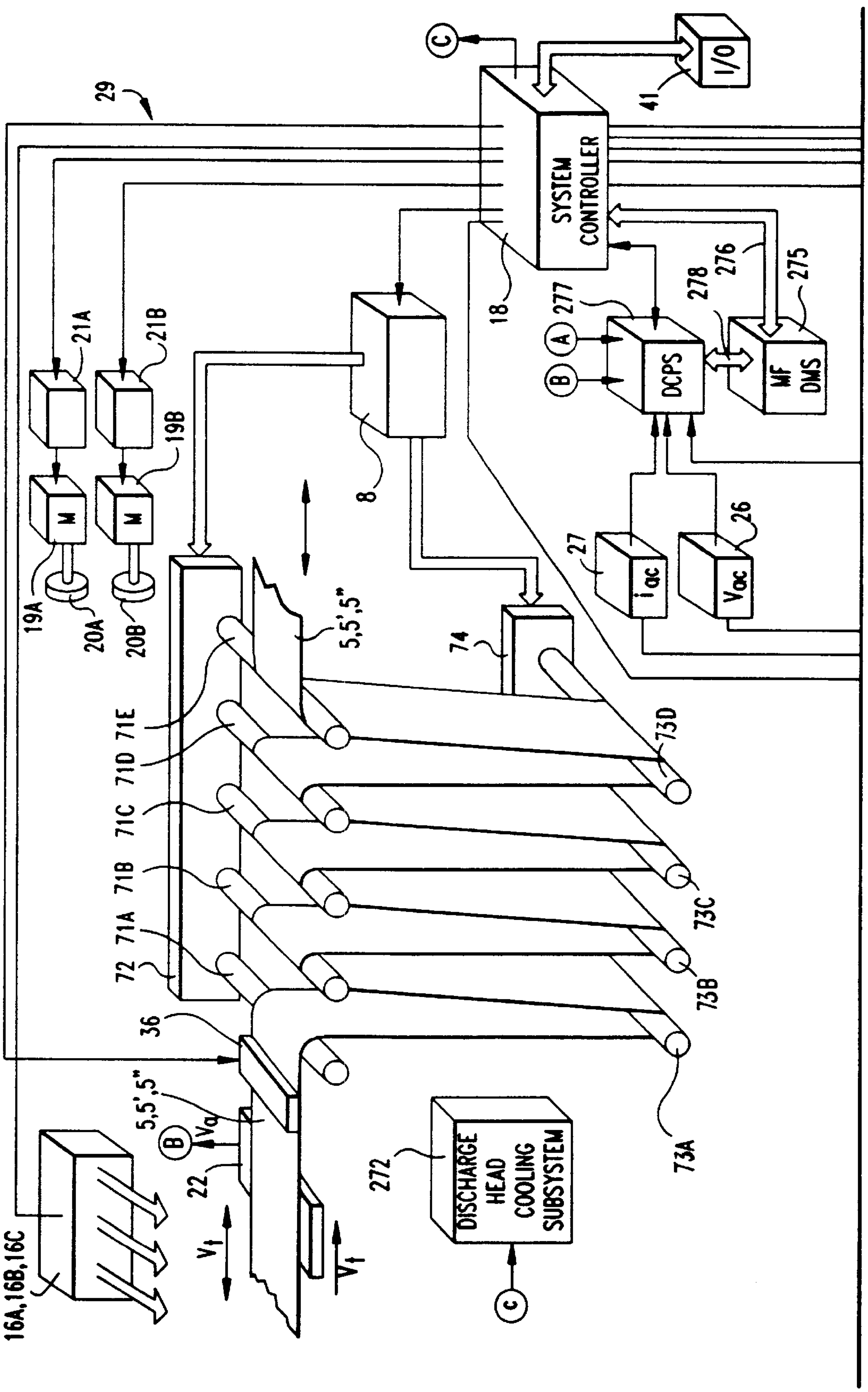
FIG.2A31

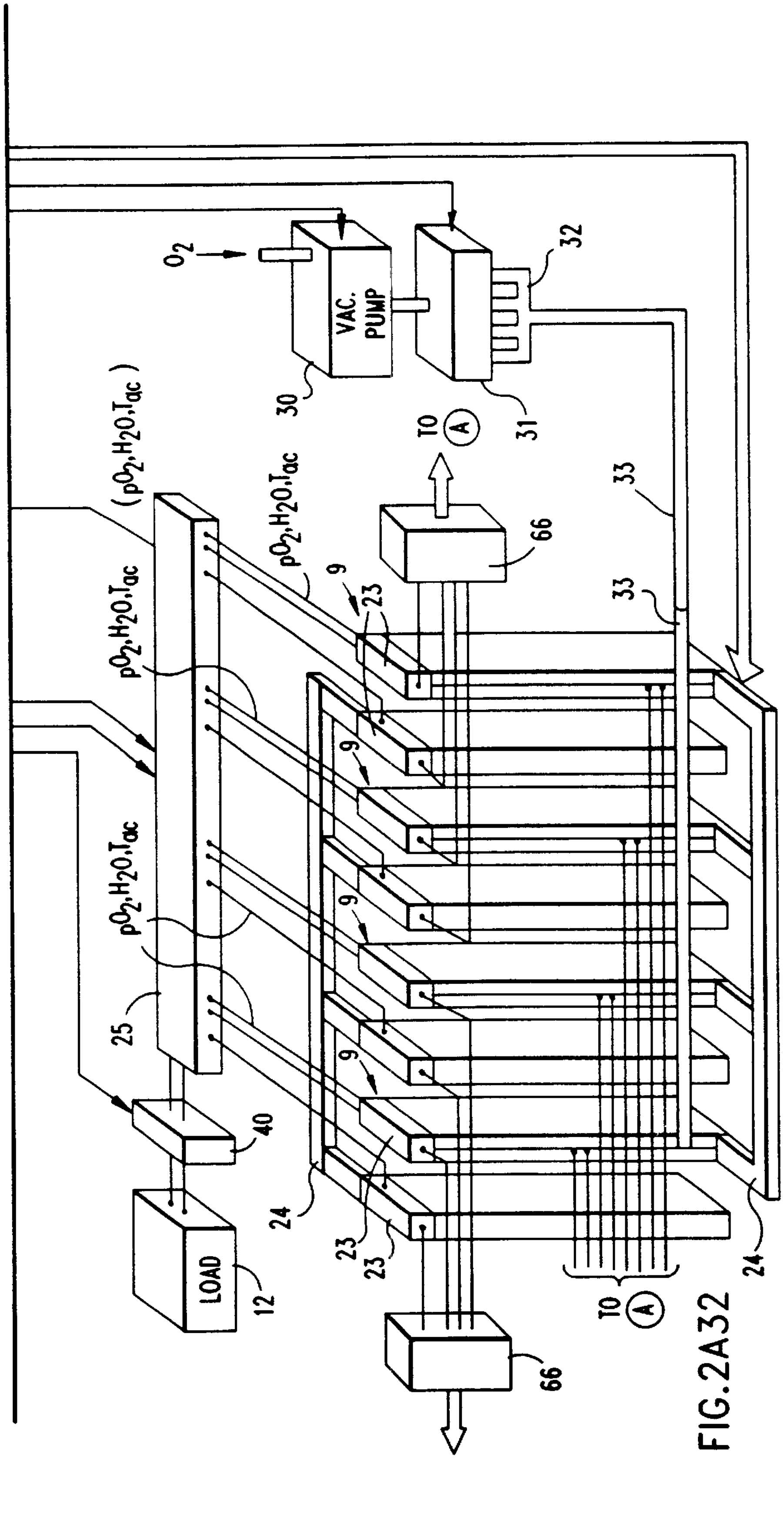
FIG.2A32

FIG.2A4
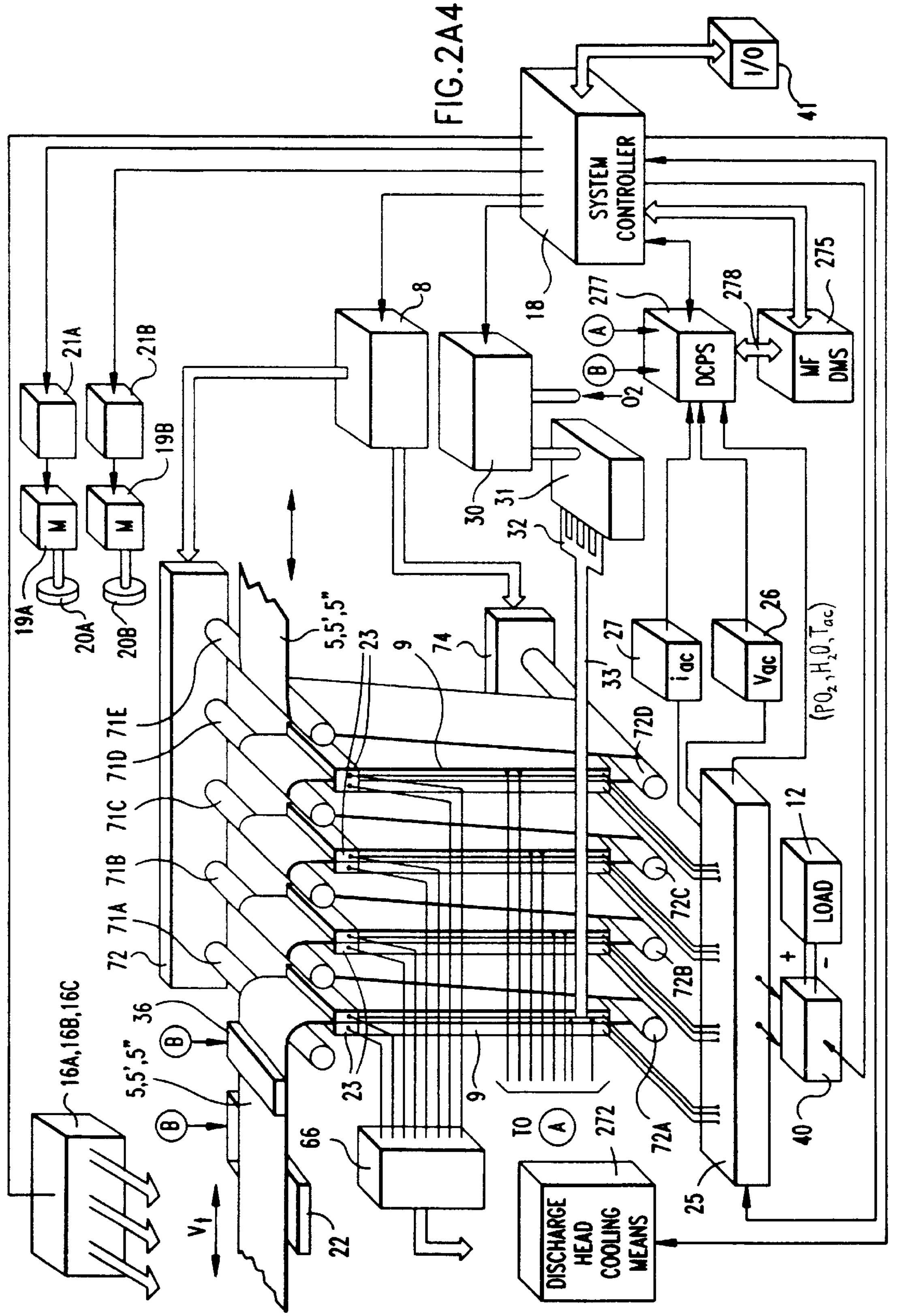

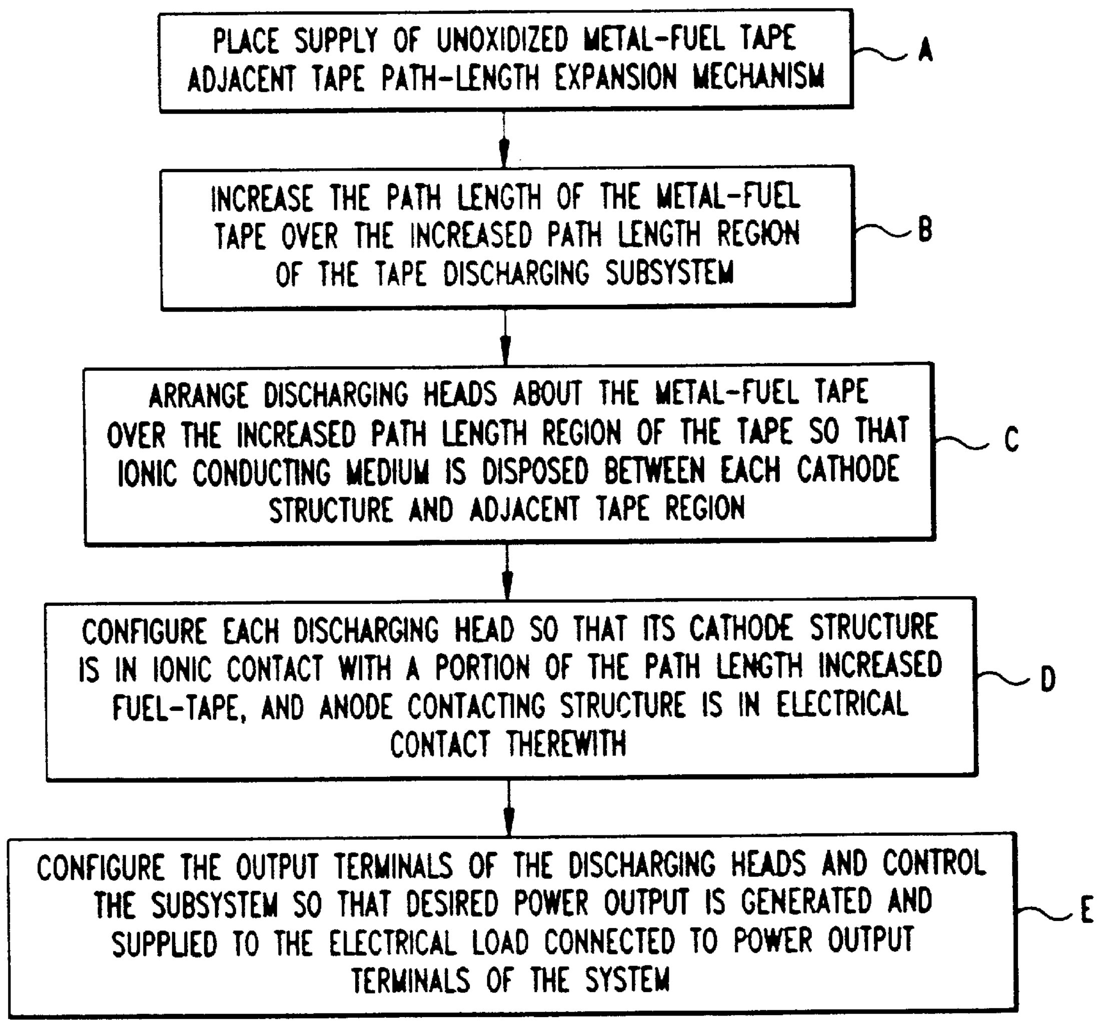
FIG.2A5

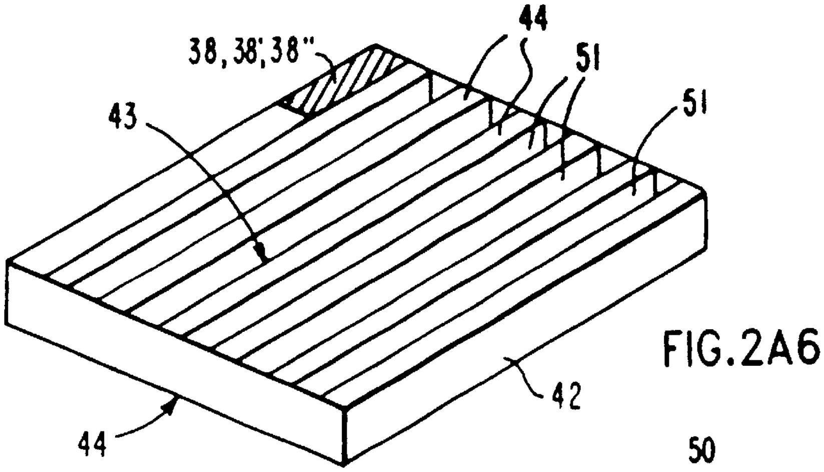
FIG.2A6
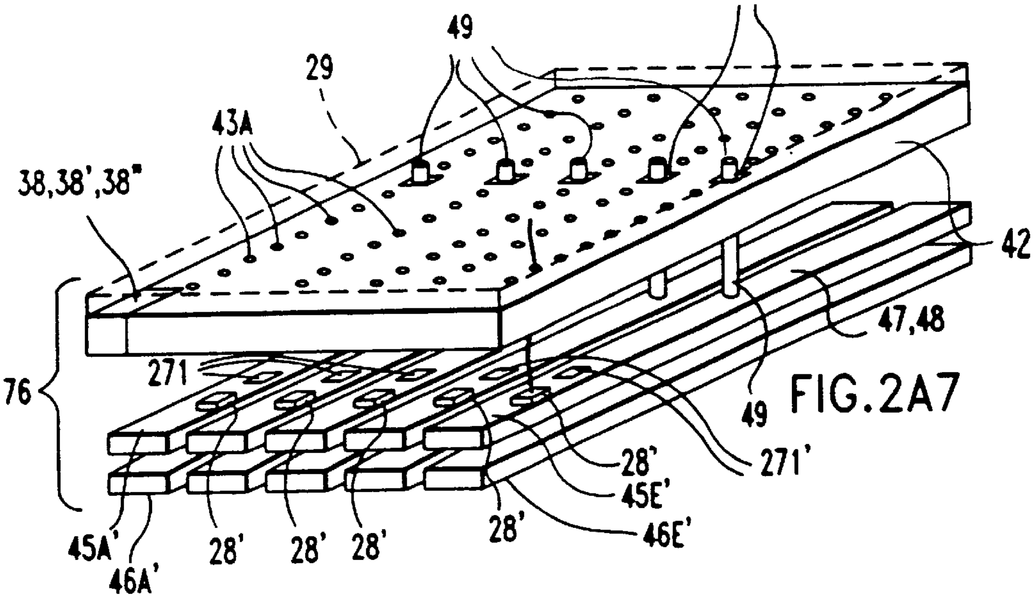
FIG.2A7
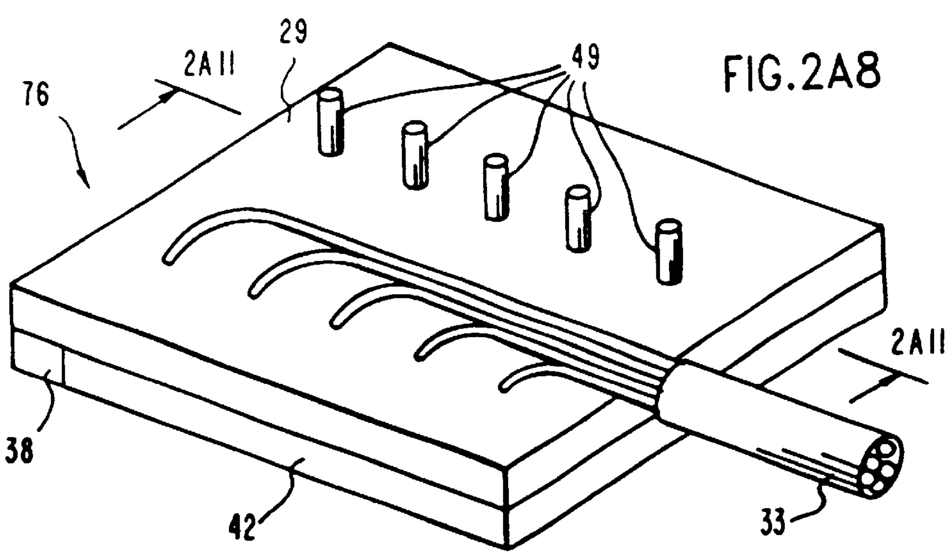
FIG.2A8

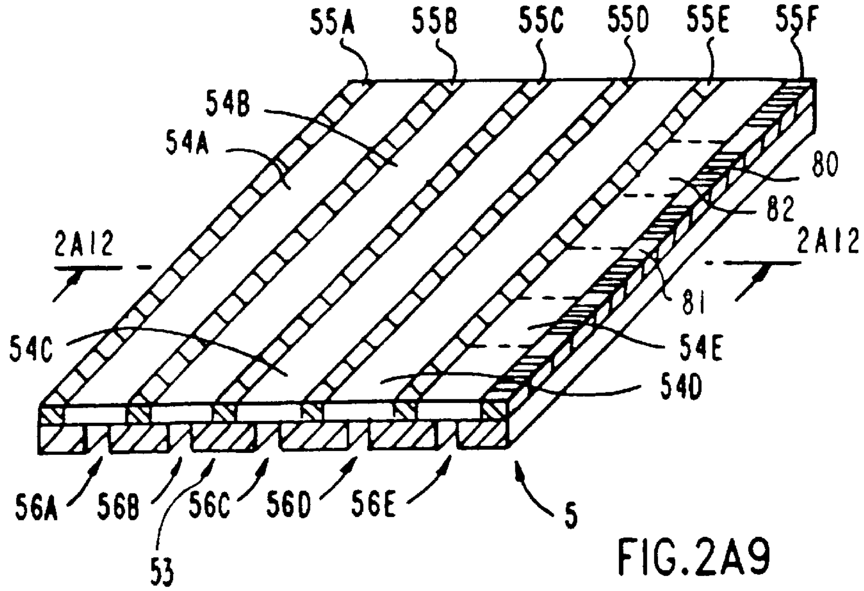
FIG.2A9
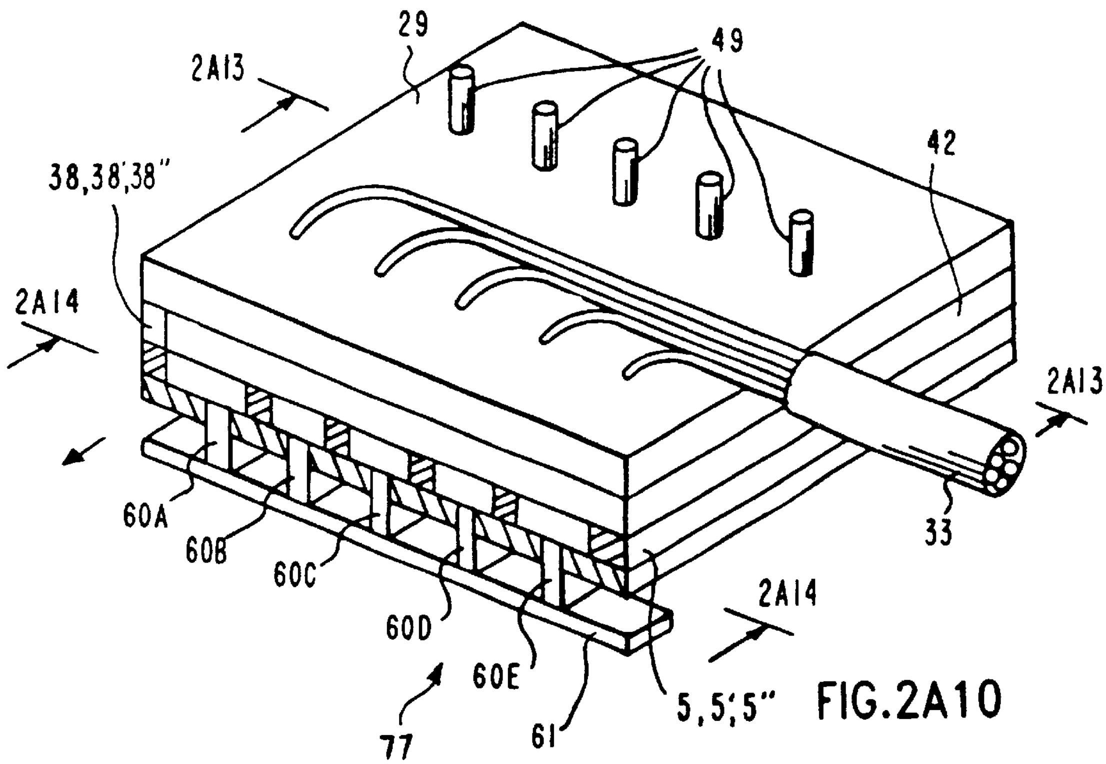
FIG.2A10

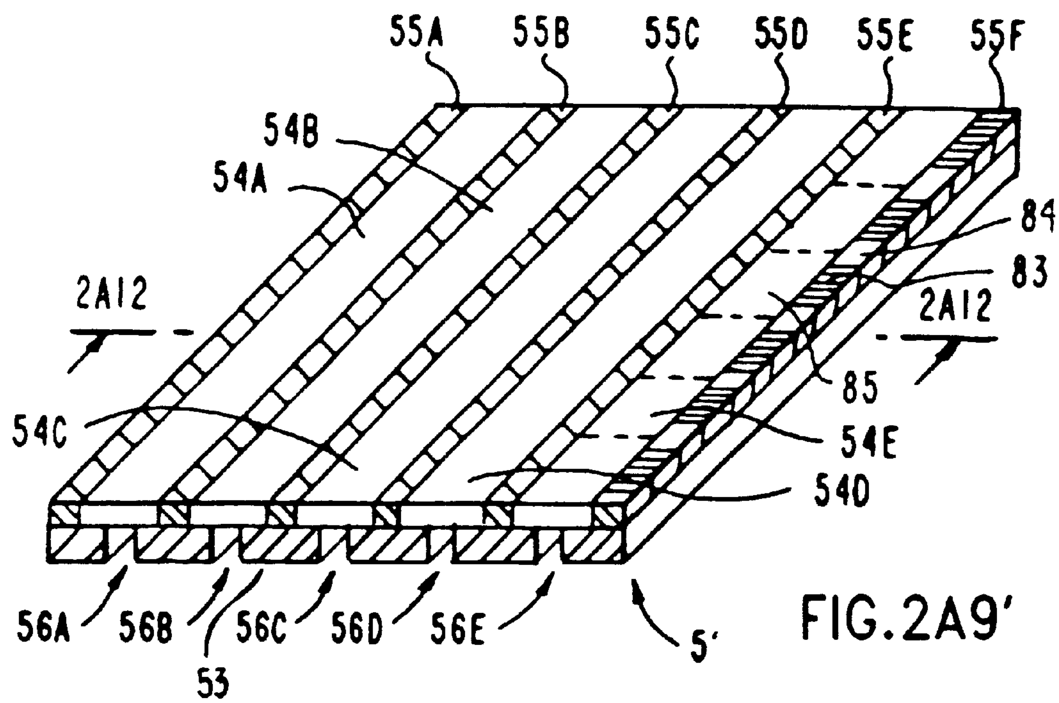
FIG.2A9'
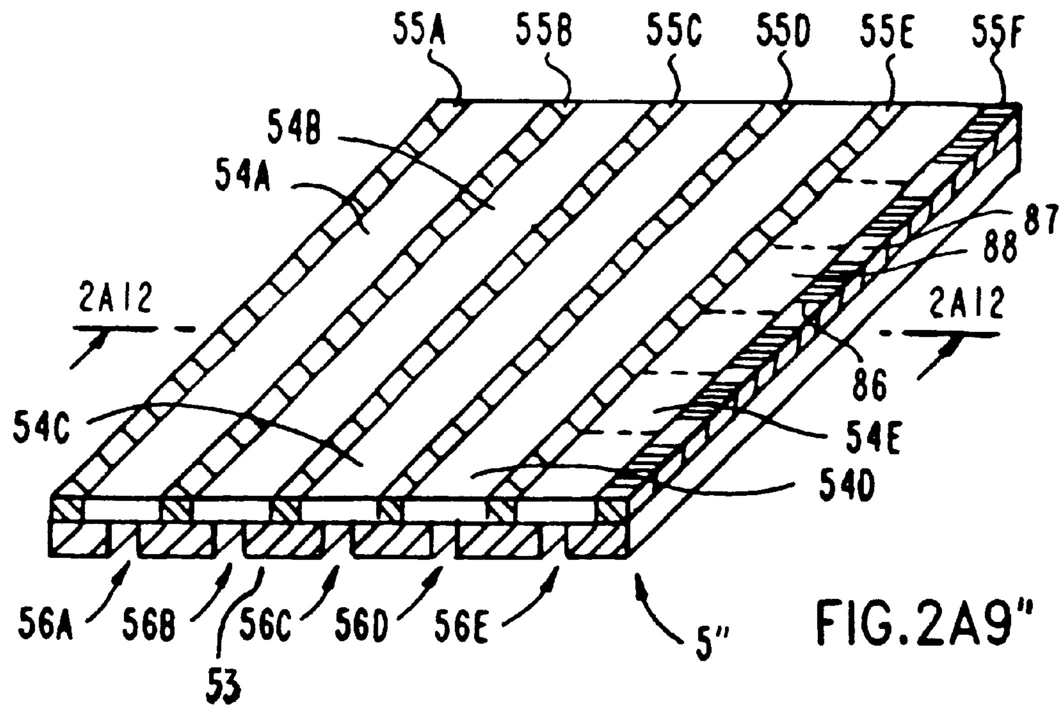
FIG.2A9"

FIG.2A11
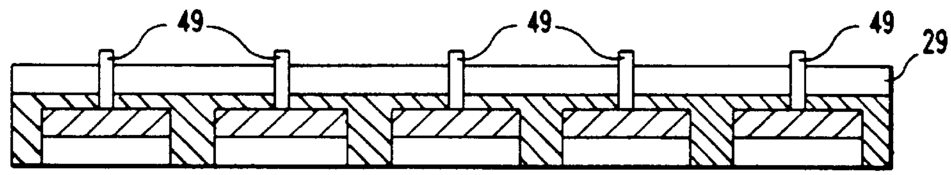
FIG.2A12
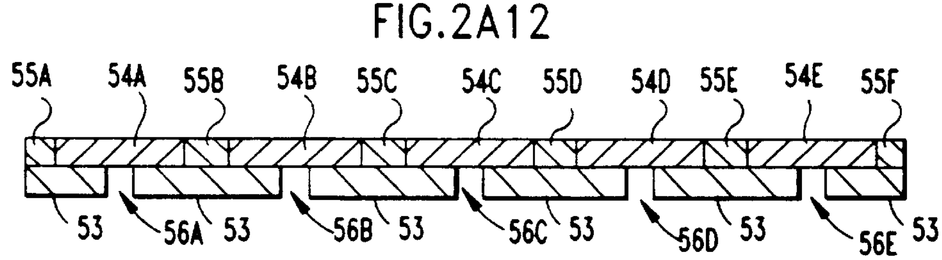
FIG.2A13
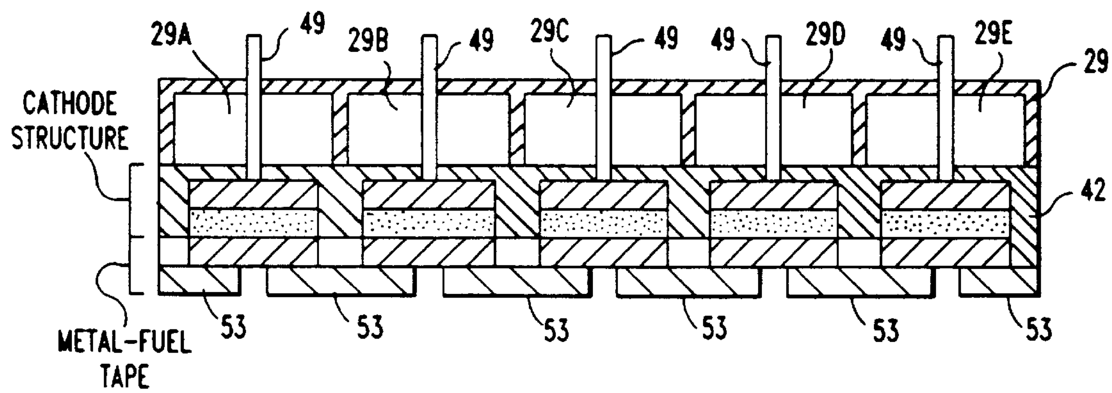
FIG.2A14
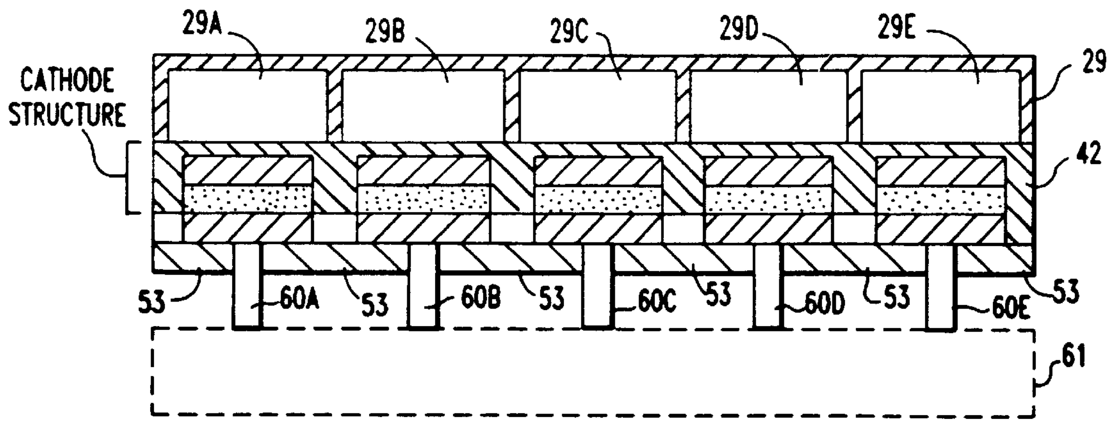

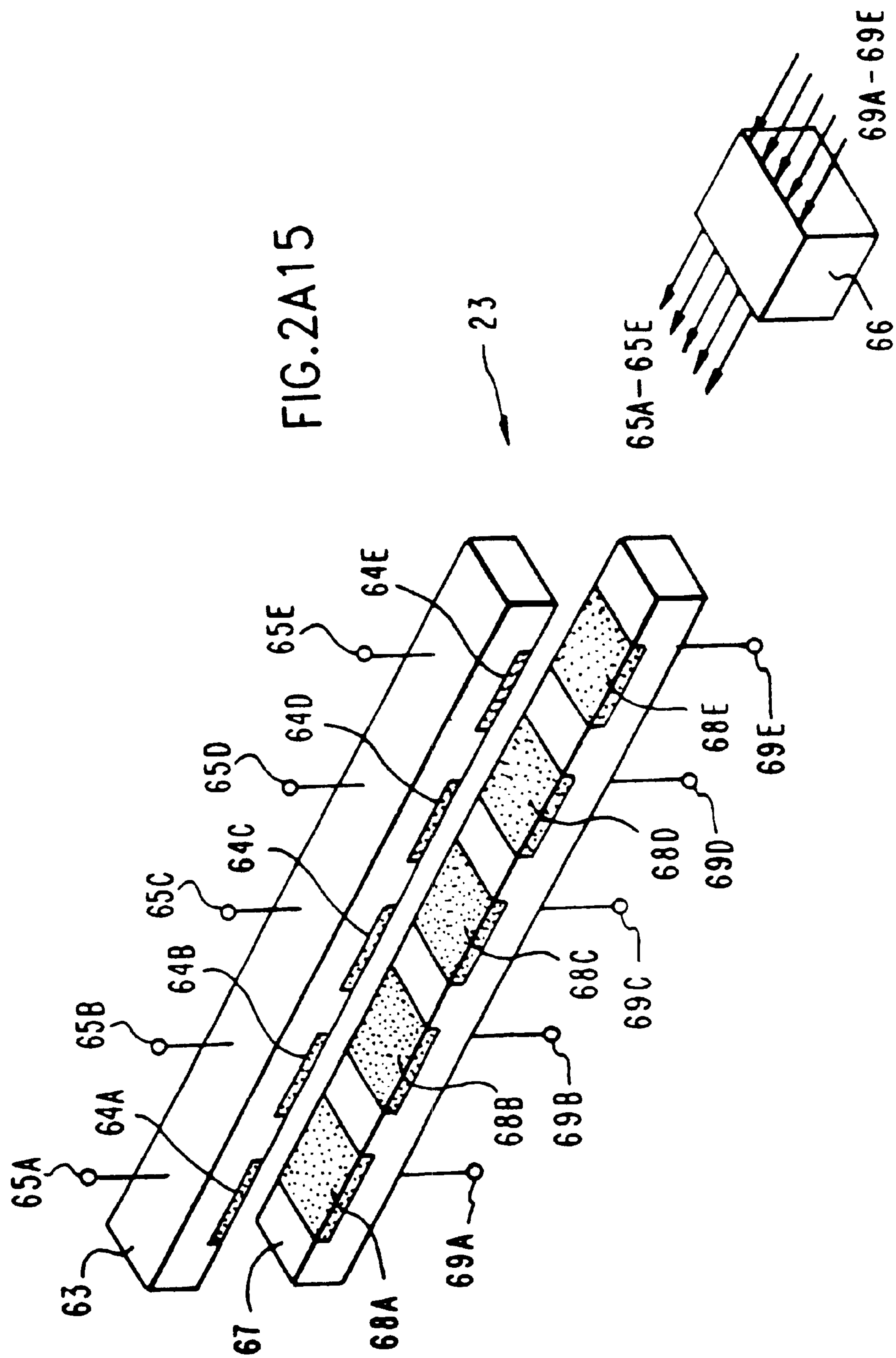
FIG.2A15

| FUEL-TAPE CASSETTE NO.__ | METAL-FUEL TRACK NO.1 | | | | | METAL-FUEL TRACK NO.2 | METAL-FUEL TRACK NO.3 | METAL-FUEL TRACK NO.4 | METAL-FUEL TRACK NO.5 |
|---|---|---|---|---|---|---|---|---|---|
| ZONE NO.1 285 | $t_1$ | $t_2$ | $t_3$ | ••• | $t_n$ | | | | |
| | $i_{ac}$ | | | ••• | | | | | |
| | $V_{ac}$ | | | ••• | | | | | |
| | $V_t$ | | | ••• | | | | | |
| | $pO_2$ | | | ••• | | | | | |
| | $H_2O\%$ | | | ••• | | | | | |
| | CM | | | ••• | | | | | |
| ZONE NO.2 | | | | | | | | | |
| ZONE NO.3 | | | | | | | | | |
| ZONE NO.4 | | | | | | | | | |
| ZONE. NO.5 | | | | | | | | | |
| ••• | ••• | | | | | ••• | ••• | ••• | ••• |
| ZONE NO.n | | | | | | | | | |

FIG.2A16

DISCHARGE DATA STRUCTURE

FIG.2B1
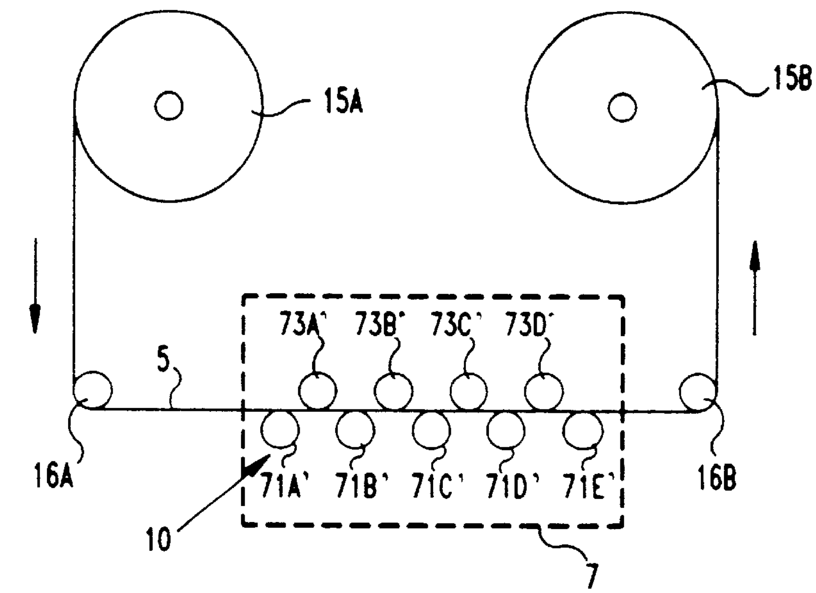
FIG.2B2
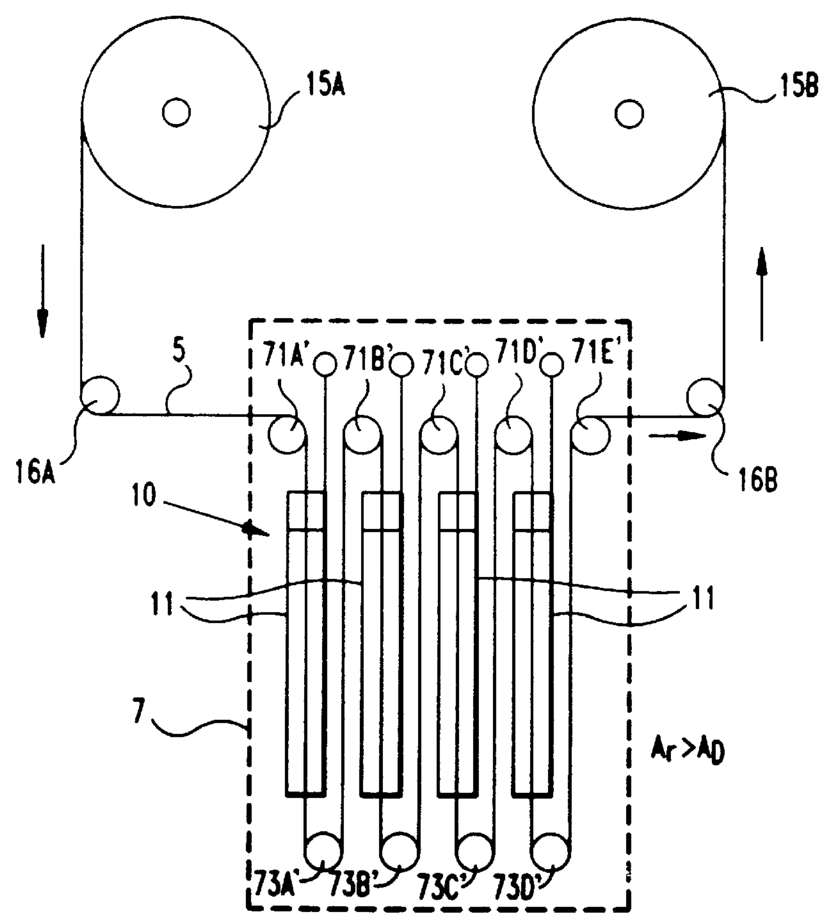

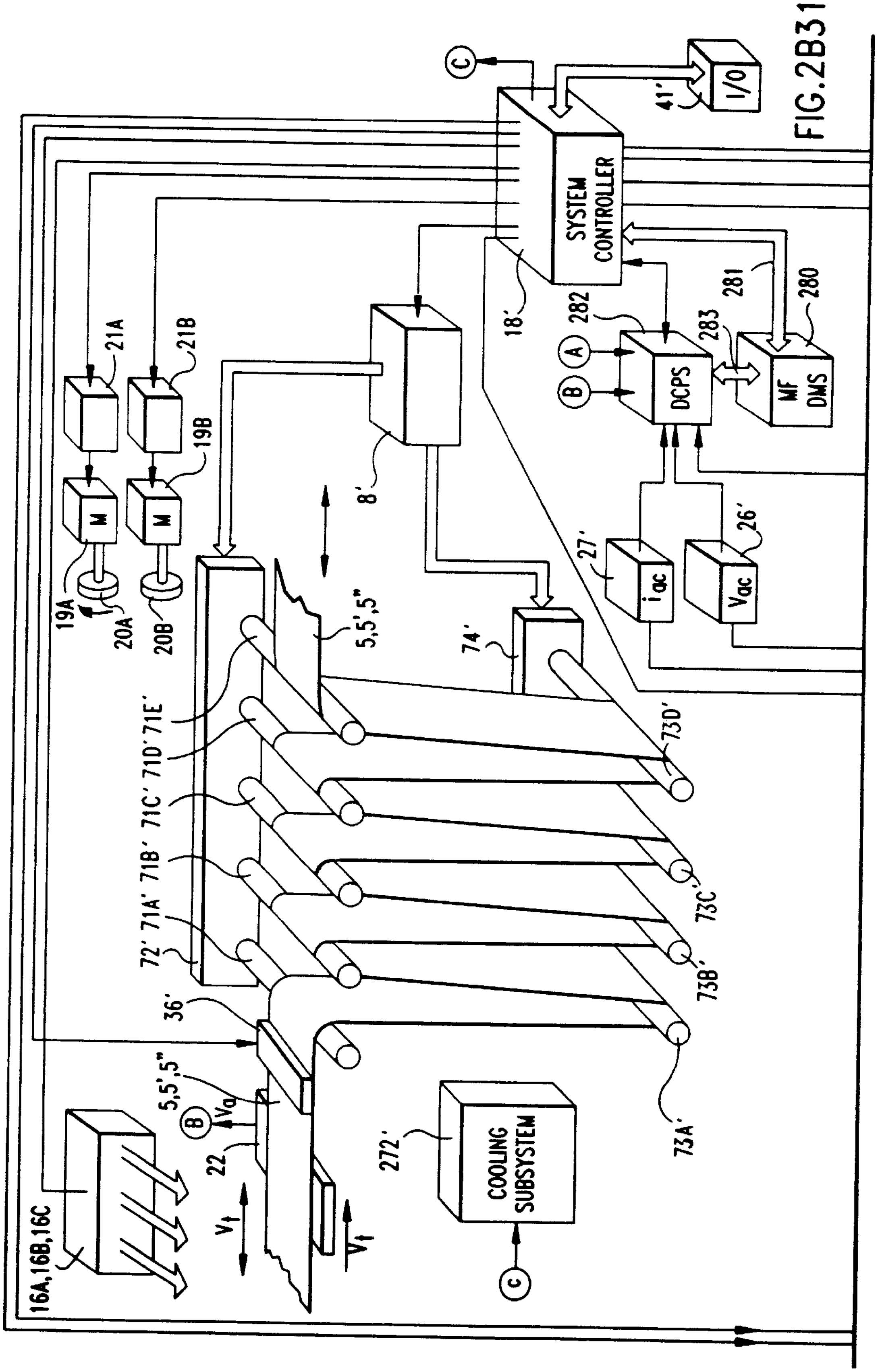
FIG.2B31

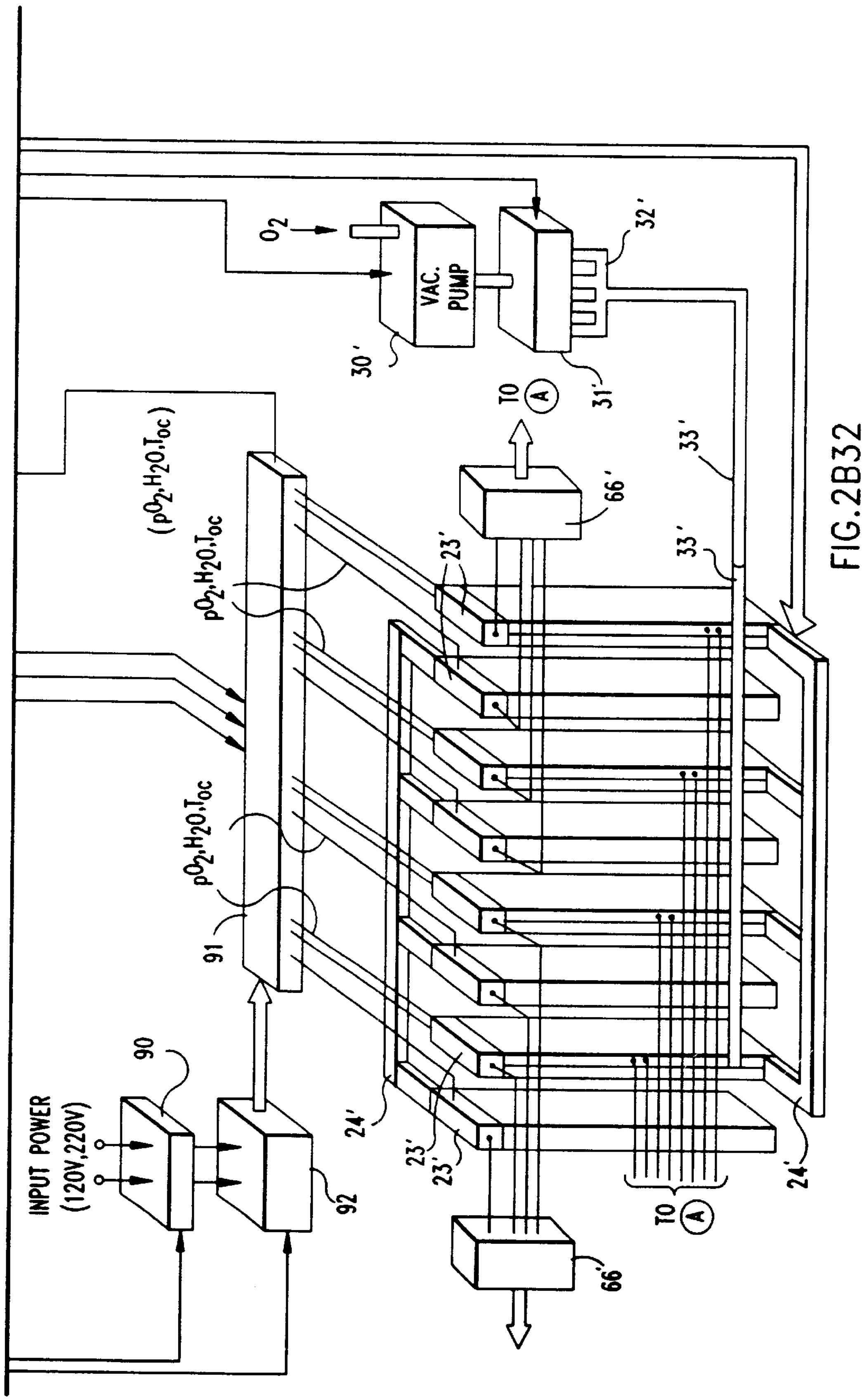
FIG.2B32

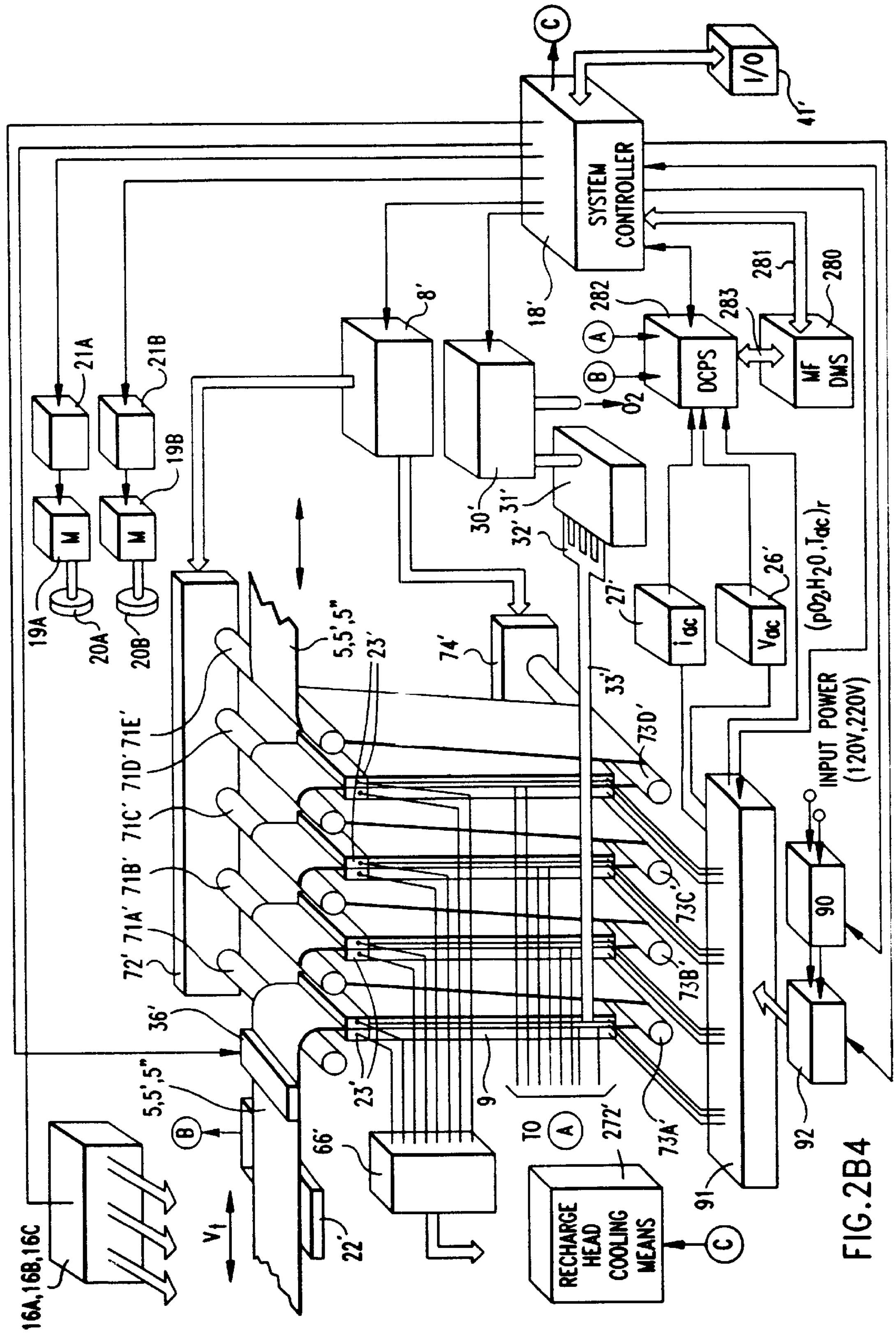
FIG.2B4

FIG.2B5
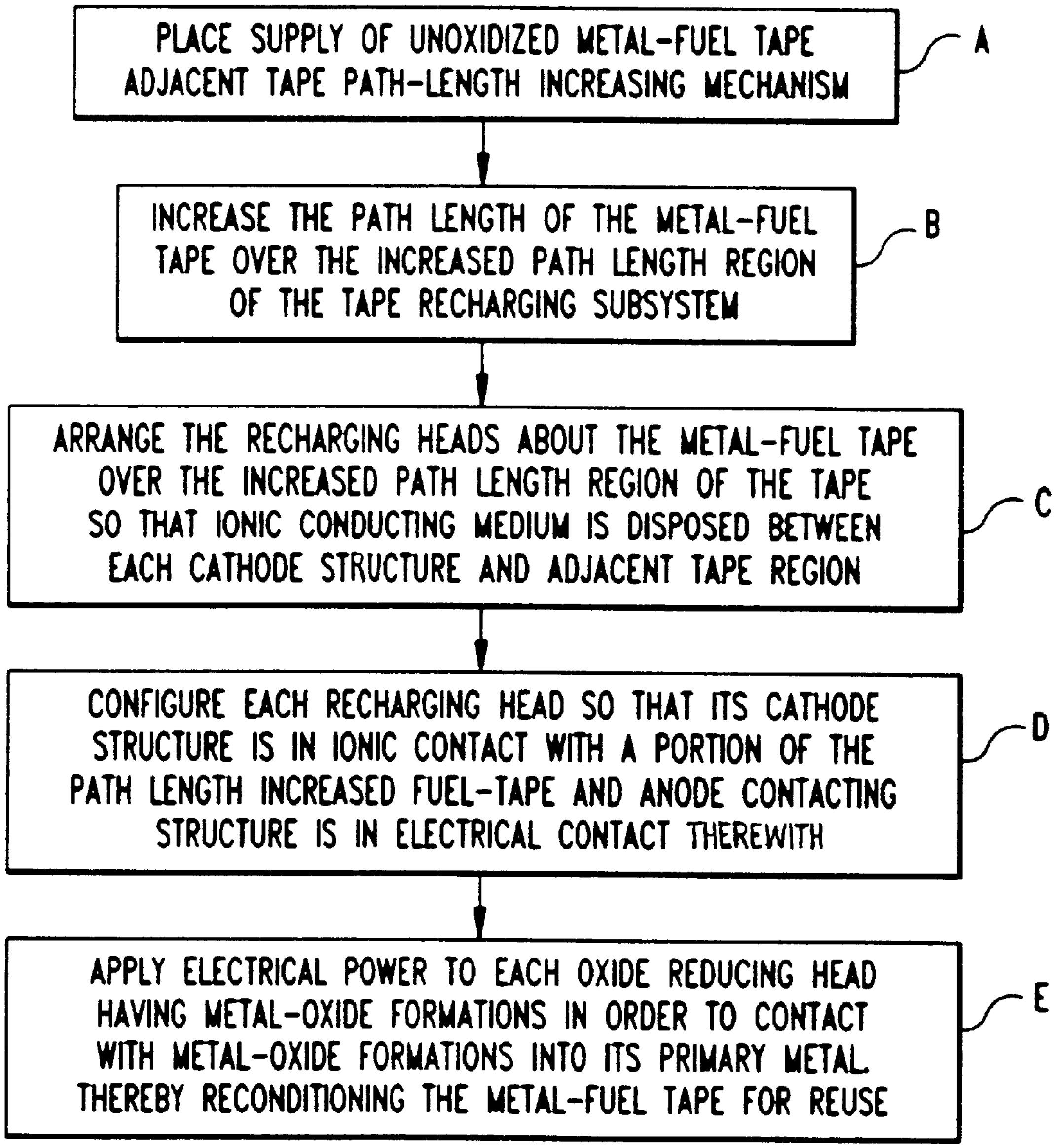

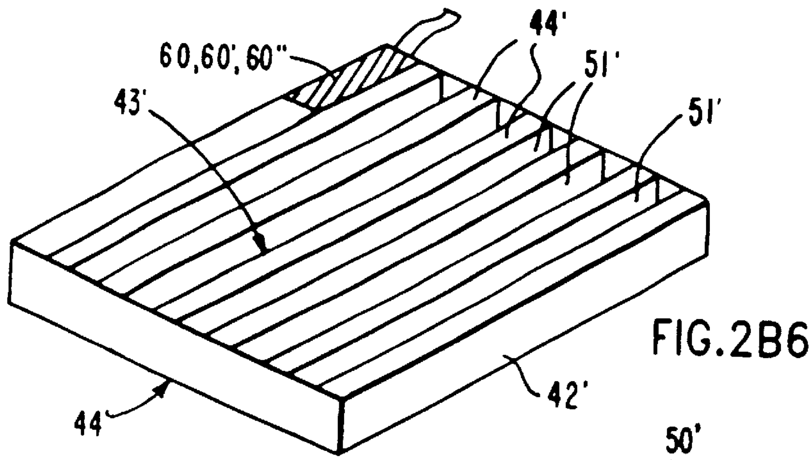
FIG.2B6
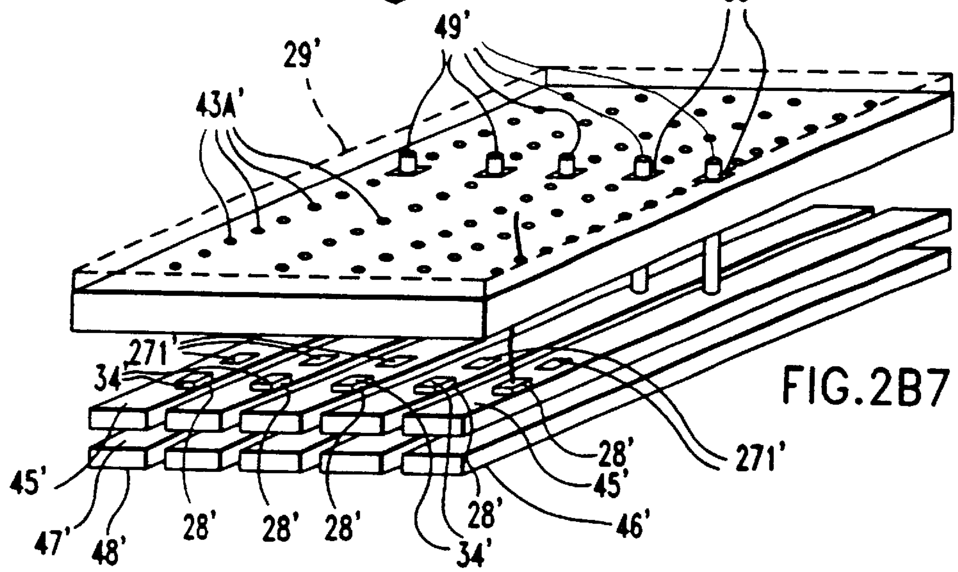
FIG.2B7
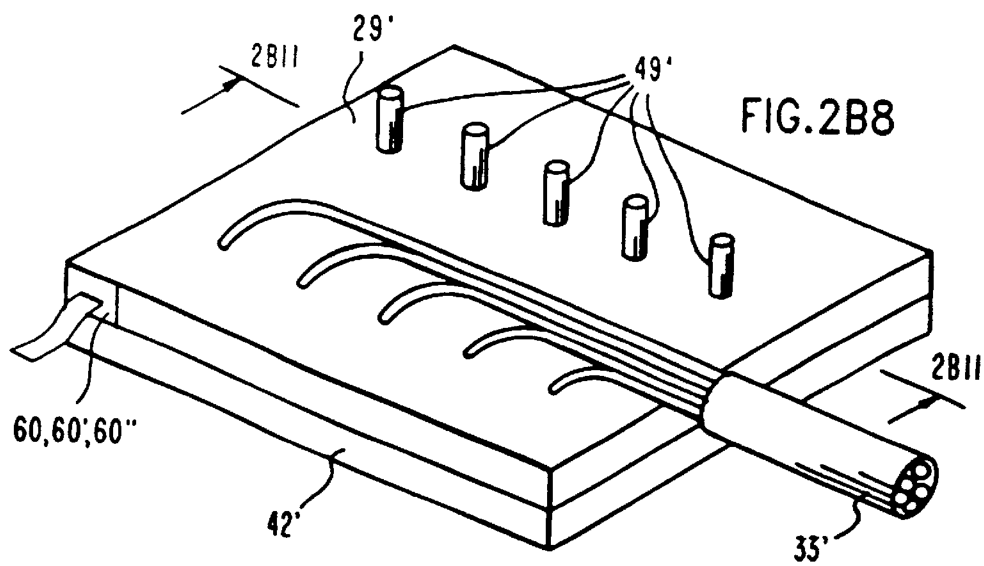
FIG.2B8

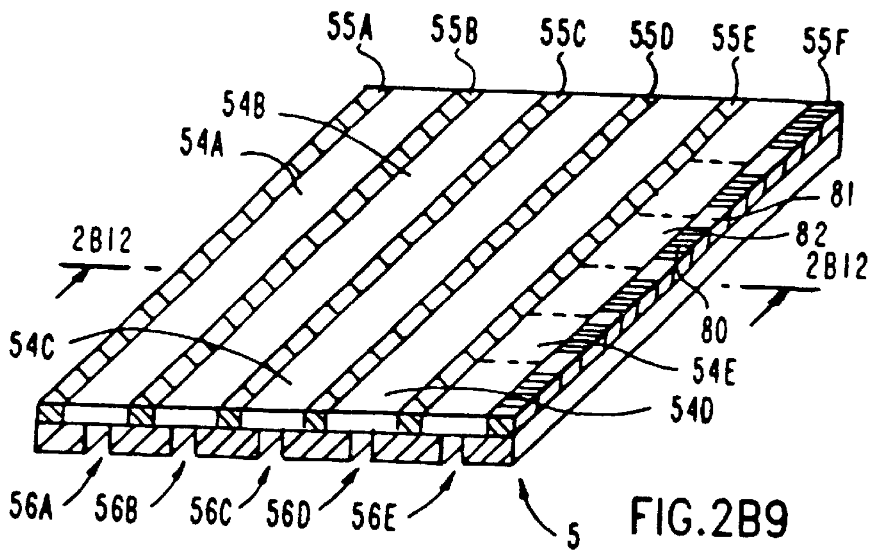
FIG.2B9
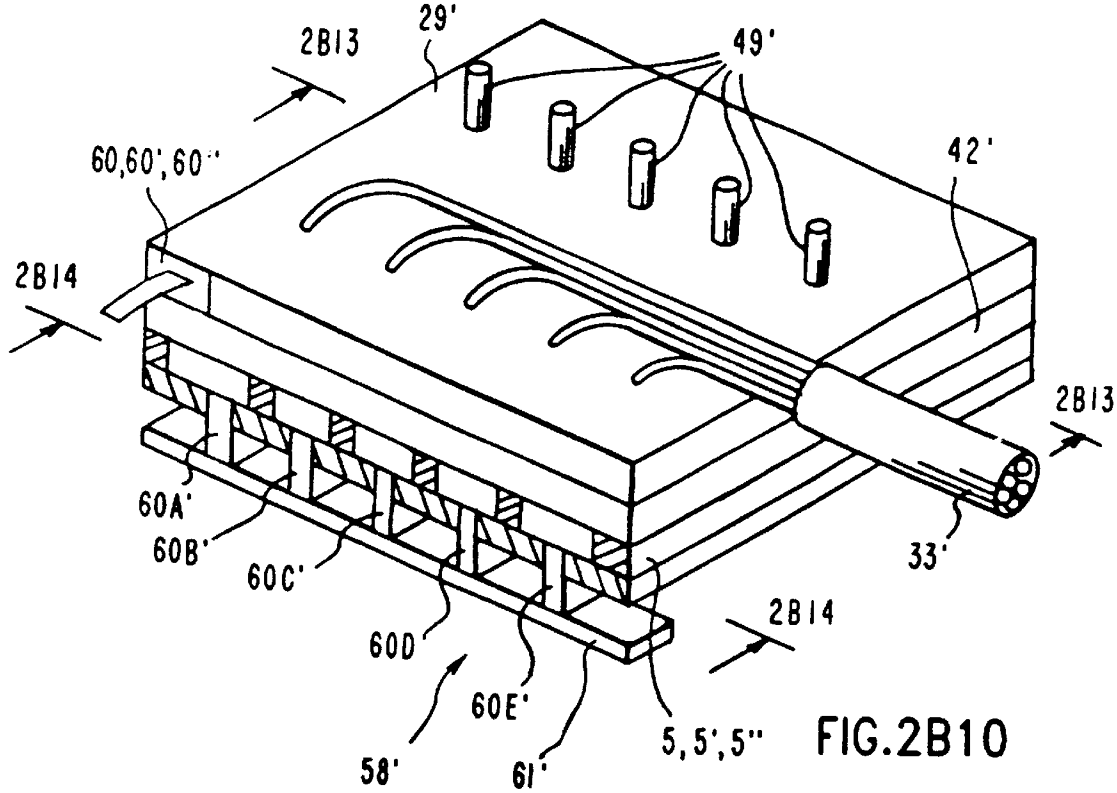
FIG.2B10

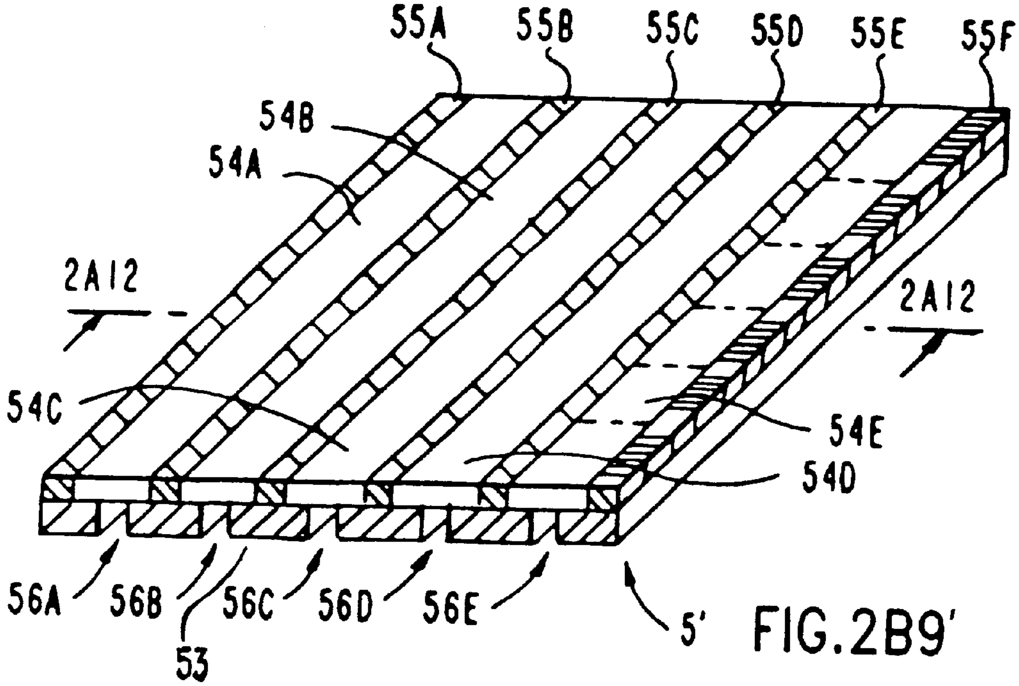
FIG.2B9'
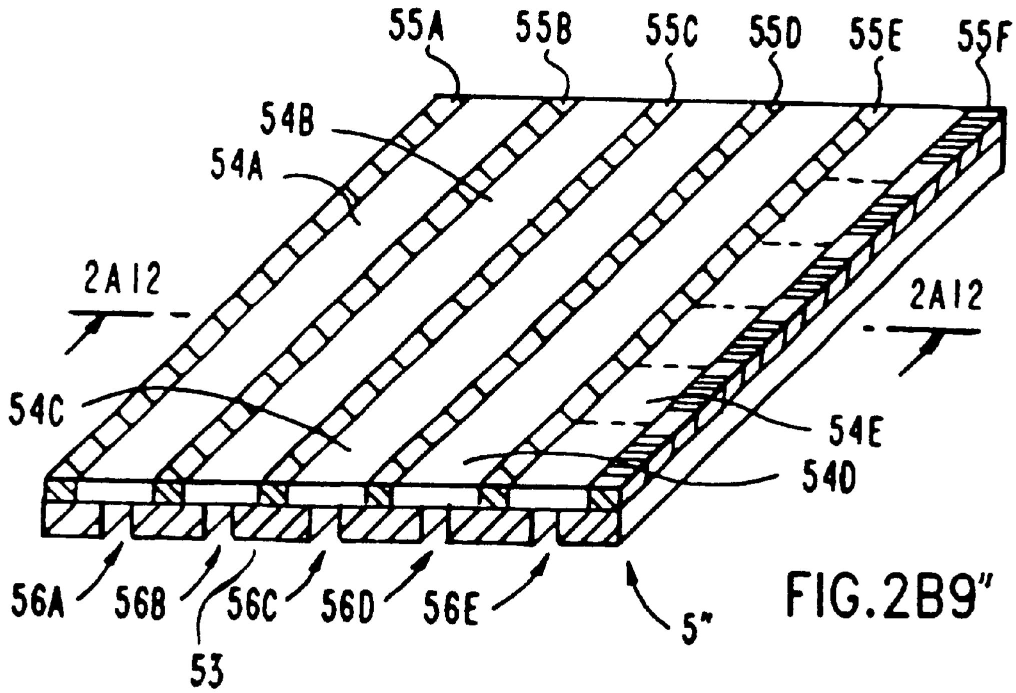
FIG.2B9"

FIG.2B11
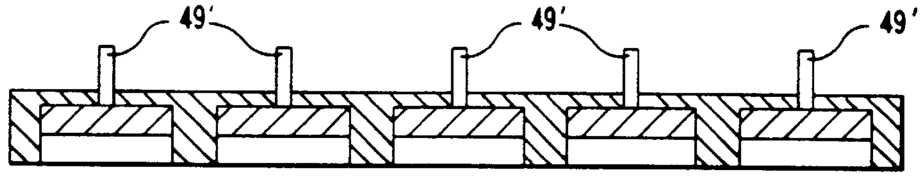
FIG.2B12
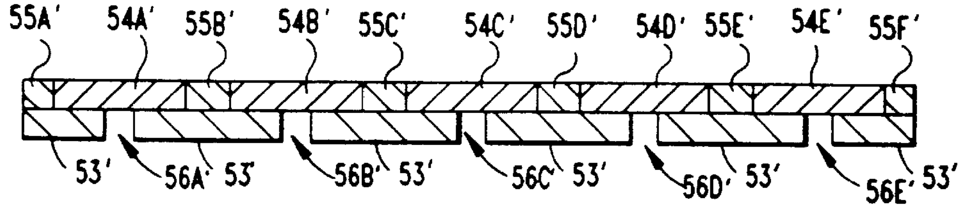
FIG.2B13
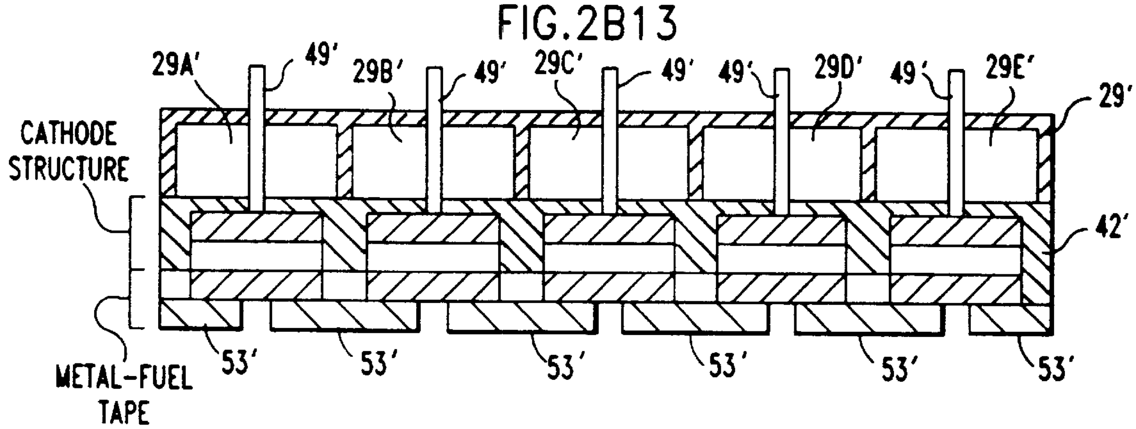
FIG.2B14
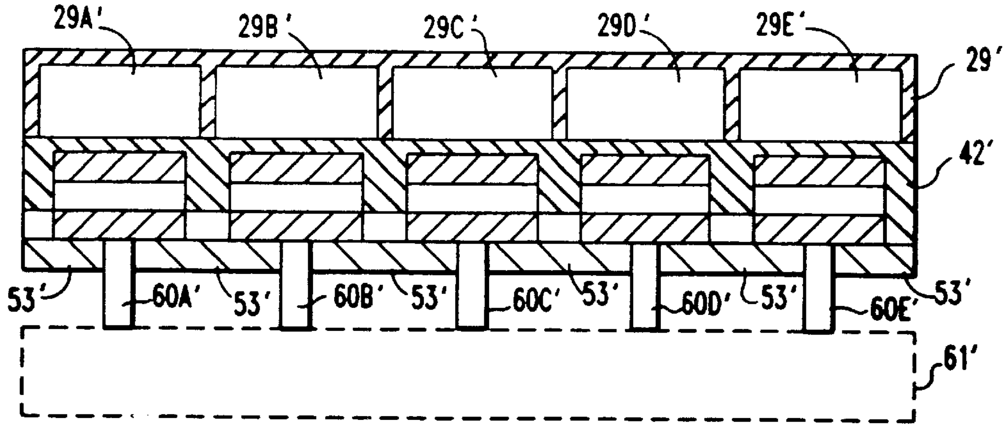

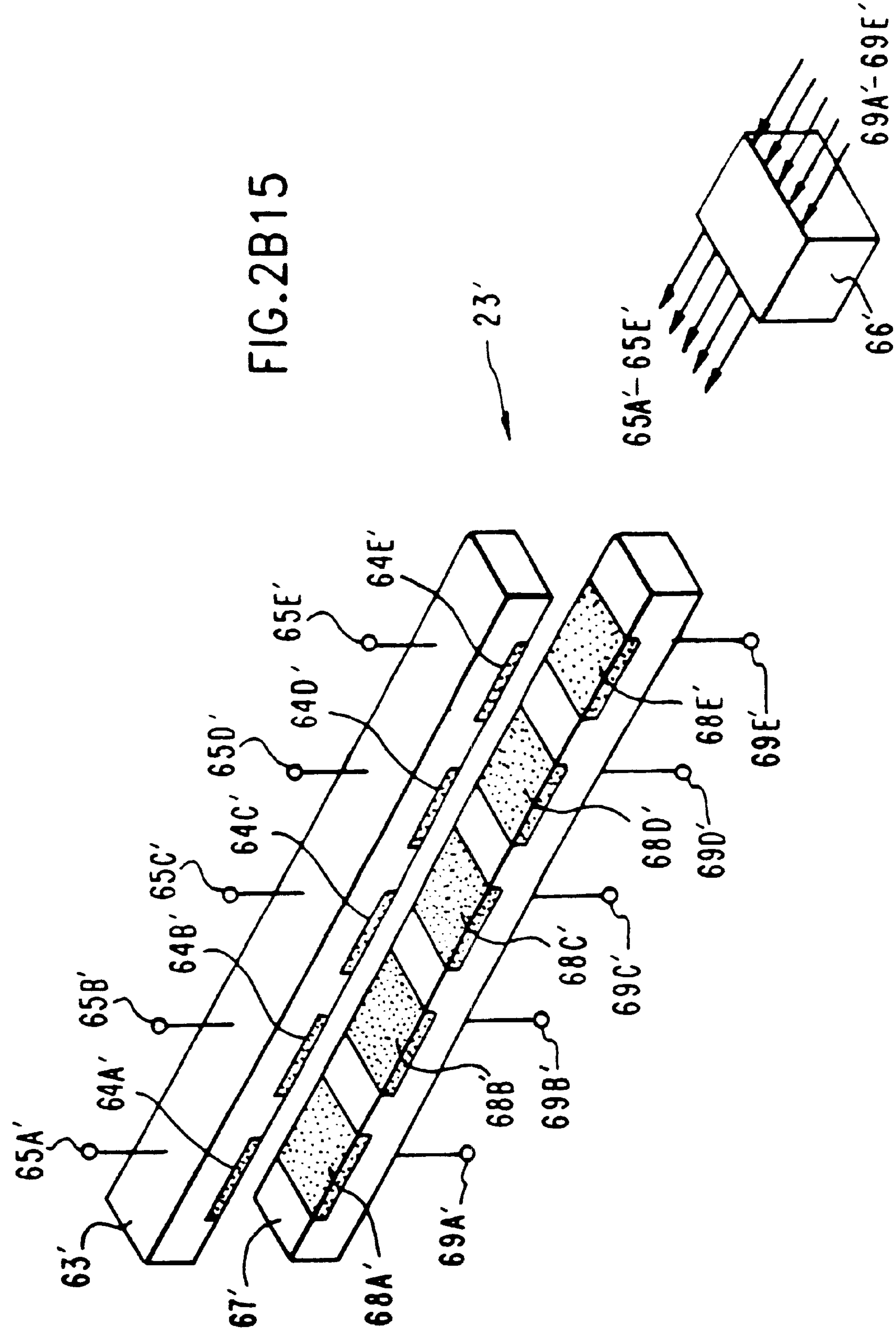
FIG.2B15

| FUEL-TAPE CASSETTE NO.__ | METAL-FUEL TRACK NO.1 | | | | | METAL-FUEL TRACK NO.2 | METAL-FUEL TRACK NO.3 | METAL-FUEL TRACK NO.4 | METAL-FUEL TRACK NO.5 |
|---|---|---|---|---|---|---|---|---|---|
| ZONE NO.1 | $t_1$ | $t_2$ | $t_3$ | ••• | $t_n$ | | | | |
| | $i_{ac}$ | | | ••• | | | | | |
| | $V_{ac}$ | | | ••• | | | | | |
| | $V_t$ | | | ••• | | | | | |
| | $pO_2$ | | | ••• | | | | | |
| | $H_2O\%$ | | | ••• | | | | | |
| | CM | | | ••• | | | | | |
| ZONE NO.2 | | | | | | | | | |
| ZONE NO.3 | | | | | | | | | |
| ZONE NO.4 | | | | | | | | | |
| ZONE NO.5 | | | | | | | | | |
| ⋮ | ⋮ | | | | | ⋮ | ⋮ | ⋮ | ⋮ |
| ZONE NO.n | | | | | | | | | |

FIG.2B16

RECHARGE DATA STRUCTURE

FIG.2B17
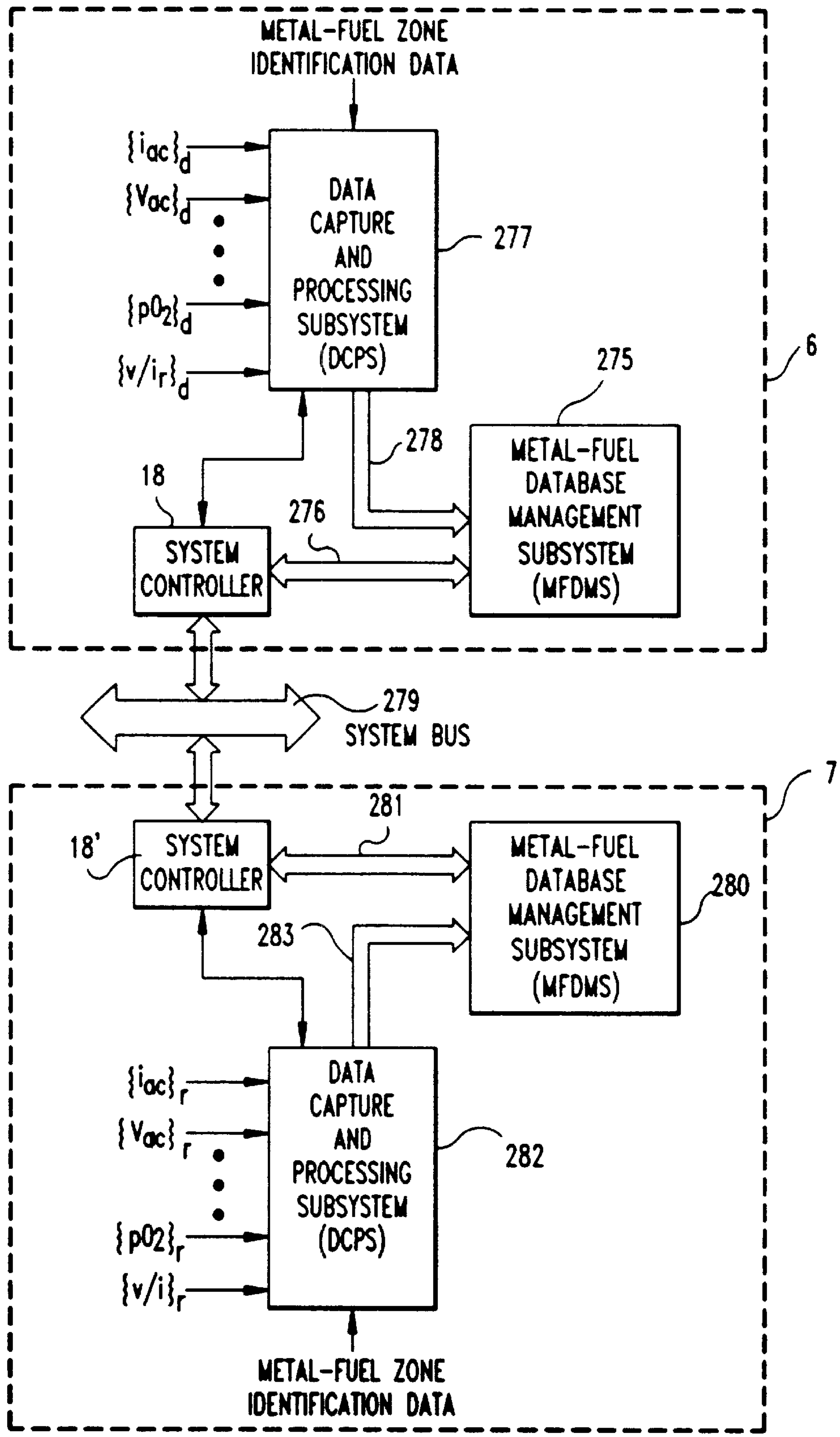

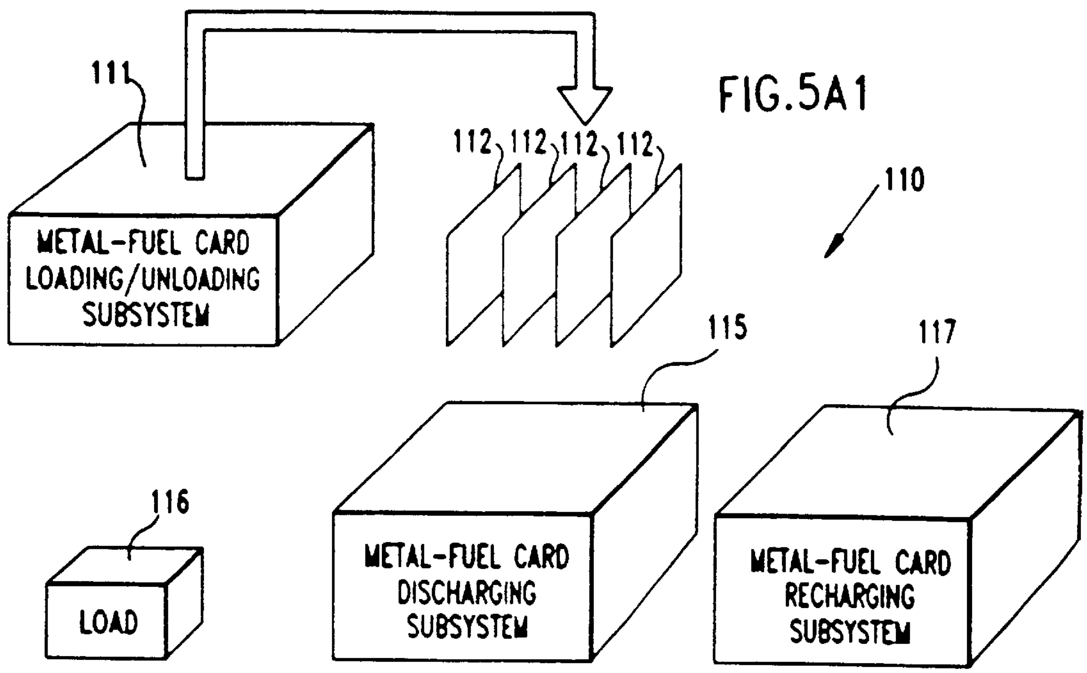
FIG.5A1
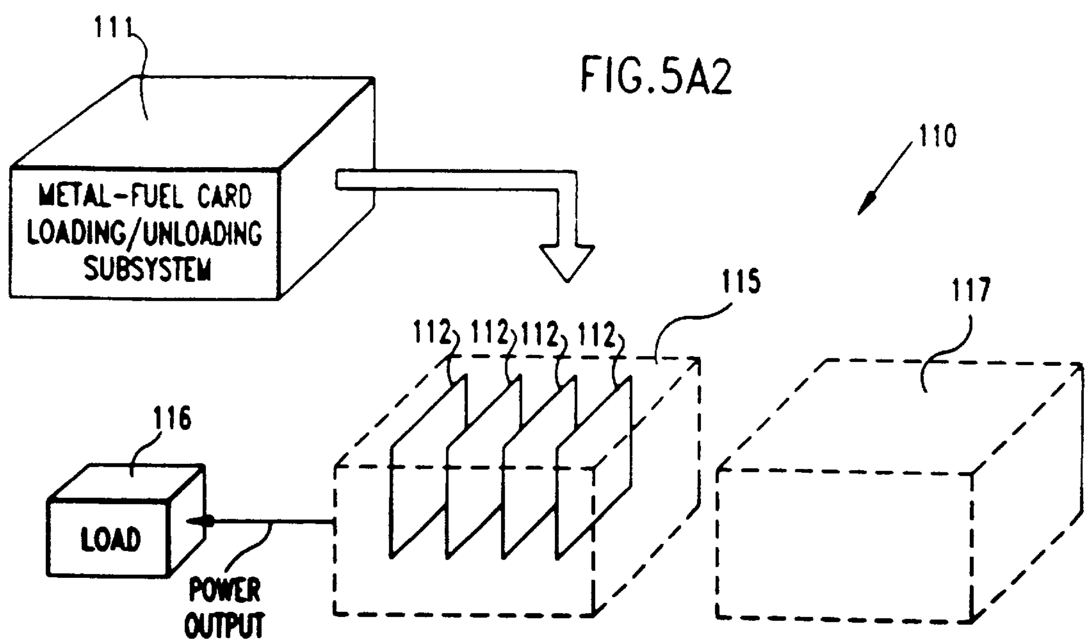
FIG.5A2

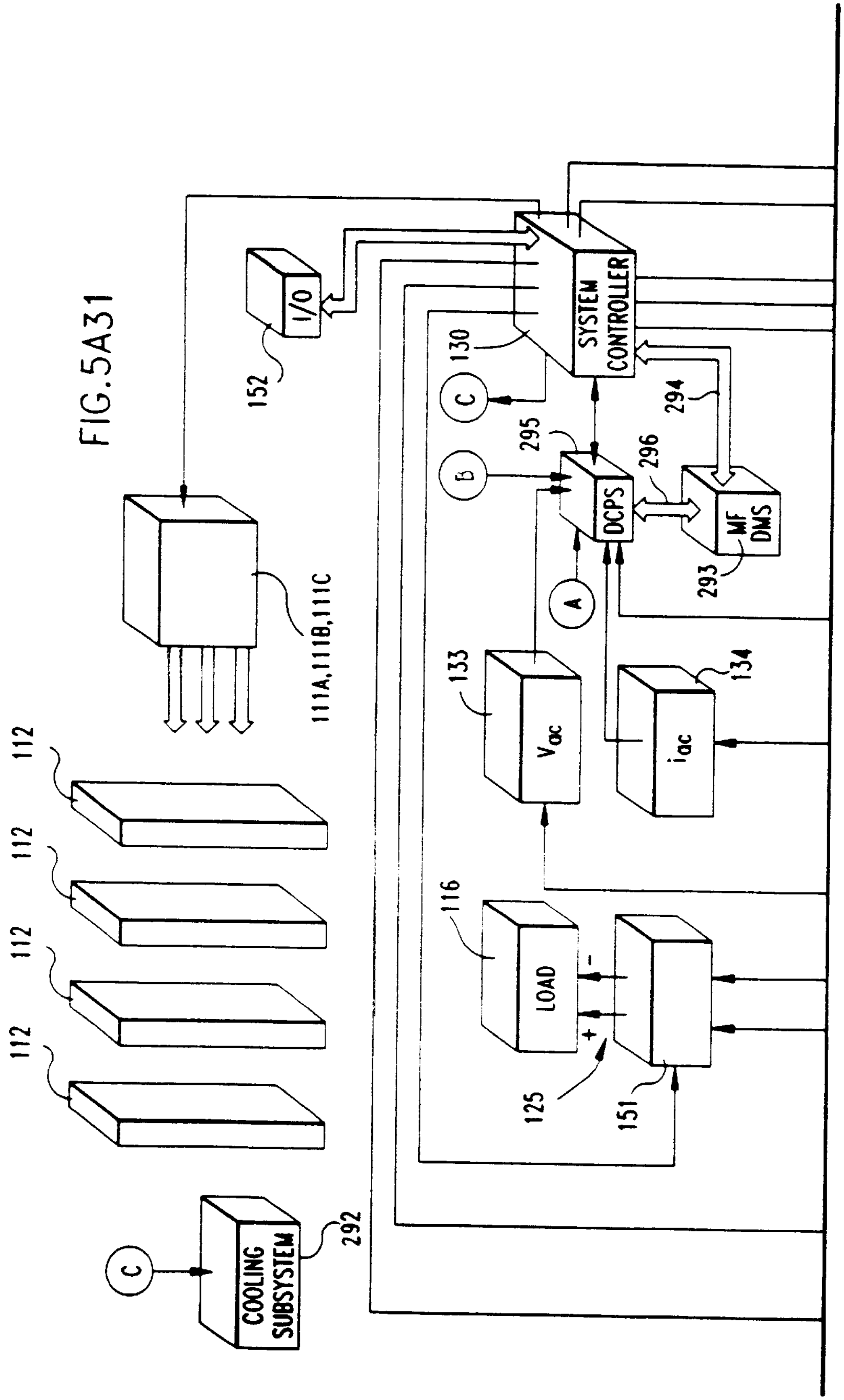
FIG.5A31

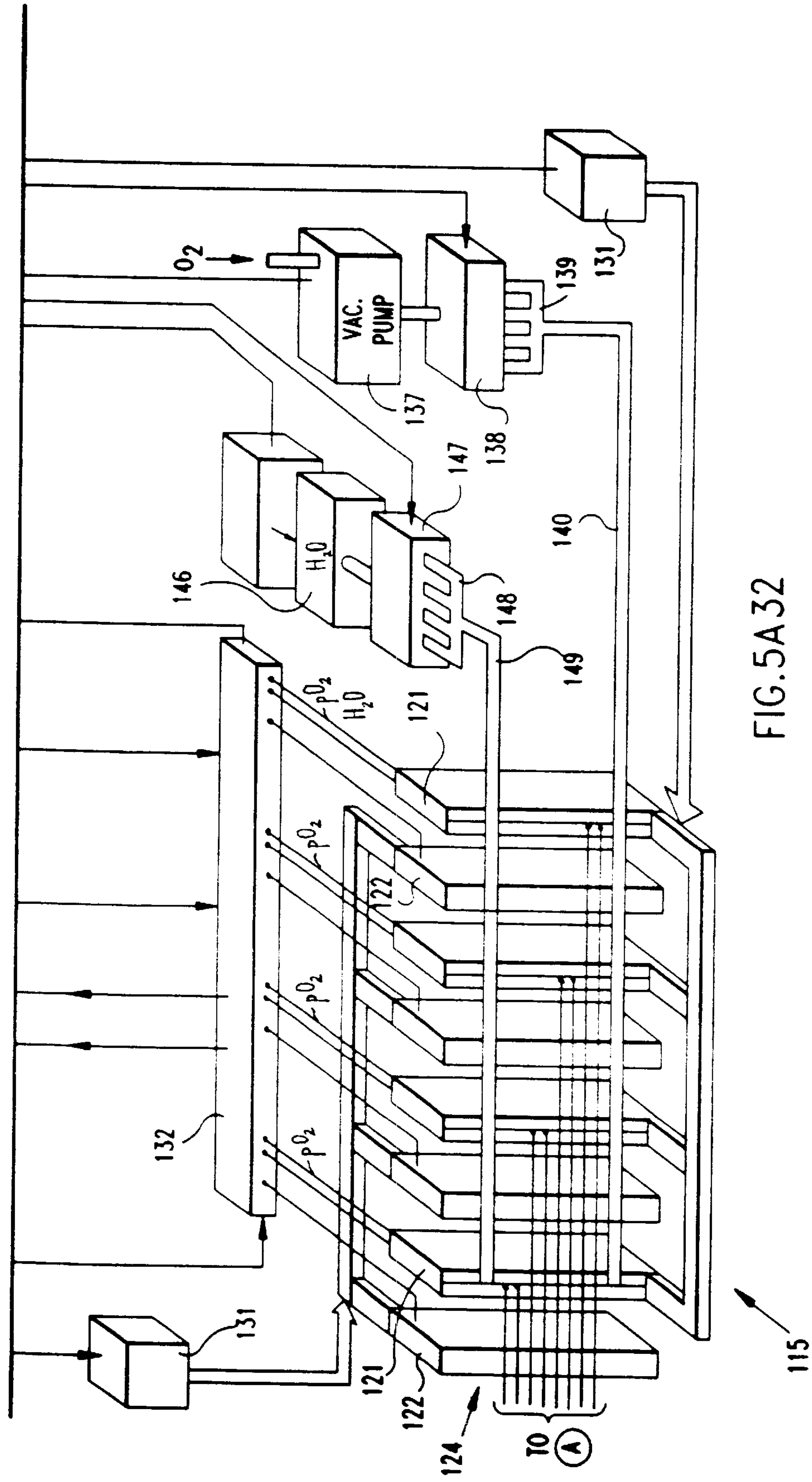
FIG.5A32

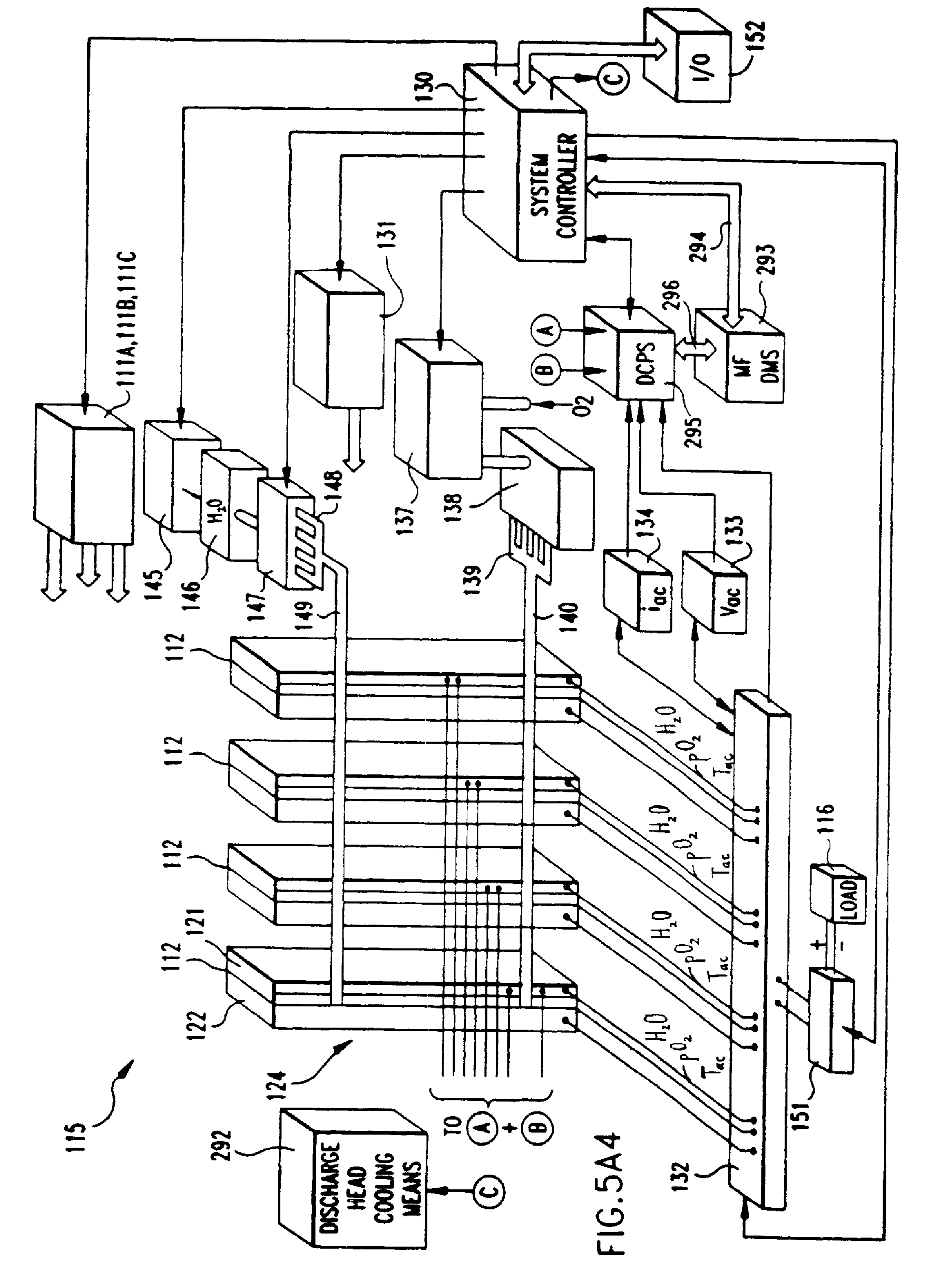
FIG.5A4

FIG.5A5
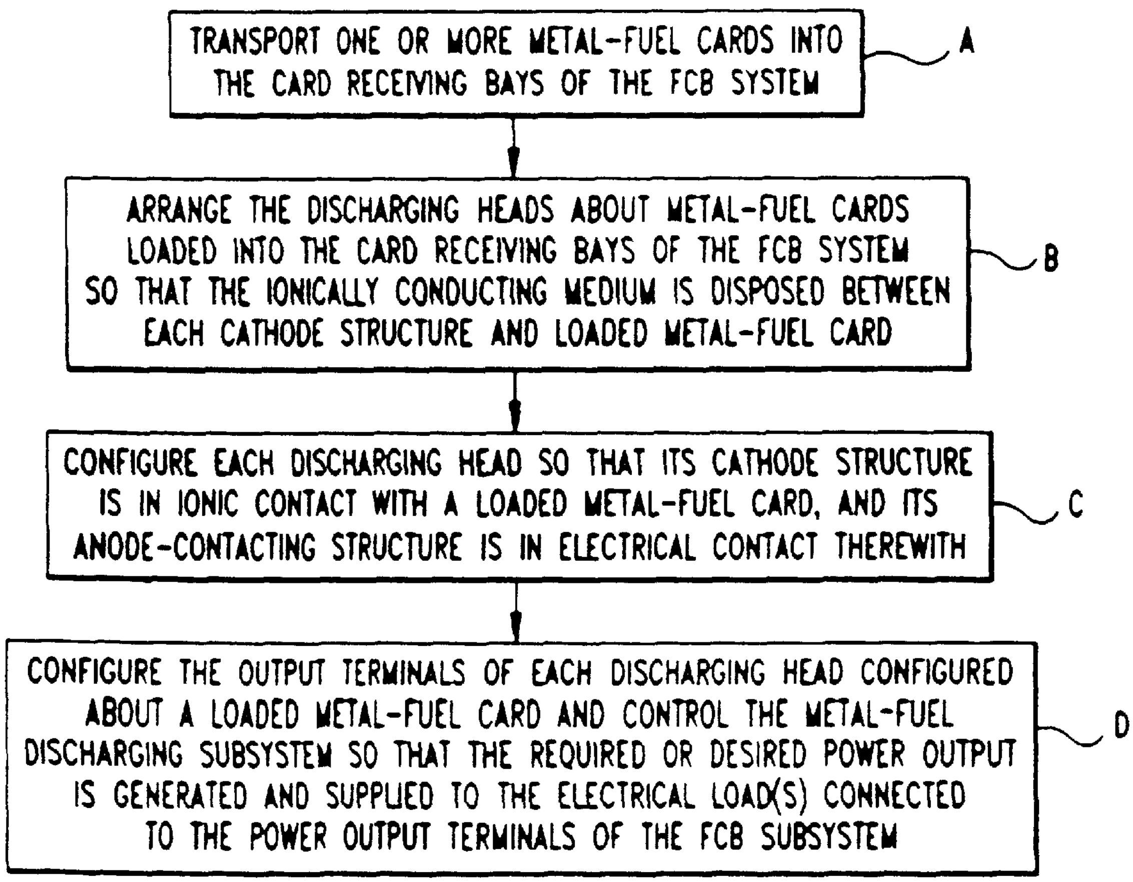

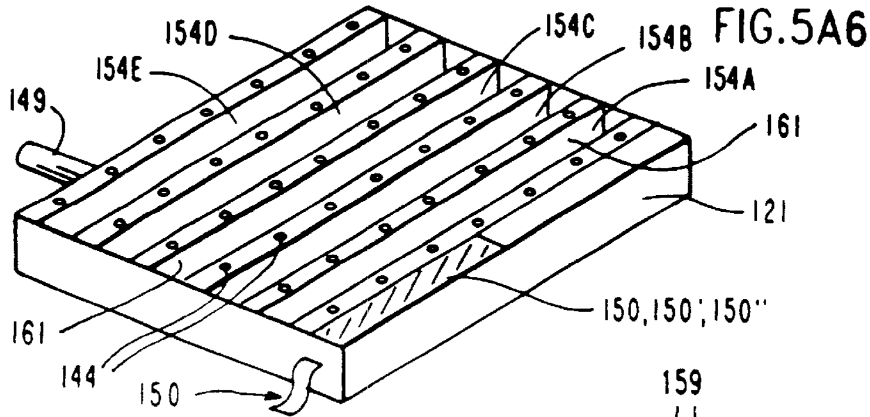
FIG.5A6
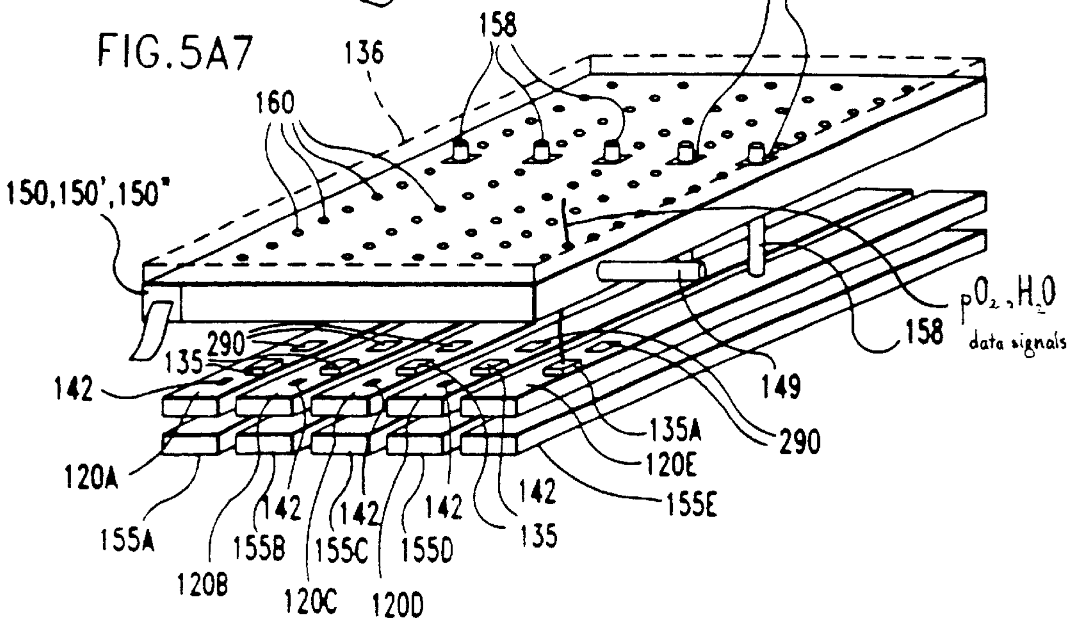
FIG.5A7
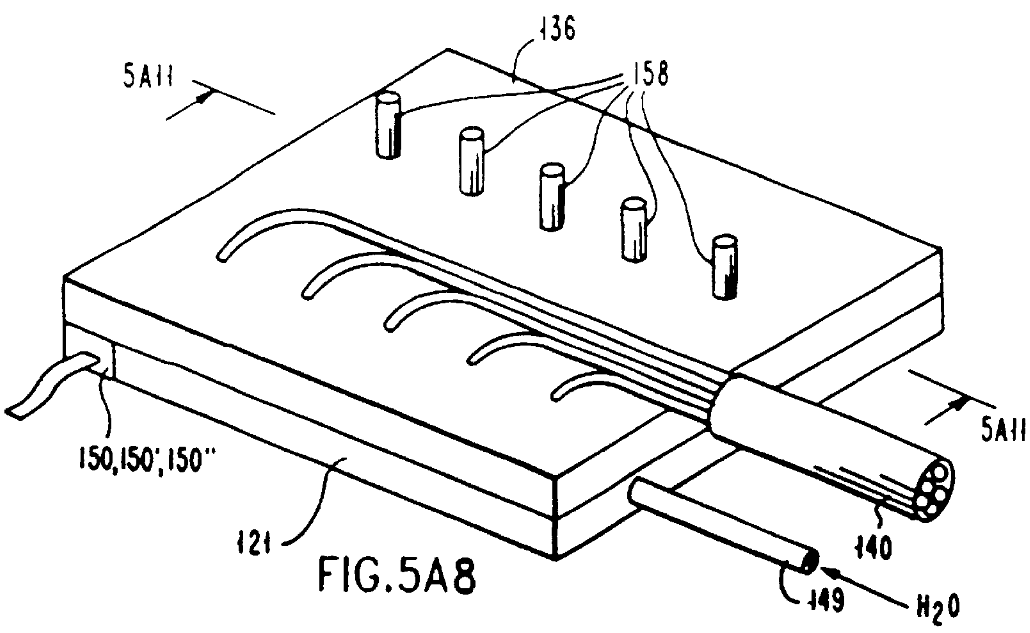
FIG.5A8

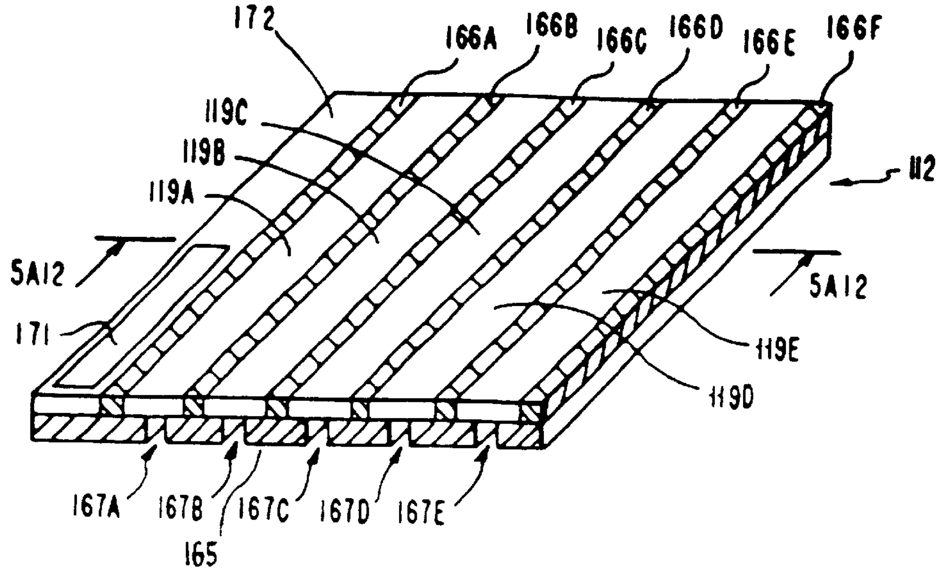
FIG.5A9
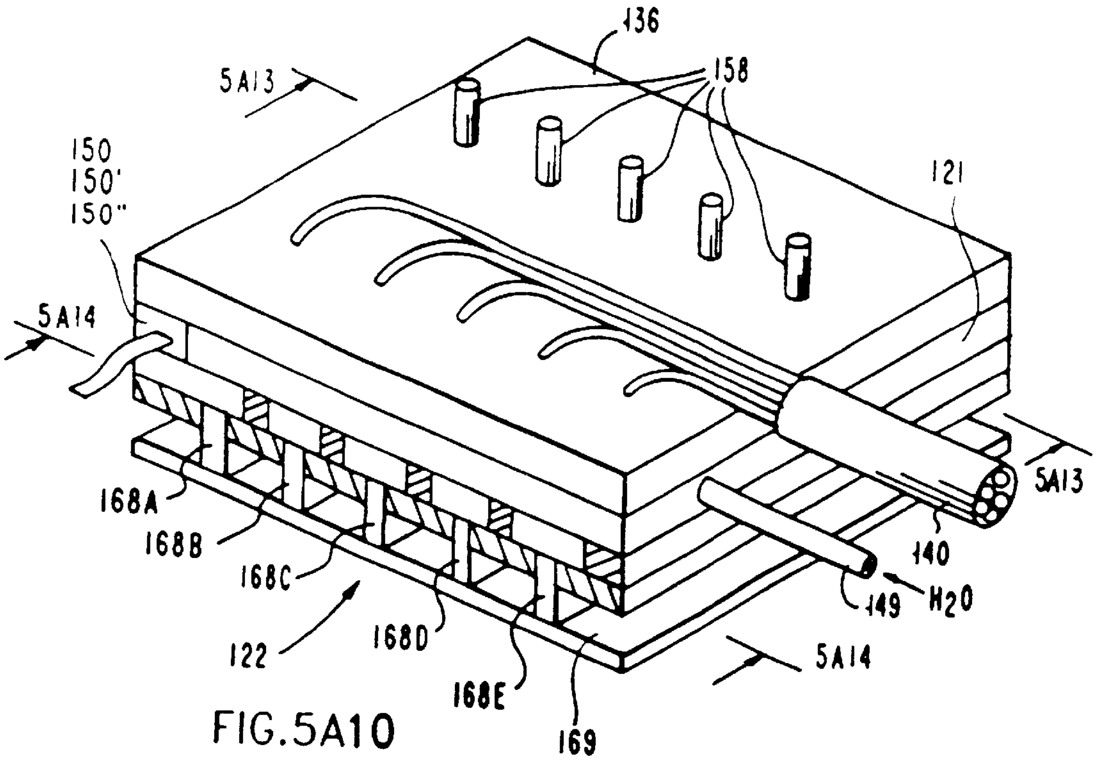
FIG.5A10

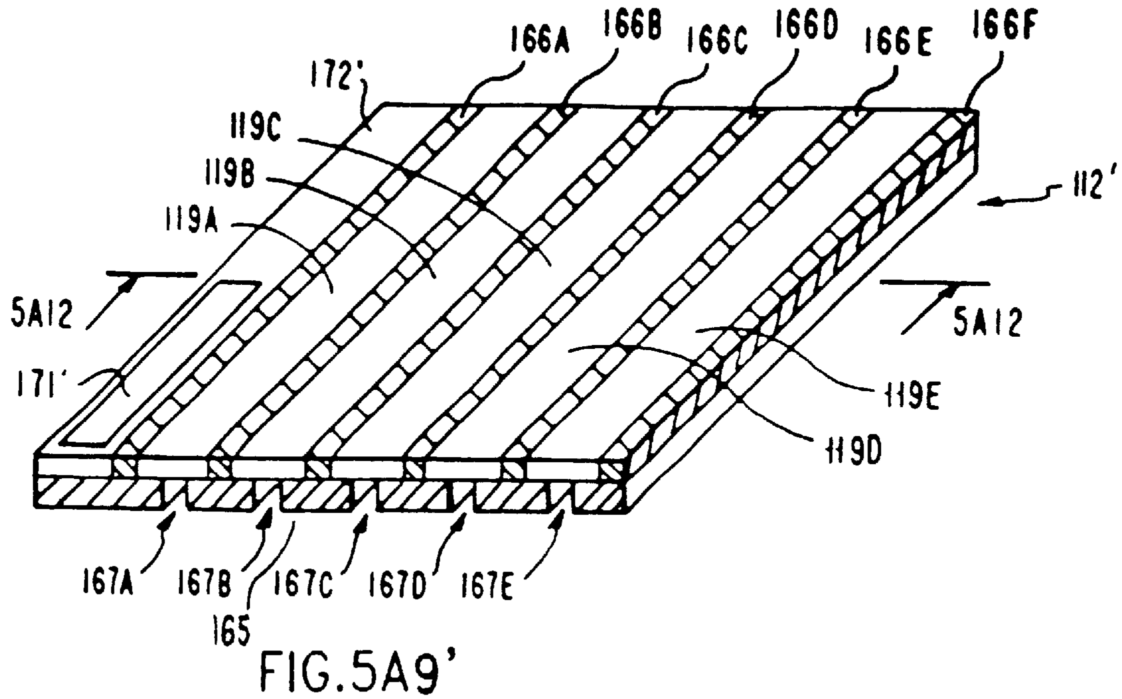
FIG.5A9'
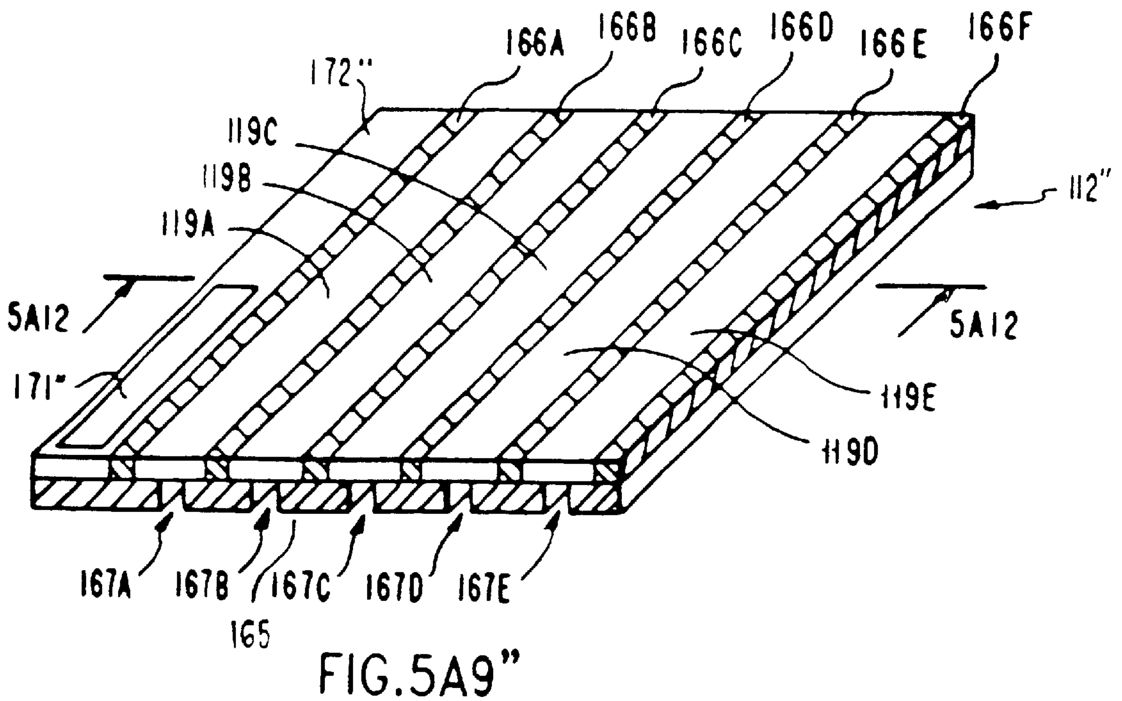
FIG.5A9"

FIG.5A11
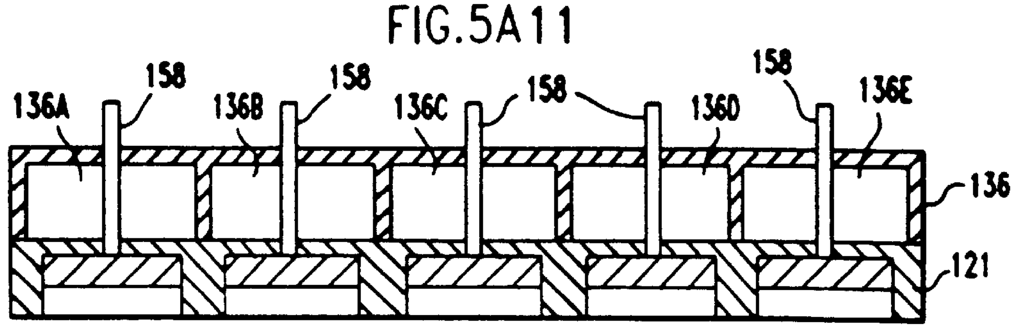
FIG.5A12
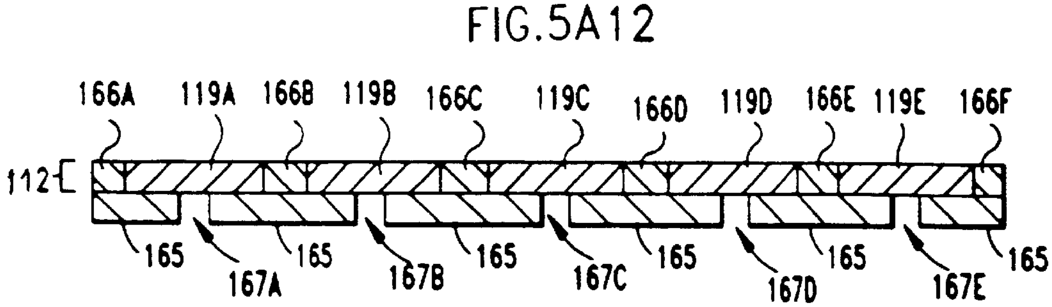
FIG.5A13
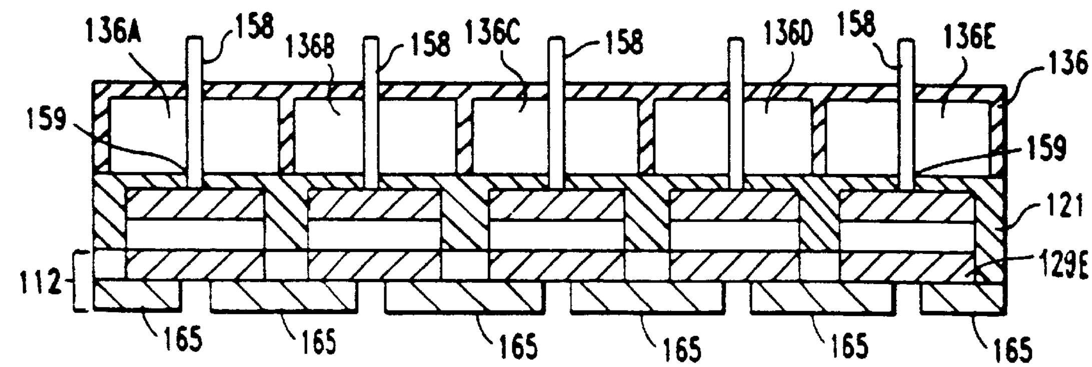
FIG.5A14
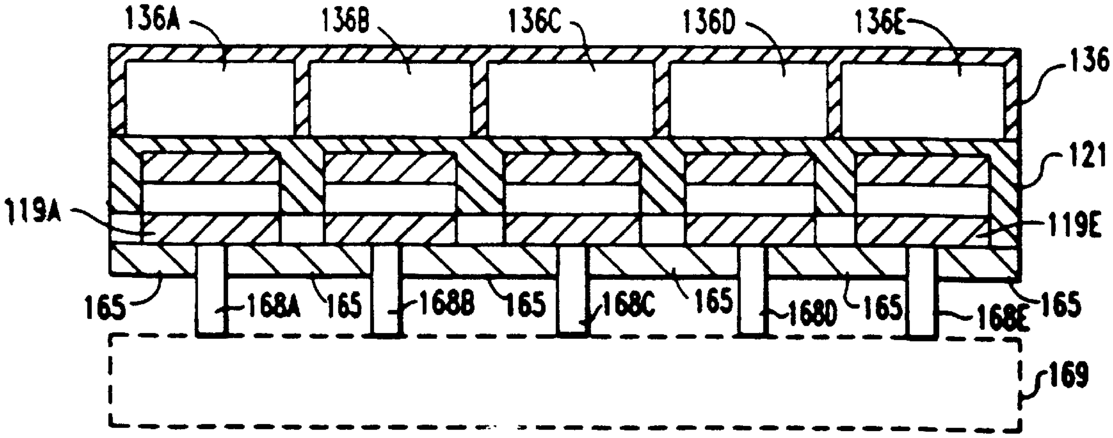

FIG.5A15

DISCHARGE DATA STRUCTURE

| FUEL-TAPE CARD NO. | METAL-FUEL TRACK NO. 1 | METAL-FUEL TRACK NO. 2 | METAL-FUEL TRACK NO. 3 | METAL-FUEL TRACK NO. 4 | METAL-FUEL TRACK NO. 5 |
|---|---|---|---|---|---|
| TIME $t_1$ | $V_{ac}$<br>$i_{ac}$<br>$PO_2$<br>$H_2O$ %<br>COMPUTED MEASURES | | | | |
| TIME $t_2$ | | | | | |
| TIME $t_3$ | | | | | |
| TIME $t_4$ | | | | | |
| TIME $t_5$ | | | | | |
| ⋮ | ⋮ | ⋮ | ⋮ | ⋮ | ⋮ |
| TIME $t_n$ | | | | | |

301

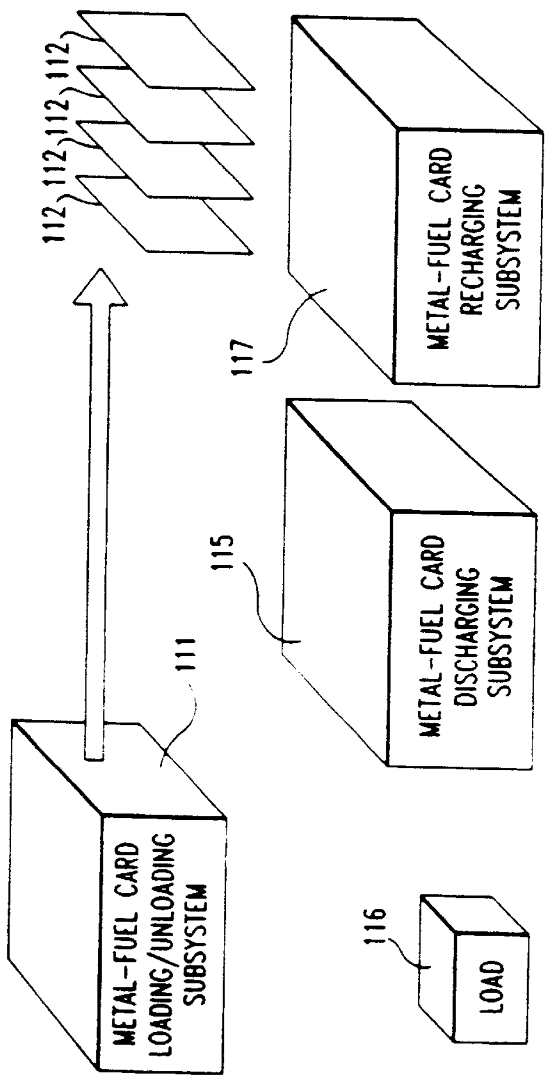
FIG.5B1
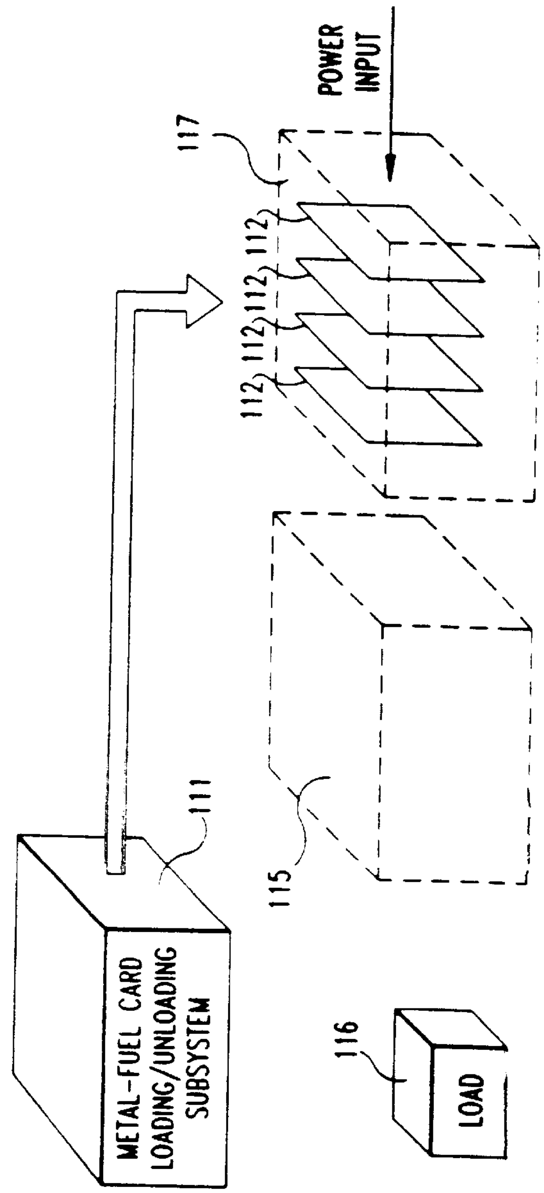
FIG.5B2

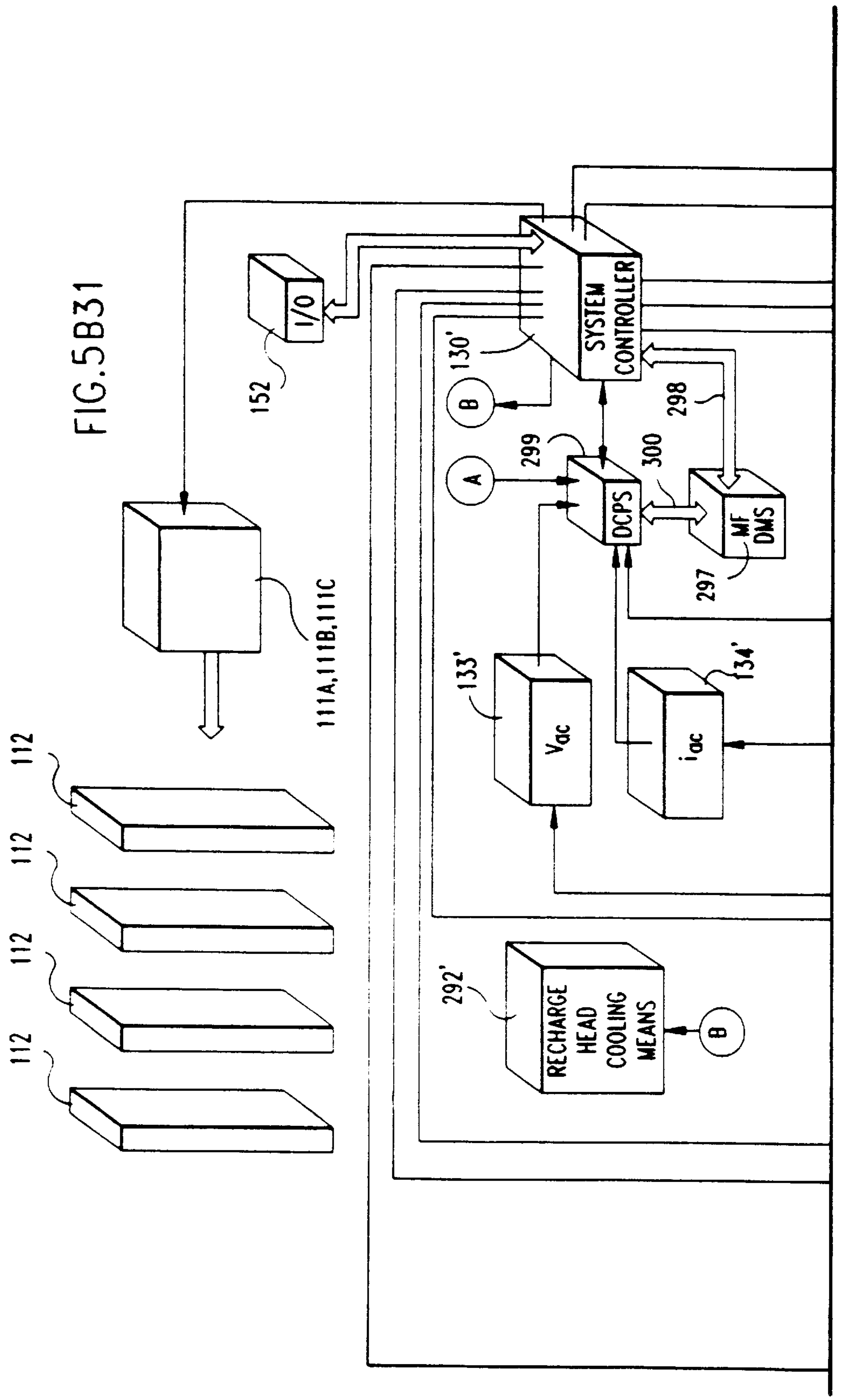
FIG.5B31

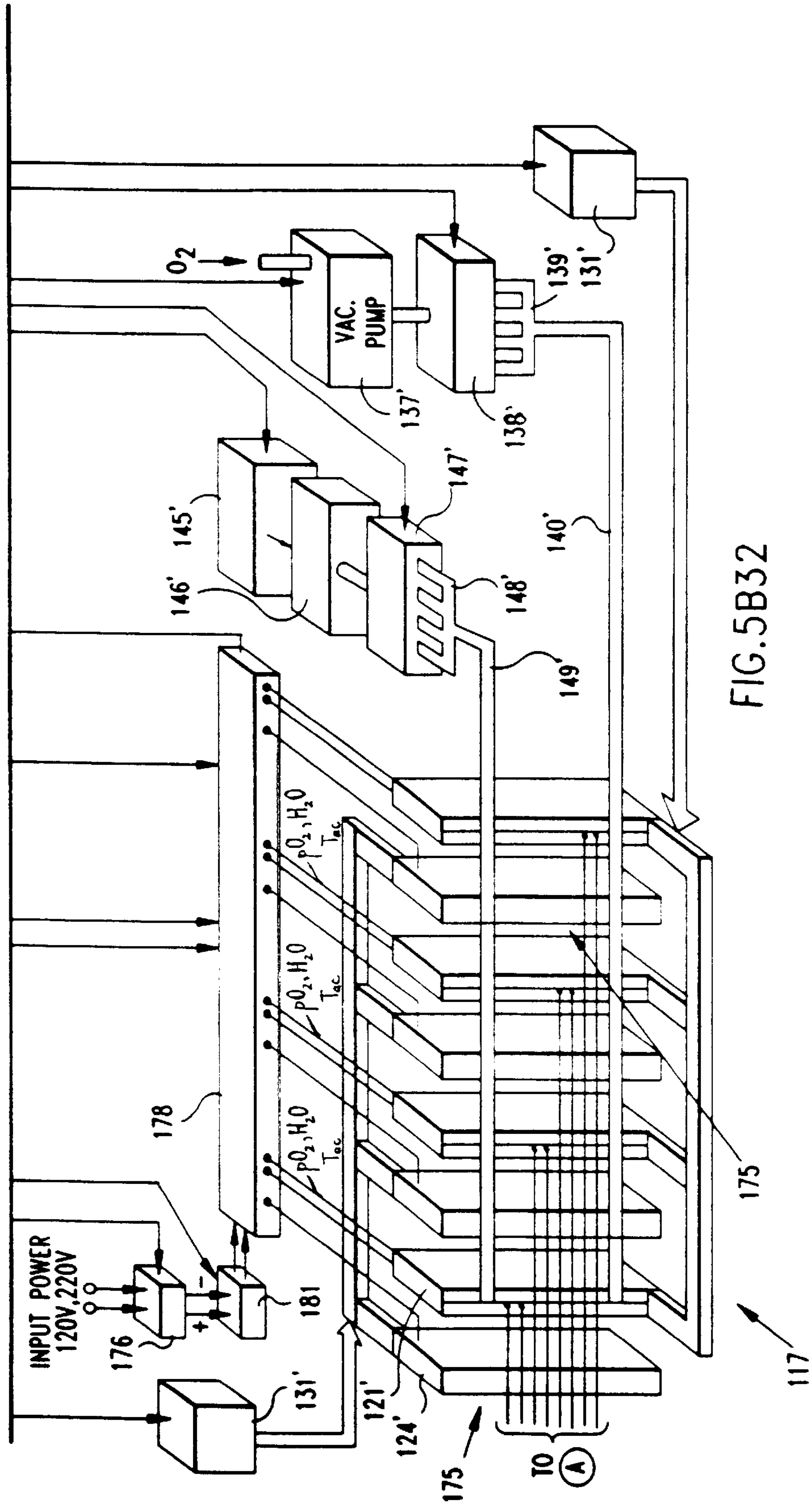
FIG.5B32

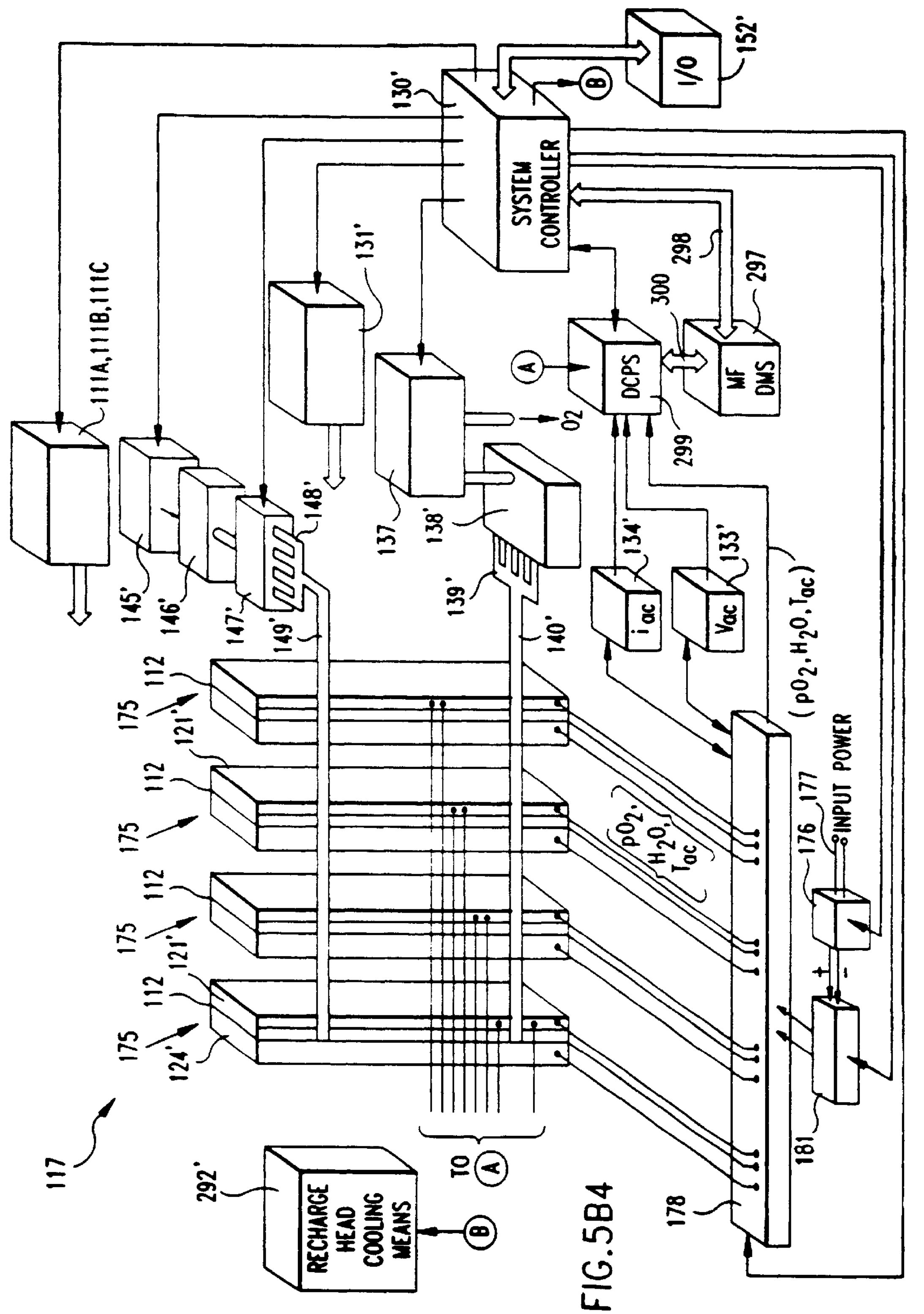
FIG.5B4

FIG.5B5
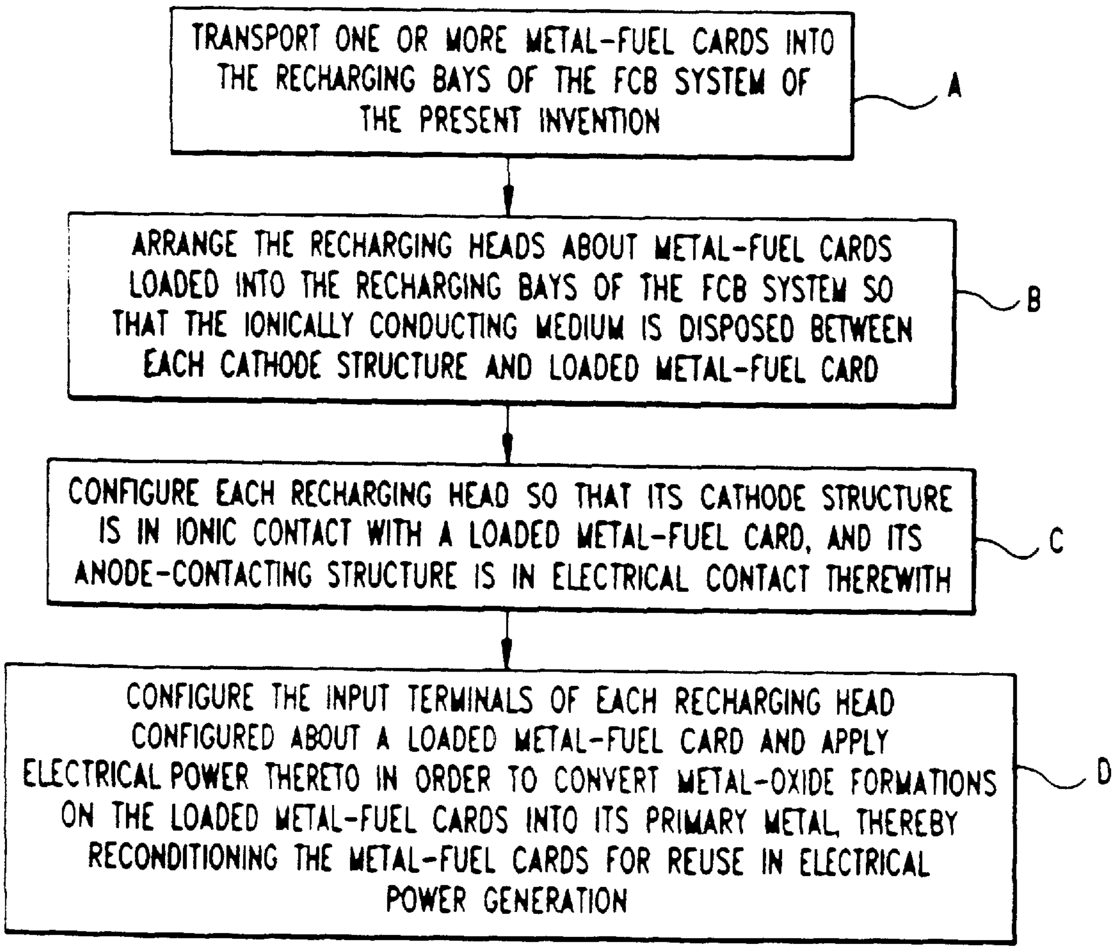

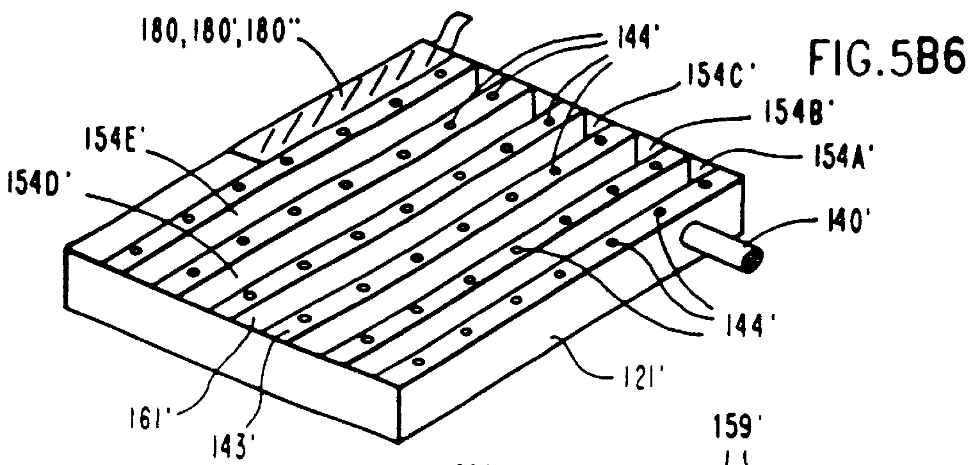
FIG.5B6
FIG.5B7
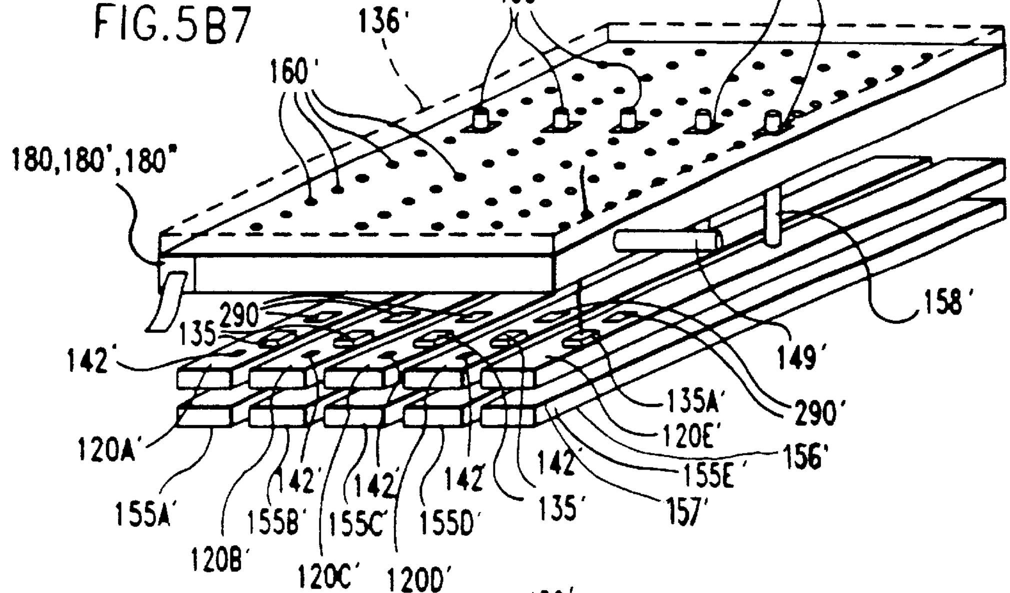
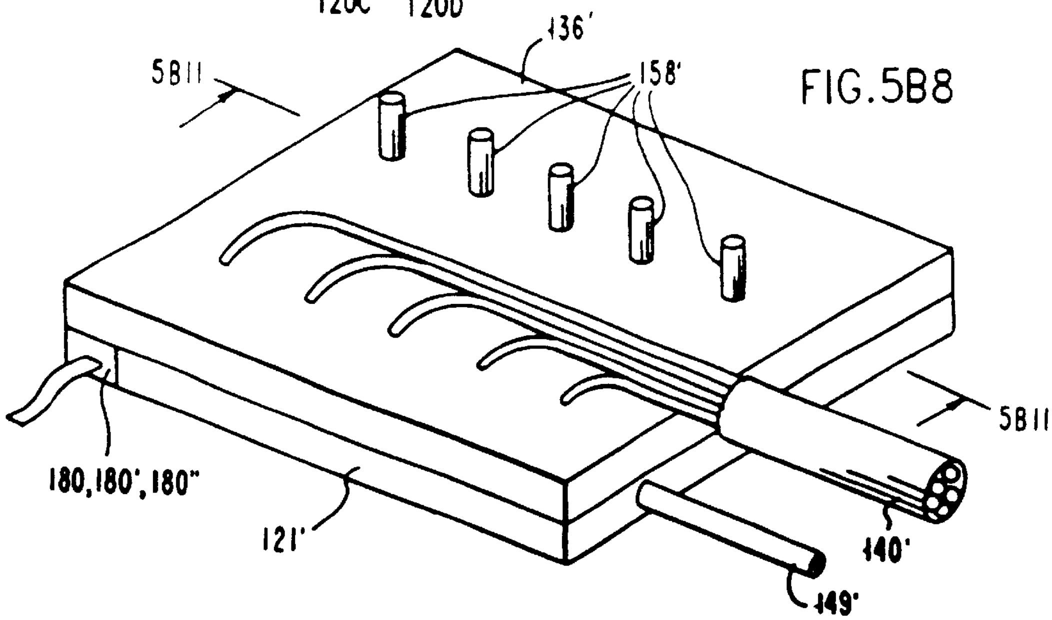
FIG.5B8

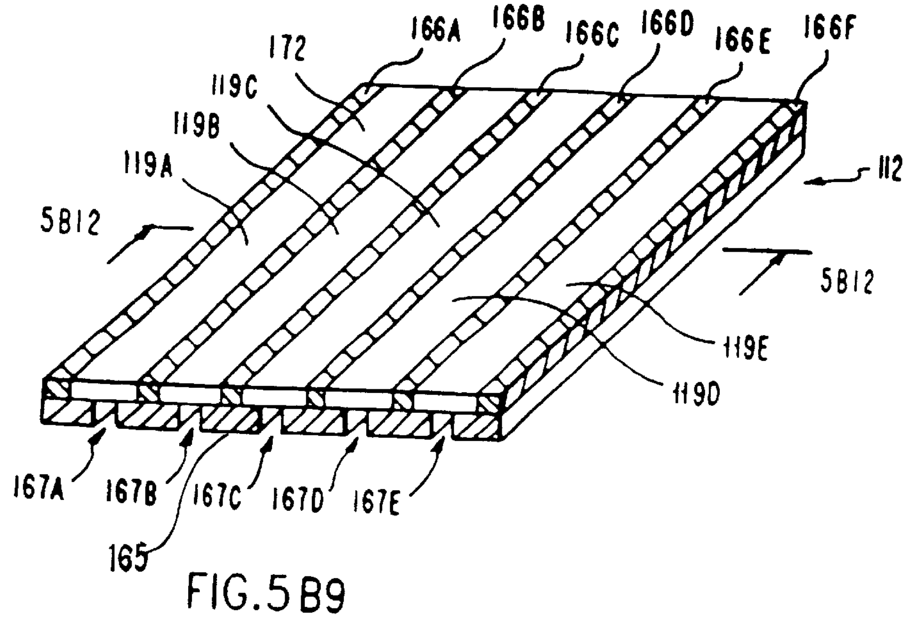
FIG.5B9
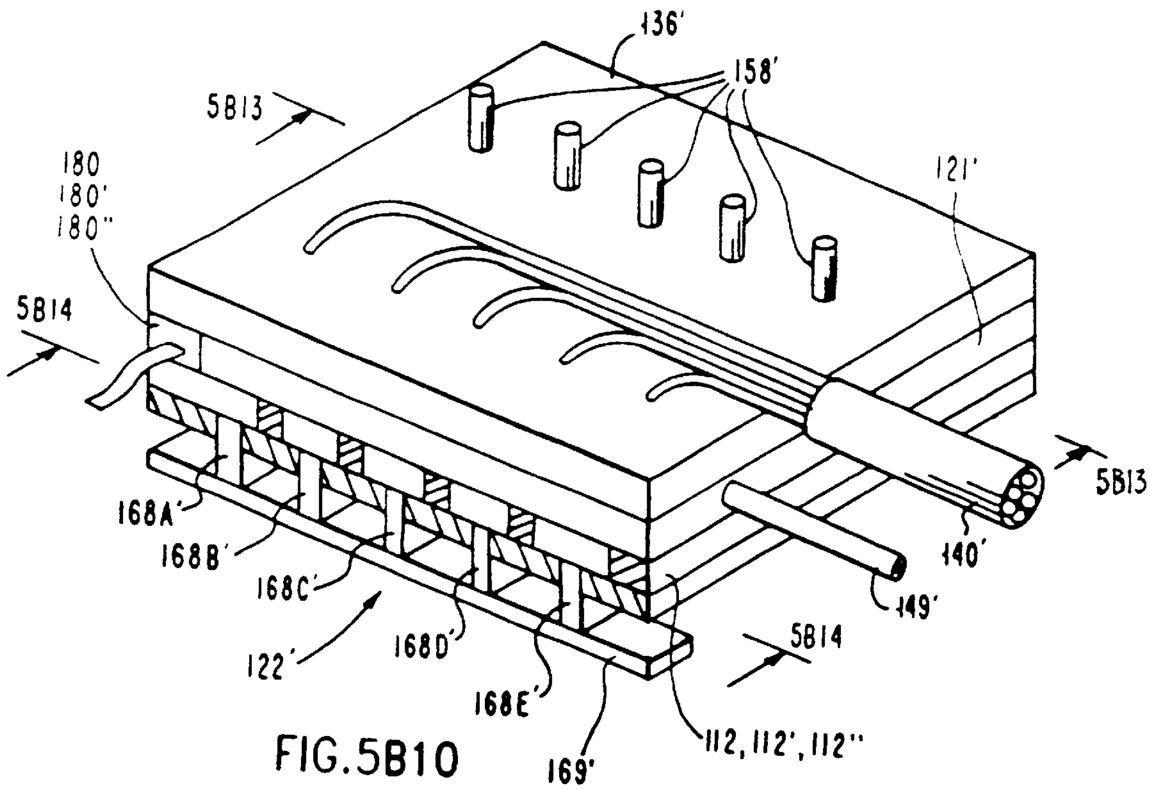
FIG.5B10

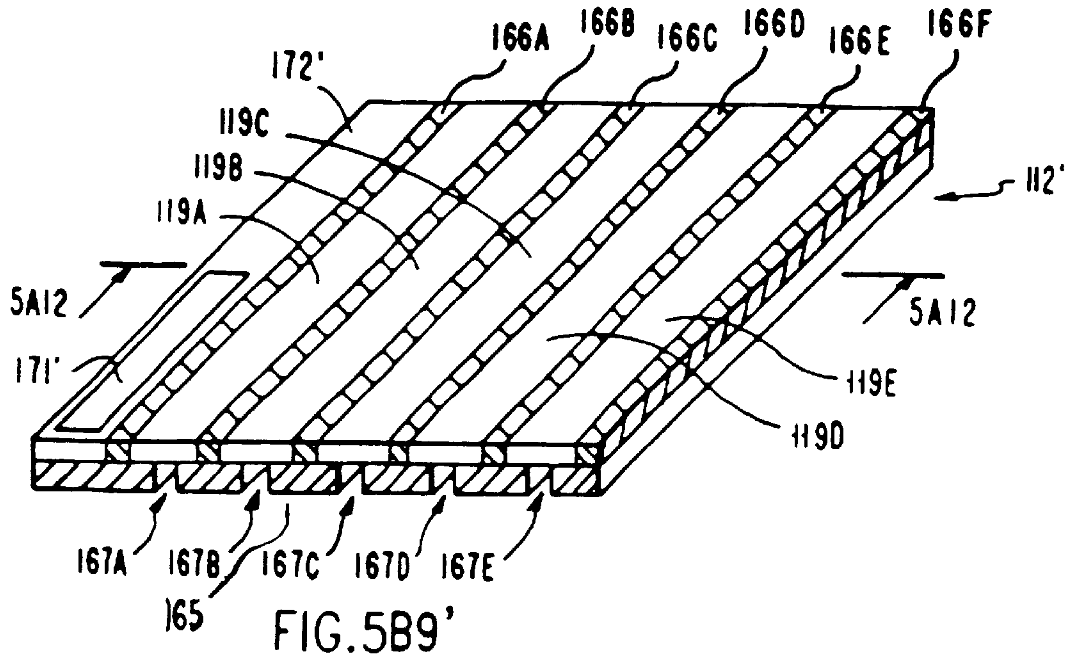
FIG.5B9'
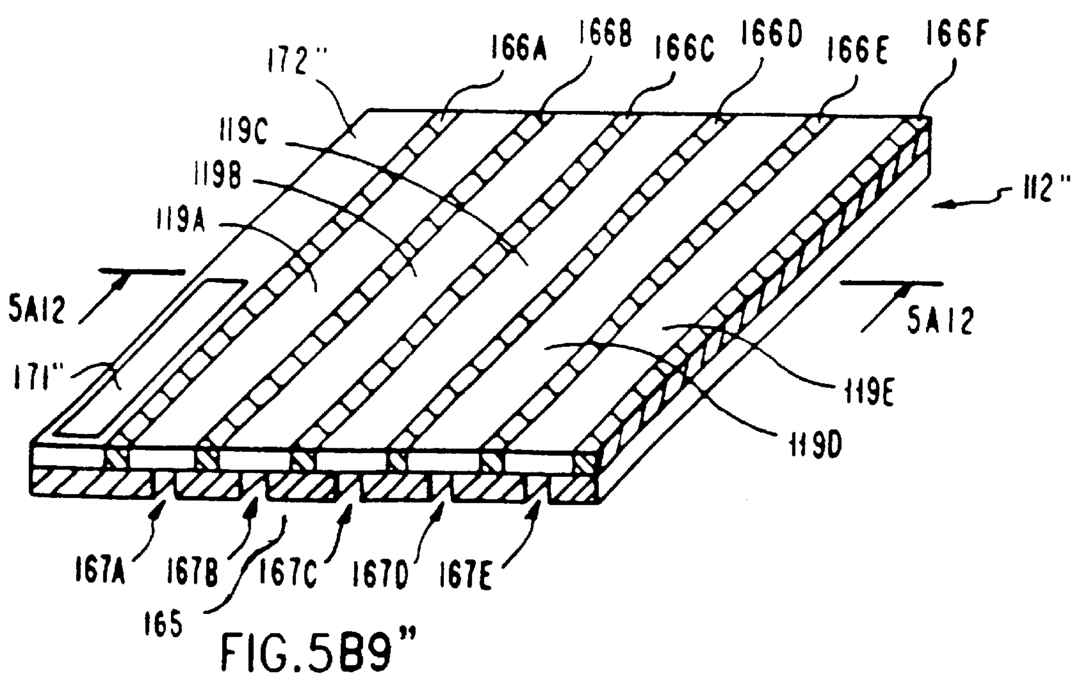
FIG.5B9"

FIG.5B11
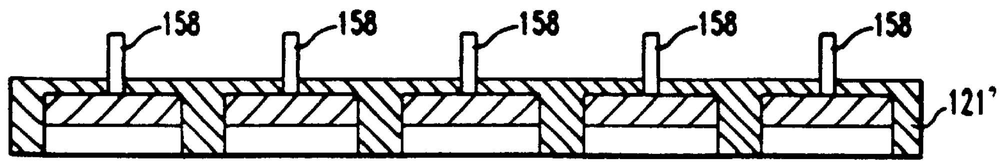
FIG.5B12
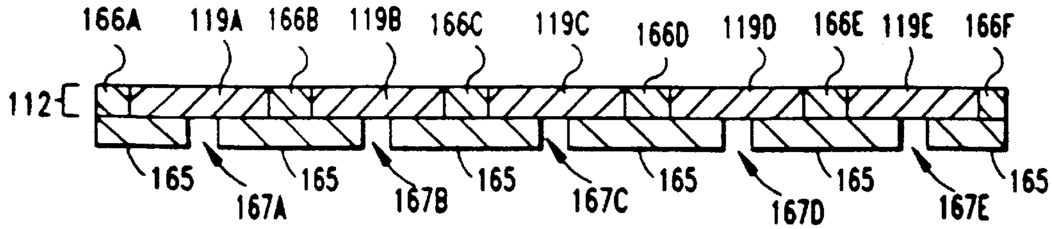
FIG.5B13
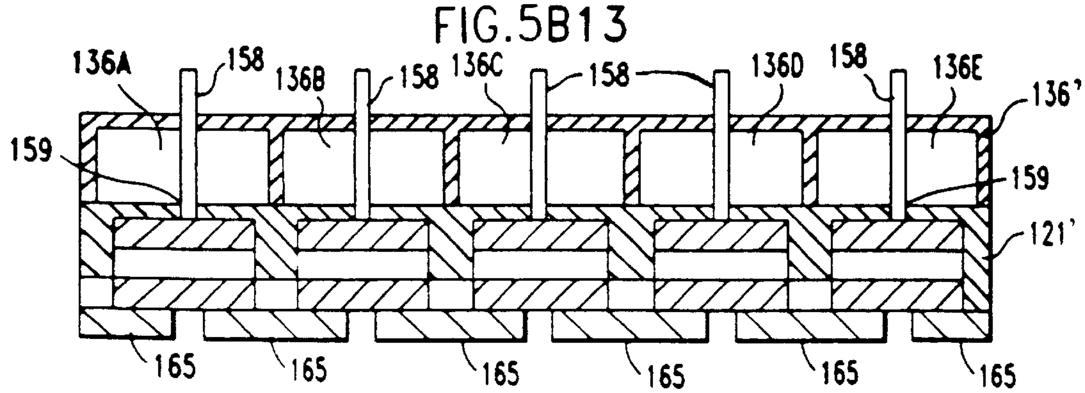
FIG.5B14
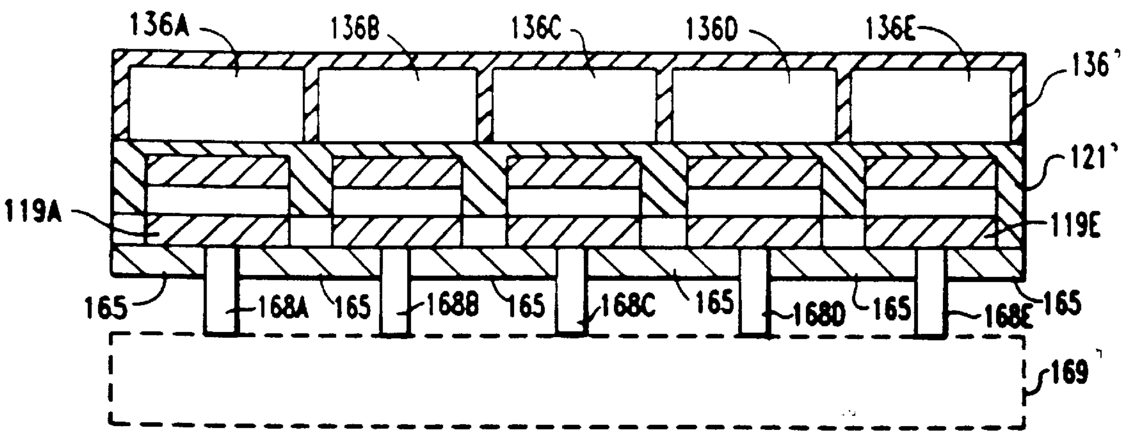

FIG.5B15

RECHARGE DATA STRUCTURE

| FUEL-TAPE CARD NO. | METAL-FUEL TRACK NO. 1 | METAL-FUEL TRACK NO. 2 | METAL-FUEL TRACK NO. 3 | METAL-FUEL TRACK NO. 4 | METAL-FUEL TRACK NO. 5 |
|---|---|---|---|---|---|
| TIME $t_1$ | $V_{oc}$<br>$i_{ac}$<br>$PO_2$<br>$H_2O$ %<br>COMPUTED MEASURES | | | | |
| TIME $t_2$ | | | | | |
| TIME $t_3$ | | | | | |
| TIME $t_4$ | | | | | |
| TIME $t_5$ | | | | | |
| ⋮ | ⋮ | ⋮ | ⋮ | ⋮ | ⋮ |
| TIME $t_n$ | | | | | |

302

FIG.5B16
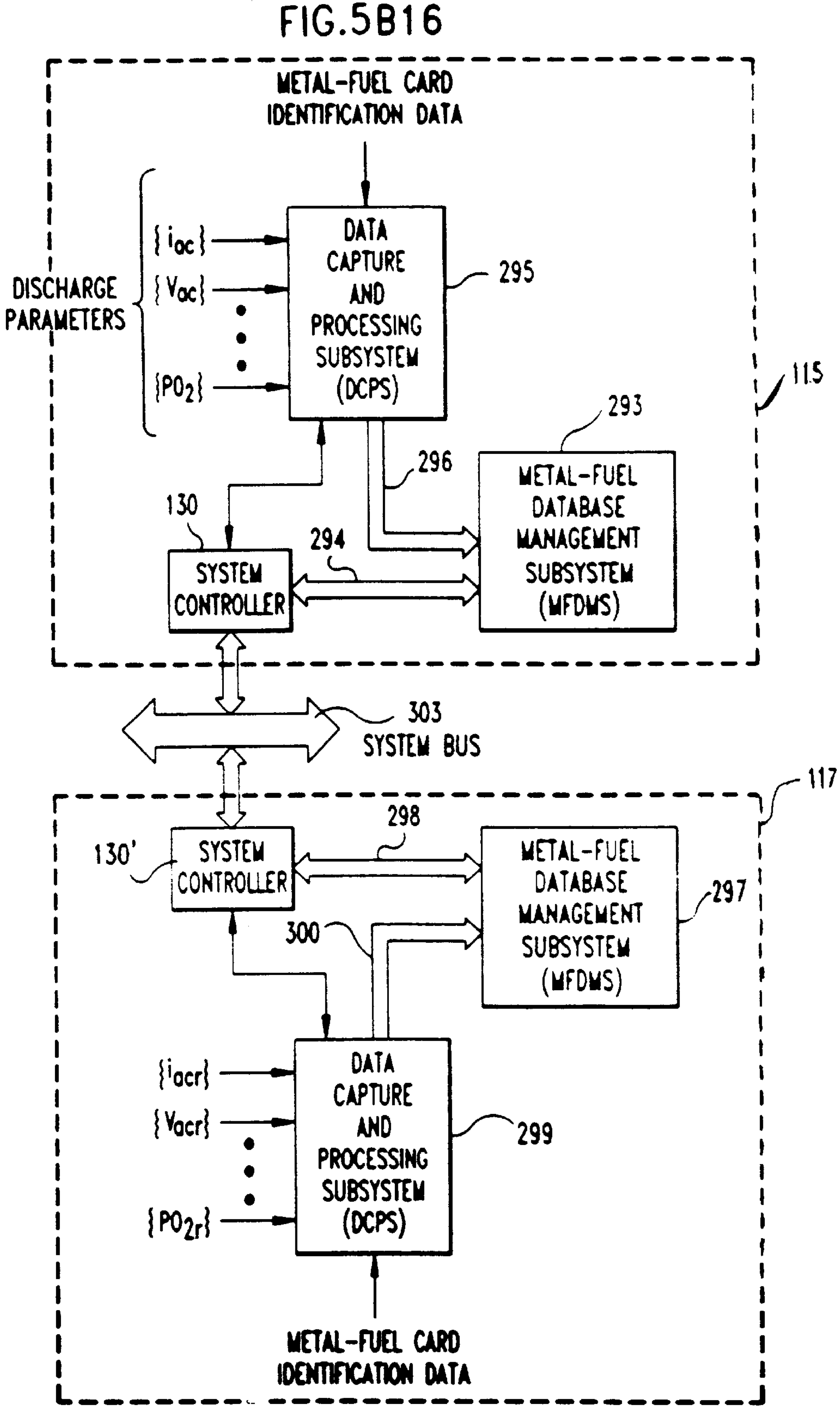

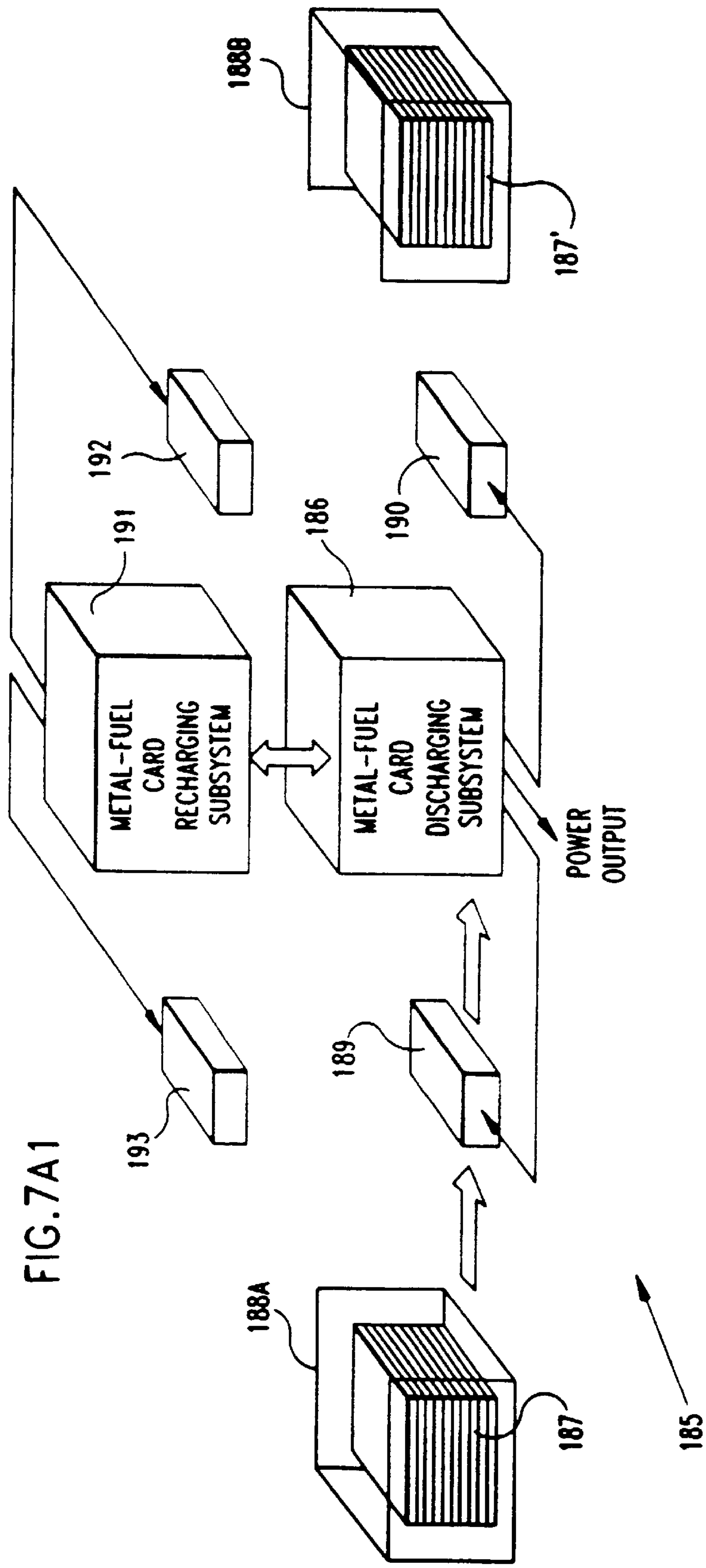
FIG.7A1

FIG.7A2
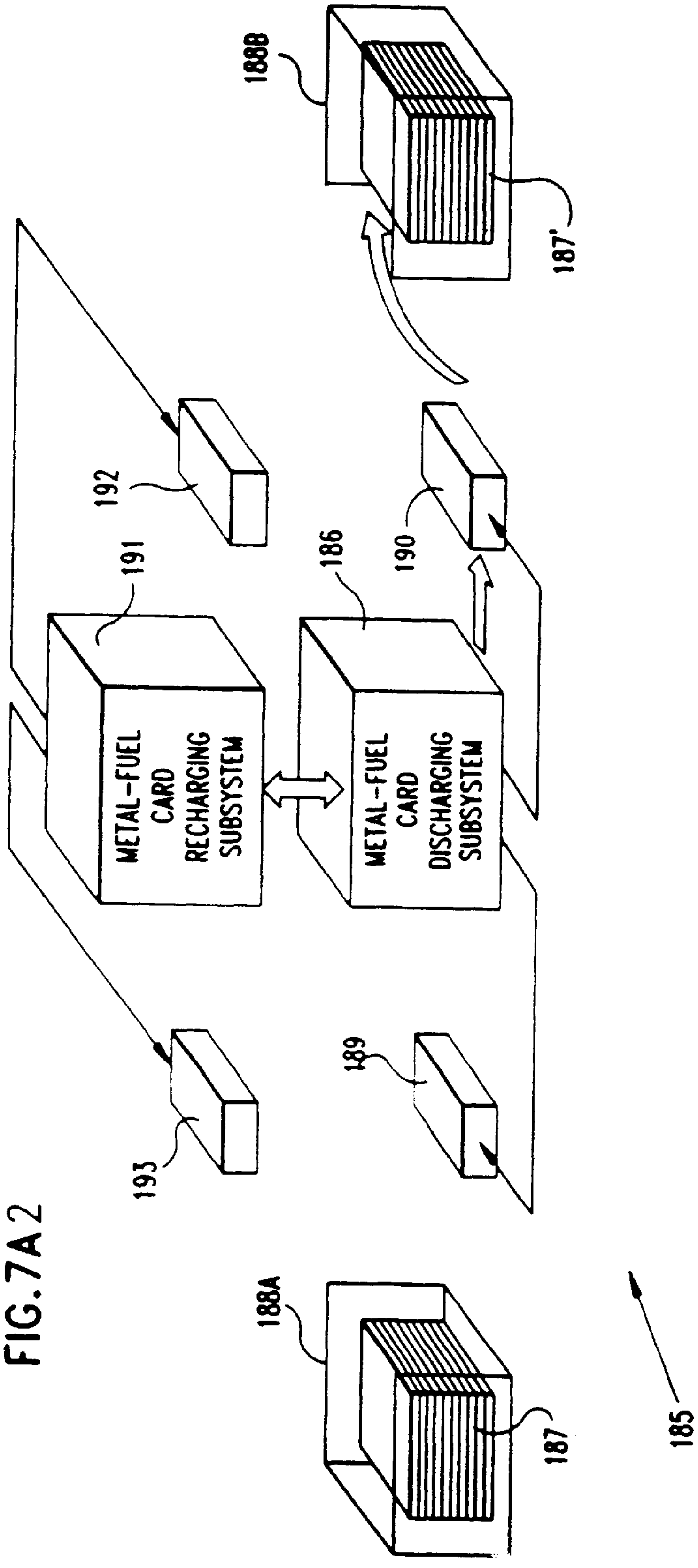

FIG. 7A31
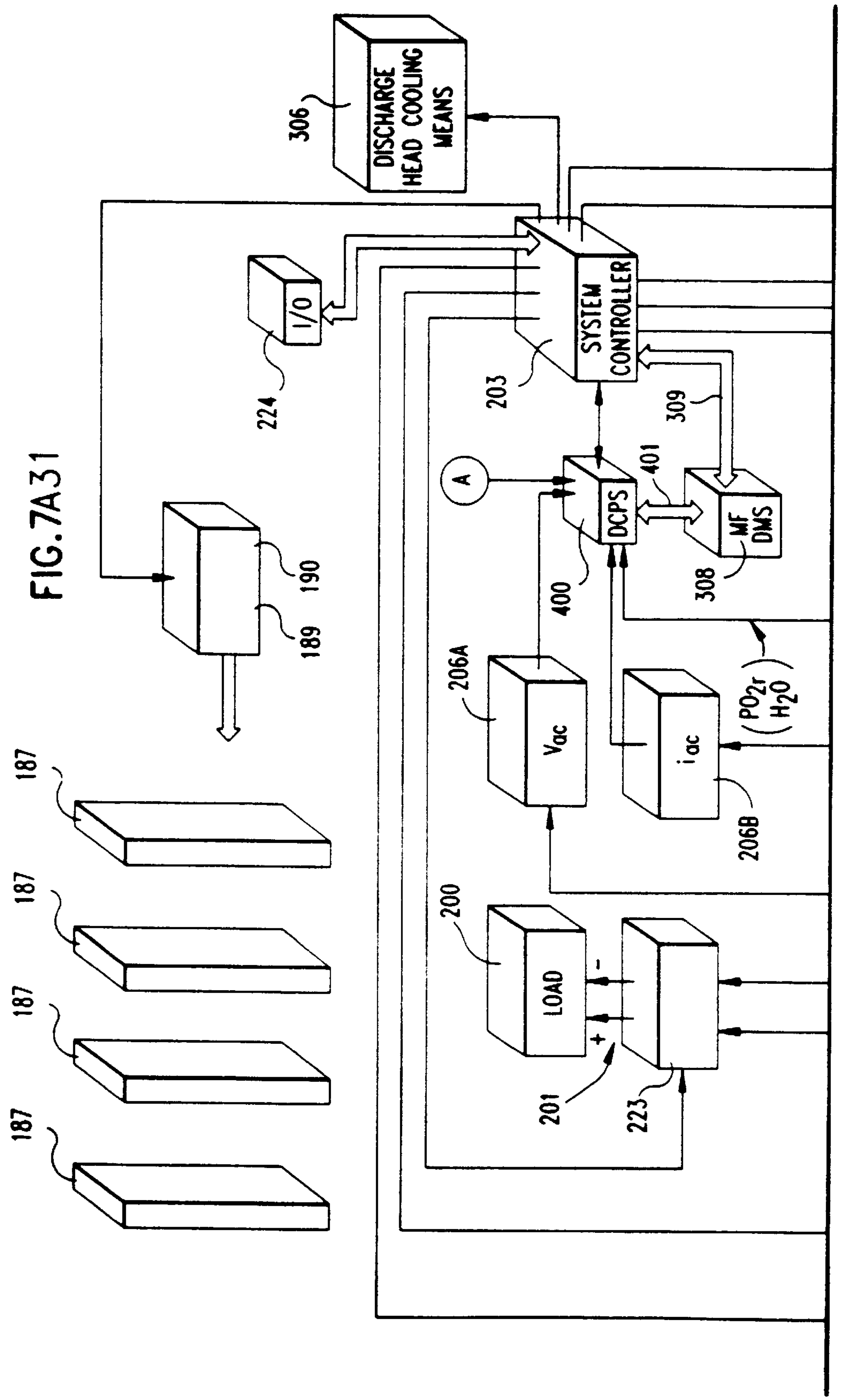

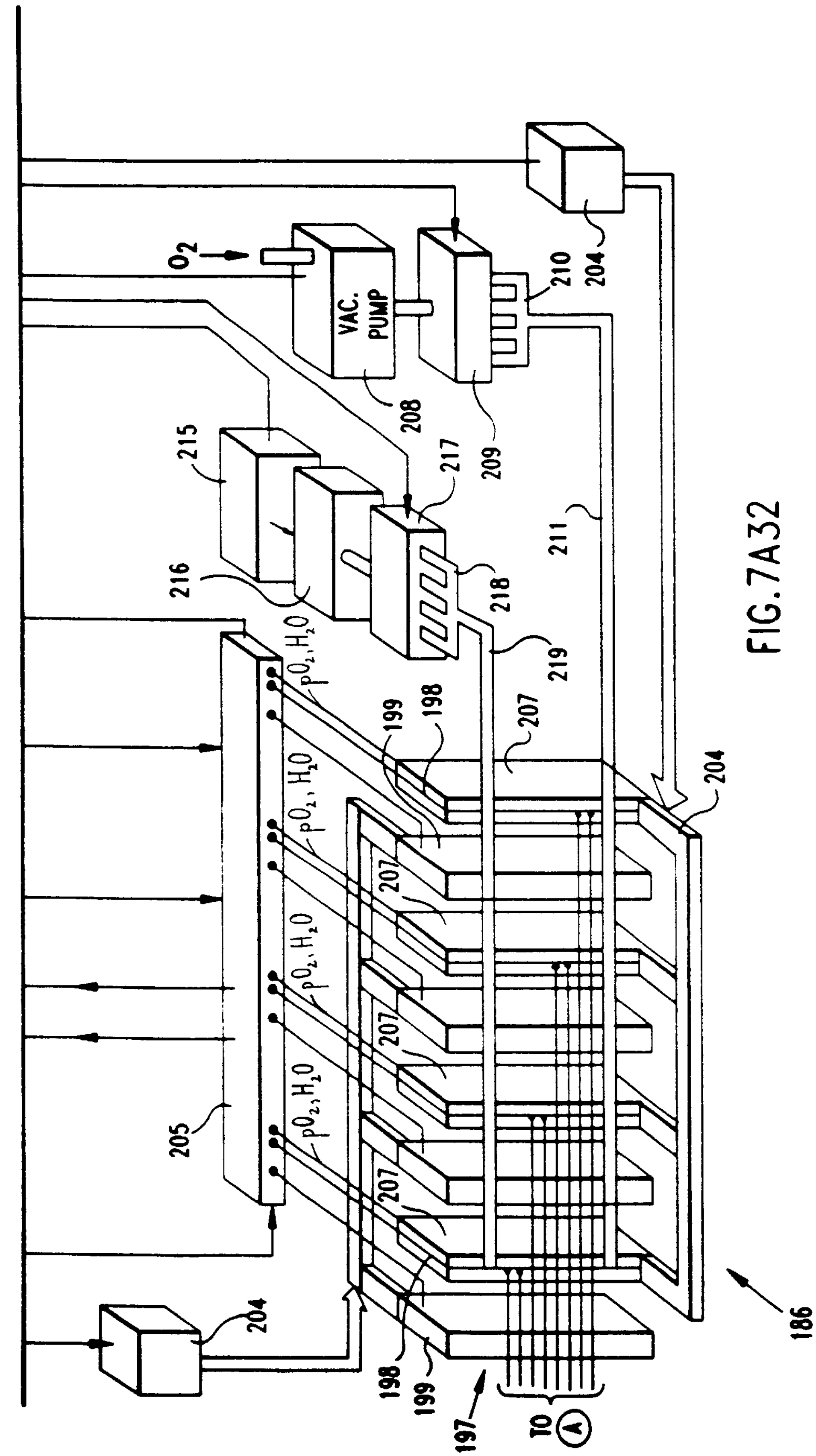
FIG. 7A32

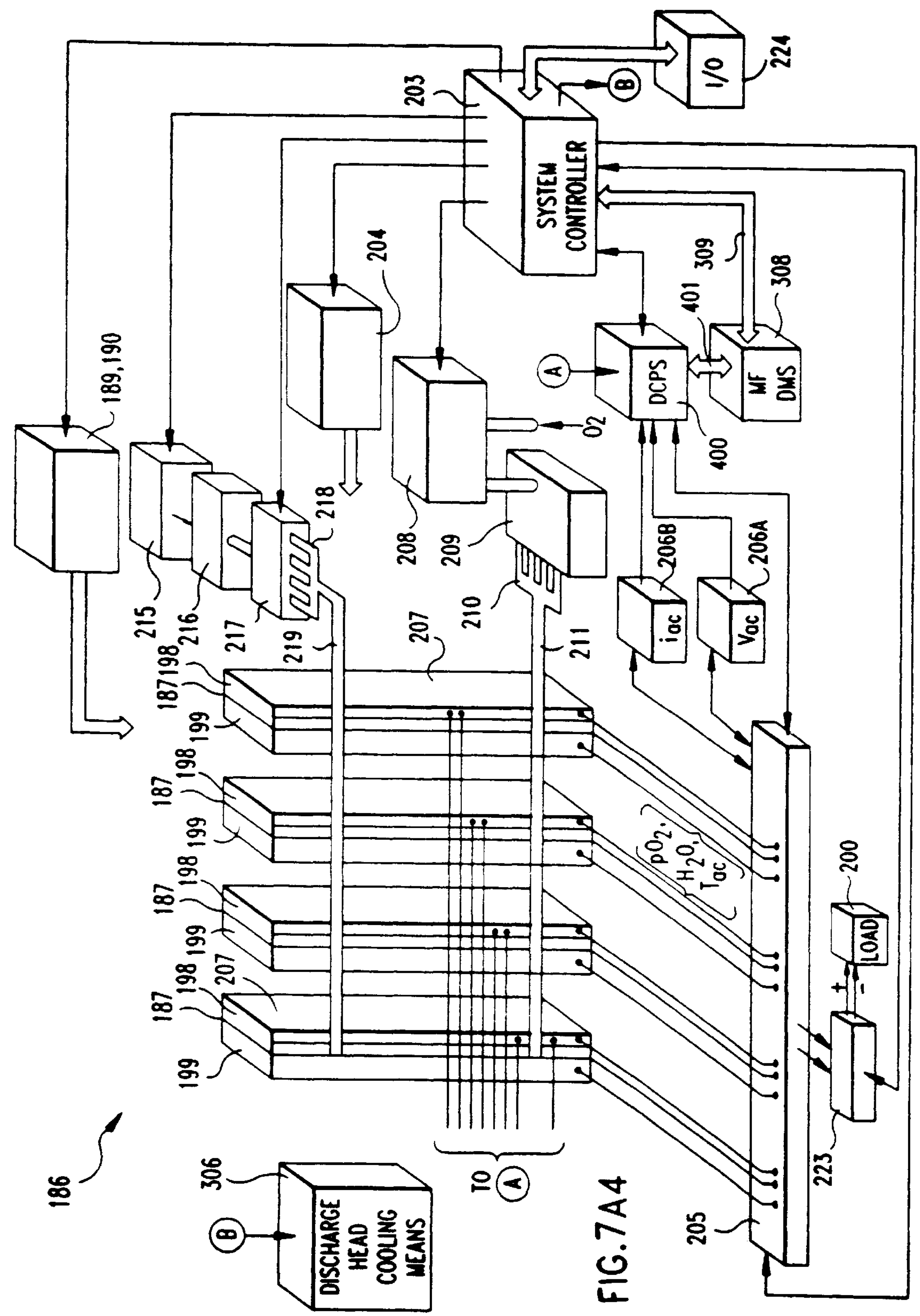
FIG.7A4

FIG.7A5
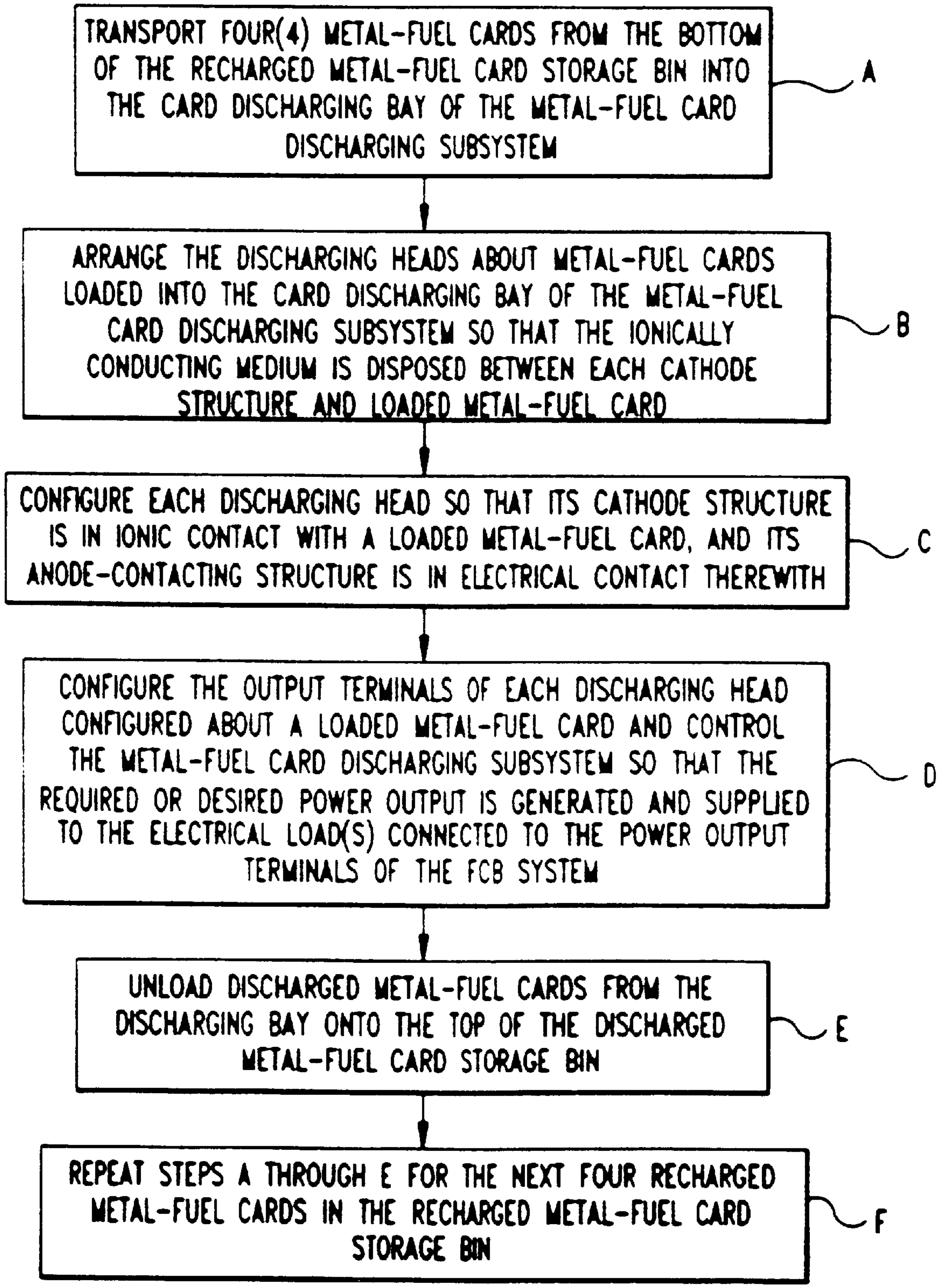

FIG.7A6
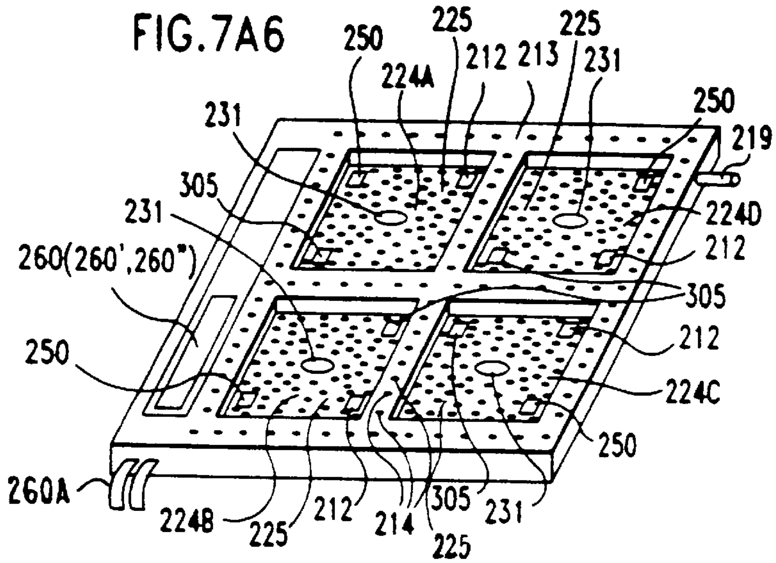
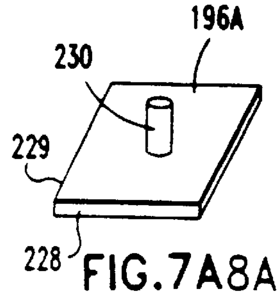
FIG.7A8A
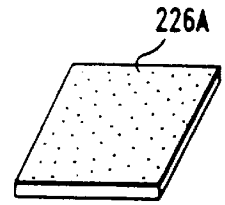
FIG.7A8B
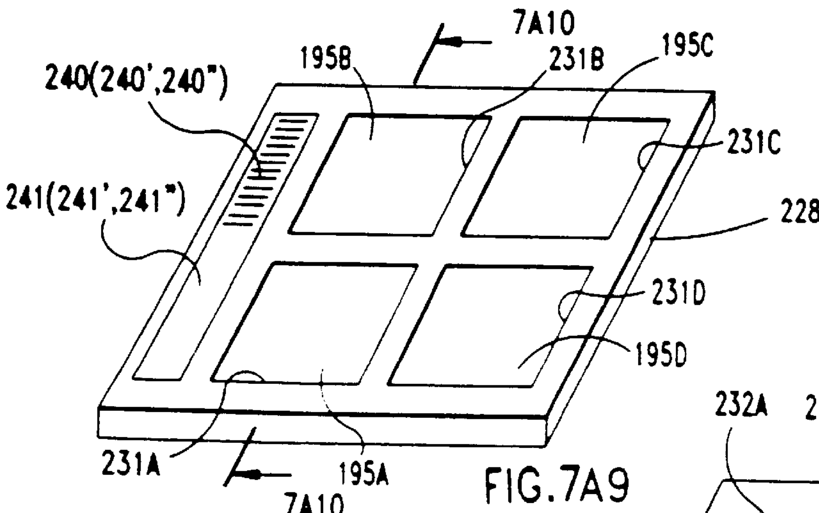
FIG.7A9
FIG.7A11
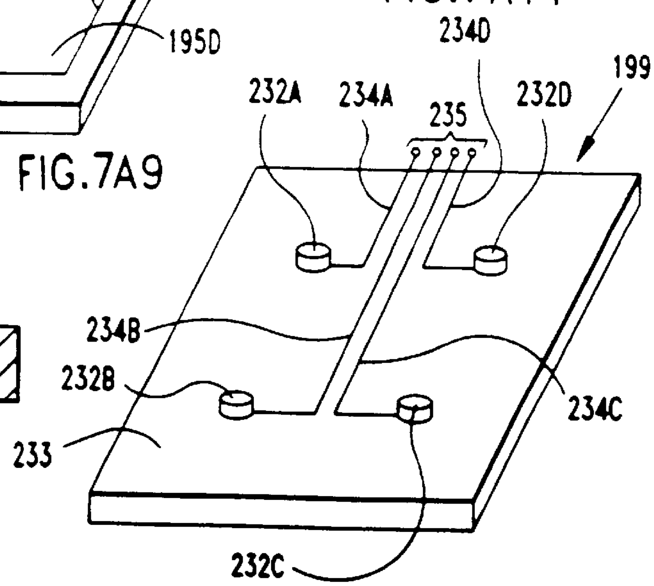
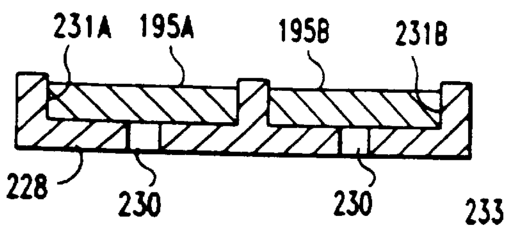
FIG.7A10

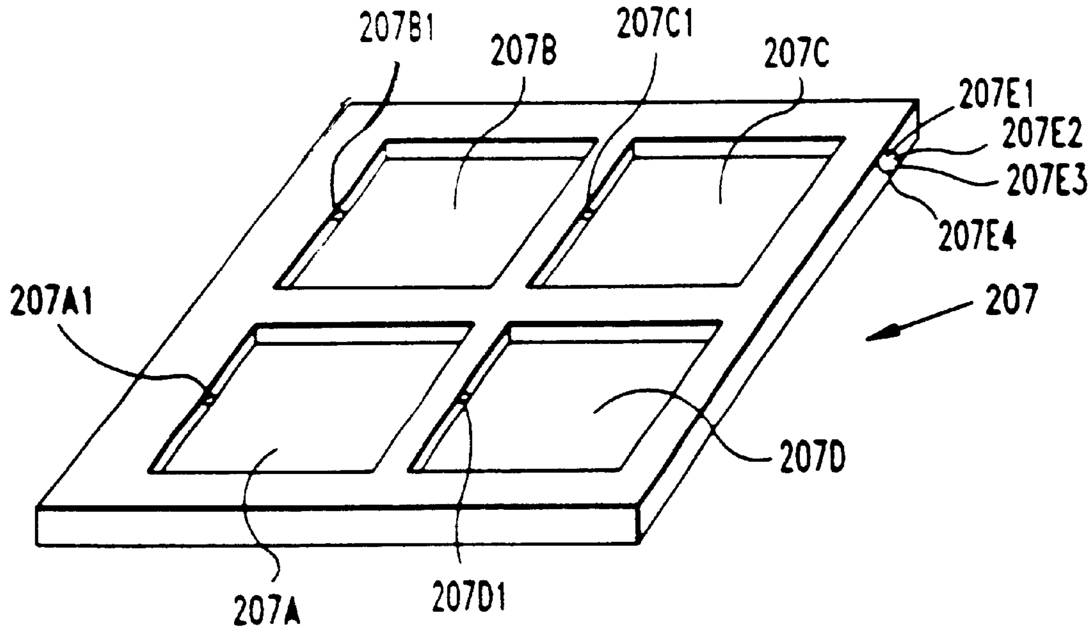
FIG.7A7

FIG.7A12
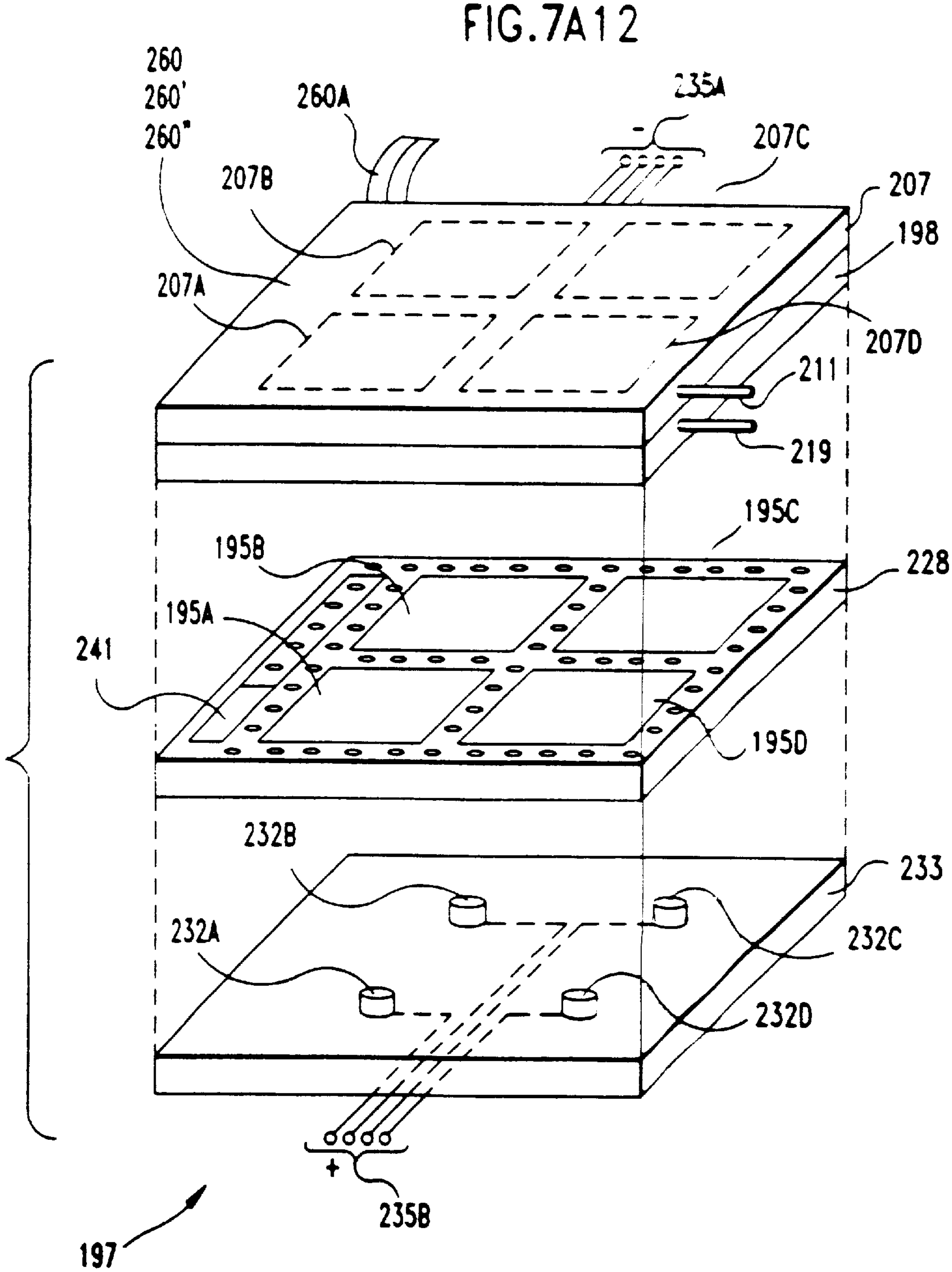

FIG.7A13

DISCHARGE DATA STRUCTURE

| FUEL-TAPE CARD NO. | METAL-FUEL ZONE NO. 1 | METAL-FUEL ZONE NO. 2 | METAL-FUEL ZONE NO. 3 | METAL-FUEL ZONE NO. 4 |
|---|---|---|---|---|
| TIME $t_1$ | $V_{ac}$<br>$i_{ac}$<br>$PO_2$<br>$H_2O$ %<br>$T_{ac}$<br>COMPUTED PARAMETERS<br>409 | | | |
| TIME $t_2$ | | | | |
| TIME $t_3$ | | | | |
| TIME $t_4$ | | | | |
| TIME $t_5$ | | | | |
| ⋮ | ⋮ | ⋮ | ⋮ | ⋮ |
| TIME $t_n$ | | | | |

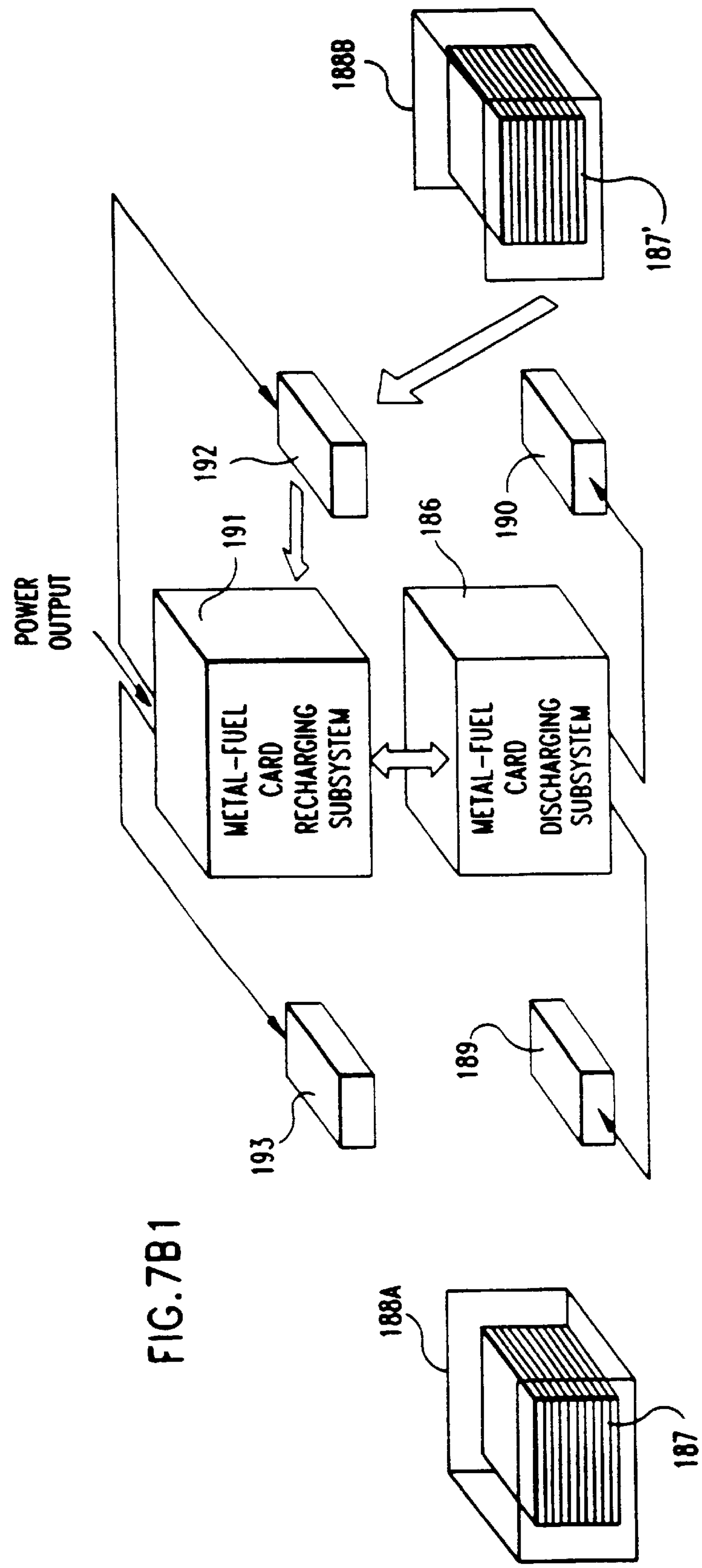
FIG. 7B1

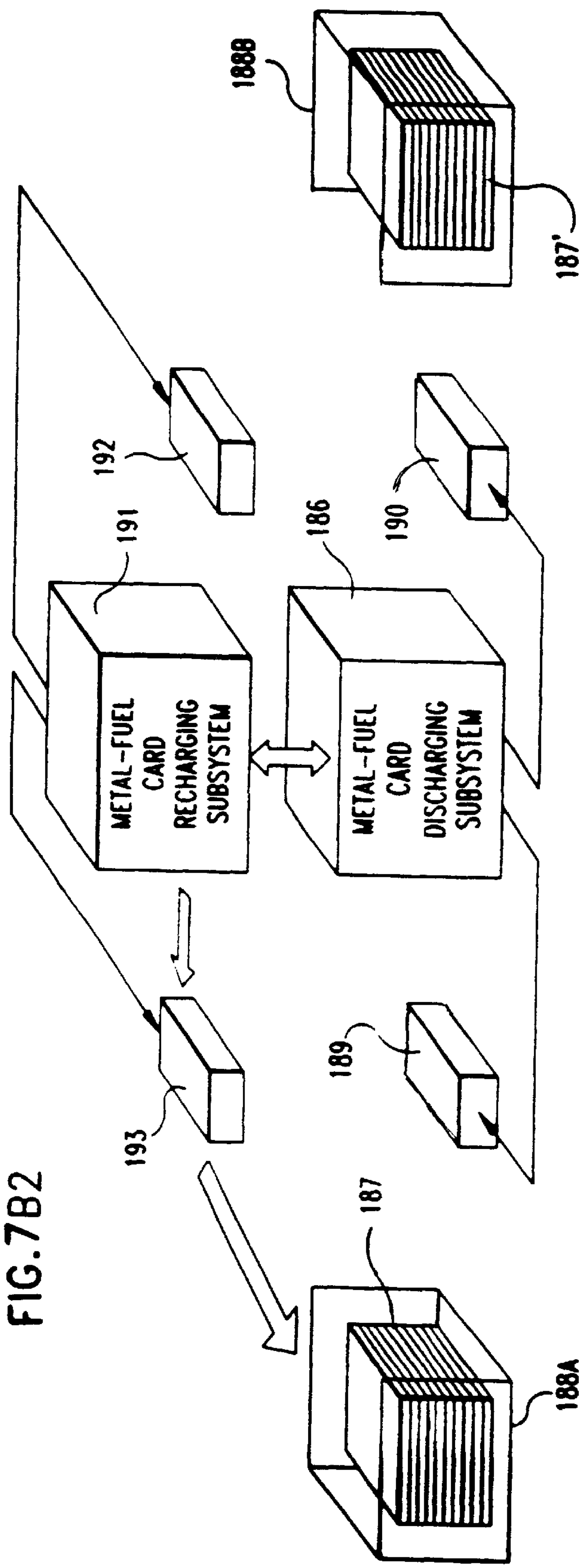
FIG.7B2

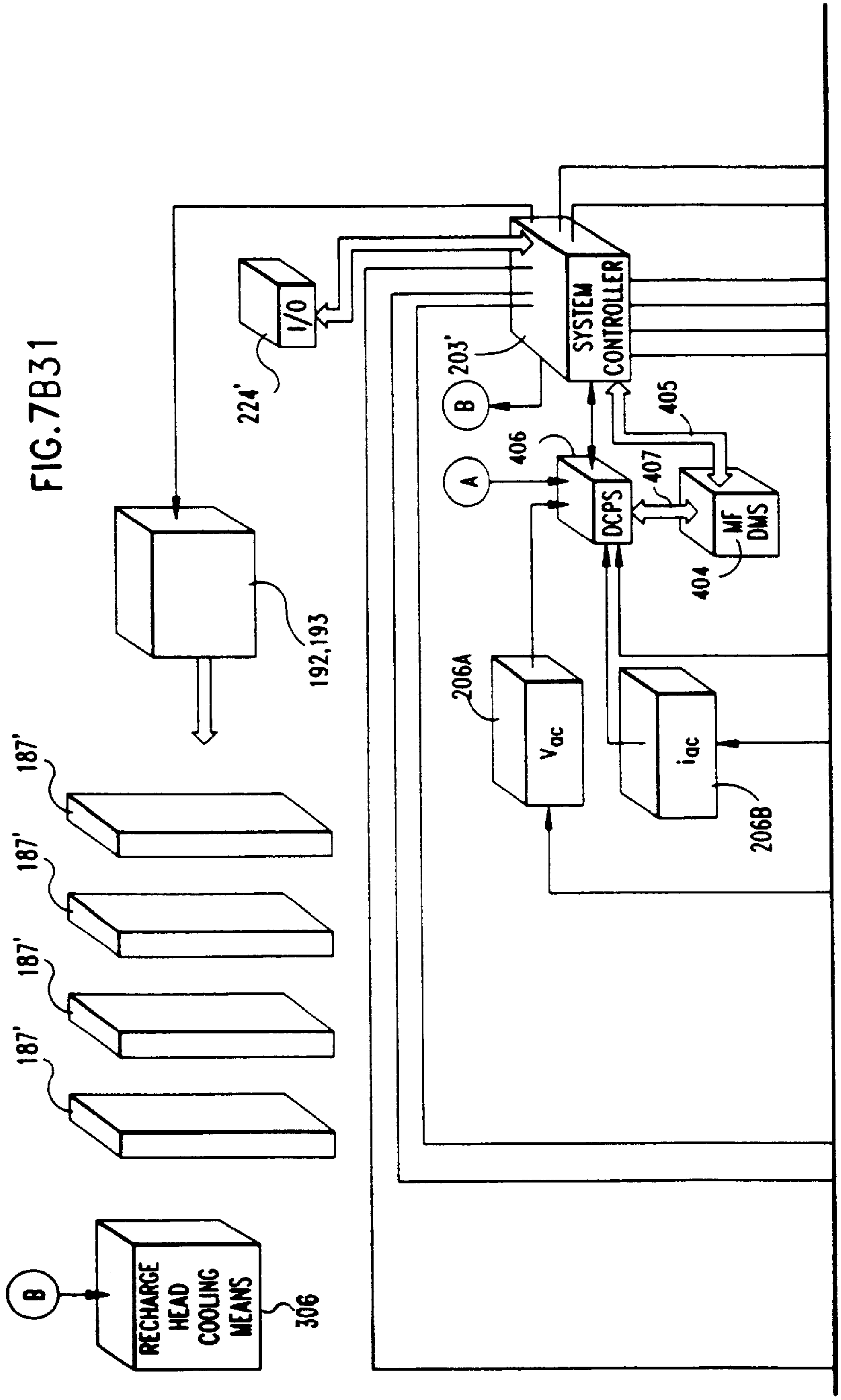
FIG.7B31

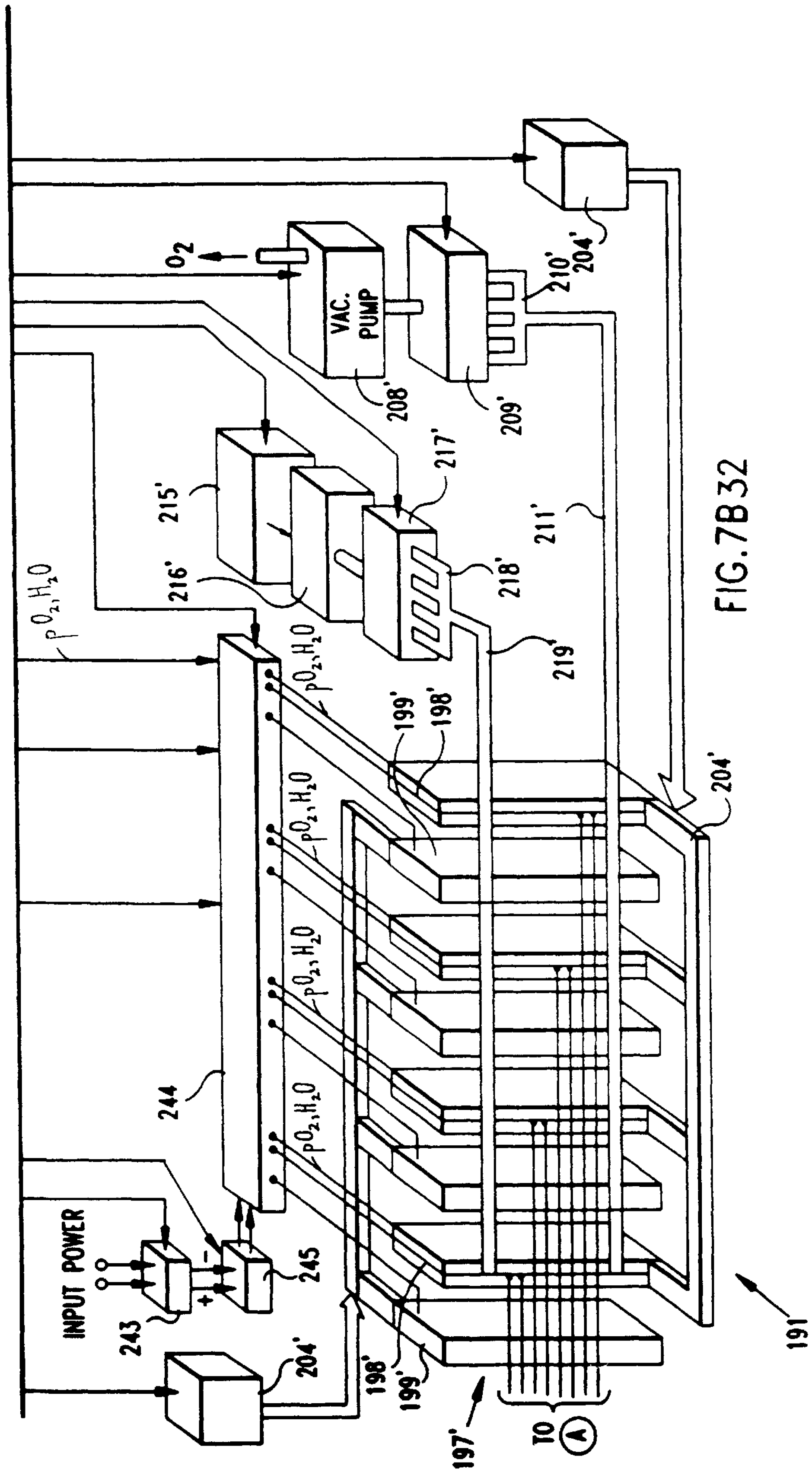
FIG.7B32

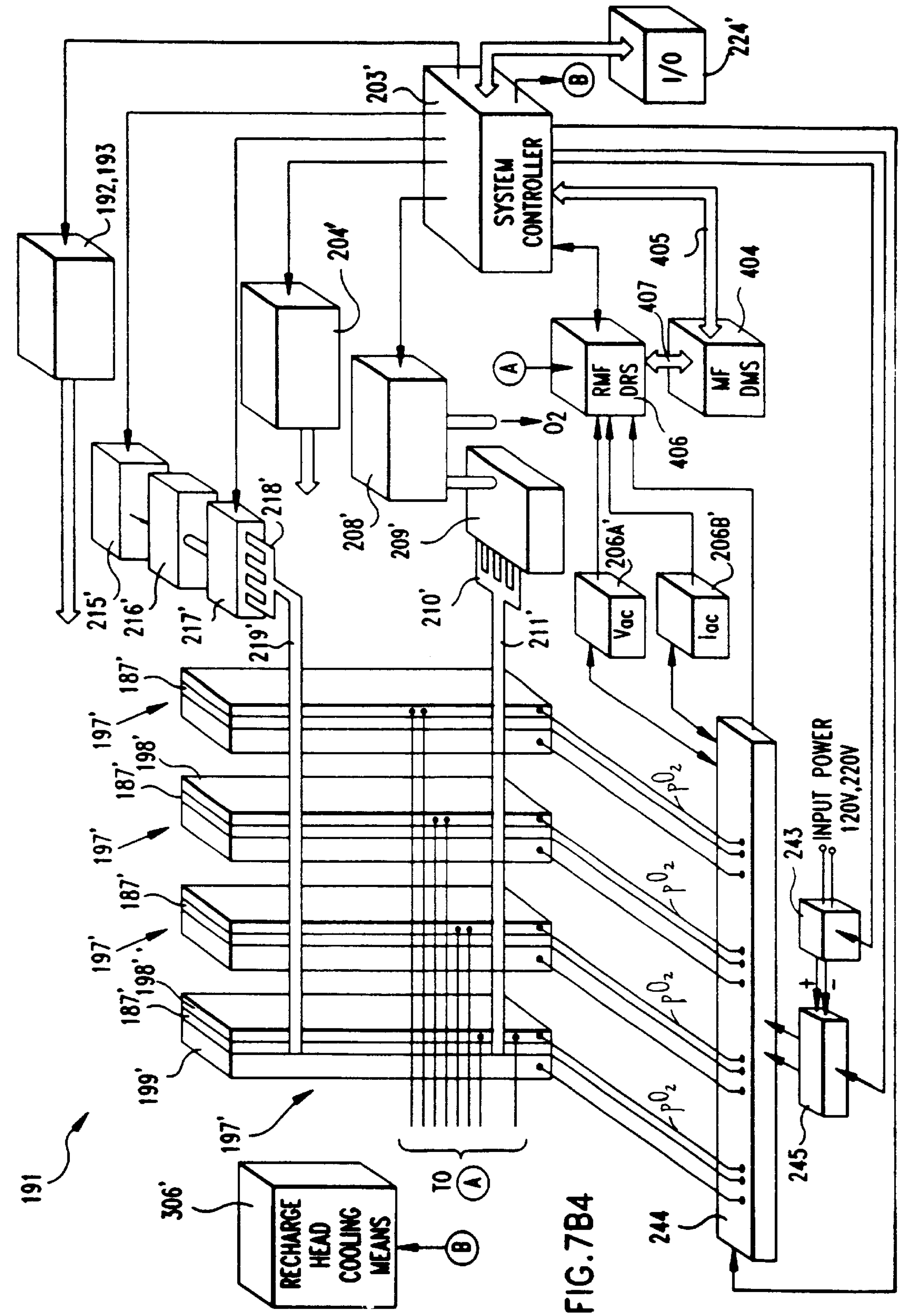
FIG.7B4

FIG.7B5
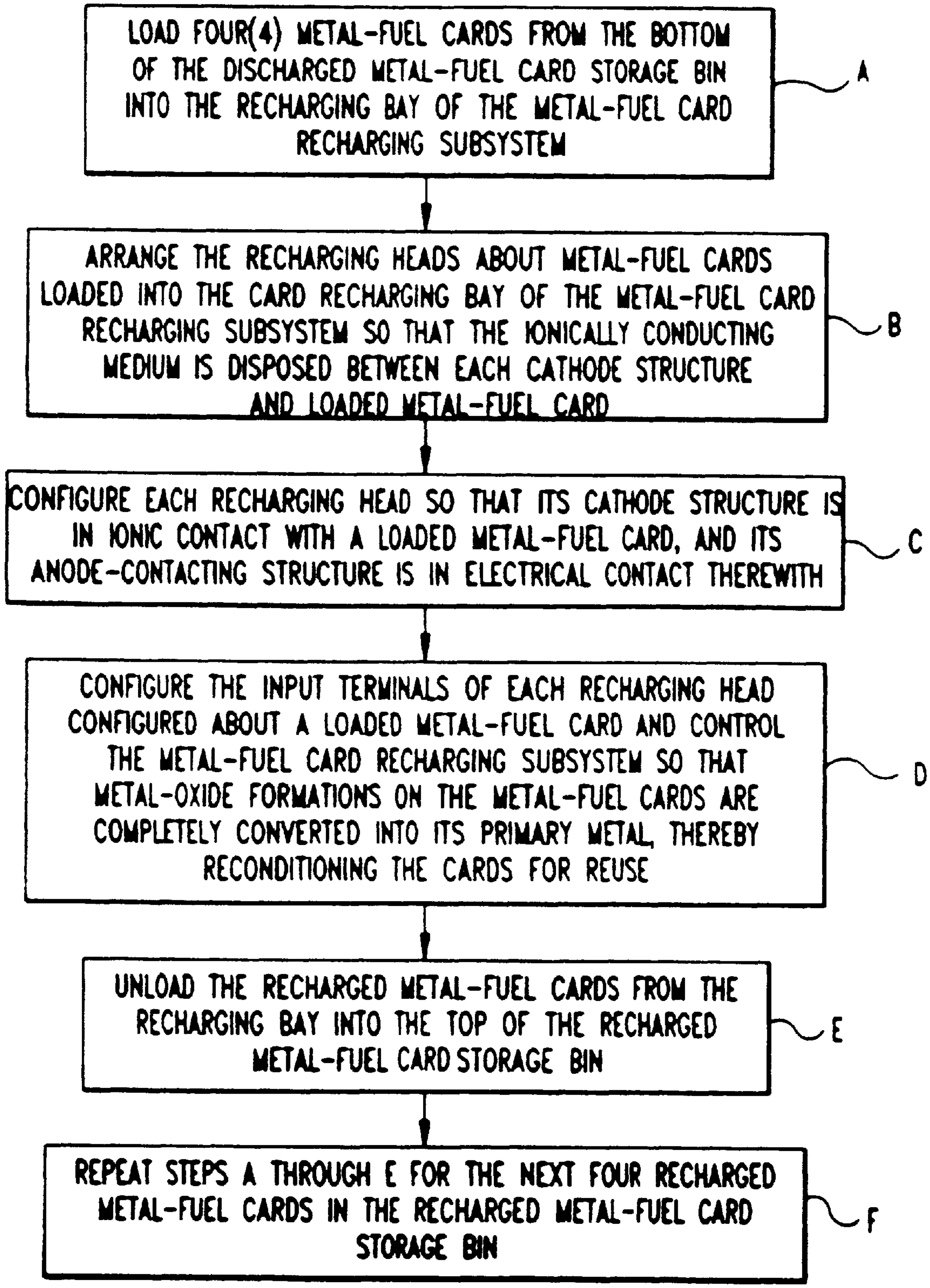

FIG.7B6
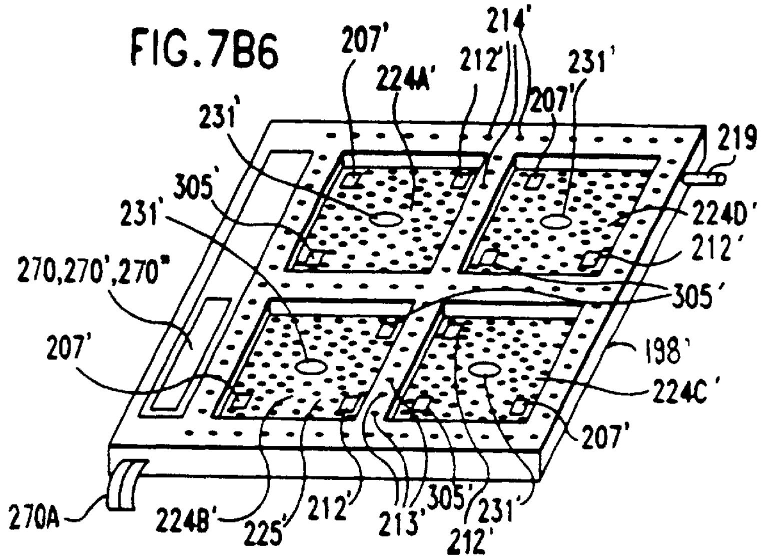
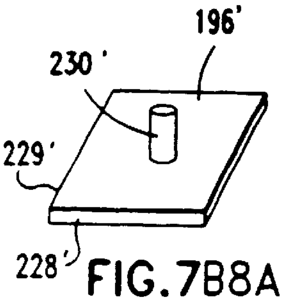
FIG.7B8A
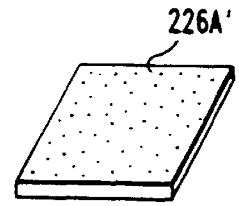
FIG.7B8B
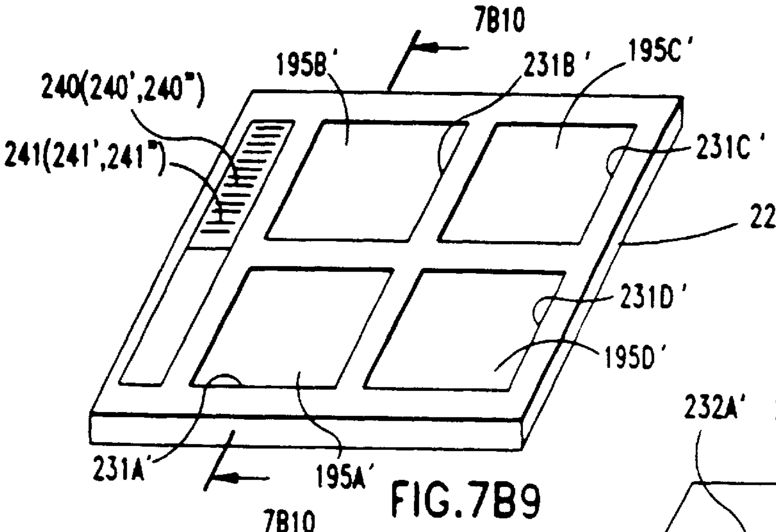
FIG.7B9
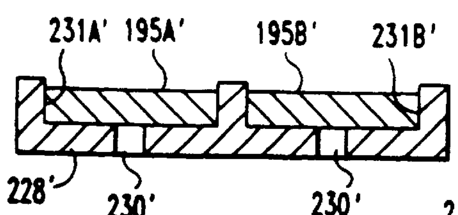
FIG.7B10
FIG.7B11
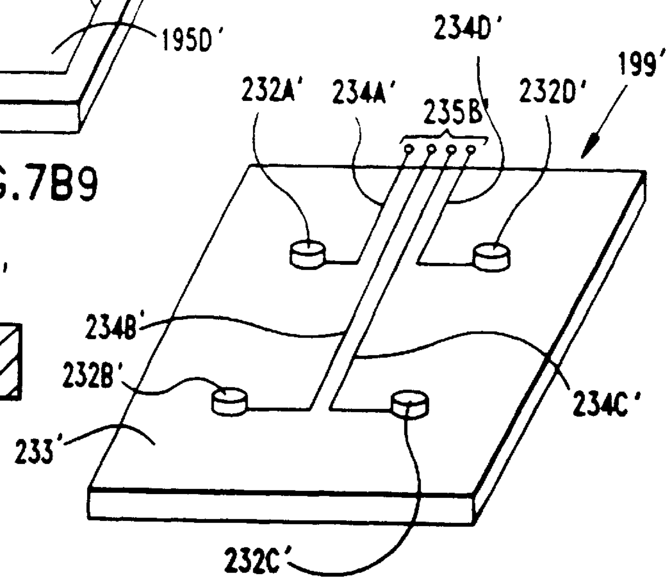

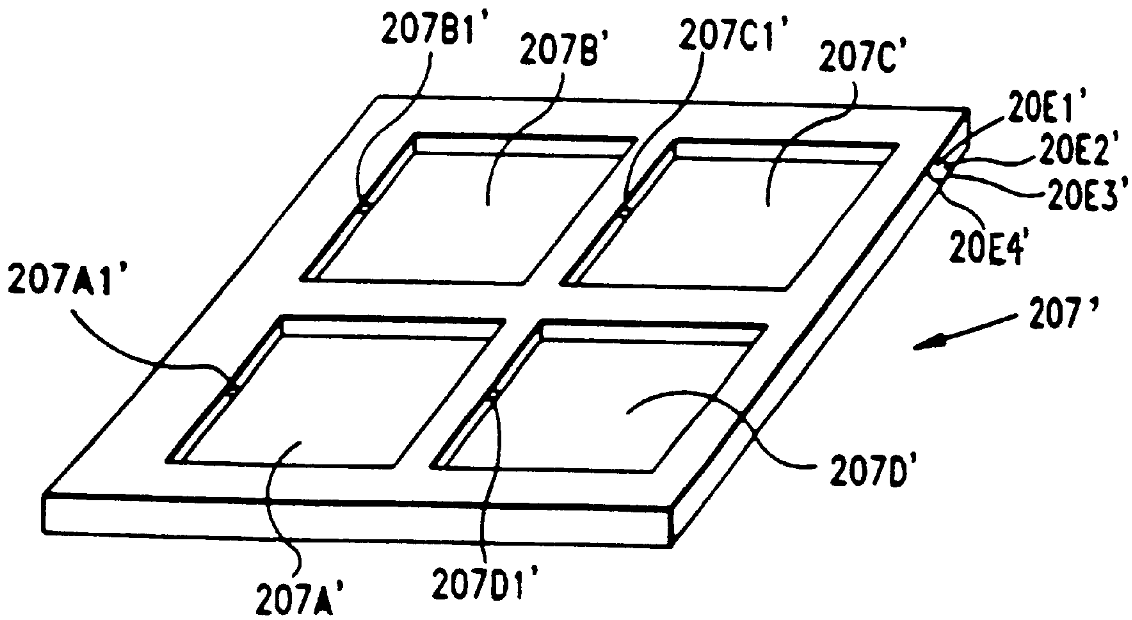
FIG.7B7

FIG.7B12
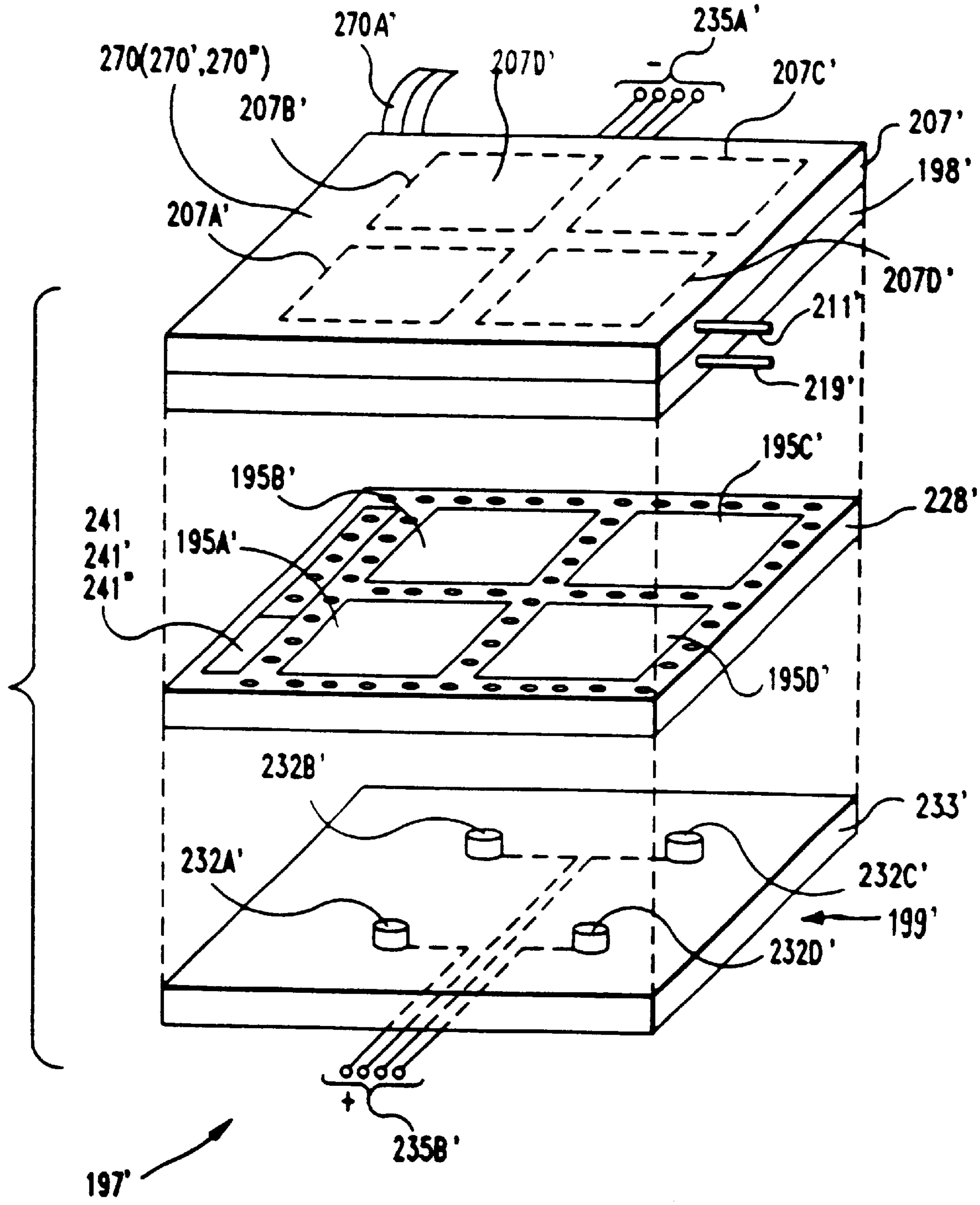

FIG.7B13

RECHARGE DATA STRUCTURE

| FUEL-TAPE CARD NO. | METAL-FUEL ZONE NO. 1 | METAL-FUEL ZONE NO. 2 | METAL-FUEL ZONE NO. 3 | METAL-FUEL ZONE NO. 4 |
|---|---|---|---|---|
| TIME $t_1$ | $V_{ac}$<br>$i_{ac}$<br>$PO_2$<br>$H_2O$ %<br>$T_{ac}$<br>COMPUTED PARAMETERS | | | |
| TIME $t_2$ | | | | |
| TIME $t_3$ | | | | |
| TIME $t_4$ | | | | |
| TIME $t_5$ | | | | |
| ⋮ | ⋮ | ⋮ | ⋮ | ⋮ |
| TIME $t_n$ | | | | |

410

FIG.7B14
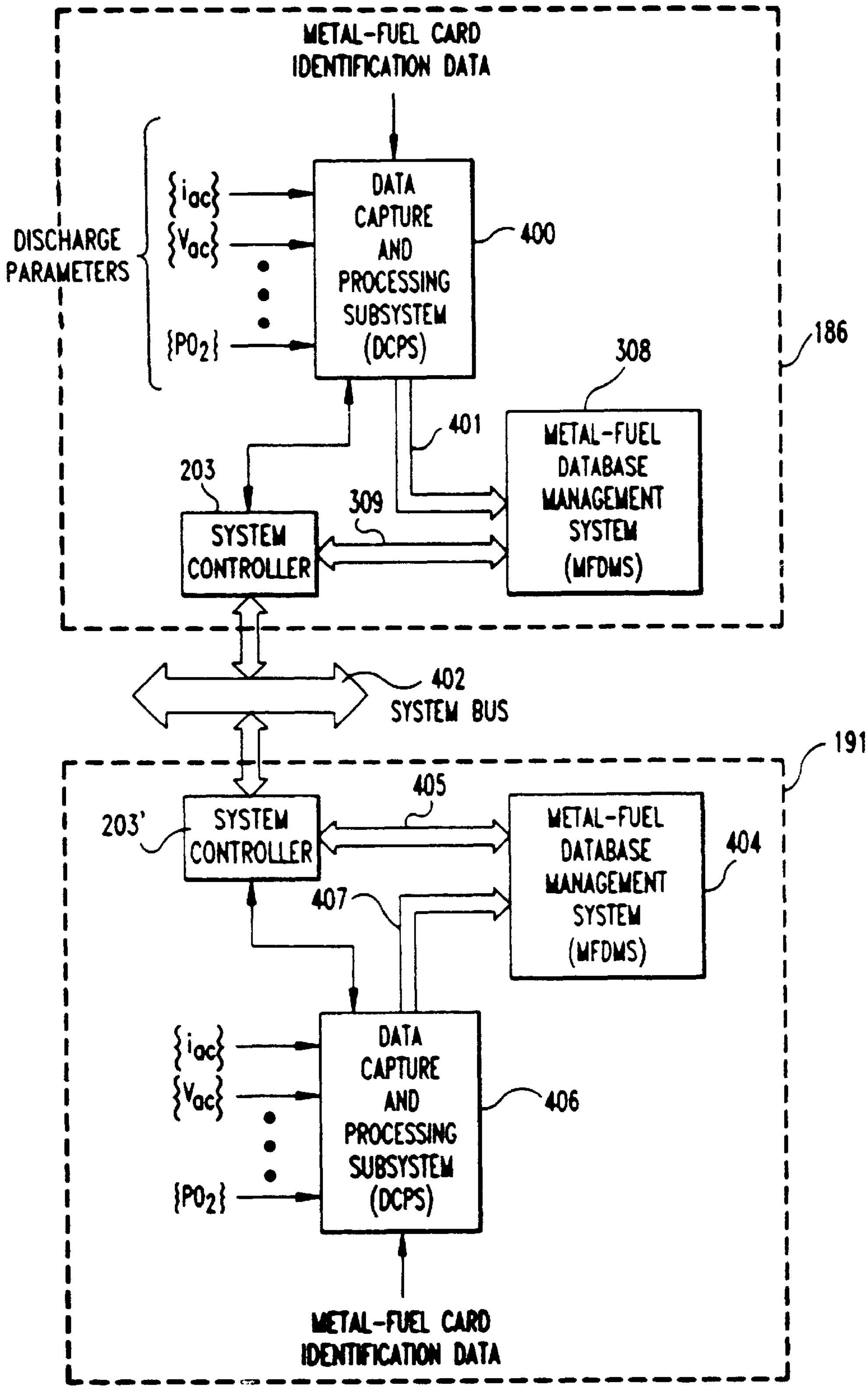

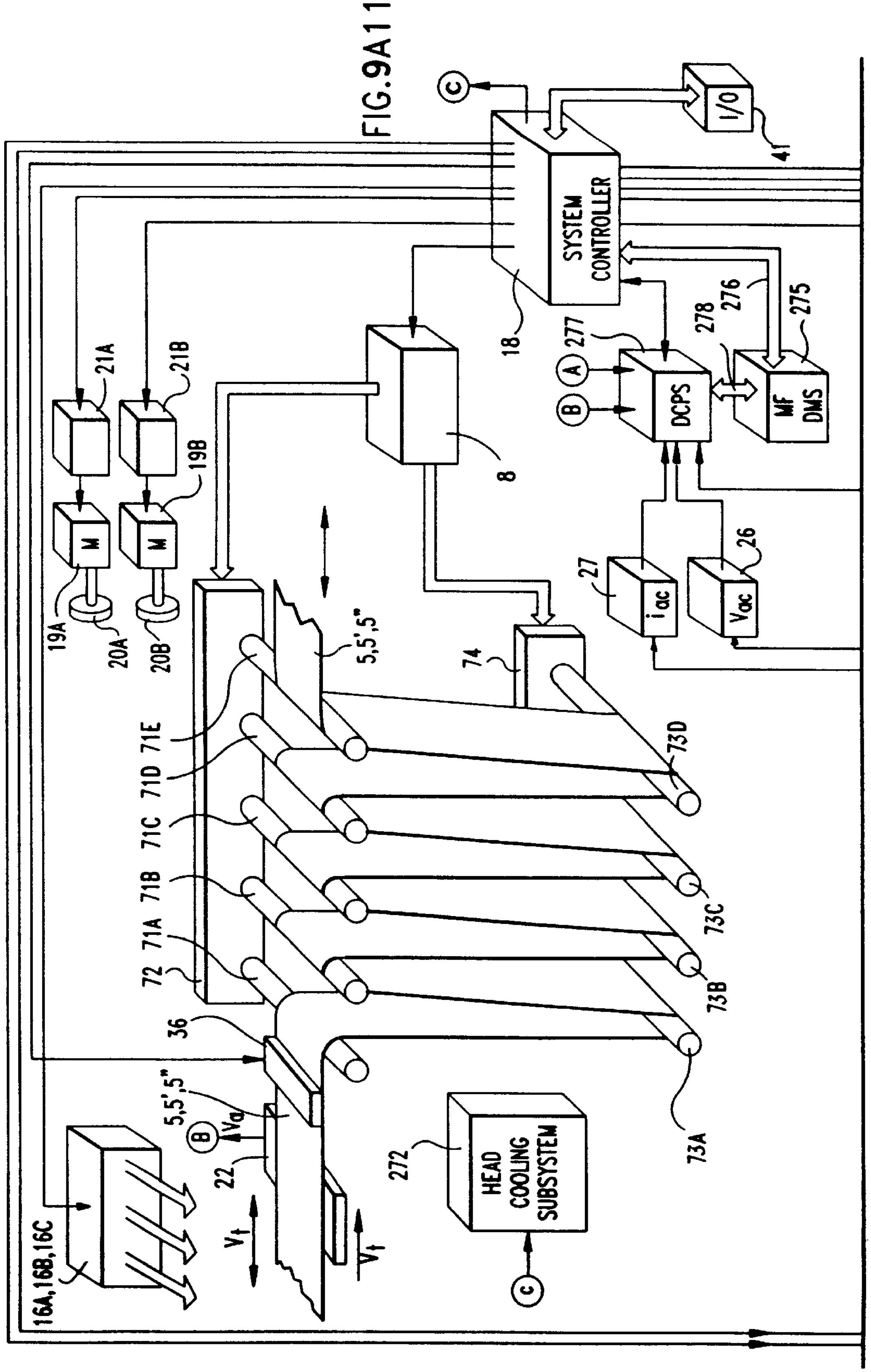
FIG.9A11

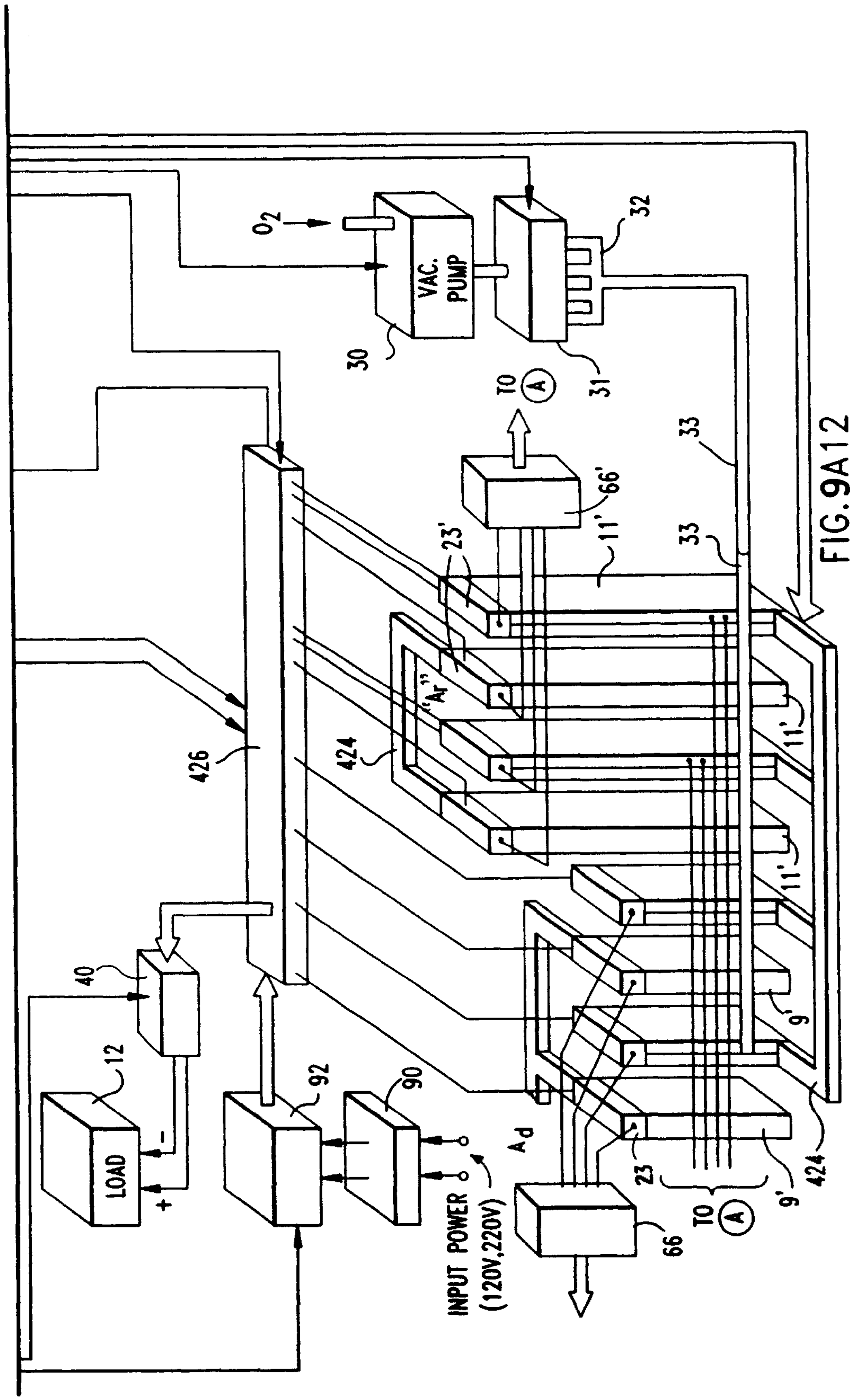
FIG.9A12

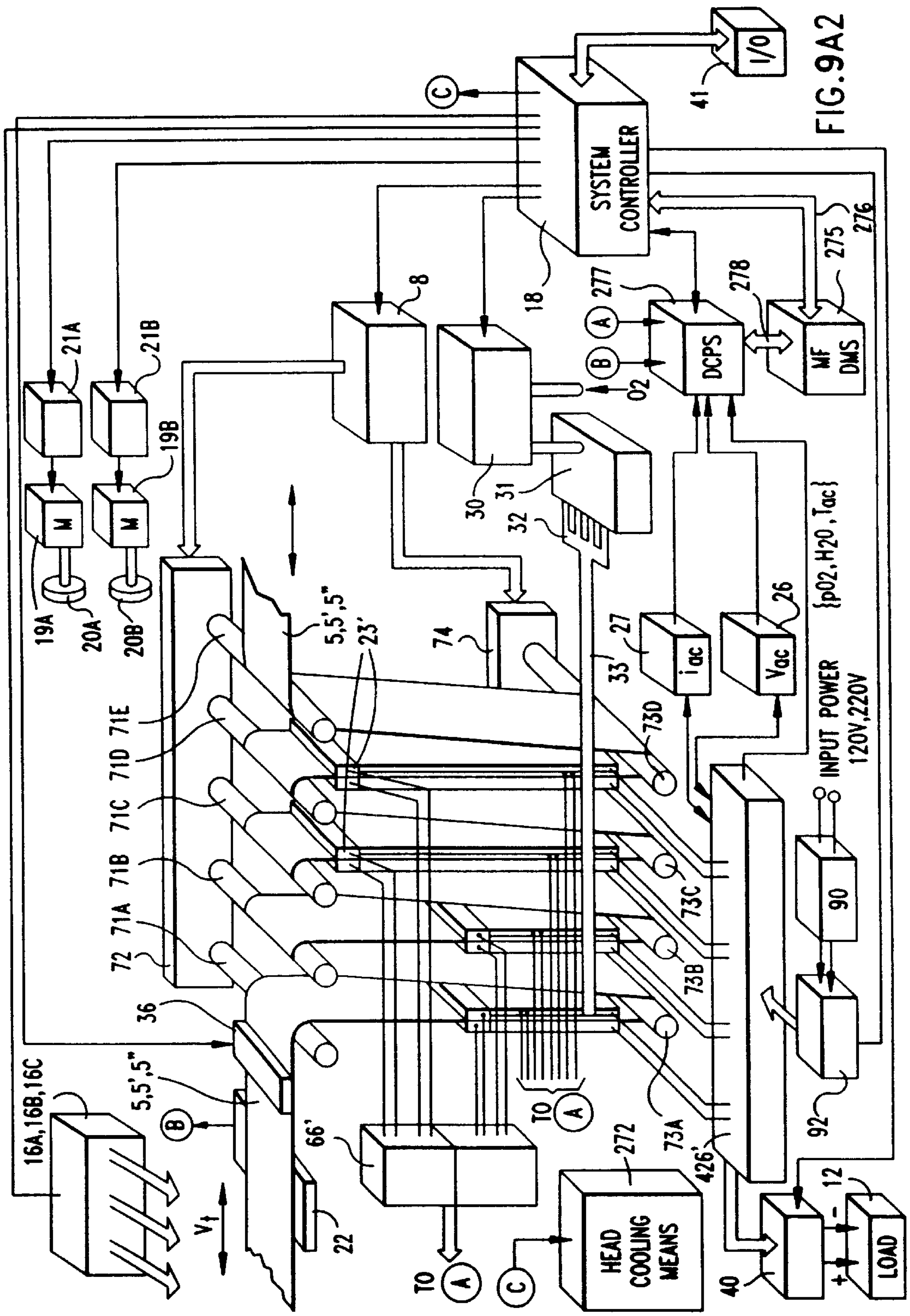
FIG.9A2

METAL-AIR FUEL CELL BATTERY SYSTEMS HAVING A METAL-FUEL CARD STORAGE CARTRIDGE, INSERTABLE WITHIN A FUEL CARTRIDGE INSERTION PORT, CONTAINING A SUPPLY OF SUBSTANTIALLY PLANAR DISCRETE METAL-FUEL CARDS, AND FUEL CARD TRANSPORT MECHANISMS THEREIN

RELATED CASES

This is a Continuation-in-Part of: application Ser. No. 08/944,507 entitled "High-Power Density Metal-Air Fuel Cell Battery System" by Sadeg Faris, et al. filed Oct. 6, 1997, now U.S. Pat. No. 6,296,960, said application being assigned to Reveo, Inc. and incorporated herein by reference in its entirely.

BACKGROUND OF THE INVENTION

1. Field of the Invention

The present invention relates to improved methods and systems for optimally discharging metal-air fuel cell battery (FCB) systems and devices, as well as improved methods and systems for optimally recharging the same in a quick and efficient manner.

2. Description of the Prior Art

In U.S. Pat. No. 6,296,960 Applicant discloses several types of novel metal-air fuel cell battery (FCB) systems. During power generation, metal-fuel tape is transported over a stationary cathode structure in the presence of an ionically-conducting medium, such as an electrolyte-impregnated gel. In accordance with well known principles of electro-chemistry, the transported metal-fuel tape is oxidized as electrical power is produced from the system.

Metal-air FCB systems of the type disclosed in U.S. application Ser. No. 08/944,507 have numerous advantages over prior art electro-chemical discharging devices. For example, one advantage is the generation of electrical power over a range of output voltage levels required by particular electrical load conditions. Another advantage is that oxidized metal-fuel tape can be repeatedly reconditioned (i.e. recharged) during battery recharging cycles carried out during electrical discharging operation, as well as separately therefrom.

In U.S. Pat. No. 5,250,370, Applicant discloses an improved system and method for recharging oxidized metal-fuel tape used in prior art metal-air FCB systems. By integrating a recharging head within a metal-air FCB discharging system, this technological improvement theoretically enables quicker recharging of metal-fuel tape for reuse in FCB discharging operations. In practice, however, a number of important problems have remained unsolved which has hitherto rendered rechargeable FCB systems commercially unfeasible.

In particular, prior art FCB systems have required very large volumes of physical space to accommodate enlarged recharging electrodes. In practice, this is often not possible, or practical.

Prior art FCB systems have suffered from problems associated with over and under recharging oxidized metal-fuel tape and sheets produced during discharging operations. Consequently, it has not been possible to optimally recharge metal-fuel tape and sheets using prior art tape recharging systems and methodologies.

Also, using prior art FCB systems it has not been possible to optimally discharge metal-fuel tape and sheets using prior art tape recharging systems and methodologies.

Thus there is a great need in the art for an improved method and apparatus for discharging and recharging metal-fuel tape, sheets, cards, and the like in a manner which overcomes the limitations of prior art technologies.

OBJECTS AND SUMMARY OF THE INVENTION

Accordingly, a primary object of the present invention is to provide an improved method of and apparatus for discharging and recharging metal-air fuel cell batteries (FCB) in a manner which avoids the shortcomings and drawbacks of prior art technologies.

Another object of the present invention is to provide such apparatus in the form of a Metal-Fuel Tape Recharging Subsystem, wherein recharge parameters, such as cathode-anode voltage and current levels, partial pressure of oxygen within the recharging cathode, relative humidity at the cathode-electrolyte interface, and where applicable, the speed of metal-fuel tape are automatically controlled in order to optimally recharge oxidized metal-fuel material (i.e. anodes) for reuse in metal-air FCB systems.

Another object of the present invention is to provide such apparatus in the form of a Metal-Fuel Tape Discharging Subsystem, wherein discharge parameters, such as cathode-anode voltage and current levels, partial pressure of oxygen within the discharging cathode, relative humidity at the cathode-electrolyte interface, and where applicable, the speed of metal-fuel tape are automatically controlled in order to optimally discharge metal-fuel material (i.e. anodes) for use in generating electrical power within metal-air FCB systems.

Another object of the present invention is to provide such a system, wherein a subsystem is provided for controlling the electrochemical reduction of metal-oxide along oxidized metal-fuel tape so as to completely reduce the metal-oxide at the fastest rate possible without destroying the porous structure of the metal-fuel tape.

Another object of the present invention is to provide such a system, wherein the metal-fuel anodes to be recharged (i.e. electro-chemically reduced) can be used with stationary and/or moving cathode structures employed in metal-air FCB systems.

Another object of the present invention is to provide such a system, wherein the metal-fuel structures to be recharged are realized in the form of oxidized metal-fuel tape which, during discharging operations, is transported across a cathode structure associated with the discharging head of a metal-air FCB system.

Another object of the present invention is to provide such a system, wherein the path-length of oxidized metal-fuel tape is substantially extended during recharging operations in order that a supply of oxidized metal-fuel tape contained within a cassette device or on a supply reel can be rapidly recharged.

Another object of the present invention is to provide such a system, wherein the oxidized metal-fuel tape to be recharged is contained within a cassette-type device insertable in the storage bay of a compact FCB discharging unit.

Another object of the present invention is to provide such a system, wherein the oxidized metal-fuel tape to be recharged comprises multiple metal-fuel tracks for use in generating different output voltages from a metal-air FCB system.

An object of the present invention is to provide such a system, wherein the path-length of oxidized metal-fuel tape is significantly extended within the recharging bay of the system using a tape path-length extension mechanism.

Another object of the present invention is to provide such a system, wherein the recharging head assembly comprises a plurality of cathode and anode structures which are selectively arranged about the extended path-length of oxidized metal-fuel tape during recharging operations.

Another object of the present invention is to provide such a system, wherein a recharging power regulating subsystem is provided for regulating operating parameters during electro-chemical reduction of metal-oxide during recharging operations.

Another object of the present invention is to provide such a system, wherein oxygen, generated from within the porous cathode elements of the recharging head of the system during electro-chemical reduction, is evacuated under the control of the recharging power regulation subsystem thereof.

Another object of the present invention is to provide such a system, wherein the relative humidity within the cathode elements of the recharging head of the system is controlled by the recharging power regulation subsystem thereof.

Another object of the present invention is to provide such a system, wherein the speed of the oxidized fuel tape transported over the recharging heads is regulated under the control of the recharging power regulation subsystem thereof.

Another object of the present invention is to provide such a system, wherein the voltage applied across and current driven through oxidized metal-fuel tape during recharging operations is regulated under the control of the recharging power control subsystem thereof.

Another object of the present invention is to provide such a system, wherein a metal-oxide sensing head is provided up-stream for sensing which metal-fuel tracks along a length of multi-tracked metal-fuel tape have been discharged (i.e. oxidized), and a recharging head is disposed downstream having multiple pairs of electrically-isolated cathode and anode structures for selectively recharging only those metal-fuel tracks that have been sufficiently oxidized (i.e. consumed).

Another object of the present invention is to provide a novel system for discharging a supply of metal-fuel cards or plates contained within a cassette storage cartridge.

Another object of the present invention is to provide such a system, wherein each metal-fuel card or plate is automatically loaded from the cassette cartridge into the recharging bay of the system.

Another object of the present invention is to provide a novel system for recharging metal-fuel cards or plates that have been oxidized during the discharging mode of operation.

Another object of the present invention is to provide such a system, wherein each oxidized metal-fuel card or plate is manually loaded into the recharging bay of the system, and after recharging (i.e. reducing) is completed, the card is ejected from the recharging bay in a semi-automatic manner.

Another object of the present invention is to provide such a system, wherein each oxidized metal-fuel card or plate is automatically loaded into the recharging bay of the system, and after recharging (i.e. reducing) is completed, the card is automatically ejected from the recharging bay, and another oxidized metal-fuel card is automatically loaded thereinto for recharging.

Another object of the present invention is to provide such a system, wherein each zone or subsection of metal fuel along the length of metal-fuel tape track is labeled with a digital code, through optical or magnetic means, for enabling the recording of discharging-related data during the discharging mode of operation, for future access and use in carrying out various types of management operations, including rapid and efficient recharging operations.

Another object of the present invention is to provide such a system, wherein metal-fuel tape can be transported through its discharging head assembly and recharging head assembly in a bi-directional manner while the availability of metal-fuel therealong is automatically managed in order to improve the performance of the system.

Another object of the present invention is to provide such a system, wherein the recharging bay contains an assembly of recharging heads, each of which comprises an electrically conductive cathode structure, an ionically conductive medium, and an anode contacting structure.

Another object of the present invention is to provide such a system, wherein a plurality of oxidized metal-fuel cards or plates is automatically transported into the system for high-speed recharging.

Another object of the present invention is to provide an improved method of and apparatus for electrochemically generating electrical power across an electrical load by discharging metal-air fuel cell batteries in a manner which allows for optimal recharging of the same during recharging cycles.

Another object of the present invention is to provide such a system and method, wherein during discharging cycles, multiple discharging heads are employed to discharge metal-fuel tape at controlled anode-cathode current levels in order to control the formation of optimally-reducible metal-oxide patterns therealong during discharge cycles.

Another object of the present invention is to provide such a system and method, wherein during discharging cycles, the use of multiple discharging heads enables each discharging head to be "lightly loaded", thus permitting improved control over the formation of metal-oxide during discharging cycles so that complete conversion thereof into its primary metal can be achieved in an optimal manner.

Another object of the present invention is to provide such a system, wherein information regarding the instantaneous loading conditions along each zone (i.e. frame) of the metal-fuel tape is recorded in memory by the system controller.

Another object of the present invention is to provide such a system, wherein (i) instantaneous loading condition data for each metal-fuel zone along a spool of metal-fuel tape is acquired by optically sensing bar code symbol data imprinted along the zone of metal-fuel tape to determine the identity thereof, (ii) loading conditions at the discharging head through which the identified metal-fuel zone passes are automatically sensed, and then (iii) such data is automatically recorded in memory for future use during subsequent tape recharging operations.

Another object of the present invention is to provide such a system, wherein, during tape recharging operations, such recorded loading condition information is read from memory and used to set current and voltage levels maintained at the recharging heads of the system.

Another object of the present invention is to provide such a system and method, wherein metal-fuel tape discharging conditions are recorded at the time of discharge and used to optimally recharge discharged metal-fuel tape during tape recharging operations.

Another object of the present invention is to provide such a system, wherein, during tape discharging operations, optical sensing of bar code data along each zone of metal-fuel tape is carried out using a miniaturized bar code symbol reader embedded within the cathode structure of each discharging head of the system.

Another object of the present invention is to provide such a system, wherein, during tape recharging operations, optical sensing of bar code data along each zone of discharged metal-fuel tape is carried out using a miniaturized bar code symbol reader embedded within the cathode structure of each recharging head of the system.

Another object of the present invention is to provide such a system, wherein both the metal-fuel tape discharging subsystem and the metal-fuel tape recharging subsystem thereof can be simultaneously operated in order to quickly recharge oxidized metal-fuel tape passing through the metal-fuel tape recharging subsystem as electrical power is being generated across an electrical loaded connected to the discharging subsystem.

Another object of the present invention is to provide such a system, wherein the subsystems thereof are remotely controllable through an input/output subsystem operably connected to the system controller.

Another object of the present invention is to provide a metal-air FCB system, wherein a metal-fuel tape discharging subsystem and a metal-fuel tape recharging subsystem are integrated within a single, stand-alone electrical discharging unit, and the tape path-length extension mechanism employed in the metal-fuel tape recharging subsystem extends oxidized metal-fuel tape over a path-length which is substantially greater than the path-length maintained by the metal-fuel tape path-length extension mechanism employed in the metal-fuel tape discharging subsystem.

Another object of the present invention is to provide a metal-air FCB system, wherein a plurality of metal-fuel cards can be loaded within a metal-fuel card discharging bay and simultaneously discharged within its metal-fuel card discharging subsystem in order to generate and deliver electrical power across an electrical load connected thereto.

Another object of the present invention is to provide such a metal-air FCB system, wherein a plurality of metal-fuel cards can be loaded within a metal-fuel card recharging bay and simultaneously recharged within its Metal-Fuel Card Recharging Subsystem in order to convert metal-oxide along the metal-fuel card into its primary metal fuel for reuse during discharging operations.

Another object of the present invention is to provide such a metal-air FCB system, wherein both the metal-fuel card discharging and recharging subsystems can be operated simultaneously as well as under the management of a system controller associated with a resultant system, such as an electrical power management system.

These and other objects of the present invention will become apparent hereinafter.

BRIEF DESCRIPTION OF THE DRAWINGS

For a more complete understanding of the Objects of the Present Invention, the following detailed Description of the Illustrative Embodiments Of the Present Invention should be read in conjunction with the accompanying Drawings, wherein:

FIG. 2A1 is a generalized schematic representation of the Metal-Fuel Tape Discharging Subsystem of FIG. 1, wherein the tape path-length extension mechanism associated therewith is shown in its non-extended configuration;

FIG. 2A2 is a generalized schematic representation of the Metal-Fuel Tape Discharging Subsystem of FIG. 1, wherein the tape path-length extension mechanism associated therewith is shown in its extended configuration and the assembly of discharging heads thereof configured about the extended path of metal-fuel tape for generating electrical power across an electrical load connected to the metal-air FCB system;

FIGS. 2A31 and 2A32 taken together set forth a generalized schematic representation of the Metal-Fuel Tape Discharging Subsystem shown in FIG. 1, wherein the subcomponents thereof are shown in greater detail, and the discharging heads thereof withdrawn from the extended path of unoxidized metal-fuel tape;

FIG. 2A4 is a schematic representation of the Metal-Fuel Tape Discharging Subsystem shown in FIGS. 2A31 and 2A32, wherein the tape path-length extension mechanism is arranged in its extended configuration with its four independent discharging heads arranged about the extended path of unoxidized metal-fuel tape, and metal-fuel zone (MFZ) identification data is generated from each discharging head during tape discharging operations so that the system controller can record, in memory, "discharge parameters" of the Metal-Fuel Tape Discharging Subsystem during the discharging of each metal-fuel zone identified along the metal-fuel tape being transported through the discharge head assembly;

FIG. 2A5 is a high-level flow chart setting forth the basic steps involved during the discharging of metal-fuel tape (i.e. electrical power generation therefrom) when using the Metal-Fuel Tape Discharging Subsystem shown in FIGS. 2A31, 2A32 and 2A4;

FIG. 2A6 is a perspective view of the cathode support structure employed in each discharging head of the Metal-Fuel Tape Discharging Subsystem shown in FIGS. 2A31, 2A32 and 2A4, showing five parallel channels within which electrically-conductive cathode strips and ionically-conducting electrolyte-impregnated strips are securely supported in its assembled state;

FIG. 2A7 is a perspective, exploded view of cathode and electrolyte impregnated strips and oxygen pressure (pO2) sensors installed within the support channels of the cathode support structure shown in FIG. 2A6;

FIG. 2A8 is a perspective view of the cathode structure and oxygen-injecting chamber of the first illustrative embodiment of the present invention, shown in its fully assembled state and adapted for use in the discharging head assembly shown in FIGS. 2A31, 2A32 and 2A4;

FIG. 2A9 is a perspective view of a section of unoxidized metal-fuel tape for use in the Metal-Fuel Tape Discharging Subsystem shown in FIGS. 1, 2A3 and 2A4, showing (i) its parallel metal-fuel strips spatially registerable with the cathode strips in the cathode structure of the discharging head partially shown in FIG. 2A8, and (ii) a graphically-encoded data track containing sequences of code symbols along the length of metal-fuel tape for identifying each metal-fuel zone therealong and facilitating, during discharging operations, (i) reading (or accessing), from data storage memory, recharge parameters and/or metal-fuel indicative data correlated to metal-fuel zone identification data prerecorded during previous recharging and/or discharging operations, and (ii) recording, in data storage memory, sensed discharge parameters and computed metal-oxide indicative data correlated to metal-fuel zone identification data read during the discharging operation;

FIG. 2A9' is a perspective view of a section of unoxidized metal-fuel tape for use in the Metal-Fuel Tape Discharging Subsystem shown in FIGS. 1, 2A31, 2A32 and 2A4, showing (i) parallel metal-fuel strips spatially registerable with the cathode strips in the cathode structure of the discharging head partially shown in FIG. 2A8, and (ii) a magnetically-encoded data track embodying sequences of code symbols along the length of metal-fuel tape for identifying each metal-fuel zone therealong and facilitating, during discharging operations, (i) reading (or accessing), from data storage memory, recharge parameters and/or metal-fuel indicative data correlated to metal-fuel zone identification data prerecorded during previous recharging and/or discharging operations, and (ii) recording, in data storage memory, sensed discharge parameters and computed metal-oxide indicative data correlated to metal-fuel zone identification data read during the discharging operation;

FIG. 2A9" is a perspective view of a section of unoxidized metal-fuel tape for use in the Metal-Fuel Tape Discharging Subsystem shown in FIGS. 1, 2A31, 2A32 and 2A4, showing (i) parallel metal-fuel strips spatially registerable with the cathode strips in the cathode structure of the discharging head partially shown in FIG. 2A8, and (ii) an optically-encoded data track containing sequences of light-transmission aperture-type code symbols along the length of metal-fuel tape for identifying each metal-fuel zone therealong, and facilitating, during discharging operations, (i) reading (or accessing), from data storage memory, recharge parameters and/or metal-fuel indicative data correlated to metal-fuel zone identification data prerecorded during previous recharging and/or discharging operations, and (ii) recording, in data storage memory, sensed discharge parameters and computed metal-oxide indicative data correlated to metal-fuel zone identification data read during recharging operations;

FIG. 2A10 is a perspective view of an assembled discharging head within the Metal-Fuel Tape Discharging Subsystem shown in FIGS. 2A31, 2A32 and 2A4, wherein during the Discharging Mode thereof, metal-fuel tape is transported past the air-pervious cathode structures shown in FIG. 2A8, and multiple anode-contacting elements establishing electrical contact with the metal-fuel strips of metal-fuel tape transported through the discharging head;

FIG. 2A11 is a cross-sectional view of the assembled cathode structure, taken along line 2A11—2A11 of FIG. 2A8, showing its cross-sectional details;

FIG. 2A12 is a cross-sectional view of the metal-fuel tape shown in FIG. 2A9, taken along line 2A12—2A12 thereof, showing its cross-sectional details;

FIG. 2A13 is a cross-sectional view of the cathode structure and oxygen-injecting chamber of the discharging head shown in FIG. 2A10, taken along line 2A13—2A13 therein;

FIG. 2A14 is a cross-sectional view of the discharging head shown in FIG. 2A10, taken along line 2A14—2A14 therein, showing its cross-sectional details;

FIG. 2A15 is a perspective view of the multi-track metal-oxide sensing head assembly employed in the Metal-Fuel Tape Discharging Subsystem shown in FIGS. 2A1 through 2A4, particularly adapted for real-time sensing (i.e. detecting) metal-oxide formations along each metal-fuel zone to assess the presence or absence of metal-fuel therelong during discharging operations;

FIG. 2A16 is a schematic representation of the information structure maintained within the Metal-Fuel Tape Discharging Subsystem of FIG. 1, comprising a set of information fields for recording discharge parameters, and metal-oxide and metal-fuel indicative data for each metal-fuel zone identified (i.e. addressed) along a discharged section of metal-fuel tape during the discharging mode of operation;

FIG. 2B1 is a generalized schematic representation of the Metal-Fuel Tape Recharging Subsystem of FIG. 1, wherein the tape path-length extension mechanism employed therein is shown in its non-extended configuration;

FIG. 2B2 is a generalized schematic representation of the Metal-Fuel Tape Recharging Subsystem of FIG. 1, wherein the tape path-length extension mechanism employed therein is shown in its extended configuration and the recharging heads thereof are configured about the extended path of oxidized metal-fuel tape for recharging the same;

FIGS. 2B31 and 2B32, taken together, set forth a generalized schematic representation of the Metal-Fuel Tape Recharging Subsystem shown in FIG. 1, wherein the subcomponents thereof are shown in greater detail, and the recharging heads thereof withdrawn from the extended path of oxidized metal-fuel tape;

FIG. 2B4 is a schematic representation of the Metal-Fuel Tape Recharging Subsystem shown in FIGS. 2B31 and 2B32, wherein the subcomponents thereof are shown in greater detail, the tape path-length extension mechanism is arranged in its extended configuration with four independent recharging heads arranged about the extended path of oxidized metal-fuel tape, and metal-fuel zone identification data (MFZID) is generated from the recharging heads during tape recharging operations so that the system controller can access previously recorded discharge parameters and metal-fuel indicative data from system memory, correlated to each metal-fuel zone along the metal-fuel tape, thereby enabling optimal setting of recharge parameters during tape recharging operations;

FIG. 2B5 is a high-level flow chart setting forth the basic steps involved during the recharging of oxidized metal-fuel tape when using the Metal-Fuel Tape Recharging Subsystem shown in FIGS. 2B31 through 2B4;

FIG. 2B6 is a perspective view of the cathode support structure employed in each recharging head of the Metal-Fuel Tape Recharging Subsystem shown in FIGS. 2B31, 2B32 and 2B4, and comprises five parallel channels within which electrically-conductive cathode strips and ionically-conducting electrolyte-impregnated strips are securely supported;

FIG. 2B7 is a perspective, exploded view of cathode and electrolyte-impregnated strips and oxygen pressure (pO2) sensors installed within the support channels of the cathode support structure shown in FIG. 2B8;

FIG. 2B8 is a perspective view of the cathode structure and oxygen-evacuation chamber of the first illustrative embodiment of the present invention, shown in its fully assembled state and adapted for use in the recharging heads shown in FIGS. 2B31, 2B32 and 2B4;

FIG. 2B9 is a perspective view of a section of oxidized metal-fuel tape for recharging in the Metal-Fuel Tape Recharging Subsystem shown in FIGS. 2B31, 2B32 and 2B4, and comprising parallel metal-fuel strips spatially registerable with the cathode strips in the cathode structure (i.e. recharging head) of FIG. 2B8, and an optically encoded data track containing sequences of bar of code symbols along the length of metal-fuel tape for identifying each metal-fuel zone along the reel of metal-fuel tape, and facilitating, during recharging operations, (i) reading (or accessing), from data storage memory, discharge parameters and/or metal-oxide indicative data correlated to metal-fuel zone identification data prerecorded during previous discharging and/or recharging operations, and (ii) recording, in data storage memory, sensed recharge parameters and computed metal-fuel indicative data correlated to metal-fuel zone identification data read during the recharging operation;

FIG. 2B9' is a perspective view of a section of oxidized metal-fuel tape for use in the Metal-Fuel Tape Recharging Subsystem shown in FIGS. 1, 2B31, 2B32 and 2B4, showing (i) parallel metal-fuel strips spatially registerable with the cathode strips in the cathode structure of the recharging head partially shown in FIG. 2B8, and (ii) a magnetically-encoded data track embodying sequences of digital words along the length thereof identifying each metal-fuel zone therealong, and facilitating, during recharging operations, (i) reading (or accessing), from data storage memory, discharge parameters and/or metal-oxide indicative data correlated to metal-fuel zone identification data prerecorded during previous discharging and/or recharging operations, and (ii) recording, in data storage memory, sensed recharge parameters and computed metal-fuel indicative data correlated to metal-fuel zone identification data read during the recharging operation;

FIG. 2B9" is a perspective view of a section of reoxidized metal-fuel tape for use in the Metal-Fuel Tape Recharging Subsystem shown in FIGS. 1, 2B31, 2B32 and 2B4, showing (i) parallel metal-fuel strips spatially registerable with the cathode strips in the cathode structure of the recharging head partially shown in FIG. 2B8, and (ii) an optically-encoded data track containing sequences of light-transmission aperture-type code symbols along the length of metal-fuel tape for identifying each metal-fuel zone therealong, and facilitating, during recharging operations, (i) reading (or accessing), from data storage memory, discharge parameters and/or metal-oxide indicative data correlated to metal-fuel zone identification data prerecorded during previous discharging and/or recharging operations, and (ii) recording, in data storage memory, sensed recharge parameters and computed metal-fuel indicative data correlated to metal-fuel zone identification data read during the recharging operation;

FIG. 2B10 is a perspective view of a recharging head within the Metal-Fuel Tape Recharging Subsystem shown in FIGS. 2B31, 2B32 and 2B4, wherein during the Recharging Mode thereof, metal-fuel tape is transported past the air-pervious cathode structure shown in FIG. 2B8, and five anode-contacting elements establishing electrical contact with the metal-fuel strips of the transported metal-fuel tape;

FIG. 2B11 is a cross-sectional view of the cathode support structure head in the Metal-Fuel Tape Recharging Subsystem hereof, taken along line 2B11—2B11 of FIG. 2B8, showing a plurality of cathode and electrolyte-impregnated strips supported therein;

FIG. 2B12 is a cross-sectional view of the metal-fuel tape shown in FIG. 2B9, taken along line 2B12—2B12 thereof;

FIG. 2B13 is a cross-sectional view of the cathode structure of the recharging head shown in FIG. 2B10, taken along line 2B13—2B13 therein;

FIG. 2B14 is a cross-sectional view of the recharging head assembly shown in FIG. 2B10, taken along line 2B14—2B14 therein;

FIG. 2B15 is a perspective view of the multi-track metal-oxide sensing head employed in the Metal-Fuel Tape Recharging Subsystem shown in FIGS. 2B31, 2B32 and 2B4, particularly adapted for sensing which metal-fuel tracks have been discharged and thus require recharging by the subsystem;

FIG. 2B16 is a schematic representation of the information structure maintained within the Metal-Fuel Tape Recharging Subsystem of FIG. 1, comprising a set of information fields for recording recharge parameters and metal-fuel and metal-oxide indicative data for each metal-fuel zone identified (i.e. addressed) along a section of metal-fuel tape during the recharging mode of operation;

FIG. 2B17 is a schematic representation of the FCB system of FIG. 1 showing a number of subsystems which enable, during the recharging mode of operation, (a)(i) reading metal-fuel zone identification data from transported metal-fuel tape, (a)(ii) recording in memory, sensed recharge parameters and computed metal-fuel indicative data derived therefrom, and (a)(iii) reading (i.e., accessing) from memory, discharge parameters and computed metal-oxide indicative data recorded during the previous discharging and/or recharging mode of operation through which the identified metal-fuel zone has been processed, and during the discharging mode of operation, (b)(i) reading metal-fuel zone identification data from transported metal-fuel tape, (b)(ii) recording in memory, sensed discharge parameters and computed metal-oxide indicative data derived therefrom, and (b)(iii) reading (i.e., accessing) from memory, recharge parameters and computed metal-fuel indicative data recorded during the previous recharging and/or discharging operations through which the identified metal-fuel zone has been subjected;

FIG. 4 is a schematic diagram showing a fourth illustrative embodiment of the metal-air FCB system of the present invention, wherein a first plurality of recharged metal-fuel cards (or sheets) are semi-manually loaded into the discharging bay of its Metal-Fuel Card Discharging Subsystem, while a second plurality of discharged metal-fuel cards (or sheets) are semi-manually loaded into the recharging bay of its Metal-Fuel Card Recharging Subsystem;

FIG. 5A1 is a generalized schematic representation of the metal-air FCB system of FIG. 4, wherein metal-fuel cards are shown about-to-be inserted within the discharging bays of the Metal-Fuel Card Discharging Subsystem;

FIG. 5A2 is a generalized schematic representation of the metal-air FCB system of FIG. 4, wherein metal-fuel cards of FIG. 1 are shown loaded within the discharging bays of the Metal-Fuel Card Discharging Subsystem;

FIGS. 5A31 and 5A32, taken together, set forth a generalized schematic representation of the Metal-Fuel Card Discharging Subsystem shown in FIGS. 5A1 and 5A2, wherein the subcomponents thereof are shown in greater detail, with all metal-fuel cards withdrawn from the discharging head assembly thereof;

FIG. 5A4 is a schematic representation of the Metal-Fuel Card Discharging Subsystem shown in FIGS. 5A1 and 5A2, wherein the subcomponents thereof are shown in greater detail, with the metal-fuel cards inserted between the cathode and anode-contacting structures of each discharging head thereof;

FIG. 5A5 is a high-level flow chart setting forth the basic steps involved during the discharging of metal-fuel cards (i.e. generating electrical power therefrom) when using the Metal-Fuel Card Discharging Subsystem shown in FIGS. 5A31 through 5A4;

FIG. 5A6 is a perspective view of the cathode support structure employed in each discharging head of the Metal-Fuel Card Discharging Subsystem shown in FIGS. 5A31, 5A32 and 5A4, and comprising five parallel channels within which electrically-conductive cathode strips and ionically-conducting electrolyte-impregnated strips are securely supported in its assembled state;

FIG. 5A7 is a perspective, exploded view of cathode and electrolyte impregnated strips and partial oxygen pressure (pO2) sensors installed within the support channels of the cathode support structure shown in FIG. 5A6;

FIG. 5A8 is a perspective view of the cathode structure of the first illustrative embodiment of the present invention, shown in its fully assembled state and adapted for use in the discharging heads shown in FIGS. 5A31, 5A32 and 5A4;

FIG. 5A9 is a perspective view of a section of unoxidized metal-fuel card for use in the Metal-Fuel Card Discharging Subsystem shown in FIGS. 4, 5A31, 5A32 and 5A4, showing (i) its parallel metal-fuel strips spatially registerable with the cathode strips in the cathode structure of the discharging head partially shown in FIG. 5A8, and (ii) a graphically-encoded data track containing code symbols identifying the metal-fuel card, and facilitating, during discharging operations, (i) reading (or access), from data storage memory, recharge parameters and/or metal-fuel indicative data correlated to metal-fuel zone identification data prerecorded during previous recharging and/or discharging operations, and (ii) recording, in data storage memory, sensed discharge parameters and computed metal-oxide indicative data correlated to metal-fuel zone identification data being read during the discharging operation;

FIG. 5A9' is a perspective view of a section of unoxidized metal-fuel card for use in the Metal-Fuel Card Discharging Subsystem shown in FIGS. 4, 5A31, 5A32 and 5A4, showing (i) its parallel metal-fuel strips spatially registerable with the cathode strips in the cathode structure of the discharging head partially shown in FIG. 5A8, and (ii) a magnetically-encoded data track embodying digital code symbols identifying the metal-fuel card, and facilitating during discharging operations, (i) reading (or accessing) from data storage memory, prerecorded recharge parameters and/or metal-fuel indicative data correlated to the metal-fuel identification data read by the subsystem during discharging operations, and (ii) recording, in data storage memory, sensed discharge parameters correlated to metal-fuel zone identification data being read during the discharging operation;

FIG. 5A9" is a perspective view of a section of unoxidized metal-fuel card for use in the Metal-Fuel Card Discharging Subsystem shown in FIGS. 4, 5A31, 5A32 and 5A4, showing (i) parallel metal-fuel strips spatially registerable with the cathode strips in the cathode structure of the discharging head partially shown in FIG. 5A8, and (ii) an optically-encoded data track containing light-transmission aperture-type code symbols identifying the metal-fuel card, and facilitating during discharging operations (i) reading (or accessing) from data storage memory, recharge parameters and/or metal-fuel indicative data correlated to metal-fuel zone identification data prerecorded during previous recharging and/or discharging operations, and (ii) recording, in data storage memory, sensed discharge parameters and computed metal-oxide indicative data correlated to metal-fuel zone identification data being read during the discharging operation;

FIG. 5A10 is a perspective view of a discharging head within the Metal-Fuel Card Discharging Subsystem shown in FIGS. 5A31, 5A32 and 5A4, wherein during the Discharging Mode thereof, metal-fuel card is transported past the air-pervious cathode structure shown in FIG. 5A10, and five anode-contacting elements establish electrical contact with the metal-fuel strips of the transported metal-fuel card;

FIG. 5A11 is a cross-sectional view of the discharging head in the Metal-Fuel Card Discharging Subsystem hereof, taken along line 5A11—5A11 of FIG. 5A8, showing the cathode structure in electrical contact with the metal-fuel card of FIG. 5A9;

FIG. 5A12 is a cross-sectional view of the metal-fuel card shown in FIG. 5A9, taken along line 5A12—5A12 thereof;

FIG. 5A13 is a cross-sectional view of the cathode structure of the discharging head shown in FIG. 5A10, taken along line 5A13—5A13 therein;

FIG. 5A14 is a cross-sectional view of the cathode structure of the discharging head shown in FIG. 5A10, taken along line 5A14—5A14 therein;

FIG. 5A15 is a schematic representation of the information structure maintained within the Metal-Fuel Card Discharging Subsystem of FIG. 4, comprising a set of information fields for use in recording discharge parameters and metal-oxide and metal-fuel indicative data for each metal-fuel track within an identified (i.e. addressed) metal-fuel card during the discharging mode of operation;

FIG. 5A16 is a schematic representation of the FCB system of FIG. 4 showing a number of subsystems which enable, during the discharging mode of operation, (i) the reading of metal-fuel card identification data from a loaded metal-fuel card, (ii) the recording of memory, sensed discharge parameters and computed metal-oxide indicative data derived therefrom, and (iii) the reading (i.e., accessing) from memory, recharge parameters and computed metal-fuel and metal-oxide indicative data recorded during previous recharging and/or discharging operations through which the identified metal-fuel card has been processed;

FIG. 5B1 is a generalized schematic representation of the metal-air FCB system of FIG. 4, wherein metal-fuel cards are shown about-to-be loaded within the recharging bays of the Metal-Fuel Card Recharging Subsystem thereof;

FIG. 5B2 is a generalized schematic representation of the metal-air FCB system of FIG. 4, wherein metal-fuel cards are shown loaded within the recharging bays of the Metal-Fuel Card Recharging Subsystem;

FIGS. 5B31 and 5B32, taken together, set forth a generalized schematic representation of the Metal-Fuel Card Recharging Subsystem shown in FIGS. 5B1 and 5B2, wherein the subcomponents thereof are shown in greater detail, with the metal-fuel cards withdrawn from the recharging head assembly thereof;

FIG. 5B4 is a schematic representation of the Metal-Fuel Card Recharging Subsystem shown in FIGS. 5B31 and 5B32, wherein the metal-fuel cards are shown loaded between the cathode and anode-contacting structure of recharging heads thereof;

FIG. 5B5 is a high-level flow chart setting forth the basic steps involved during the recharging of oxidized metal-fuel cards when using the Metal-Fuel Card Recharging Subsystem shown in FIGS. 5B31 through 5B4;

FIG. 5B6 is a perspective view of the cathode support structure employed in each recharging head of the Metal-Fuel Card Recharging Subsystem shown in FIGS. 5B31, 5B32 and 5B4, showing five parallel channels within which electrically-conductive cathode strips and ionically-conducting electrolyte-impregnated strips are securely supported;

FIG. 5B7 is a perspective, exploded view of cathode and electrolyte impregnated strips and oxygen pressure (pO2) sensors being installed within the support channels of the cathode support structure shown in FIG. 5B8;

FIG. 5B8 is a perspective view of the cathode structure and its associated oxygen-evacuation chamber of the first illustrative embodiment of the present invention, shown in its fully assembled state and adapted for use in the recharging heads shown in FIGS. 5B31, 5B32 and 5B4;

FIG. 5B9 is a perspective view of a section of an oxidized metal-fuel card adapted for use in the Metal-Fuel Card Recharging Subsystem shown in FIGS. 4, 5B31, 5B32 and 5B4, showing (i) its parallel metal-fuel strips spatially registerable with the cathode strips in the cathode structure of the recharging head partially shown in FIG. 5B8, and (ii) a graphically-encoded data track containing code symbols for identifying each metal-fuel zone therealong, and facilitating during recharging operations, (i) reading (or accessing), from data storage memory, discharge parameters and/or metal-oxide indicative data correlated to metal-fuel zone identification data prerecorded during previous discharging and/or recharging operations, and (ii) recording, in data storage memory, sensed recharge parameters and computed metal-fuel indicative data correlated to metal-fuel zone identification data being read during the recharging operation;

FIG. 5B9' is a perspective view of a section of an oxidized metal-fuel card adapted for use in the Metal-Fuel Tape Recharging Subsystem shown in FIGS. 4, 5B31, 5B32 and 5B4, showing (i) its parallel metal-fuel strips spatially registerable with the cathode strips in the cathode structure of the discharging head partially shown in FIG. 5B8, and (ii) a magnetically encoded data track embodying digital data for identifying each metal-fuel zone therealong, and facilitating during recharging operations, (i) reading (or access), from data storage memory, discharge parameters and/or metal-oxide indicative data correlated to metal-fuel zone identification data prerecorded during previous discharging and/or recharging operations, and (ii) recording in data storage memory, sensed recharge parameters and computed metal-fuel indicative data correlated to metal-fuel zone identification data being read during the recharging operation;

FIG. 5B9" is a perspective view of a section of an oxidized metal-fuel card adapted for use in the Metal-Fuel Tape Recharging Subsystem shown in FIGS. 4, 5A31, 5A32 and 5A4, showing (i) parallel metal-fuel strips spatially registerable with the cathode strips in the cathode structure of the recharging head partially shown in FIG. 5A8, and (ii) an optically-encoded data track containing a light-transmission aperture-type code symbols on the metal-fuel card for identifying each metal-fuel card, and facilitating during recharging operations, (i) reading (or accessing) from data storage memory, discharge parameters and/or metal-oxide indicative data correlated to metal-fuel zone identification data prerecorded during previous discharging and/or recharging operations, and (ii) recording, in data storage memory, sensed recharge parameters and computed metal-fuel indicative data correlated to metal-fuel zone identification data being read during the recharging operation;

FIG. 5B10 is a perspective view of a recharging head within the Metal-Fuel Card Recharging Subsystem shown in FIGS. 5B31, 5B32 and 5B4, wherein during the Recharging Mode thereof, metal-fuel card is transported past the air-pervious cathode structure shown in FIG. 5B10, and five anode-contacting elements establish electrical contact with the metal-fuel strips of the transported metal-fuel card;

FIG. 5B11 is a cross-sectional view of each recharging head in the Metal-Fuel Card Recharging Subsystem hereof, taken along line 5B11—5B11 of FIG. 5B8, showing the cathode structure in electrical contact with the metal-fuel card structure of FIG. 5B9;

FIG. 5B12 is a cross-sectional view of the metal-fuel card shown in FIG. 5B9, taken along line 5B12—5B12 thereof;

FIG. 5B13 is a cross-sectional view of the cathode structure of the recharging head shown in FIG. 5B10, taken along line 5B13—5B13 therein;

FIG. 5B14 is a cross-sectional view of the cathode structure of the recharging head shown in FIG. 5B10, taken along line 5B14—5B14 therein;

FIG. 5B15 is a schematic representation of the information structure maintained within the Metal-Fuel Card Recharging Subsystem of FIG. 4, comprising a set of information fields for recording recharge parameters and metal-oxide and metal-fuel indicative data for each metal-fuel track within an identified (i.e. addressed) metal-fuel card during the recharging mode of operation;

FIG. 5B16 is a schematic representation of the FCB system of FIG. 4 showing a number of subsystems which enable, during the recharging mode of operation, (a)(i) reading metal-fuel card identification data from a loaded metal-fuel card, (a)(ii) recording in memory, sensed recharge parameters and computed metal-fuel indicative data derived therefrom, and (a)(iii) reading (accessing) from memory, discharge parameters and computed metal-oxide and metal-fuel indicative data recorded during previous discharging and/or recharging operations through which the identified metal-fuel card has been processed, and during the discharging mode of operation, (b)(i) reading metal-fuel card identification data from a loaded metal-fuel card, (b)(ii) recording in memory, sensed discharge parameters and computed metal-oxide indicative data derived therefrom, and (b)(iii) reading (accessing) from memory, recharge parameters and computed metal-oxide and metal-oxide and metal-fuel indicative data recorded during previous discharging and/or recharging operations through which the identified metal-fuel card has been processed;

FIG. 6 is a perspective diagram of a fifth illustrative embodiment of the metal-air FCB system of the present invention, wherein a first plurality of recharged metal-fuel cards can be automatically transported from its recharged metal-fuel card storage bin into the discharging bay of its Metal-Fuel Card Discharging Subsystem, while a second plurality of oxidized metal-fuel cards are automatically transported from the discharged metal-fuel card storage bin into the recharging bay of its Metal-Fuel Card Recharging Subsystem for use in electrical power generation operations;

FIG. 7A1 is a generalized schematic representation of the metal-air FCB system of FIG. 6, wherein recharged metal-fuel cards are shown being automatically transported from the bottom of the stack of recharged metal-fuel cards in the recharged metal-fuel card storage bin, into the discharging bay of the Metal-Fuel Card Discharging Subsystem;

FIG. 7A2 is a generalized schematic representation of the metal-air FCB system of FIG. 6, wherein discharged metal-fuel cards are shown being automatically transported from the discharging bay of the Metal Fuel Card Discharging Subsystem onto the top of the stack of discharged metal fuel cards in the discharged metal-fuel card storage bin;

FIGS. 7A31 and 7A32, taken together, set forth a generalized schematic representation of the Metal-Fuel Card Discharging Subsystem shown in FIGS. 7A1 and 7A2, wherein the subcomponents thereof are shown in greater detail, with a plurality of recharged metal-fuel cards arranged and ready for insertion between the cathode and anode-contacting structures of the discharging heads thereof;

FIG. 7A4 is a schematic representation of the Metal-Fuel Card Discharging Subsystem shown in FIGS. 7A31 and 7A32, wherein the plurality of recharged metal-fuel cards are inserted between the cathode and anode-contacting structures of the discharging heads thereof;

FIG. 7A5 sets forth a high-level flow chart setting forth the basic steps involved during the discharging of metal-fuel cards (i.e. generating electrical power therefrom) using the Metal-Fuel Card Discharging Subsystem shown in FIGS. 7A31 through 7A4;

FIG. 7A6 is a perspective view of the cathode support structure employed in each discharging head of the Metal-Fuel Card Discharging Subsystem shown in FIGS. 7A31, 7A32 and 7A4, wherein four cathode element receiving recesses are provided for receiving cathode structures and electrolyte-impregnated pads therein;

FIG. 7A7 is a schematic diagram of the oxygen-injection chamber adapted for use with the cathode support structure shown in FIG. 7A6;

FIG. 7A8A is a schematic diagram of a cathode structure insertable within the lower portion of a cathode receiving recess of the cathode support plate shown in FIG. 7A6;

FIG. 7A8B is a schematic diagram of an electrolyte-impregnated pad for insertion over a cathode structure within the upper portion of a cathode receiving recess of the cathode support plate shown in FIG. 7A6;

FIG. 7A9 is a perspective view of an unoxidized metal-fuel card for discharging within the Metal-Fuel Discharging Subsystem of FIG. 6, and which comprises four spatially-isolated recesses each supporting a metal-fuel strip and permitting electrical contact with an anode-contacting electrode through an aperture formed in the bottom surface of the recess when loaded within the discharging head;

FIG. 7A10 is a cross-sectional view of the metal-fuel support structure of FIG. 7A9, taken along line 7A10—7A10 of FIG. 7A9;

FIG. 7A11 is a perspective view of an electrode support plate supporting a plurality of electrodes which are designed to establish electrical contact with the anodic metal-fuel strips supported within the metal-fuel support plate of FIG. 7A9, during discharging operations carried out by the Metal-Fuel Card Discharging Subsystem of FIG. 6;

FIG. 7A12 is a perspective, exploded view of a discharging head within the Metal-Fuel Card Discharging Subsystem of FIG. 6, showing its cathode support structure, oxygen-injection chamber, metal-fuel support structure, and anode electrode-contacting plate thereof in a disassembled yet registered relationship;

FIG. 7A13 is a schematic representation of the information structure maintained within the Metal-Fuel Card Discharging Subsystem of FIG. 6, comprising a set of information fields for use in recording discharge parameters, and metal-oxide and metal-fuel indicative data for each metal-fuel zone within an identified (i.e. addressed) metal-fuel card during discharging operations;

FIG. 7B1 is a generalized schematic representation of the metal-air FCB system of FIG. 6, wherein a plurality of oxidized metal-fuel cards are shown being automatically transported from the bottom of the stack of discharged metal-fuel cards in the discharged metal-fuel card storage bin into the recharging bay of the Metal-Fuel Card Recharging Subsystem thereof;

FIG. 7B2 is a generalized schematic representation of the metal-air FCB system of FIG. 6, wherein recharged metal-fuel cards are shown being automatically transported from the recharging bay of the Metal-Fuel Card Recharging Subsystem onto the top of the stack of recharged metal fuel cards in recharged metal-fuel card storage bin;

FIGS. 7B31 and 7B32, taken together, set forth a generalized schematic representation of the Metal-Fuel Card Recharging Subsystem shown in FIGS. 7B1 and 7B2, wherein the subcomponents thereof are shown in greater detail, with a plurality of discharged metal-fuel cards ready for insertion between the cathode and anode-contacting structures of the recharging heads thereof;

FIG. 7B4 is a schematic representation of the Metal-Fuel Card Recharging Subsystem shown in FIGS. 7B31 and 7B32, wherein a plurality of discharged metal-fuel cards are shown inserted between the cathode and anode-contacting structures of the metal-oxide recharging heads thereof;

FIG. 7B5 sets forth a high-level flow chart setting forth the basic steps involved during the recharging of metal-fuel cards (i.e. converting metal-oxide into its primary metal) when using the Metal-Fuel Card Recharging Subsystem shown in FIGS. 7B31 through 7B4;

FIG. 7B6 is a perspective view of the cathode support structure employed in each recharging head of the Metal-Fuel Card Recharging Subsystem shown in FIGS. 7B31, 7B32 and 7B4, wherein four cathode element receiving recesses are provided for receiving cathode structures and electrolyte-impregnated pads therein;

FIG. 7B7 is a schematic diagram of a cathode structure insertable within the lower portion of a cathode receiving recess of the cathode support structure shown in FIG. 7B6;

FIG. 7B8A is a schematic diagram of a cathode structure insertable within the lower portion of a cathode receiving recess in the cathode support plate of FIG. 7B6;

FIG. 7B8B is a schematic diagram of an oxygen-evacuation chamber adapted for use in cathode support structure shown in FIG. 7B6;

FIG. 7B9 is a perspective view of a partially-oxidized metal-fuel card designed for recharging in the Metal-Fuel Recharging Subsystem of FIG. 6, and comprising four spatially-isolated recesses each supporting a metal-fuel strip and permitting electrical contact with an anode-contacting electrode through an aperture formed in the bottom surface of the recess when loaded within a recharging head;

FIG. 7B10 is a cross-sectional view of the metal-fuel support structure of FIG. 7B9, taken along line 7B10—7B10 of FIG. 7B9;

FIG. 7B11 is a perspective view of a metal-fuel support plate for supporting a plurality of electrodes designed to establish electrical contact with the metal-fuel strips supported within the metal-fuel support plate of FIG. 7B10, during recharging operations carried out by the Metal-Fuel Card Recharging Subsystem of FIG. 6;

FIG. 7B12 is a perspective, exploded view of a recharging head within the Metal-Fuel Card Recharging Subsystem of FIG. 6, showing the cathode support structure, the metal-fuel support structure and the anode electrode-contacting plate thereof in a disassembled yet registered relationship;

FIG. 7B13 is a schematic representation of the information structure maintained within the Metal-Fuel Card Discharging Subsystem of FIG. 6, comprising a set of information fields for use in recording recharge parameters, and metal-fuel and metal-oxide indicative data for each metal-fuel track within an identified (i.e. addressed) metal-fuel card during recharging operations;

FIG. 7B14 is a schematic representation of the FCB system of FIG. 6 showing a number of subsystems which enable, during recharging operations, (a)(i) reading metal-fuel card identification data from a loaded metal-fuel card, (a)(ii) recording in memory, sensed recharge parameters and computed metal-fuel indicative data derived therefrom, and (a)(iii) reading (accessing) from memory, discharge parameters and computed metal-oxide and metal-oxide indicative data recorded during previous discharging and/or recharging operations through which the identified metal-fuel card has been processed;

FIG. 8 is a is a schematic block diagram of a sixth illustrative embodiment of the metal-air FCB system of the present invention, wherein metal-fuel tape discharging and recharging functions are realized in a single hybrid-type Metal-Fuel Tape Discharging/Recharging Subsystem, wherein the tape path-length extension mechanism employed therein extends metal-fuel tape to be recharged over a path which is substantially greater than the path maintained for metal-fuel tape to be discharged;

FIGS. 9A11 and 9A12, taken together, set forth a schematic representation of the hybrid Metal-Fuel Tape Discharging/Recharging Subsystem shown in FIG. 8, wherein the configured discharging heads and recharging heads thereof are shown withdrawn from the extended path-length of metal-fuel tape;

FIG. 9A2 is a schematic representation of the hybrid Metal-Fuel Tape Discharging/Recharging Subsystem shown in FIG. 8, wherein the configured discharging heads and recharging heads are arranged about the extended path-length of metal-fuel tape to enable simultaneous discharging and recharging operations to be carried out in an optimal manner;

FIG. 10 is a schematic diagram of the seventh illustrative embodiment of the metal-air FCB system hereof, wherein metal-fuel is provided in the form of metal-fuel cards (or sheets) contained within a cassette cartridge-like device having a partitioned interior volume for storing (re)charged and discharged metal-fuel cards in separate storage compartments formed within the same cassette cartridge-like device;

FIG. 11 is a schematic diagram of the eighth illustrative embodiment of the metal-air FCB system hereof, wherein metal-fuel is provided in the form of metal-fuel cards (or sheets) contained within a cassette cartridge-like device having a partitioned interior volume for storing (re)charged and discharged metal-fuel cards in separate storage compartments formed within the same cassette cartridge-like device.

DETAILED DESCRIPTION OF THE ILLUSTRATIVE EMBODIMENTS OF THE PRESENT INVENTION

Figure 1:
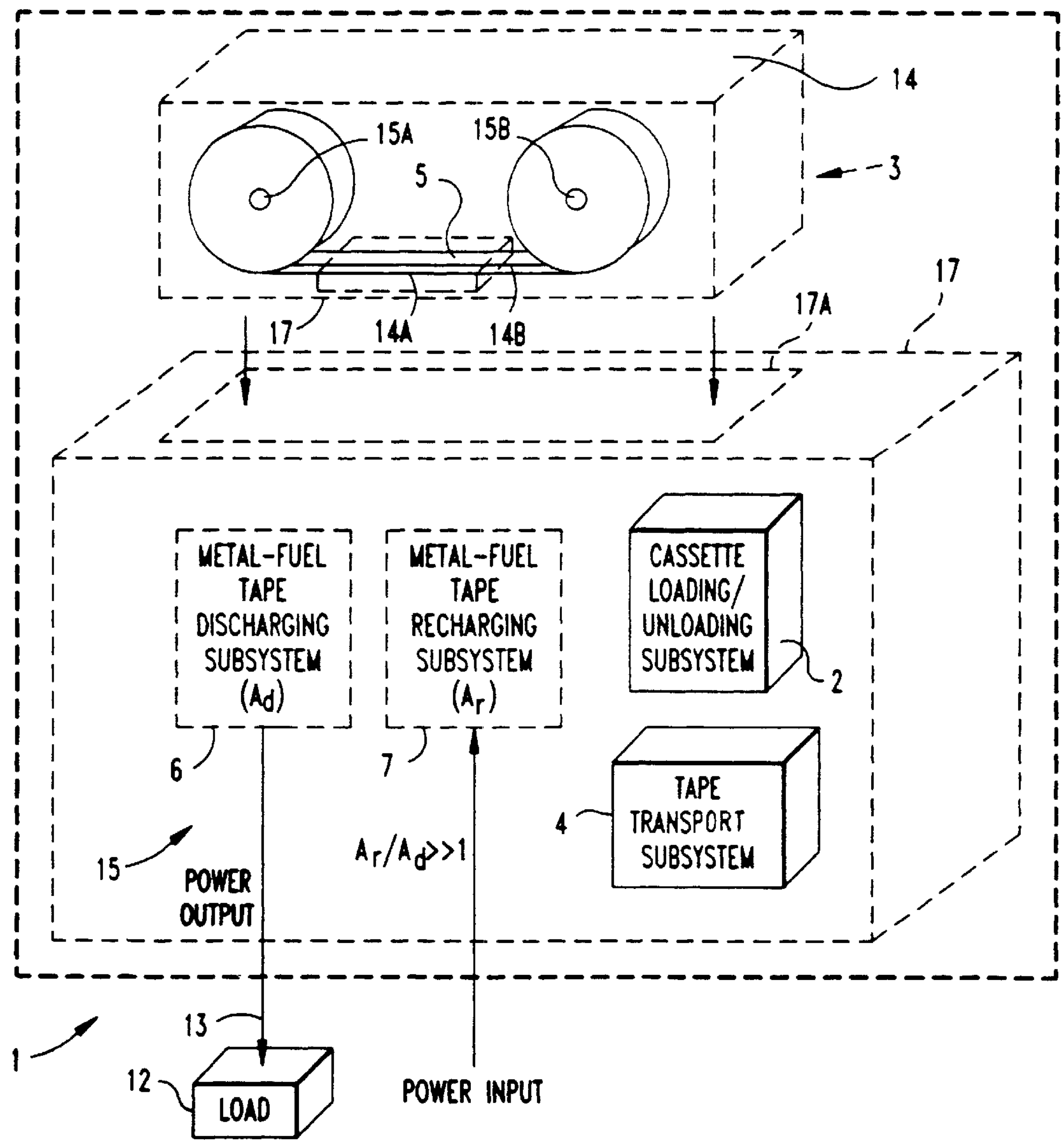
FIG. 1 is a schematic block diagram of a first illustrative embodiment of the metal-air FCB system of the present invention, wherein a Metal-Fuel Tape Discharging Subsystem and a Metal-Fuel Tape Recharging Subsystem are integrated within a single, stand-alone rechargeable power generation unit, and the tape path-length extension mechanism employed in the Metal-Fuel Tape Recharging Subsystem extends oxidized metal-fuel tape over a path-length which is substantially greater than the path-length maintained by the tape path-length extension mechanism in the Metal-Fuel Tape Discharging Subsystem (i.e. $A_{Recharge} >> A_{Discharge}$)

Referring now to the figures in the accompanying Drawings, the illustrative embodiments of the present invention will now be described in great technical detail, wherein like elements are indicated by like reference numbers.

In general, many of the rechargeable metal-air FCB-based systems according to the present invention can be decomposed into a number of subsystems including, for example: a Metal-Fuel Transport Subsystem; a Metal-Fuel Discharging Subsystem; and a Metal-Fuel Recharging Subsystem. The function of the Metal-Fuel Transport Subsystem is to transport metal-fuel material, in the form of tape, cards, sheets, cylinders and the like, to the Metal-Fuel Discharge Subsystem, or the Metal-Fuel Recharge Subsystem, depending on the mode of the system selected. When transported to or through the Metal-Fuel Discharge Subsystem, the metal-fuel is discharged by (i.e. electro-chemically reaction with) one or more discharging heads in order produce electrical power across an electrical load connected to the subsystem while $H_2O$ and $O_2$ are consumed at the cathode-electrolyte interface during the electro-chemical reaction. When transported to or through the Metal-Fuel Recharging Subsystem, discharged metal-fuel is recharged by one or more recharging heads in order to convert the oxidized metal-fuel material into its source metal material suitable for reuse in power discharging operations, while $O_2$ is released at the cathode-electrolyte interface during the electro-chemical reaction. The electro-chemistry upon which such discharging and recharging operations are based is described in Applicant's copending Application Ser. No. 08/944,507, U.S. Pat. No. 5,250,370, and other applied science publications well known in the art. These applied science principles will be briefly summarized below.

During discharging operations within metal-air FCB systems, metal-fuel such as zinc, aluminum, magnesium or beryllium is employed as an electrically-conductive anode of a particular degree of porosity (e.g. 50%) which is brought in "ionic-contact" with an electrically-conductive oxygen-pervious cathode structure of a particular degree of porosity, by way of an ionically-conductive medium such as an electrolyte gel, KOH, NaOH or ionically-conductive polymer. When the cathode and anode structure are brought into ionic contact, a characteristic open-cell voltage is automatically generated. The value of this open-cell voltage is based on the difference in electrochemical potential of the anode and cathode materials. When an electrical load is connected across the cathode and anode structures of the metal-air FCB cell, so constructed, electrical power is delivered to the electrical load, as oxygen $O_2$ from the ambient environment is consumed and metal-fuel anode material oxidizes. In the case of a zinc-air FCB system or device, the zinc-oxide (ZnO) is formed on the zinc anode structure during the discharging cycle, while oxygen is consumed at within the region between the adjacent surfaces of the cathode structure and electrolytic medium (hereinafter referred to as the "cathode-electrolyte interface" for purposes of convenience).

During recharging operations, the Metal-Fuel Recharging Subsystem hereof applies an external voltage source (e.g. more than 2 volts for zinc-air systems) across the cathode structure and oxidized metal-fuel anode of the metal-air FCB system. Therewhile, the Metal-Fuel Recharging Subsystem controls the electrical current flowing between the cathode and metal-fuel anode structures, in order to reverse the electro-chemical reaction which occurred during discharging operations. In the case of the zinc-air FCB system or device, the zinc-oxide (ZnO) formed on the zinc anode structure during the discharging cycle is converted into (i.e. reduced back) into zinc, while oxygen $O_2$ is released at the cathode-electrolyte interface to the ambient environment.

Specific ways and means for optimally carrying out such discharging and recharging processes in metal-air FCB systems and devices will be described in detail below in connection with the various illustrative embodiments of the present invention.

THE FIRST ILLUSTRATIVE EMBODIMENT OF THE METAL-AIR FCB SYSTEM OF THE PRESENT INVENTION

The first illustrative embodiment of the metal-air FCB system hereof is illustrated in FIGS. 1 through 2B16. As shown in FIG. 1, this metal-air FCB system 1 comprises a number of subsystems, namely: a Metal-Fuel Tape Cassette Cartridge Loading/Unloading Subsystem 2 for loading and unloading a metal-fuel tape cassette device 3 into the FCB system during its Cartridge Loading and Unloading Modes of operation, respectively; a Metal-Fuel Tape Transport Subsystem 4 for transporting metal-fuel tape 5, supplied by the loaded cassette device, through the FCB system during its Discharging and Recharging Modes of operation alike; a Metal-Fuel Tape Discharging (i.e. Power Generation) Subsystem 6 for generating electrical power from the metal-fuel tape during the Discharging Mode of operation; and a Metal-Fuel Tape Recharging Subsystem 7 for electro-chemically recharging (i.e. reducing) sections of oxidized metal-fuel tape during the Recharging Mode of operation. In the illustrative embodiment of the Metal-Fuel Tape Discharging Subsystem 6 to be described in greater detail hereinebelow, an assembly of discharging (i.e. discharging) heads are provided for discharging metal-fuel tape in the presence of air ($O_2$) and water and ($H_2O$) and generating electrical power across an electrical load connected to the FCB system.

In order to equip the metal-air FCB system with multiple discharging heads arranged within an ultra-compact space, the Metal-Fuel Tape Discharging Subsystem 6 comprises a metal-fuel tape path-length extension mechanism 8, as shown in FIGS. 2A1 and 2A2. In FIG. 2A1, the path-length extension mechanism 8 is shown in its unextended configuration. When a cassette cartridge 3 is loaded into the cassette storage bay of the FCB system, the path-length extension mechanism 8 within the Metal-Fuel Tape Discharging Subsystem 6 automatically extends the path-length of the metal-fuel tape 5, as shown in FIG. 2A2, thereby permitting an assembly of discharging heads 9 to be arranged thereabout for generating electrical power during the Discharging Mode of the system. The many advantages of providing multiple discharging heads in the Metal-Fuel Tape Discharging Subsystem will become apparent hereinafter.

Similarly, in order to equip the metal-air FCB system with multiple metal-oxide reducing (i.e. recharging) heads arranged within an ultra-compact space, the Metal-Fuel Tape Recharging Subsystem 7 also comprises a metal-fuel tape path-length extension mechanism 10. In FIG. 2B1, the path-length extension mechanism 10 is shown in its unextended configuration. When a cassette cartridge 3 is loaded into the cassette storage bay of the FCB system, the path-length extension mechanism 10 within the Metal-Fuel Tape Recharging Subsystem 7 automatically extends the path-length of the metal-fuel tape 5, as shown in FIG. 2B2, thereby permitting the assembly of recharging heads 11 to be inserted between and arranged about the path-length extended metal-fuel tape, for converting metal-oxide formations into its primary metal during the Recharging Mode of operation.

In order to provide for rapid recharging of the metal-fuel tape in the metal-air FCB system of the first illustrative embodiment, the total surface area $A_{recharge}$ of the recharging heads in the Metal-Fuel Tape Recharging Subsystem 7 is designed to be substantially greater than the total surface area $A_{discharge}$ of the discharging heads within the Metal-Fuel Tape Discharging Subsystem 6 (i.e. $A_{recharge} >> A_{discharge}$), as taught in Applicant's prior U.S. Pat. No. 5,250,370, incorporated herein by reference. This design feature enables a significant decrease in recharging time, without requiring a significant increase in volume in the housing of the FCB system. These subsystem features will be described in greater detail hereinafter in connection with the description of the Metal-Fuel Tape Discharging and Recharging Subsystems hereof.

Brief Summary of Modes of Operation of the FCB System of the First Illustrative Embodiment of the Present Invention During the Cartridge Loading Mode, the cassette cartridge 3 containing a supply of charged metal-fuel tape 5 is loaded into the FCB system, by the Cassette Loading/Unloading Subsystem 2. During the Discharging Mode, the charged metal-fuel tape within the cartridge is mechanically manipulated by path-length extension mechanism hereof 8 to substantially increase its path-length so that the assembly of discharging heads 9 can be arranged thereabout for electro-chemically generating electrical power therefrom for supply to an electrical load connected thereto. During the Recharging Mode, the oxidized metal-fuel tape 5 within the cartridge is mechanically manipulated by path-length extension mechanism hereof 10 to substantially increase its path-length so that the assembly of metal-oxide reducing (i.e. recharging) heads 11 can be arranged thereabout for electro-chemically reducing (i.e. recharging) the oxide formations on the metal-fuel tape transported therethrough into its primary metal during recharging operations. During the Cartridge Unloading Mode, the cassette cartridge is unloaded (e.g. ejected) from the FCB system by the Cassette Loading/Unloading Subsystems.

While it may be desirable in some applications to suspend tape recharging operations while carryout tape discharging operations, the FCB system of the first illustrative embodiment enables concurrent operation of the Discharging and Recharging Modes. Notably, this feature of the present invention enables simultaneous discharging and recharging of metal-fuel tape during power generating operation.

Multi-Track Metal-Fuel Tape Used in the FCB System of the First Illustrative Embodiment In the FCB system of FIG. 1, the metal-fuel tape 5 has multiple fuel-tracks (e.g. five tracks) as taught in U.S. Pat. No. 6,296,960 supra. When using such a metal-fuel tape design, it is desirable to design each discharging head 9 within the Metal-Fuel Tape Discharging Subsystem 6 as a "multi-track" discharging head. Similarly, each recharging head 11 within the Metal-Fuel Tape Recharging Subsystem 7 hereof should be designed as a multi-track recharging head in accordance with the principles of the present invention. As taught in great detail in copending Application Ser. No. 08/944,507, the use of "multi-tracked" metal-fuel tape and multi-track discharging heads enables the simultaneous production of multiple supply voltages (e.g. 1.2 Volts), and thus the generation and delivery of a wide range of output voltages {V1, V2, . . . , Vn} to electrical loads having various loading requirements. Such output voltages can be used suitable for driving various types of electrical loads 12 connected to output power terminals 13 of the FCB system. This is achieved by configuring the individual output voltages produced across each anode-cathode pair during tape discharging operations. This system functionality will be described in greater detail hereinbelow.

In general, multi-track and single-track metal-fuel tape alike can be made using several different techniques. Preferably, the metal-fuel tape contained with the cassette device 3 is made from zinc as this metal is inexpensive, environmentally safe, and easy to work. Several different techniques will be described for making zinc-fuel tape according to the present invention.

For example, in accordance with a first fabrication technique, a thin metal layer (e.g. nickel or brass) of about 1 to 10 microns thickness is applied to the surface of low-density plastic material (drawn and cut in the form of tape). The plastic material should be selected so that it is stable in the presence of an electrolyte such as KOH. The function of this thin metal layer is to provide efficient current collection at the anode surface. Thereafter, zinc powder is mixed with a binder material and then applied as a coating (e.g. about 10 to 1000 microns thick) upon the surface thin metal layer. The zinc layer should have a uniform porosity of about 50% to allow ions within the ionically-conducting medium (e.g. electrolyte) to flow with minimum electrical resistance between the current collecting elements of the cathode and anode structures.

In accordance with a second fabrication technique, a thin metal layer (e.g. nickel or brass) of about 1 to 10 microns thickness is applied to the surface of low-density plastic material (drawn and cut in the form of tape). The plastic material should be selected so that it is stable in the presence of an electrolyte such as KOH. The function of the thin metal layer is to provide efficient current collection at the anode surface. Thereafter zinc is electroplated onto the surface of the thin layer of metal. The zinc layer should have a uniform porosity of about 50% to allow ions within the ionically-conducting medium (e.g. electrolyte) to flow with minimum electrical resistance between the current collecting elements of the cathode and anode structures.

In accordance with a third fabrication technique, zinc power is mixed with a low-density plastic base material and drawn into electrically-conductive tape. The low-density plastic material should be selected so that it is stable in the presence of an electrolyte such as KOH. The electrically-conductive tape should have a uniform porosity of about 50% to allow ions within the ionically-conducting medium (e.g. electrolyte) to flow with minimum electrical resistance between the current collecting elements of the cathode and anode structures. Then a thin metal layer (e.g. nickel or brass) of about 1 to 10 microns thickness is applied to the surface of the electrically-conductive tape. The function of the thin metal layer is to provide efficient current collection at the anode surface.

Each of the above-described techniques for manufacturing metal-fuel tape can be ready modified to produce "double-sided" metal-fuel tape, in which single track or multi-track metal-fuel layers are provided on both sides of the flexible base (i.e. substrate) material. Such embodiments of metal-fuel tape will be useful in applications where discharging heads are to be arranged on both sides of metal-fuel tape loaded within the FCB system. When making double-sided metal-fuel tape, it will be necessary in most embodiments to form a current collecting layer (of thin metal material) on both sides of the plastic substrate so that current can be collected from both sides of the metal-fuel tape, associated with different cathode structures. When making double-sided multi-tracked fuel tape, it may be desirable or necessary to laminate together two lengths of multi-track metal-fuel tape, as described hereinabove, with the substrates of each tape-length in physical contact. Adaptation of the above-described methods to produce double-sided metal-fuel tape will be readily apparent to those skilled in the art having had the benefit of the present disclosure. In such illustrative embodiments of the present invention, the anode-contacting structures within the each discharging head will be modified so that electrical contact is established with each electrically-isolated current collecting layer formed within the metal-fuel tape structure being employed therewith.

Methods and Devices for Packaging Metal-Fuel Tape of the Present Invention

Multi-track metal-fuel tape 5 made in the manner described above can be packaged in a variety of different ways. One packaging technique would be to roll the metal-fuel tape off a supply reel, and take it up on a take-up reel in the manner that 9-track digital recording tape is handled. Another handling technique, which is preferred over the reel-to-reel technique, involves storing the metal-fuel tape within a compact cassette cartridge device ("cassette fuel cartridge"). As shown in FIG. 1, the cassette device 5 has a housing 14 containing a pair of spaced-apart spindles 15A and 15B, about which a supply of metal-fuel tape 5 (5', 5") is wound in a manner similar to a video-cassette tape. The cassette cartridge device 5 also includes a pair of spaced apart tape guiding rollers 16A and 16B mounted in the front corners of the cassette housing, and an opening 17 formed in the front end portion 14A (i.e. side wall and top surface) thereof.

Front-end opening 14A serves a number of important functions, namely: it allows the "multi-track" discharging head assembly 9 to be moved into a properly aligned position with respect to the "path-length extended" metal-fuel tape during discharging operations; it allows the discharging head assembly to be moved away from the extended path-length of metal-fuel tape when the cassette cartridge is removed from the discharging bay of the Metal-Fuel tape Discharging Subsystem; it allows the tape path-length extension mechanism 10, integrated into the FCB recharging subsystem 7, to engage a section of the metal-fuel tape and then extend its path length by way of the two-step process illustrated in FIGS. 2A1 through 2B2.

Cassette housing opening 14A also allows the "multi-track" recharging head assembly 11 associated with the Metal-Fuel Recharging Subsystem 7 to be moved into properly aligned position with respect to the "path-length extended" portion of the discharged metal-fuel tape during recharging operations; it also allows the recharging head assembly 11 to be removed (i.e. withdrawn) from the metal-fuel tape when the cassette cartridge is removed from the cassette storage bay 15 of the FCB system. A retractable window or door 14B can be mounted over this opening within the cassette housing in order to close off the cassette interior from the environment when the device is not installed within the cassette storage bay of the system. Various types of spring-biased mechanisms can be used to realize the retractable window of the cassette cartridge of the present invention.

While not shown, tape-tensioning mechanisms may also be included within the cassette housing in order to ensure that the metal-fuel tape maintains proper tension during unwinding and rewinding of the metal-fuel tape in either the Discharging Mode or Recharging Mode of operation. The cassette housing can be made from any suitable material designed to withstand heat and corrosion. Preferably, the housing material is electrically non-conducting to provide an added measure of user-safety during tape discharging and recharging operations.

Cassette Cartridge Loading/Unloading Subsystem for the First Illustrative Embodiment of the Metal-Air FCB System of the Present Invention As schematically illustrated in FIGS. 1, 2A3 and 2A4, and shown in detail in U.S. Pat. No. 6,296,960, the Cassette Cartridge Loading/Unloading Transport Subsystem 2 in the FCB system of FIG. 1 comprises a number of cooperating mechanisms, namely: a cassette receiving mechanism 16A for automatically (i) receiving the cassette cartridge 3 at a cassette insertion port 17A formed in the front panel of the system housing 17, and (ii) withdrawing the cartridge into the cassette storage bay therewithin; an automatic door opening mechanism 16B for opening the door formed in the cassette cartridge (for metal-fuel tape access) when the cartridge is received within the cassette storage bay of the FCB system; and an automatic cassette ejection mechanism 16C for ejecting the cassette cartridge from the cassette storage bay through the cassette insertion port in response to a predetermined condition (e.g., the depression of an "ejection" button provided on the front panel of the system housing, automatic sensing of the end of the metal-fuel tape, etc.).

In the illustrative embodiment of FIG. 1, the cassette receiving mechanism 16A can be realized as a platform-like carriage structure that surrounds the exterior of the cassette cartridge housing. The platform-like carriage structure can be supported on a pair of parallel rails, by way of rollers, and translatable therealong by way of an electric motor and cam mechanism. These devices are operably connected to the system controller which will be described in greater detail hereinafter. The function of the cam mechanism is to convert rotational movement of the motor shaft into a rectilinear motion necessary for translating the platform-like carriage structure along the rails when a cassette is inserted within the platform-like carriage structure. A proximity sensor, mounted within the system housing, can be used to detect the presence of the cassette cartridge being inserted through the insertion port and placed within the platform-like carriage structure. The signal produced from the proximity sensor can be provided to the system controller in order to initiate the cassette cartridge withdrawal process in an automated manner.

Within the system housing, the automatic door opening mechanism 16B can be realized by any suitable mechanism that can slide the cassette door 14B into its open position when the cassette cartridge is completely withdrawn into the cassette storage bay. In the illustrative embodiment, the automatic cassette ejection mechanism 16C employs the same basic structures and functionalities of the cassette receiving mechanism described above. The primary difference is the automatic cassette ejection mechanism responds to the depression of an "ejection" button provided on the front panel of the system housing, or functionally equivalent triggering condition or event. When the button is depressed, the system controller automatically causes the discharging heads to be transported away from the metal-fuel tape, the path-length extended metal-fuel tape to become unextended, and the cassette cartridge automatically ejected from the cassette storage bay, through the cassette insertion port.

Figure 3A:
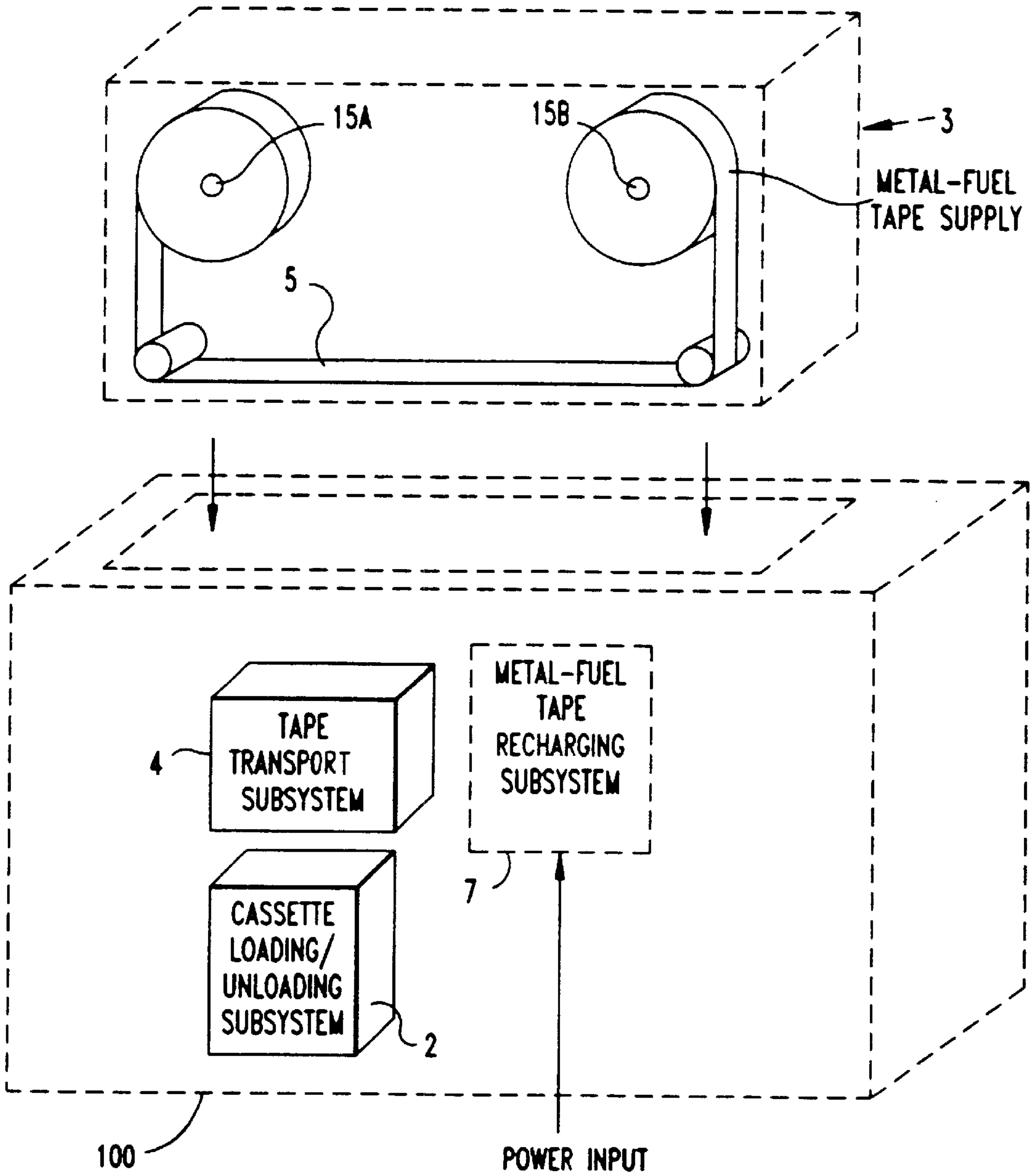
FIG. 3A is a schematic block diagram of a second illustrative embodiment of the metal-air FCB system of the present invention shown realized as an external stand-alone unit, into which a cassette-type device containing a supply of oxidized metal-fuel tape can be received and quickly recharged for reuse in generating of electrical power.
Figure 3B:
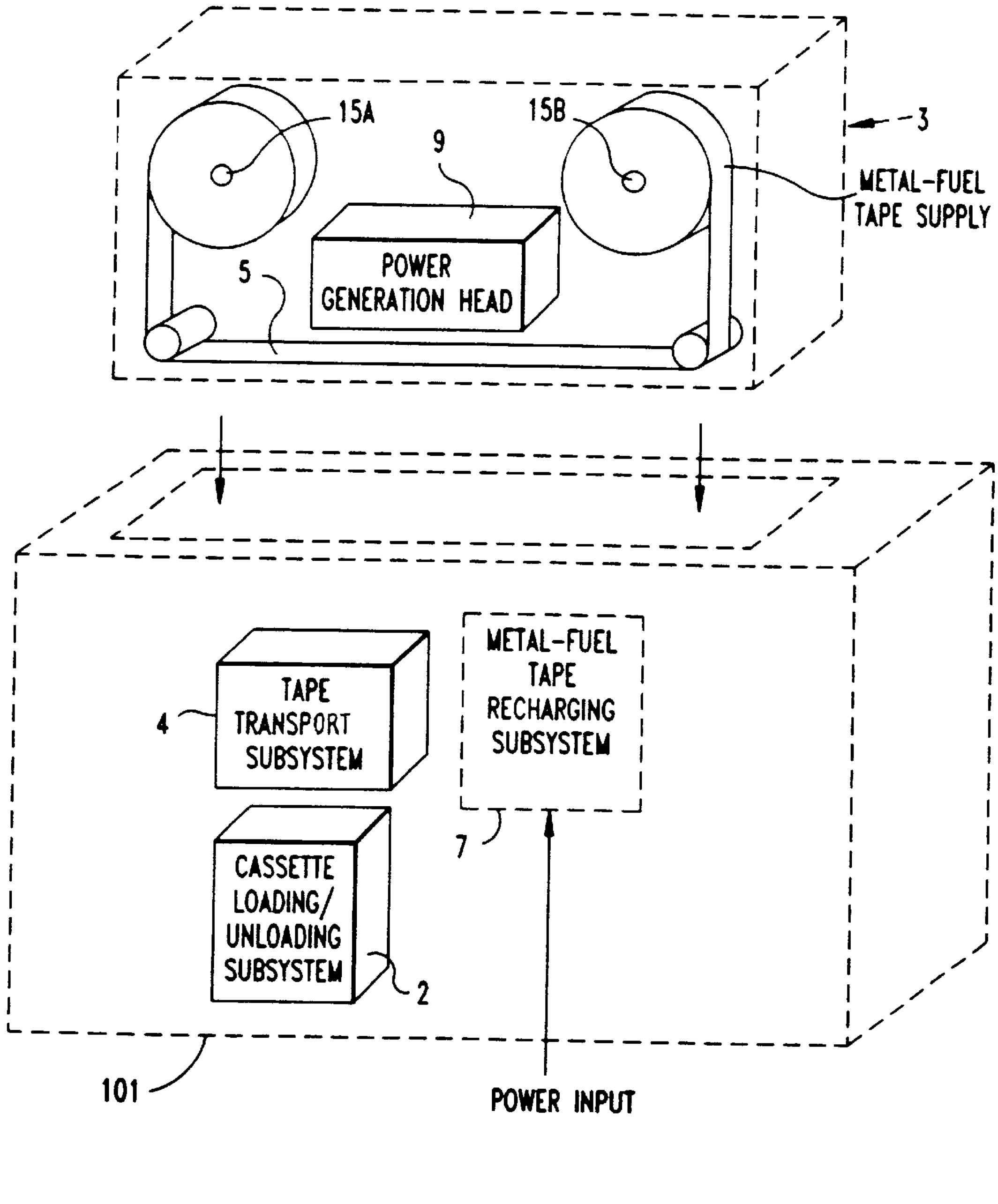
FIG. 3B is a schematic block diagram of a third illustrative embodiment of the metal-air FCB system of the present invention shown realized as an external stand-alone unit, into which a cassette-type device containing a supply of oxidized metal-fuel tape and at least a portion of the metal-fuel tape discharging subsystem (e.g. the discharging head) can be received and quickly recharged for reuse in generating electrical power.
Figure 4:
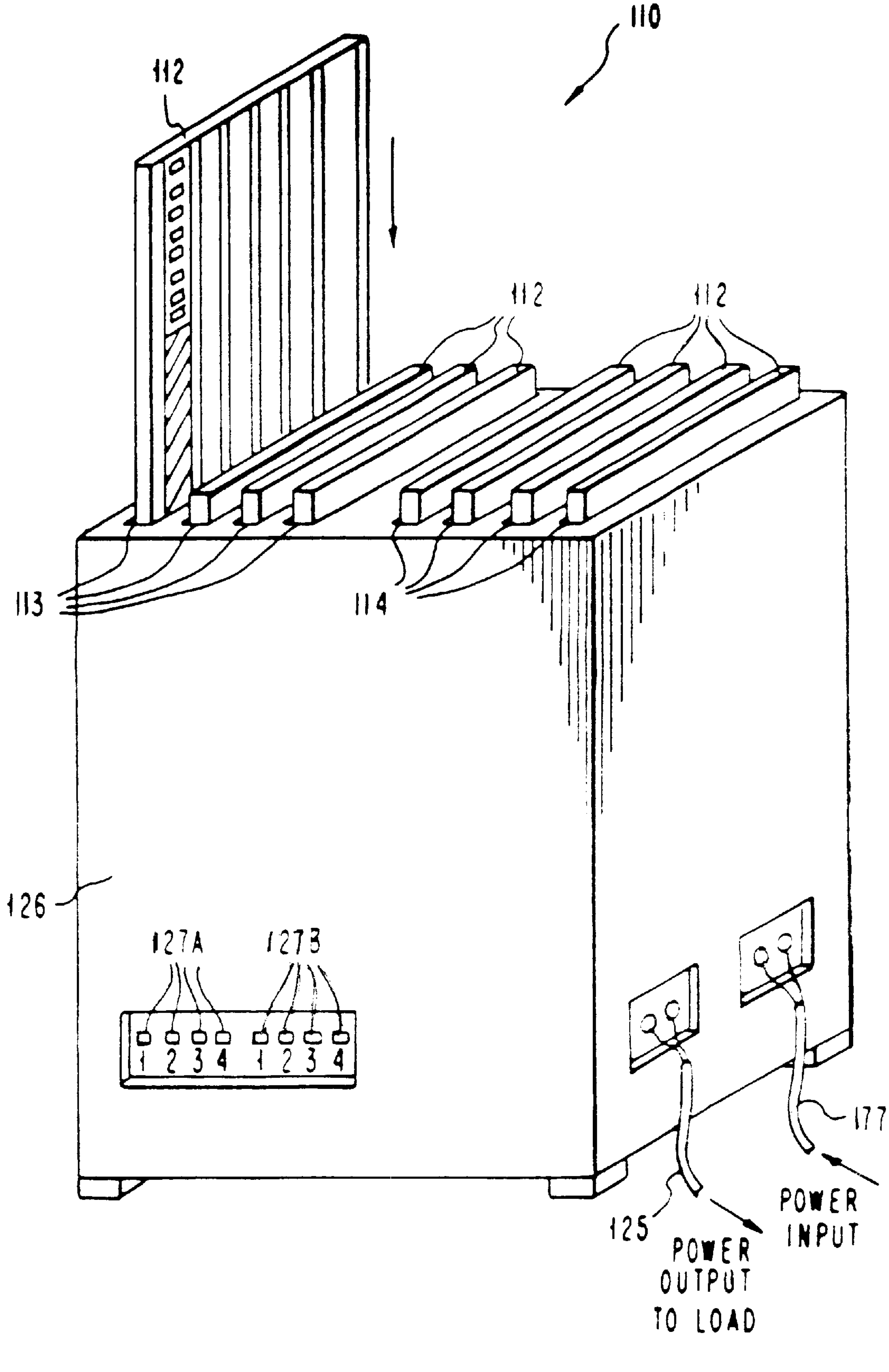

Notably, the control functions required by the Cassette Cartridge Loading/Unloading Subsystem 2, as well as all other subsystems within the FCB system of the first illustrative embodiment, are carried out by the system controller 18, shown in FIGS. 2A3 and 2A4. In the illustrative embodiments hereof, the system controller is realized by a programmed microcontroller (i.e. microcomputer) having program storage memory (ROM), data storage memory (RAM) and the like operably connected by one or more system buses well known in the microcomputing and control arts.

Metal-Fuel Tape Transport Subsystem for the First Illustrative Embodiment of the Metal-Air FCB System of the Present Invention As shown in FIGS. 2A3 and 2A4, the metal-fuel tape transport subsystem 4 of the first illustrative embodiment comprises: a pair of synchronized electric motors 19A and 19B for engaging spindles 20A and 20B in the metal-fuel fuel cartridge 3 when it is inserted in the cassette receiving bay of the system, and driving the same in either forward or reverse directions under synchronous control during the Discharging Mode and (Tape) Recharging Mode of operation; electrical drive circuits 21A and 21B for producing electrical drive signals for the electric motors 19A and 19B; and a tape-speed sensing circuit 22 for sensing the speed of the metal-fuel tape (i.e. motors) and producing signals indicative thereof for use by the system controller 18 to control the speed of the metal-fuel tape during discharging and recharging operations. As the metal-fuel tape transport subsystem 4 of the first illustrative embodiment employs the system controller 18, it is proper to include the system controller 18 as a supporting subsystem within the metal-fuel tape transport subsystem 4.

Figure 8:
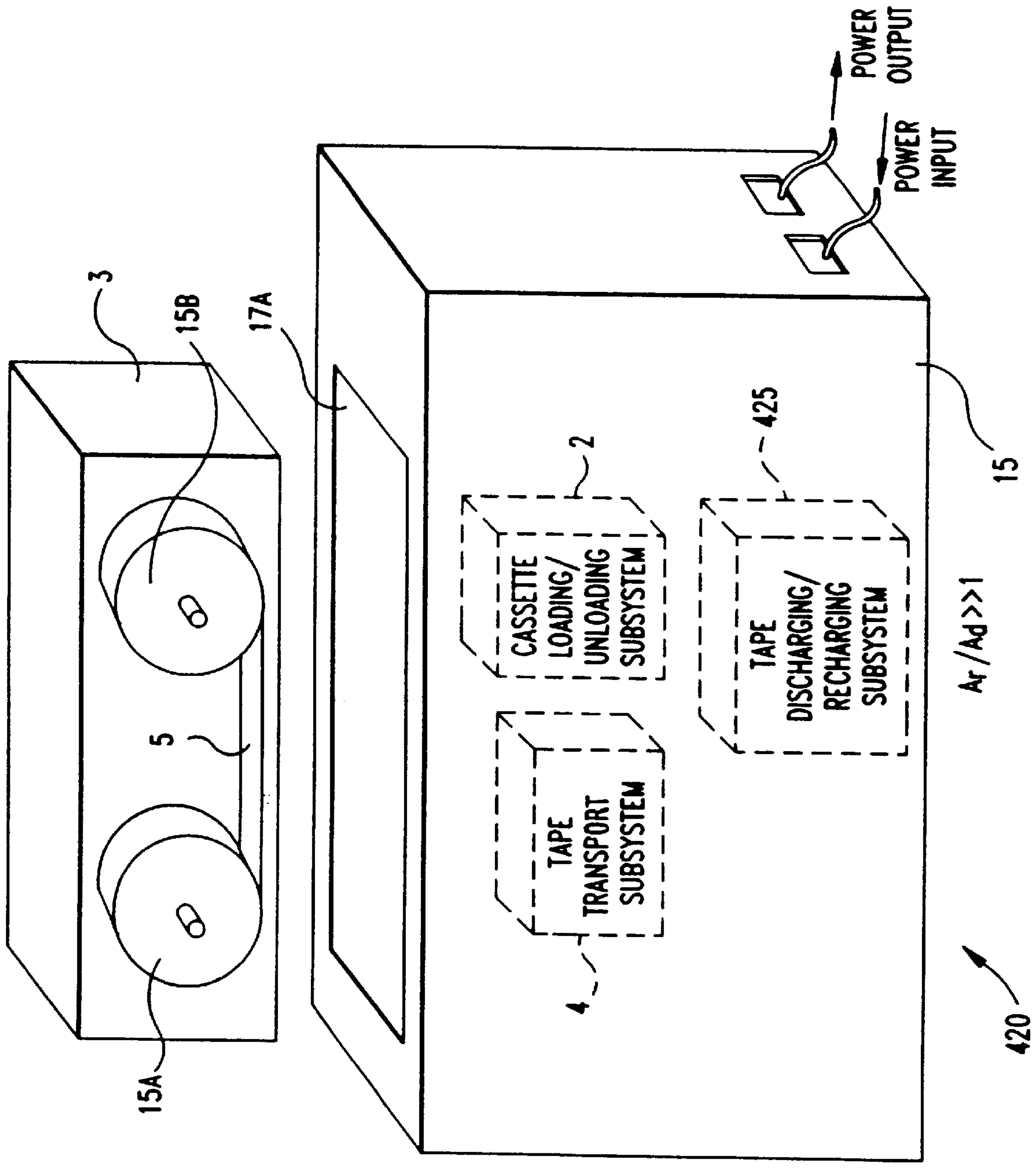

The Metal-Fuel Tape Discharging Subsystem for the First Illustrative Embodiment of the Metal-Air FCB System of the Present Invention As shown in FIGS. 2A3 and 2A4, the metal-fuel tape discharging subsystem 6 of the first illustrative embodiment comprises a number of subsystems, namely: an assembly of multi-track discharging heads 9, each having multi-element cathode structures and anode-contacting structures with electrically-conductive output terminals connectable in a manner to be described hereinbelow; an assembly of metal-oxide sensing heads 23 for sensing the presence of metal-oxide formation along particular zones of metal fuel tracks as the metal fuel tape is being transported past the discharging heads during the Discharging Mode; a metal-fuel tape path-length extension mechanism 8, as schematically illustrated in FIGS. 2A1 and 2A2 and described above, for extending the path-length of the metal-fuel tape over a particular region of the cassette device 5, and enabling the assembly of multi-track discharging heads to be arranged thereabout during the Discharging Mode of operation; a discharging head transport subsystem 24 for transporting the subcomponents of the discharging head assembly 9 (and the metal-oxide sensing head assembly 24) to and from the metal-fuel tape when its path-length is arranged in an extended configuration by the metal-fuel tape path-length extension mechanism 8; a cathode-anode output terminal configuration subsystem 25 for configuring the output terminals of the cathode and anode-contacting structures of the discharging heads under the control of the system controller 18 so as to maintain the output voltage required by a particular electrical load connected to the Metal-Fuel Tape Discharging Subsystem; a cathode-anode voltage monitoring subsystem 26, connected to the cathode-anode output terminal configuration subsystem 25 for monitoring (i.e. sampling) the voltage produced across cathode and anode of each discharging head, and producing (digital) data representative of the sensed voltage level; a cathode-anode current monitoring subsystem 27, connected to the cathode-anode output terminal configuration subsystem 25, for monitoring (e.g. sampling) the current flowing across the cathode and anode of each discharging head during the Discharging Mode, and producing digital data signals representative of the sensed current levels; a cathode oxygen pressure control subsystem, comprising the system controller 18, solid-state $pO_2$ sensors 28, vacuum chamber (structure) 29 shown in FIGS. 2A7 and 2A8, vacuum pump 30, airflow control device 31, manifold structure 32, and multi-lumen tubing 33 shown in FIGS. 2A8, for sensing and controlling the $pO_2$ level within the cathode structure of each discharging head 9; a metal-fuel tape speed control subsystem, comprising the system controller 18, motor drive circuits 21A and 21B, and tape velocity (i.e. speed and direction) sensor/detector 22, for bi-directionally controlling the speed of metal-fuel tape relative to the discharging heads, in either forward or reverse tape directions; an ion-concentration control subsystem, comprising the system controller 18, solid-state moisture sensor 34, moisturizing (e.g. humidifying or wicking element) 35, for sensing and modifying conditions within the FCB system (e.g. the moisture or humidity level at the cathode-electrolyte interface of the discharging heads) so that the ion-concentration at the cathode-electrolyte interface is maintained within an optimal range during the Discharge Mode of operation; discharge head temperature control subsystem comprising the system controller 18, solid-state temperature sensors (e.g. thermistors) 271 embedded within each channel of the multi-cathode support structure hereof, and a discharge head cooling device 272, responsive to control signals produced by the system controller 18, for lowering the temperature of each discharging channel to within an optimal temperature range during discharging operations; a relational-type metal-fuel database management subsystem (MFDMS) 275 operably connected to system controller 18 by way of local bus 276, and designed for receiving particular types of information derived from the output of various subsystems within the Metal-Fuel Tape Discharging Subsystem 6; a Data Capture and Processing Subsystem (DCPS) 277, comprising data reading head 38 embedded within or mounted closely to the cathode support structure of each discharging head 9, metal-oxide sensing head assembly 23 and associated circuitry, and a programmed microprocessor-based data processor adapted to receive data signals produced from voltage monitoring subsystem 26, cathode-anode current monitoring subsystem 27, metal-oxide sensing head assembly 23, the cathode oxygen pressure control subsystem and the ion-concentration control subsystem hereof, and enable (i) the reading of metal-fuel zone identification data from transported metal-fuel tape 5, (ii) the recording of sensed discharge parameters and computed metal-oxide indicative data derived therefrom in the Metal-Fuel Database Management Subsystem (MFDMS) 275 using local system bus 278 shown in FIG. 2B17, and (iii) the reading of prerecorded recharge parameters and prerecorded metal-fuel indicative data stored in the Metal-Fuel Database Management Subsystem (MFDMS) using the same local system bus 278; an output (i.e. discharging) power regulation subsystem 40 connected between the output terminals of the cathode-anode output terminal configuration subsystem 25 and the input terminals of the electrical load 12 connected to the Metal-Fuel Tape Discharging Subsystem 6, for regulating the output power delivered across the electrical load (and regulate the voltage and/or current characteristics as required by the Discharge Control Method carried out by the system controller); an input/output control subsystem 41, interfaced with the system controller 18, for controlling all functionalities of the FCB system by way of a remote system or resultant system, within which the FCB system is embedded; and system controller 18, interfaced with system controller 18' within the Metal-Fuel Tape Recharging Subsystem 7 by way of global system bus 279, as shown in FIG. 2B17, and having various means for managing the operation of the above mentioned subsystems during the various modes of system operation. These subsystems will be described in greater technical detail below.

Multi-Track Discharging Head Assembly within the Metal-Fuel Tape Discharging Subsystem The function of the assembly of multi-track discharging heads 9 is to generate electrical power across the electrical load as metal-fuel tape is transported therethrough during the Discharging Mode of operation. In the illustrative embodiment, each discharging head 9 comprises: a cathode element support plate 42 having a plurality of isolated channels 43 permitting the free passage of oxygen (O2) through the bottom portion 44 of each such channel; a plurality of electrically-conductive cathode elements (e.g. strips) 45 for insertion within the lower portion of these channels, respectively; a plurality of electrolyte-impregnated strips 46 for placement over the cathode strips 45, and support within the channels 29, respectively, as shown in FIG. 2C2; and an oxygen-injection chamber 29 mounted over the upper (back) surface of the cathode element support plate 44, in a sealed manner.

As shown in FIG. 2A13 and 2A14, each oxygen-injection chamber 29 has a plurality of subchambers 29A through 29E physically associated with channels 35A and 35E, respectively, wherein each subchamber is isolated from all other subchamber and is arranged in fluid communication with one channel in the electrode support plate supporting one electrode element and one electrolyte impregnated element. As shown, each subchamber within the discharging head assembly is arranged in fluid communication with an air compressor or $O_2$ gas supply means (e.g. tank or cartridge) 30 via one lumen of multi-lumen tubing 33, one channel of manifold assembly 32 and one channel of electronically-controlled air-flow switch 31, shown in FIGS. 3A3 and 2A4, and whose operation is controlled by system controller 18. This arrangement enables the system controller 18 to independently control the $pO_2$ level in each oxygen-injection chamber 29A through 29E within an optimal range during discharging operations, within the discharging head assembly, by selectively pumping pressurized air through the corresponding air flow channel in the manifold assembly 32 under the management of the system controller 18.

In the illustrative embodiment, electrolyte-impregnated strips are realized by impregnating an electrolyte-absorbing carrier medium with a gel-type electrolyte. Preferably, the electrolyte-absorbing carrier strip is realized as a strip of low-density, open-cell foam material made from PET plastic. The gel-electrolyte for each discharging cell is made from a formula consisting of an alkali solution (e.g. KOH), a gelatin material, water, and additives known in the art.

In the illustrative embodiment, each cathode strip is made from a sheet of nickel wire mesh 47 coated with porous carbon material and granulated platinum or other catalysts 48 to form a cathode suitable for use in metal-air FCB systems. Details of cathode construction are disclosed in U.S. Pat. Nos. 4,894,296 and 4,129,633, incorporated herein by reference. To form a current collection pathway, an electrical conductor 49 is soldered to the underlying wire mesh sheet of each cathode strip. As shown in FIG. 2C2, each electrical conductor 49 is passed through a small hole 50 formed in the bottom surface of a channel 43 of the cathode support plate, and is connected to the cathode-anode output terminal configuration subsystem 25. As shown, the cathode strip pressed into the lower portion of the channel to secure the same therein. As shown in FIG. 2A7, the bottom surface 44 of each channel 43 has numerous perforations 43 A formed therein to allow the free passage of oxygen to the cathode strip. In the illustrative embodiment, an electrolyte-impregnated strip 46 is placed over a cathode strip 45 and is secured within the upper portion of the cathode supporting channel 43. As shown in FIG. 2A8, when the cathode strip and thin electrolyte strip are mounted in their respective channel in the cathode support plate, the outer surface of the electrolyte-impregnated strip is disposed flush with the upper surface of the plate defining the channels, thereby permitting metal-fuel tape to be smoothly transported thereover during tape discharging operations.

Hydrophobic agents are added to the carbon material constituting the oxygen-pervious cathode elements within the discharging head assembly 9 to ensure the expulsion of water therefrom during discharging operations. Also, the interior surfaces of the cathode support channels are coated with a hydrophobic film (e.g. Teflon®) 51 to ensure the expulsion of water within electrolyte-impregnated strips 47 and thus achieve optimum oxygen transport across the cathode strips, to the injection-chamber 29 during the Discharging Mode. Preferably, the cathode support plate is made from an electrically non-conductive material, such as polyvinyl chloride (PVC) plastic material well known in the art. The cathode support plate and evacuation chamber can be fabricated using injection molding technology also well known in the art.

In order to sense the partial oxygen pressure within the cathode structure during the Discharging Mode, for use in effective control of electrical power generated from discharging heads, a solid-state $pO_2$ sensor 28 is embedded within each channel of the cathode support plate 42, as illustrated in FIG. 2A7, and operably connected to the system controllerl 8 as an information input device thereto.

In the illustrative embodiment, the $pO_2$ sensor can be realized using well-known $pO_2$ sensing technology employed to measure (in vivo) $pO_2$ levels in the blood of humans. Such prior art sensors can be constructed using miniature diodes which emit electromagnetic radiation at two or more different wavelengths that are absorbed at different levels in the presence of oxygen in the blood, and such information can be processed and analyzed to produce a computed measure of $pO_2$ in a reliable manner, as taught in U.S. Pat. No. 5,190,038 and references cited therein, each being incorporated herein by reference. In the present invention, the characteristic wavelengths of the light emitting diodes can be selected so that similar sensing functions can be carried out within the structure of the cathode in each discharging head, in a straightforward manner.

Figure 9B:
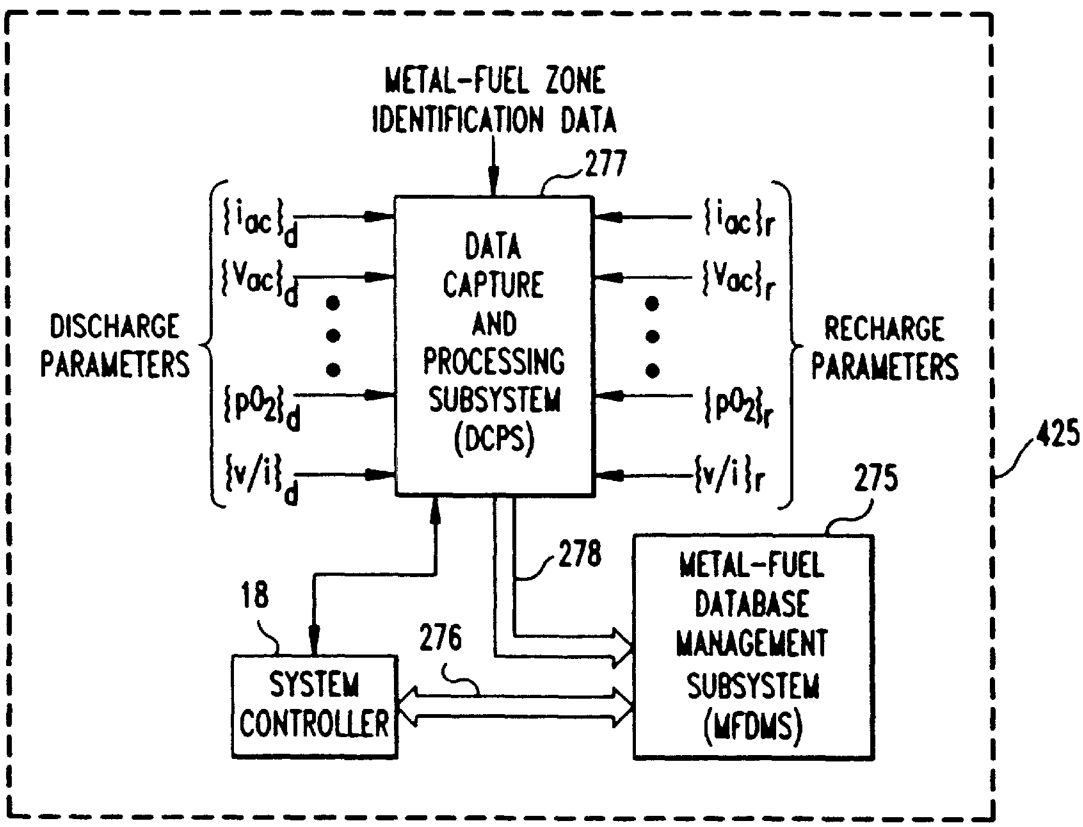
FIG. 9B is a schematic representation of the FCB system of FIG. 8 showing a number of subsystems which enable data capture, processing and storage of discharge and recharge parameters as well as metal-fuel and metal-oxide indicative data for use during discharging and recharging modes of operation.

The multi-tracked fuel tape contained within the cassette fuel cartridge of FIG. 2 is shown in greater structural detail in FIG. 2A9. As shown, the metal-fuel tape 5 comprises: an electrically non-conductive base layer 53 of flexible construction (i.e. made from a plastic material stable in the presence of the electrolyte); a plurality of parallel extending, spatially-separated strips of metal (e.g. zinc) 54A, 54B, 54C, 54D and 54E disposed upon the ultra-thin current-collecting layer (not shown) itself disposed upon the base layer 53; a plurality of electrically non-conductive strips 55A, 55B, 55C, 55D and 55E disposed upon the base layer, between pairs of fuel strips 54A, 54B, 54C, 54D and 54E; and a plurality of parallel extending channels (e.g. grooves) 56, 56B, 56B, 56D and 56E formed in the underside of the base layer, opposite the metal fuel strips thereabove, for allowing electrical contact with the metal-fuel tracks 54A, 54B, 54C, 54D and 54E through the grooved base layer. Notably, the spacing and width of each metal-fuel strip is designed so that it is spatially-registered with a corresponding cathode strip in the discharging head of the system in which the metal-fuel tape is intended to be used.

The metal-fuel tape described above can be made by applying zinc strips onto a layer of base plastic material 53 in the form of tape, using any of the fabrication techniques described hereinabove. The metal strips can be physically spaced apart, or separated by Teflon®, in order to ensure electrical isolation therebetween. Then, the gaps between the metal strips can be filled in by applying a coating of electrically insulating material, and thereafter, the base layer can be machined, laser etched or otherwise treated to form fine channels therein for allowing electrical contact with the individual metal fuel strips through the base layer. Finally, the upper surface of the multi-tracked fuel tape can be polished to remove any electrical insulation material from the surface of the metal fuel strips which are to come in contact with the cathode structures during discharging.

Figure 10:
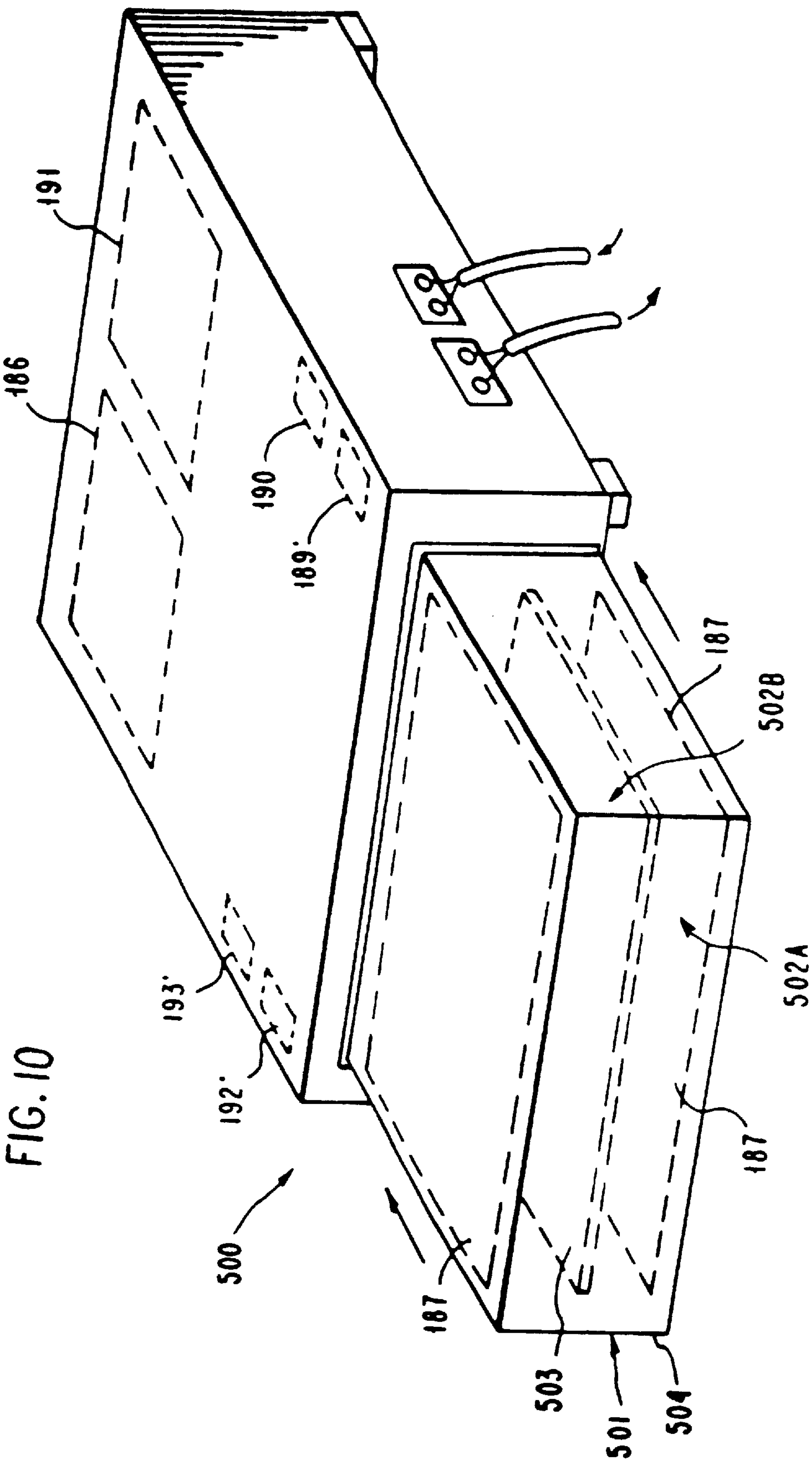

In FIG. 2A10, an exemplary metal-fuel (anode) contacting structure 58 is disclosed for use with the multi-tracked cathode structure shown in FIGS. 2A7 and 2A8. As shown, a plurality of electrically-conductive elements 60A, 60B, 60C, 60D, and 60E are supported from an platform 61 disposed adjacent the travel of the fuel tape within the cassette cartridge. Each conductive element 60A through 60E has a smooth surface adapted for slidable engagement with one track of metal-fuel through the fine groove formed in the base layer 53 of the metal-fuel tape corresponding to fuel track. Each conductive element is connected to an electrical conductor which is connected to the cathode-anode output terminal configuration subsystem 25 under the management of the system controller 18. The platform 61 is operably associated with the discharging head transport subsystem 24 and can be designed to be moved into position with the fuel tape during the Discharging Mode of the system, under the control of the system controller.

Notably, the use of multiple discharging heads, as in the illustrative embodiments hereof, rather than a single discharging head, allows more power to be produced from the discharging head assembly for delivery to the electrical load while minimizing heat build-up across the individual discharging heads. This feature of the Metal-Fuel Tape Discharging Subsystem extends the service-life of the cathodes employed within the discharging heads thereof.

Metal-Oxide Sensing Head Assembly within the Metal-Fuel Tape Discharging Subsystem The function of the Metal-Oxide Sensing Head Assembly 23 is to sense (in real-time) the current levels produced across the individual fuel tracks during discharging operations, and generate electrical data signals indicating the degree to which portions of metal-fuel tracks have been oxidized and thus have little or no power generation potential. As shown in FIGS. 2A15, each multi-track metal-oxide sensing head 23 in the assembly thereof comprises a number of subcomponents, namely: a positive electrode support structure 63 for supporting a plurality of positively electrode elements 64A, 64B, 64C, 64D and 64E, each in registration with the upper surface of one of the fuel tracks (that may have been oxidized) and connected to a low voltage power supply terminal 65A, 65B, 65C, 65D and 65E provided by current sensing circuitry 66 which is operably connected to the Data Capture and Processing Subsystem 277 within the Metal-Fuel Tape Discharging Subsystem 6, as shown in FIGS. 2A3 and 2A4; and a negative electrode support structure 67 for supporting a plurality of negative electrode elements 68A, 68B, 68C, 628D and 68E, each in registration with the lower surface of the fuel tracks and connected to a low voltage power supply terminal 69A, 69B, 69C, 69D and 69E, respectively, provided by current sensing circuitry 66.

In the illustrative embodiment shown in FIGS. 2A3 and 2A4, each multi-track metal-oxide sensing head 23 is disposed immediately before a discharging head 9 in order to sense the actual condition of the metal-fuel tape therebefore and provide a data signal to the system controller 18 for detection and determination of the actual amount of metal-oxide present thereon before the discharging. While only one metal-oxide sensing head assembly 23 is shown in the first illustrative embodiment of the FCB system hereof, it is understood that for bi-directional tape-based FCB systems, it would be preferred to install one metal-oxide sensing head assembly 23 on each end of the discharging head assembly so that the system controller can “anticipate” which metal-fuel zones are “dead” or devoid of metal-fuel regardless of the direction that the metal-fuel tape is being transported at any particular instant in time. With such an arrangement, the Metal-Fuel Tape Discharging Subsystem 6 is capable of determining (i.e. estimating) which portions of which metal-fuel tracks have sufficient electrical power generation capacity for discharge operations, and which do not, and to control the metal-fuel tape transport subsystem so as to discharge metal-fuel tape in an optimal manner during the Discharging Mode of operation. Details concerning this aspect of the present invention will be described hereinafter.

Metal-Fuel Tape Path-Length Extension Mechanism within the Metal-Fuel Tape Discharging Subsystem As shown in FIGS. 2A3 and 2A4, the tape path-length extension mechanism 8 of the illustrative embodiment comprises: a first array of rollers 71A through 71E mounted on support structure 72 for contacting the metal-fuel portion of the metal-fuel tape when the cassette device 3 inserted into the cassette receiving port of the FCB system; a second array of rollers 73A through 73E disposed between the array of stationary rollers 71A through 71E and mounted on support structure 74, for contacting the base portion of the metal-fuel tape when the cassette device is inserted into the cassette receiving port of the FCB system; and a transport mechanism 75 of electromechanical construction, for transporting roller support structures 72 and 74 relative to the system housing and each other in order to carry out the functions of this subsystem described in greater detail hereinbelow.

In the configuration shown in FIG. 2A3, the tape path-length mechanism 8 is arranged so that the first and second sets of rollers 71A through 71E and 73A through 73E barely contacting opposite sides of the metal-fuel tape when the cassette device 3 is inserted within the cassette receiving port of the FCB system. As shown in FIG. 2A4, the second set of rollers 73A through 73E are displaced (i.e. transported) a distance relative to the first set of stationary rollers 71A through 71E, thereby causing the path-length of the metal-fuel tape to become substantially extended from the path-length shown in the configuration of FIG. 2A3. This extended path-length permits a plurality of discharging heads 9 to be arranged thereabout during the discharging mode of operation. In this configuration, the cathode structure 76 of each discharging head is in ionic contact with the metal-fuel structures along the metal-fuel tape, while the anode-contacting structure 77 of each discharging head is in electrical contact with the metal-fuel structures of the tape. In this configuration, the metal-fuel tape so arranged so that a plurality of discharging heads can be arranged about the metal-fuel tape during power discharging operations. The use of multiple discharging heads enables low current loading of the metal-fuel tape during power generation, and thus provides improved control over the formation of metal-oxide during power generation. Such advantages will become apparent hereinafter.

Discharging Head Transport Subsystem within the Metal-Fuel Tape Discharging Subsystem The primary function of the discharging head transport subsystem is to transport the assembly of discharging heads 9 (and metal-oxide sensing heads 23 supported thereto) about the metal-fuel tape that has been path-length extended, as shown in FIG. 2A3. When properly transported, the cathode and anode-contacting structures of the discharging heads are brought into “ionically-conductive” and “electrically-conductive” contact with the metal-fuel tracks of metal-fuel tape while the metal-fuel tape is transported through the discharging head assembly by the metal-fuel tape transport subsystem during the discharging mode of operation.

Discharging head transport subsystem 24 can be realized using any one of a variety of electromechanical mechanisms capable of transporting the cathode structure 76 and anode-contacting structure 77 of each discharging head away from the metal-fuel tape 5, as shown in FIG. 2A3, and about the metal-fuel tape as shown in FIG. 2A4. As shown, these transport mechanisms are operably connected to system controller 18 and controlled by the same in accordance with the system control program carried out thereby.

Cathode-Anode Output Terminal Configuration Subsystem within the Metal-Fuel Tape Discharging Subsystem As shown in FIGS. 2A3 and 2A4, the cathode-anode output terminal configuration subsystem 25 is connected between the input terminals of the discharging power regulation subsystem 40 and the output terminals of the cathode-anode pairs within the assembly of discharging heads 9. The system controller 18 is operably connected to cathode-anode output terminal configuration subsystem 25 in order to supply control signals for carrying out its functions during the Discharging Mode of operation.

The function of the cathode-anode output terminal configuration subsystem 25 is to automatically configure (in series or parallel) the output terminals of selected cathode-anode pairs within the discharging heads of the Metal-Fuel Tape Discharging Subsystem so that the required output voltage level is produced across the electrical load connected to the FCB system during tape discharging operations. In the illustrative embodiment of the present invention, the cathode-anode output terminal configuration mechanism 25 can be realized as one or more electrically-programmable power switching circuits using transistor-controlled technology, wherein the cathode and anode-contacting elements within the discharging heads 9 are connected to the input terminals of the output power regulating subsystem 40. Such switching operations are carried out under the control of the system controller 18 so that the required output voltage is produced across the electrical load connected to the output power regulating subsystem of the FCB system.

Cathode-Anode Voltage Monitoring Subsystem within the Metal-Fuel Tape Discharging Subsystem As shown in FIGS. 2A3 and 2A4, the cathode-anode voltage monitoring subsystem 26 is operably connected to the cathode-anode output terminal configuration subsystem 25 for sensing voltage levels and the like therewithin. While not shown, this subsystem is also operably connected to the system controller 18 for receiving control signals required to carry out its functions. In the first illustrative embodiment, the cathode-anode voltage monitoring subsystem 26 has two primary functions: to automatically sense the instantaneous voltage level produced across the cathode-anode structures associated with each metal-fuel track being transported through each discharging head during the Discharging Mode; and to produce a (digital) data signal indicative of the sensed voltages for detection, analysis and processing within the Data Capture and Processing Subsystem 277, and subsequent recording within the Metal-Fuel Database Management Subsystem 275 which is accessible by the system controller 18 during the Discharge Mode of operation.

In the first illustrative embodiment of the present invention, the Cathode-Anode Voltage Monitoring Subsystem 26 can be realized using electronic circuitry adapted for sensing voltage levels produced across the cathode-anode structures associated with each metal-fuel track transported through each discharging head within the Metal-Fuel Tape Discharging Subsystem 6. In response to such detected voltage levels, the electronic circuitry can be designed to produce a digital data signals indicative of the sensed voltage levels.

Cathode-Anode Current Monitoring Subsystem within the Metal-Fuel Tape Discharging Subsystem As shown in FIGS. 2A3 and 2A4, the cathode-anode current monitoring subsystem 27 is operably connected to the cathode-anode output terminal configuration subsystem 25. The cathode-anode current monitoring subsystem 27 has two primary functions: to automatically sense the magnitude of electrical current flowing through the cathode-anode pair of each metal-fuel track along each discharging head assembly within the Metal-Fuel Tape Discharging Subsystem during the discharging mode; and to produce a digital data signal indicative of the sensed current for detection, analysis and processing within the Data Capture and Processing Subsystem 277, and subsequent recording within the Metal-Fuel Database Management Subsystem 275 which is accessible by the system controller 18 during the Discharge Mode of operation.

In the first illustrative embodiment of the present invention, the Cathode-Anode Current Monitoring Subsystem 27 can be realized using current sensing circuitry for sensing the electrical current passed through the cathode-anode pair of each metal-fuel track along each discharging head assembly, and producing a digital data signal indicative of the sensed current. As will be explained in greater detail hereinafter, these detected current levels are stored in the Metal-Fuel Database Subsystem__and can be readily accessed by the system controller 18 in various ways, namely: carrying out its discharging power regulation method; creating a "discharging condition history" for each zone or subsection of discharged metal-fuel tape; etc.

Cathode Oxygen Pressure Control Subsystem within the Metal-Fuel Tape Discharging Subsystem The function of the cathode oxygen pressure control subsystem defined above is to sense the oxygen pressure ($pO_2$) within each channel of the cathode structure of the discharging head 9, and in response thereto, control (i.e. increase or decrease) the same by regulating the air ($O_2$) pressure within such cathode structures. In accordance with the present invention, the partial oxygen pressure ($PO_2$) within each channel of the cathode structure of each discharging head provides a measure of the oxygen concentration therewithin and thus is maintained at an optimal level in order to allow optimal oxygen consumption within the discharging heads during the Discharging Mode. By maintaining the $pO_2$ level within each channel of the cathode structure, power output produced from the discharging heads can be increased in a controllable manner. Also, by monitoring changes in $pO_2$ and producing digital data signals representative thereof for detection and analysis by the system controller, the system controller 18 is provided with a controllable variable for use in regulating electrical power supplied to the electrical load 12 during the Discharging Mode.

In the first illustrative embodiment of the FCB system hereof shown in FIG. 1, the data signals produced by the solid-state $pO_2$ sensors 28A through 28E embodied within the discharging heads 9 are provided to the Data Capture and Processing Subsystem 277, as shown in FIGS. 2A3 and 2A4. The Data Capture and Processing Subsystem 277 receives these signals, converts them into digital data and the like and then records the resulting information items within the information structure shown in FIG. 2A16, managed within the Metal-Fuel Database Management Subsystem 275 with the Metal-Fuel Tape Discharging Subsystem 6. Such discharging parameters can be accessed by the system controller 18 at any time over local bus 276 in order to independently control the level of $pO_2$ within each of the channels of the discharging heads 9 hereof during discharging operations.

Metal-Fuel Tape Speed Control Subsystem within the Metal-Fuel Tape Discharging Subsystem During the Discharging Mode, the function of Metal-Tape Speed Control Subsystem 4 is to control the speed of the metal-fuel tape over the discharging heads within the Metal-Fuel Tape Discharging Subsystem 6. In the illustrative embodiment, metal-fuel tape speed control subsystem 18 comprises a number of subcomponents, namely: the system controller 18; the motor speed circuits 21A and 21B; and tape velocity sensor 22. In response to the transport of tape past the velocity sensor 22, a data signal indicative of the tape velocity (i.e. speed and direction) is generated and supplied to the Data Capture and Processing Subsystem 277. Upon processing this data signal, the Data Capture and Processing Subsystem 277 produces digital data representative of the sampled tape velocity which is then stored in the Metal-Fuel Database Management Subsystem 275, correlated with the metal-fuel identification data (i.e. Code) read by the same subsystem. In accordance with the Power Discharge Regulation Method being carried out, the system controller 18 automatically reads the tape velocity data from the Metal-Fuel Database Management Subsystem 275 by way of local system bus 276. Using this information, the system controller 18 automatically controls (i.e. increases or decreases) the instantaneous velocity of the metal-fuel tape, relative to the discharging heads. Such tape velocity control is achieved by generating appropriate control signals for driving electric motors 19A and 19B coupled to the supply and take-up reels of metal-fuel tape being discharged.

The primary reason for controlling the velocity of metal-fuel tape is that this parameter determines how much electrical current (and thus power) can be produced from metal-fuel tape during transport through each discharging head within the Metal-Fuel Tape Discharging Subsystem 6. Ideally, during the Discharging Mode, it is desirable to transport the metal-fuel tape as slow as possible through the discharging head assembly in order to deliver the amount of electrical power required by the connected load 12. However, for practical reasons, the velocity of the metal-fuel tape will be controlled so that the cathode-anode current ($i_{ac}$) generated in each discharging head will satisfy the electrical power requirements of the connected load 12. In many applications where the power requirements of the electrical load are below the maximum output power capacity of the FCB system, the velocity of the metal-fuel tape will be controlled so that that the total metal fuel amount (TMFA) along each metal-fuel zone is completely consumed upon a single complete pass through all of the discharging heads within the discharging head assembly, thereby distributing the electrical load and heat generation evenly across each of the discharging heads. This will serve to maximize the service-life of the discharging heads.

Ion-Concentration Control Subsystem within the Metal-Fuel Tape Discharging Subsystem In order to achieve high-energy efficiency during the Discharging Mode, it is necessary to maintain an optimal concentration of (charge-carrying) ions at the cathode-electrolyte interface of each discharging head within the Metal-Fuel Tape Discharging Subsystem 6. Thus it is the primary function of the ion-concentration control subsystem to sense and modify conditions within the FCB system so that the ion-concentration at the cathode-electrolyte interface within the discharging heads is maintained within an optimal range during the Discharge Mode of operation.

In the case where the ionically-conducting medium between the cathode and anode is an electrolyte containing potassium hydroxide (KOH), it will be desirable to maintain its concentration at 6N (–6M) during the Discharging Mode of operation. As the moisture level or relative humidity (RH %) can significantly affect the concentration of KOH in the electrolyte, it is desirable to regulate the moisture level or relative humidity at the cathode-electrolyte interface within each discharging heads. In the illustrative embodiment, ion-concentration control is achieved in a variety of different ways: (e.g. by embedding a miniature solid-state moisture sensor 34 within the FCB system (as close as possible to the anode-cathode interfaces of the discharging heads) in order to sense moisture conditions and produce a digital data signal indicative thereof. As shown in FIGS. 2A3 and 2A4, the digital data signals are supplied to the Data Capture and Processing Subsystem 277 for detection, analysis and subsequent recording within the information structure of FIG. 2A 16 which is maintained by the Metal-Fuel Data Management Subsystem 275. In the event that the moisture level (or relative humidity) within a particular channel of the discharging head drops below the predetermined threshold value set within the information structure of FIG. 2A16, the system controller 18 responds to such changes in moisture-level by automatically generating a control signal that is supplied to moisturizing ($H_2O$ dispensing) element 35 for the purpose of increasing the moisture level within the particular channel. In general, moisturizing element 35 can be realized in a number of different ways. One such way would be to controllably release a supply of water to the surface of the metal-fuel tracks on the tape using a wicking (e.g. $H_2O$ applying) device 36 arranged in physical contact with the metal-fuel tracks as the metal-fuel tape is being transported through the discharging head assembly during the Discharging Mode. Another technique may involve spraying fine water droplets (e.g. ultra-fine mist) from micro-nozzles realized along the top surfaces of each cathode support structure, facing the metal-fuel tape during transport. Such operations will increase the moisture level (or relative humidity) within the interior of the discharging heads and thus ensure that the concentration of KOH within electrolyte-impregnated strips 46A through 46E is maintained for optimal ion transport and thus power generation.

Discharge Head Temperature Control Subsystem within the Metal-Fuel Tape Discharging Subsystem As shown in FIGS. 2A3, 2A4, and 2A7, the discharge head temperature control subsystem incorporated within the Metal-Fuel Tape Discharging Subsystem 6 of the first illustrative embodiment comprises a number of subcomponents, namely: the system controller 18; solid-state temperature sensors (e.g. thermistors) 271 embedded within each channel of the multi-cathode support structure hereof 42, as shown in FIG. 2A7; and a discharge head cooling device 272, responsive to control signals produced by the system controller 18, for lowering the temperature of each discharging channel to within an optimal temperature range during discharging operations. The discharge head cooling device 272 can be realized using a wide variety of heat-exchanging techniques, including forced-air cooling, water-cooling, and/or refrigerant cooling, each well known in the heat exchanging art. In some embodiments of the present invention, where high levels of electrical power are being generated, it may be desirable to provide a jacket-like structure about each discharge head in order to circulate air, water or refrigerant for temperature control purposes.

Data Capture and Processing Subsystem within the Metal-Fuel Tape Discharging Subsystem In the illustrative embodiment of FIG. 1, Data Capture And Processing Subsystem (DCPS) 277 shown in FIGS. 2A3 and 2A4 carries out a number of functions, including, for example: (1) identifying each zone or subsection of metal-fuel tape immediately before it is transported through each discharging head within the discharging head assembly and producing metal-fuel zone identification data representative thereof; (2) sensing (i.e. detecting) various "discharge parameters" within the Metal-Fuel Tape Discharging Subsystem 6 existing during the time period that the identified metal-fuel zone is transported through the discharging head assembly thereof; (3) computing one or more parameters, estimates or measures indicative of the amount of metal-oxide produced during tape discharging operations, and producing "metal-oxide indicative data" representative of such computed parameters, estimates and/or measures; and (4) recording in the Metal-Fuel Database Management Subsystem 275 (accessible by system controller 18), sensed discharge parameter data as well as computed metal-oxide indicative data both correlated to its respective metal-fuel zone identified during the Discharging Mode of operation. As will become apparent hereinafter, such recorded information maintained within the Metal-Fuel Database Management Subsystem 275 by Data Capture and Processing Subsystem 277 can be used by the system controller 18 in various ways including, for example: optimally discharging (i.e. producing electrical power from) partially or completely oxidized metal-fuel tape in an efficient manner during the Discharging Mode of operation; and optimally recharging partially or completely oxidized metal-fuel tape in a rapid manner during the Recharging Mode of operation.

During discharging operations, the Data Capture and Processing Subsystem 277 automatically samples (or captures) data signals representative of "discharge parameters" associated with the various subsystems constituting the Metal-Fuel Tape Discharging Subsystem 6 described above. These sampled values are encoded as information within the data signals produced by such subsystems during the Discharging Mode. In accordance with the principles of the present invention, tape-type "discharge parameters" shall include, but are not limited to: the voltages produced across the cathode and anode structures along particular metal-fuel tracks monitored, for example, by the cathode-anode voltage monitoring subsystem 26; the electrical currents flowing across the cathode and anode structures along particular metal-fuel tracks monitored, for example, by the cathode-anode current monitoring subsystem 27; the velocity (i.e. speed and direction) of the metal-fuel tape during discharging of a particular zone of metal-fuel tape, monitored by the metal-fuel tape speed control subsystem; the oxygen saturation level ($pO_2$) within the cathode structure of each discharging head, monitored by the cathode oxygen pressure control subsystem (28,30,31,18); the moisture ($H_2O$) level (or relative humidity) level across or near the cathode-electrolyte interface along particular metal-fuel tracks in particular discharging heads monitored, for example, by the ion-concentration control subsystem (18, 34, 35 and 36); and the time duration ($^{\Delta T}$) of the state of any of the above-identified discharge parameters.

In general, there are a number of different ways in which the Data Capture and Processing Subsystem 277 can record tape-type "discharge parameters" during the Discharging Mode of operation. These different methods will be detailed hereinbelow.

According to a first method of data recording shown in FIG. 2A9, a unique zone identifying code or indicia 80 (e.g. miniature bar code symbol encoded with zone identifying information) is graphically printed on an "optical" data track 81 realized as, for example, as a strip of transparent of reflective film material affixed or otherwise attached along the edge of each zone or subsection 82 of metal-fuel tape, as shown in FIG. 2A9. The function of this optical data track is to record a unique identifying code or symbol (i.e. digital information label) alongside each metal-fuel zone along the supply of metal-fuel tape. The position of the graphical zone identifying code should physically coincide with the particular metal-fuel zone to which it relates. This optical data track, with zone identifying codes recorded therein by printing or photographic techniques, can be formed at the time of manufacture of the multi-track metal-fuel tape hereof. The metal-fuel zone identifying indicia 80 along the edge of the tape is then read by an optical data reader 38 realized using optical techniques (e.g. laser scanning bar code symbol readers, or optical decoders). In the illustrative embodiment, the digital data representative of these unique zone identifying codes is produced for recording in an information storage structure, as shown in FIG. 2A16, which is created for each metal-fuel zone identified along the tape by tape data reader 38 of the Data Capture and Processing Subsystem 277. Preferably, such information storage is realized by data writing operations carried out by the Data Capture and Processing and Subsystem 277 within the Metal-Fuel Tape Discharging Subsystem 6 during the discharge operations.

According to a second method of data recording shown in FIG. 2A9', a unique digital "zone identifying" code 83 is magnetically recorded in a magnetic data track 84 disposed along the edge of each zone or subsection 85 of the metal-fuel tape 5'. The position of the code should coincide with the particular metal-fuel zone to which it relates. This magnetic data track, with zone identifying codes recorded therein, can be formed at the time of manufacture of the multi-track metal-fuel tape hereof. The zone identifying indicia along the edge of the tape is then read by a magnetic reading head 38' realized using magnetic information reading techniques well known in the art. In the illustrative embodiment, the digital data representative of these unique zone identifying codes is produced for recording in an information storage structure, as shown in FIG. 2A16, created for each metal-fuel zone identified along the tape by the data reader 38'. Preferably, such information storage is realized by data writing operations carried out by the Data Capture and Processing and Subsystem 277 within the Metal-Fuel Tape Discharging Subsystem 6 during the discharge operations.

According to a third method of data recording shown in FIG. 2A9", a unique digital "zone identifying" code is recorded as a sequence of light transmission apertures 86 formed in an optically opaque data track 87 disposed along the edge of each zone or subsection 88 of the metal-fuel tape 5". In this aperturing technique, information is encoded in the form of light transmission apertures whose relative spacing and/or width is the means by which information encoding is achieved. The position of the code (i.e. unique identification number or address) should spatially coincide with the particular metal-fuel zone to which it relates. This optical data track, with zone identifying codes recorded therein, can be formed at the time of manufacture of the multi-track metal-fuel tape hereof. The zone identifying indicia 86 along the edge of the tape is then read by an optical sensing head 38" realized using optical sensing techniques well known in the art. In the illustrative embodiment, the digital data representative of these unique zone identifying codes is produced for recording in an information storage structure, as shown in FIG. 2A16, created for each metal-fuel zone identified along the tape by the data reader 38". Preferably, such information storage is realized by data writing operations carried out by the Data Capture and Processing and Subsystem 277 within the Metal-Fuel Tape Discharging Subsystem 6 during the discharge operations.

According to a fourth alternative method of data recording, both unique digital "zone identifying" code and discharge parameters for each identified metal-fuel zone are recorded in a magnetic, optical, or apertured data track, realized as a strip attacked to and extending along the edge of the metal-fuel tape of the present invention. The block of information pertaining to a particular zone or subsection of metal-fuel, schematically indicated in FIG. 2A16, can be recorded in the data track physically adjacent the related metal-fuel zone facilitating easily access of such recorded information during the Recharging Mode of operation.

Typically, the block of information will include the metal-fuel zone identification number and a set of discharge parameters detected by the Data Capture and Processing Subsystem 275 as the metal-fuel zone is transported through the discharging head assembly 9.

The first and second data recording methods described above have several advantages over the third method described above. In particular, when using the first and second methods, the data track provided along the metal-fuel tape can have a very low information capacity. This is because very little information needs to be recorded to tag each metal-fuel zone with a unique identifier (i.e. address number or zone identification number), to which sensed tape discharge parameters are recorded in the Metal-Fuel Database Management Subsystem 275. Also, formation of a data track in accordance with the first and second methods should be very inexpensive, as well as providing apparatus for reading zone identifying information recorded along such data tracks.

Discharging Power Regulation Subsystem within the Metal-Fuel Tape Discharging Subsystem As shown in FIGS. 2A3 and 2A4, the input port of the discharging power regulation subsystem 40 is operably connected to the output port of the cathode-anode output terminal configuration subsystem 25, whereas the output port of the discharging power regulation subsystem 40 is operably connected to the input port of the electrical load 12. While the primary function of the discharging power regulation subsystem 40 is to regulate the electrical power delivered the electrical load during its Discharging Mode of operation, the discharging power regulation subsystem can also regulate the output voltage across the electrical load, as well as the electrical current flowing across the cathode-electrolyte interface during discharging operations. Such control functions are managed by the system controller 18 and can be programmably selected in a variety of ways in order to achieve optimal discharging of multi-tracked and single-tracked metal-fuel tape according to the present invention while satisfying dynamic loading requirements.

The discharging power regulating subsystem of the first illustrative embodiment can be realized using solid-state power, voltage and current control circuitry well known in the power, voltage and current control arts. Such circuitry can include electrically-programmable power switching circuits using transistor-controlled technology, in which a current-controlled source is connectable in electrical series with electrical load 12 in order to control the electrical current therethrough in response to control signals produced by the system controller carrying out a particular Discharging Power Control Method. Such electrically-programmable power switching circuits can also include transistor-controlled technology, in which a voltage-controlled source is connectable in electrical parallel with the electrical load in order to control the output voltage therethrough in response to control signals produced by the system controller. Such circuitry can be combined and controlled by the system controller 12 in order to provide constant power control across the electrical load.

In the illustrative embodiment of the present invention, the primary function of the discharging power regulation subsystem 40 is to carry out real-time power regulation to the electrical load using any one of the following Discharge Power Control (i.e. Regulation) Methods, namely: (1) a Constant Output Voltage/Variable Output Current Method, wherein the output voltage across the electrical load is maintained constant while the current is permitted to vary in response to loading conditions; (2) a Constant Output Current/Variable Output Voltage Method, wherein the current into the electrical load is maintained constant while the output voltage thereacross is permitted to vary in response to loading conditions; (3) a Constant Output Voltage/Constant Output Current Method, wherein the voltage across and current into the load are both maintained constant in response to loading conditions; (4) a Constant Output Power Method, wherein the output power across the electrical load is maintained constant in response to loading conditions; (5) a Pulsed Output Power Method, wherein the output power across the electrical load is pulsed with the duty cycle of each power pulse being maintained in accordance with preset conditions; (6) a Constant Output Voltage/Pulsed Output Current Method, wherein the output current into the electrical load is maintained constant while the current into the load is pulsed with a particular duty cycle; and (7) a Pulsed Output Voltage/Constant Output Current Method, wherein the output power into the load is pulsed while the current thereinto is maintained constant.

In the preferred embodiment of the present invention, each of the seven (7) Discharging Power Regulation Methods are preprogrammed into ROM associated with the system controller 18. Such power regulation methods can be selected in a variety of different ways, including, for example, by manually activating a switch or button on the system housing, by automatically detection of a physical, electrical, magnetic or optical condition established or detected at the interface between the electrical load 12 and the Metal-Fuel Tape Discharging Subsystem 6.

Input/Output Control Subsystem within the Metal-Fuel Tape Discharging Subsystem

In some applications, it may be desirable or necessary to combine two or more FCB systems or their Metal-Fuel Tape Discharging Subsystems in order to form a resultant system with functionalities not provided by the such subsystems operating alone. Contemplating such applications, the Metal-Fuel Tape Discharging Subsystem 6 hereof includes an Input/Output Control Subsystem 41 which allows an external system (e.g. microcomputer or microcontroller) to override and control aspects of the Metal-Fuel Tape Discharging Subsystem 6 as if its system controller were carrying out such control functions. In the illustrative embodiment, the Input/Output Control Subsystem 41 is realized as a standard IEEE I/O bus architecture which provides an external and/or remote computer system with a way and means of directly interfacing with the system controller 18 of the Metal-Fuel Tape Discharging Subsystem 6 and managing various aspects of system and subsystem operation in a straightforward manner.

System Controller within the Metal-Fuel Tape Discharging Subsystem

As illustrated in the detailed description set forth above, the system controller 18 performs numerous operations in order to carry out the diverse functions of the FCB system within its Discharging Mode. In the preferred embodiment of the FCB system of FIG. 1, the system controller 18 is realized using a programmed microcontroller having program and data storage memory (e.g. ROM, EPROM, RAM and the like) and a system bus structure well known in the microcomputing and control arts. In any particular embodiment of the present invention, it is understood that two or more microcontrollers may be combined in order to carry out the diverse set of functions performed by the FCB system hereof. All such embodiments are contemplated embodiments of the system of the present invention.

Discharging Metal-Fuel Tape within the Metal-Fuel Tape Discharging Subsystem

FIG. 2A5 sets forth a high-level flow chart describing the basic steps of discharging metal-fuel tape (i.e. generating electrical power therefrom) using the Metal-Fuel Tape Discharging Subsystem shown in FIGS. 2A3 through 2A4.

As indicated at Block A, the user places (i.e. inserts) a supply of unoxidized metal-fuel tape into the cartridge receiving port of the system housing so that the tape path-length expansion mechanism 8 is adjacent the metal-fuel tape ready for discharge within the Metal-Fuel Tape Discharging Subsystem.

As indicated at Block B, the path-length expansion mechanism within the Metal-Fuel Tape Discharging Subsystem increases the path-length of the metal-fuel tape over the increased path-length region thereof, as shown in FIGS. 2A3 and 2A4.

As indicated at Block C, the Discharge Head Transport Subsystem 6 arranges the discharging heads about the metal-fuel tape over the expanded path-length of the Metal-Fuel Tape Discharging Subsystem so that the ionically-conducting medium is disposed between each cathode structure and the adjacent metal-fuel tape.

As indicated at Block D, the Discharge Head Transport Subsystem 6 then configures each discharging head so that its cathode structure is in ionic contact with a portion of the path-length extended metal-fuel tape and its anode contacting structure is in electrical contact therewith.

As indicated at Block E, the cathode-anode output terminal configuration subsystem 25 automatically configures the output terminals of the cathode-anode structures of each discharging head arranged about the path-length extended metal-fuel tape, and then the system controller 18 controls the Metal-Fuel Card Discharging Subsystem 6 so that electrical power is generated and supplied to the electrical load at the required output voltage. When all or a substantial portion of the metal-fuel tape has been discharged, then the Cartridge Loading/Unloading Subsystem 2 can be programmed to automatically eject the metal-fuel tape cartridge for replacement with a cartridge containing recharged metal-fuel tape.

Metal-Fuel Tape Recharging Subsystem for the First Illustrative Embodiment Of The Metal-Air FCB System of the Present Invention As shown in FIGS. 2B3 and 2B4, the metal-fuel tape recharging subsystem 7 of the first illustrative embodiment comprises a number of subsystems, namely: an assembly of multi-track metal-oxide reducing (i.e. recharging) heads 11, each having multi-element cathode structures and anode-contacting structures with electrically-conductive input terminals connectable in a manner to be described hereinbelow; an assembly of metal-oxide sensing heads 23' for sensing the presence of metal-oxide formation along particular zones of metal fuel tracks as the metal fuel tape is being transported past the recharging heads during the Recharging Mode; a metal-fuel tape path-length extension mechanism 10, as schematically illustrated in FIGS. 2B1 and 2B2 and described above, for extending the path-length of the metal-fuel tape over a particular region of the cassette device 5, and enabling the assembly of multi-track metal-oxide reducing heads to be arranged thereabout during the Recharging Mode of operation; a recharging head transport subsystem 24' for transporting the subcomponents of the recharging head assembly 11 (and the metal-oxide sensing head assembly 23' to and from the metal-fuel tape when its path-length is arranged in an extended configuration by the metal-fuel tape path-length extension mechanism 11; an input power supply subsystem 90 for converting externally supplied AC power signals into DC power supply signals having voltages suitable for recharging metal-fuel tracks being transported through the recharging heads of the Metal-Fuel Tape Recharging Subsystem; a cathode-anode input terminal configuration subsystem 91, for connecting the output terminals (port) of the input power supply subsystem 90 to the input terminals (port) of the cathode and anode-contacting structures of the recharging heads 11, under the control of the system controller 18' so as to supply input voltages thereto for electro-chemically converting metal-oxide formations into its primary metal during the Recharging Mode; a cathode-anode voltage monitoring subsystem 26', connected to the cathode-anode input terminal configuration subsystem 91, for monitoring (i.e. sampling) the voltage applied across cathode and anode of each recharging head, and producing (digital) data representative of the sensed voltage level; a cathode-anode current monitoring subsystem 27', connected to the cathode-anode input terminal configuration subsystem 91, for monitoring (e.g. sampling) the current flowing across the cathode-electrolyte interface of each recharging head during the Recharging Mode, and producing digital data signals representative of the sensed current levels; a cathode oxygen pressure control subsystem comprising the system controller 18', solid-state $PO_2$ sensors 28', vacuum chamber (structure) 29' shown in FIGS. 2B7 and 2B8, vacuum pump 30', electronically-controlled airflow control device 31', manifold structure 32', and multi-lumen tubing 33' shown in FIG. 2B8, for sensing and controlling the $pO_2$ level within each channel of the cathode structure of each recharging head 11; a metal-fuel tape speed control subsystem comprising the system controller 18', motor drive circuits 21A and 21B, and tape velocity (i.e. speed and direction) sensor/detector 22', for bi-directionally controlling the velocity of metal-fuel tape relative to the recharging heads 11, in the forward and reverse tape directions; an ion-concentration control subsystem comprising the system controller 18', solid-state moisture sensor 34', moisturizing (e.g. humidifying or wicking element) 35', for sensing and modifying conditions within the FCB system (e.g. the relative humidity at the cathode-electrolyte interface of the discharging heads) so that the ion-concentration at the cathode-electrolyte interface is maintained within an optimal range during the Recharge Mode of operation; recharge head temperature control subsystem comprising the system controller 18', solid-state temperature sensors (e.g. thermistors) 271' embedded within each channel of the multi-cathode support structure hereof, and a discharge head cooling device 272', responsive to control signals produced by the system controller 18', for lowering the temperature of each recharging channel to within an optimal temperature range during recharging operations; a relational-type Metal-Fuel Database Management Subsystem (MRDMS) 280 operably connected to system controller 18' by way of local bus 281, and designed for receiving particular types of information derived from the output of various subsystems within the Metal-Fuel Tape Recharging Subsystem 7; a Data Capture and Processing Subsystem (DCPS) 282, comprising data reading head 38' embedded within or mounted closely to the cathode support structure of each recharging head 11, metal-oxide sensing head assembly 23' and associated circuitry, and a programmed microprocessor-based data processor adapted to receive data signals produced from voltage monitoring subsystem 26', current monitoring subsystem 27', metal-oxide sensing head assembly 23', the tape velocity control subsystem, the cathode oxygen pressure control subsystem, and the ion-concentration control subsystem hereof, and enable (i) the reading of metal-fuel zone identification data from transported metal-fuel tape 5, (ii) the recording of sensed discharge parameters and computed metal-oxide indicative data derived therefrom in the Metal-Fuel Database Management Subsystem (MFDMS) 280 using local system bus 283, and (iii) the reading of prerecorded recharge parameters and prerecorded metal-fuel indicative data stored in the Metal-Fuel Database Management Subsystem 280 using local system bus 281; an input (i.e. recharging) power regulation subsystem 92 connected between the output terminals (i.e. port) of the input power supply subsystem 90 and the input terminal (i.e. port) of the cathode-anode input terminal configuration subsystem 91, for regulating the input power (and voltage and/or current characteristics) delivered across the cathode and anode structures of each metal-fuel track being recharged during the Recharging Mode; an input/output control subsystem 41', interfaced with the system controller 18', for controlling all functionalities of the FCB system by way of a remote system or resultant system, within which the FCB system is embedded; and system controller 18' for managing the operation of the above mentioned subsystems during the various modes of system operation. These subsystems will be described in greater technical detail below.

Figure 6:
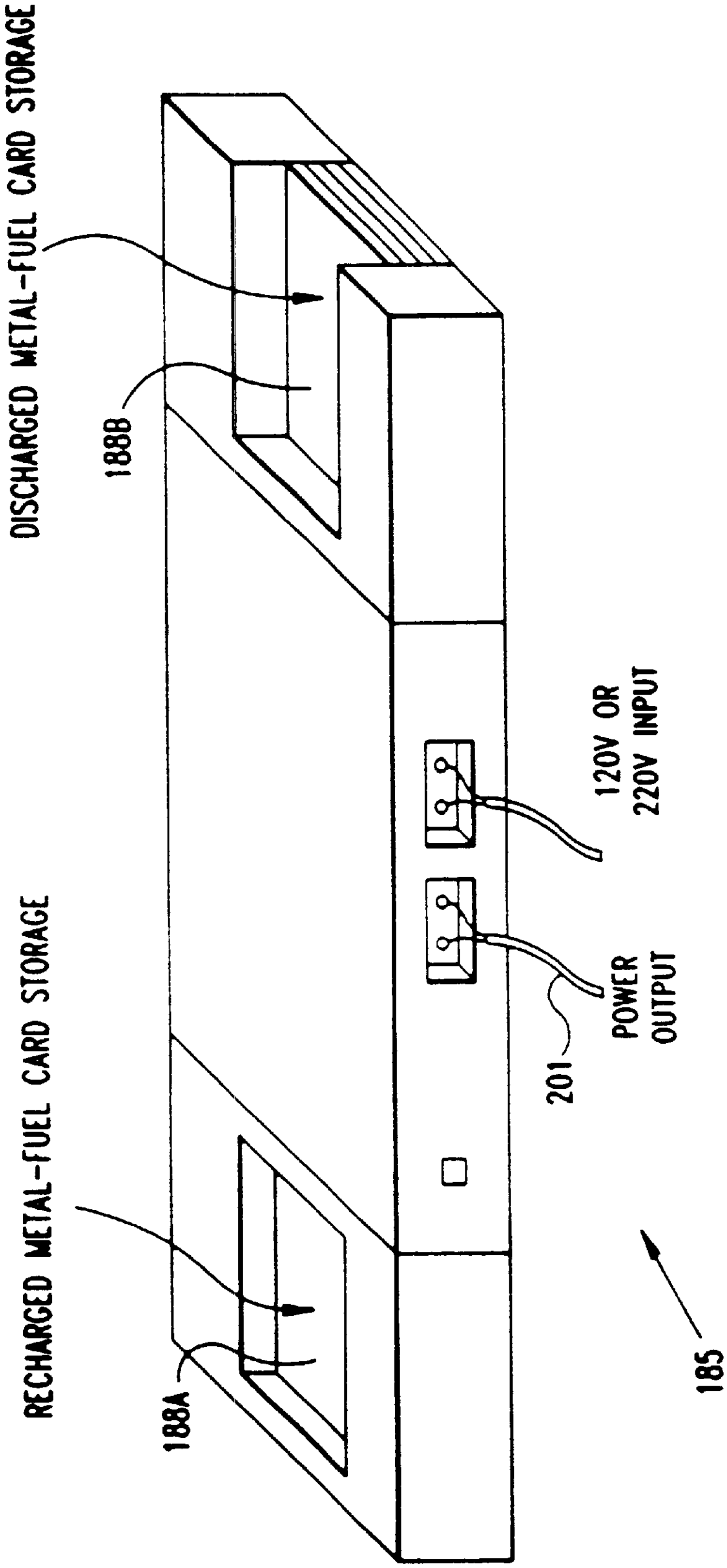

Multi-Track Recharging Head Assembly within the Metal-Fuel Tape Recharging Subsystem The function of the assembly of multi-track recharging heads 11 is to electrochemically reduce metal-oxide formations along the tracks of metal-fuel tape transported through the recharging head assembly 11 during the Recharging Mode of operation. In the illustrative embodiment, each recharging head 11 comprises: a cathode element support plate 42 having a plurality of isolated channels 43' permitting the free passage of oxygen (O2) through the bottom portion 44' of each such channel; a plurality of electrically-conductive cathode elements (e.g. strips) 45A' through 45E' for insertion within the lower portion of these channels, respectively; a plurality of electrolyte-impregnated strips 46A' through 46E' for placement over the cathode strips 45A' through 45E', respectively, and support within the channels 44' as shown in FIG. 2B6; and an oxygen-evacuation chamber 29' mounted over the upper (back) surface of the cathode element support plate 42', in a sealed manner, as shown in FIG. 2B7.

As shown in FIGS. 2B3 and 2B4, each oxygen-evacuation chamber 29' has a plurality of subchambers 29A' through 29E' physically associated with recessed channels 154A' and 154E', respectively. Each vacuum subchamber 29A' through 29E' is isolated from all other subchambers and is in fluid communication with one channel supporting a cathode element and electrolyte-impregnated element. As shown, each subchamber 29A' through 29E' is arranged in fluid communication with a vacuum pump 30' via multi-lumen tubing 38', manifold assembly 32' and electronically-controlled air-flow switch 31', each of whose operation is controlled by system controller 18'. This arrangement enables the system controllerl 8' to maintain the $pO_2$ level in each subchamber within an optimal range during recharging operations by selectively evacuating air from subchamber through the corresponding air flow channel in the manifold assembly 32'.

In the illustrative embodiment, electrolyte-impregnated strips within the recharging head assembly 11 are realized by impregnating an electrolyte-absorbing carrier medium with a gel-type electrolyte. Preferably, the electrolyte-absorbing carrier strip is realized as a strip of low-density, open-cell foam material made from PET plastic. The gel-electrolyte for each discharging cell is made from a formula consisting of an alkali solution (e.g. KOH), a gelatin material, water, and additives known in the art.

In the illustrative embodiment, each cathode strip is made from a sheet of nickel wire mesh 47' coated with porous carbon material and granulated platinum or other catalysts 48' to form a cathode suitable for use in metal-air FCB systems. Details of cathode construction are disclosed in U.S. Pat. Nos. 4,894,296 and 4,129,633, incorporated herein by reference. To form a current collection pathway, an electrical conductor 49' is soldered to the underlying wire mesh sheet of each cathode strip. As shown in FIG. 2B7, each electrical conductor 49' is passed through a small hole 50' formed in the bottom surface of a channel of the cathode support plate, and is connected to the cathode-anode input terminal configuration subsystem 91. As shown, the cathode strip pressed into the lower portion of the channel to secure the same therein. As shown in FIG. 2B7, the bottom surface of each channel 43 has numerous perforations 43A formed therein to allow the evacuation of oxygen away from the cathode-electrolyte interface, and out towards the vacuum pump 30'. In the illustrative embodiment, an electrolyte-impregnated strip 46A' through 46E' is placed over a cathode strip 45A' through 45E' and is secured within the upper portion of the cathode supporting channel 43'. As shown in FIG. 2B8, when the cathode strip and thin electrolyte strip are mounted in their respective channel in the cathode support plate 42', the outer surface of the electrolyte-impregnated strip is disposed flush with the upper surface of the plate defining the channels, thereby permitting metal-fuel tape to be smoothly transported thereover during tape recharging operations.

Hydrophobic agents are added to the carbon material constituting the cathode elements within the recharging head assembly 11, to ensure the expulsion of water from the oxygen-pervious cathode elements. Also, the interior surfaces 44 of the cathode support channels are coated with a hydrophobic film (e.g. PTFE®) 51' to ensure the expulsion of water within electrolyte-impregnated strips 47' and thus achieve optimum oxygen transport across the cathode strips during the Recharging Mode. Preferably, the cathode support plate is made from an electrically non-conductive material, such as polyvinyl chloride (PVC) plastic material well known in the art. The cathode support plate and evacuation chamber can be fabricated using injection molding technology also well known in the art.

In order to sense the partial oxygen pressure within the cathode structure during the Recharging Mode, for use in effective control of metal-oxide reduction within the recharging heads, a solid-state PO2 sensor 28' is embedded within each channel of the cathode support plate 42', as illustrated in FIG. 2B7, and operably connected to the Data Capture and Processing Subsystem 282 as an information input device thereto. Data signals produced by the $pO_2$ sensors are received by the Data Capture and Processing Subsystem 282, converted into an appropriate format and then recorded within the information structure shown in FIG. 2B16, maintained by the Metal-Fuel Database Management Subsystem 280. The system controller 18' has access to such information stored in the Database Management Subsystem by way of local system bus 281, as shown in FIGS. 2B3 and 2B4.

In the illustrative embodiment, each $pO_2$ sensor can be realized using well-known $pO_2$ sensing technology employed to measure (in vivo) pO2 levels in the blood of humans. Such prior art sensors can be constructed using miniature diodes which emit electromagnetic radiation at different wavelengths that are absorbed at different levels in the presence of oxygen in the blood, and such information can be processed and analyzed to produce a computed measure of pO2 in a reliable manner, as taught in U.S. Pat. No. 5,190,038 and references cited therein, each being incorporated herein by reference. In the present invention, the characteristic wavelengths of the light emitting diodes can be selected so that similar sensing functions are carried out within the structure of the cathode in each recharging head, in a straightforward manner.

In FIG. 2B9, there is shown a section of multi-tracked fuel tape that has undergone partial discharge and thus has metal-oxide formations along the metal-fuel tracks thereof. Notably, this section of partially-discharged metal-fuel tape is contained within the cassette fuel cartridge shown in FIG. 1 and requires recharging within the Metal-Fuel Tape Recharging Subsystem 7 while its cassette device is received within the cassette storage bay of the FCB system.

In FIG. 2B10, an exemplary metal-fuel (anode) contacting structure 58' is disclosed for use with the cathode structure shown in FIGS. 2B7 and 2B8. As shown, a plurality of electrically conductive elements 60A through 60E' are supported from an platform 61' disposed adjacent the travel of the fuel tape within the cassette cartridge. Each conductive element 60A' through 60E' has a smooth surface adapted for slidable engagement with one track of metal fuel through the fine groove formed in the base layer of the fuel tape corresponding to the fuel track. Each conductive element is connected to an electrical conductor which is connected to the output port of the cathode-anode input terminal configuration subsystem 91. The platform 61' is operably associated with the recharging head transport subsystem 24' and can be designed to be moved into position with the metal-fuel tape during the Recharging Mode of the system, under the control of the system controller.

Notably, the use of multiple recharging heads, as shown in the illustrative embodiments hereof, rather than a single recharging head, allows discharged metal-fuel tape to be recharged more quickly using lower recharging currents, thereby minimizing heat build-up across the individual recharging heads. This feature of the Metal-Fuel Tape Recharging Subsystem 7 extends the service-life of the cathodes employed within the recharging heads thereof.

Metal-Oxide Sensing Head Assembly within the Metal-Fuel Tape Recharging Subsystem The function of the Metal-Oxide Sensing Head Assembly 23' within the Metal-Fuel Tape Recharging Subsystem 7 is to sense (in real-time) the current levels produced across the individual fuel tracks during recharging operations, and generate electrical signals indicating the degree to which portions of metal-fuel tracks have been oxidized and thus require metal-oxide reduction. As shown in FIG. 2B15, each multi-track metal-oxide sensing head 23' in the assembly thereof comprises a number of subcomponents, namely: a positive electrode support structure 63' for supporting a plurality of positively electrode elements 64A' through 64E', each in registration with the upper surface of one of the fuel tracks (that may have been oxidized) and connected to a low-voltage power supply terminal 59A, 59B, 59C, 59D and 59E provided by current sensing circuitry 66 which is operably connected to the Data Capture and Processing Subsystem 282 within the Metal-Fuel Tape Recharging Subsystem 7, as shown in FIGS. 2B3 and 2B4; and a negative electrode support structure 67 for supporting a plurality of negative electrode elements 68A' through 68E', each in registration with the lower surface of the metal-fuel tracks and connected to a low voltage power supply terminal 69A through 69E provided by current sensing circuitry 66.

In the illustrative embodiment shown in FIGS. 2B3 and 2B4, each multi-track metal-oxide sensing head 23' is disposed immediately before a recharging head 11 in order to sense the actual condition of the metal-fuel tape therebefore and provide a signal to the system controller 18' for detection and determination of the amount (or percentage) of metal-oxide present thereon before recharging. While only one metal-oxide sensing head assembly 23' is shown in the first illustrative embodiment of the FCB system hereof, it is understood that for bi-directional tape-based FCB systems, it would be preferred to install one assembly on each end of the recharging head assembly so that the system controller 18' can "anticipate" which metal-fuel zones are fully charged, partially discharged or completely discharged, regardless of the direction that the metal-fuel tape is being transported at any particular instant in time.

With this arrangement, the Metal-Fuel Tape Recharging Subsystem 7 is capable of actually determining which portions of which metal fuel tracks require metal-oxide reducing during recharging operations. Such information gathering can be carried out using current sensing circuitry 66' which automatically applies a test voltage ($v_{acr}$) across each metal-fuel track during the Recharge Mode, to measure the response current ($i_{acr}$). Such parameters are provided as input to the Data Capture and Processing Subsystem 282. This subsystem then processes this captured data in one or more ways to determine the presence of metal-oxide formations. For example, this subsystem can compare the detected response current value against a threshold current value stored within the Metal-Fuel Database Management Subsystem 280. Alternatively, the subsystem may compute the ratio $V_{acr}/i_{acr}$ to determine a measure of electrical resistance for the cell and compare this measure with a reference threshold value to determine whether there is high electrical resistance across the cell and thus large metal-oxide formations therealong. This data is stored in the Metal-Fuel Database Management Subsystem 280 and is accessible by the system controller 18' any time during recharging operations. The various ways in which the system controller 18' may respond to real-time analysis of data within the Metal-Fuel Database Management Subsystem 280 will be described in greater detail hereinafter.

Metal-Fuel Tape Path-Length Extension Mechanism within the Metal-Fuel Tape Recharging Subsystem As shown in FIGS. 2B3 and 2B4, the tape path-length extension mechanism 10 of the illustrative embodiment comprises: a first array of rollers 71A' through 71E' mounted upon support structure 72', for contacting the metal-fuel portion of the metal-fuel tape when the cassette device 3 inserted into the cassette receiving port of the FCB system; a second array of rollers 73A' through 73E', disposed between the array of stationary rollers 71A' through 71E', for contacting the base portion of the metal-fuel tape 5 when the cassette device 3 is inserted into the cassette receiving port of the FCB system, and a transport mechanism 75' of the electromechanical construction, for transporting roller support structures 72 and 74 relative to the system housing and each other, in order to carry out the functions of this subsystem described in greater detail hereinbelow. Notably, these roller arrays 71A' through 71E' can be arranged to either the left of right of the roller arrays 73A' through 73E' of the tape-path extension mechanism provided for the Metal-Fuel Tape Discharging Subsystem 7. Alternatively, in other embodiments of the present invention, it may be desirable to employ a single tape path-length extension mechanism for use with the discharging heads of the Metal-Fuel Tape Discharging Subsystem and the recharging heads of the Metal-Fuel Tape Recharging Subsystem.

In the configuration shown in FIG. 2B3, the tape path-length mechanism 10 for the Metal-Fuel Tape Recharging Subsystem is arranged so that the first and second sets of rollers 71A' through 71E' and 73A' through 73E' barely contact opposite sides of the metal-fuel tape when the cassette device 3 is inserted within the cassette receiving port of the FCB system. As shown in FIG. 2B4, the second set of rollers 73A' through 73E' are displaced a distance relative to the first set of stationary rollers 71A' through 71E', thereby causing the path-length of the metal-fuel tape to become substantially extended from the path-length shown in the configuration of FIG. 2B3. This extended path-length permits a plurality of recharging heads 11 to be arranged thereabout during the recharging mode of operation. In this configuration, the cathode structure 76' of each recharging head 11 is in ionic contact with the metal-fuel structures along the metal-fuel tape, while the anode-contacting structure 77' of each recharging head is in electrical contact with the metal-fuel structures of the tape. In this configuration, the metal-fuel tape is arranged so that a plurality of recharging heads 11 can be arranged about the metal-fuel tape during tape recharging operations. The use of multiple recharging heads enables recharging of metal-fuel tape using lower electrical currents and thus providing improved control over the metal-oxide conversion during tape recharging. Such advantages will become apparent hereinafter.

Recharging Head Transport Subsystem within the Metal-Fuel Tape Recharging Subsystem The primary function of the recharging head transport subsystem is to transport the assembly of recharging heads 11 (and metal-oxide sensing heads 23' supported thereto) about the metal-fuel tape that has been path-length extended, as shown in FIG. 2B3. When properly transported, the cathode and anode-contacting structures of the recharging heads are brought into "ionically-conductive" and "electrically-conductive" contact with the metal-fuel tracks of metal-fuel tape while it is being is transported through the recharging head assembly during the Recharging Mode.

The recharging head transport subsystem 24' can be realized using any one of a variety of electromechanical mechanisms capable of transporting the cathode structure 76' and anode-contacting structure 77' of each recharging head away from the metal-fuel tape 5, as shown in FIG. 2B3, and about the metal-fuel tape as shown in FIG. 2B4. As shown, these transport mechanisms are operably connected to system controller 18' and controlled by the same in accordance with the system control program carried out thereby.

Input Power Supply Subsystem within the Metal-Fuel Tape Recharging Subsystem

In the illustrative embodiment, the primary function of the Input Power Supply Subsystem 90 is to receive as input, standard alternating current (AC) electrical power (e.g. at 120 or 220 Volts) through an insulated power cord, and to convert such electrical power into regulated direct current (DC) electrical power at a regulated voltage required at the recharging heads of the Metal-Fuel Tape Recharging Subsystem 7 during the recharging mode of operation. For zinc anodes and carbon cathodes, the required "open-cell" voltage $v_{ac}$ across each anode-cathode structure during recharging is about 2.2–2.3 Volts in order to sustain electrochemical reduction. This subsystem can be realized in various ways using AC-DC and DC-DC power conversion and regulation circuitry well known in the art.

Cathode-Anode Input Terminal Configuration Subsystem within the Metal-Fuel Tape Recharging Subsystem As shown in FIGS. 2B3 and 2B4, the cathode-anode input terminal configuration subsystem 91 is connected between the output terminals of the input power regulation subsystem 90 and the input terminals of the cathode-anode pairs associated with multiple tracks of the recharging heads 11. The system controller 18' is operably connected to cathode-anode input terminal configuration subsystem 91 in order to supply control signals thereto for carrying out its functions during the Recharge Mode of operation.

The primary function of the cathode-anode input terminal configuration subsystem 91 is to automatically configure (in series or parallel) the input terminals of selected cathode-anode pairs within the recharging heads of the Metal-Fuel Tape Recharging Subsystem 7 so that the required input (recharging) voltage level is applied across cathode-anode structures of metal-fuel tracks requiring recharging. In the illustrative embodiment of the present invention, the cathode-anode input terminal configuration mechanism 91 can be realized as one or more electrically-programmable power switching circuits using transistor-controlled technology, wherein the cathode and anode-contacting elements within the recharging heads 11 are connected to the output terminals of the input power regulating subsystem 92. Such switching operations are carried out under the control of the system controller 18' so that the required output voltage produced by the input power regulating subsystem 92 is applied across the cathode-anode structures of metal-fuel tracks requiring recharging.

Cathode-Anode Voltage Monitoring Subsystem within the Metal-Fuel Tape Recharging Subsystem As shown in FIGS. 2B3 and 2B4, the cathode-anode voltage monitoring subsystem 26' is operably connected to the cathode-anode input terminal configuration subsystem 91 for sensing voltage levels across the cathode and anode structures connected thereto. This subsystem is also operably connected to the system controller 18' for receiving control signals therefrom required to carry out its functions. In the first illustrative embodiment, the cathode-anode voltage monitoring subsystem 26' has two primary functions: to automatically sense the instantaneous voltage level applied across the cathode-anode structures associated with each metal-fuel track being transported through each recharging head during the Recharging Mode; and to produce a (digital) data signals indicative of the sensed voltages for detection and analysis by the Data Capture and Processing Subsystem 280, and ultimately response by the system controller 18'.

In the first illustrative embodiment of the present invention, the Cathode-Anode Voltage Monitoring Subsystem 26' can be realized using electronic circuitry adapted for sensing voltage levels applied across the cathode-anode structures associated with each metal-fuel track transported through each recharging head within the Metal-Fuel Tape Recharging Subsystem 7. In response to such detected voltage levels, the electronic circuitry can be designed to produce a digital data signals indicative of the sensed voltage levels for detection, analysis and response at the data signal input of the system controller 18'. As will be described in greater detail hereinafter, such data signals can be used by the system controller to carry out its recharging power regulation method during the Recharging Mode of operation.

Cathode-Anode Current Monitoring Subsystem within the Metal-Fuel Tape Recharging Subsystem As shown in FIGS. 2B3 and 2B4, the cathode-anode current monitoring subsystem 27' is operably connected to the cathode-anode input terminal configuration subsystem 18'. The cathode-anode current monitoring subsystem 27' has two primary functions: to automatically sense the magnitude of electrical current flowing through the cathode-anode pair of each metal-fuel track along each recharging head assembly within the Metal-Fuel Tape Recharging Subsystem 11 during the discharging mode; and to produce a digital data signal indicative of the sensed current for detection and analysis by the system controller 18'.

In the first illustrative embodiment of the present invention, the Cathode-Anode Current Monitoring Subsystem 27' can be realized using current sensing circuitry for sensing the electrical current passed through the cathode-anode pair of each metal-fuel track along each recharging head assembly, and producing a digital data signal indicative of the sensed current for detection at the input of the system controller 18'. As will be explained in greater detail hereinafter, these detected current levels can be used by the system controller in carrying out its recharging power regulation method, and well as creating a "recharging condition history" information file for each zone or subsection of recharged metal-fuel tape.

Cathode Oxygen Pressure Control Subsystem within the Metal-Fuel Tape Recharging Subsystem The function of the cathode oxygen pressure control subsystem defined above is to sense the partial oxygen pressure ($pO_2$) (i.e. $O_2$ concentration) within each channel of the cathode structure in the recharging heads 11, and in response thereto, control (i.e. increase or decrease) the same by regulating the air ($O_2$) pressure within such cathode structures. In accordance with the present invention, partial oxygen pressure ($pO_2$) within each channel of the cathode structure in each recharging head is maintained at an optimal level in order to allow optimal oxygen evacuation from the recharging heads during the Recharging Mode. By lowering the $pO_2$ level within each channel of the cathode structure (by evacuation), metal-oxide along the metal-fuel tape can be completely recovered with optimal use of input power supplied to the recharging heads during the Recharging Mode. Also, by monitoring changes in $pO_2$ and producing digital data signals representative thereof for detection and analysis by the system controller, the system controller is provided with a controllable variable for use in regulating the electrical power supplied to the electrical load during the Recharging Mode.

In the first illustrative embodiment of the FCB system hereof shown in FIG. 1, the data signals produced by the solid-state $pO_2$ sensors 28A' through 28E' embodied within the recharging heads 11 are provided to the Data Capture and Processing Subsystem 282, as shown in FIGS. 2B3 and 2B4. The Data Capture and Processing Subsystem 282 receives these signals, converts them into digital data and the like and then records the resulting information items within the information structure shown in FIG. 2B16, managed within the Metal-Fuel Database Management Subsystem 280 with the Metal-Fuel Tape Recharging Subsystem 7.

Metal-Fuel Tape Velocity Control Subsystem within the Metal-Fuel Tape Recharging Subsystem In the FCB system shown in FIG. 1, there is the need for only one metal-fuel tape control subsystem to be operative at any instant in time as metal-fuel tape is common to both the Metal-Fuel Tape Discharging Subsystem 6 and the Metal-Fuel Tape Recharging Subsystem 7 during discharging and/or recharging operations. Notwithstanding this fact, the system controllers 18 and 18' associated with these subsystems 6 and 7 can override each other, as required, in order to control the operation of the tape velocity control subsystem within such discharging and recharging subsystem.

For example, during the Recharging Mode, when the Metal-Fuel Tape Discharging Subsystem 6 is inoperative (i.e. no power generation occurring), the function of metal-tape speed control subsystem described hereinabove is to control the speed of the metal-fuel tape over the recharging heads within the metal-fuel tape recharging subsystem 7. In response to signals produced by the tape velocity sensor 22 and in accordance with the recharging power regulation method being carried out by the system controller 18', the system controller 18' automatically controls (i.e. increases or decreases) the speed of the metal-fuel tape relative to the recharging heads by generating appropriate control signals for driving electric motors 19A and 19B coupled to the supply and take-up reels of metal-fuel tape being recharged. The primary reason for controlling the velocity of metal-fuel tape is that, during the Recharging Mode, this parameter determines how much electrical charge can be delivered to each zone or subsection of oxidized metal-fuel tape as it is being transported through each recharging head within the Metal-Fuel Tape Recharging Subsystem 7. Ideally, during the Recharging Mode, it is desirable to transport the metal-fuel tape as fast as possible through the assembly of recharging heads in order to rapidly and completely recharge the metal-fuel tape within the cassette cartridge inserted within the FCB system. In contrast, the Discharge Mode, it will be desirable in many cases to transport the metal-fuel tape as slow as possible to conserve the supply of metal-fuel. In general, for a constant cathode-anode current applied to a recharging head with the requisite cathode-anode recharging voltage (i.e. Constant Input Current/Constant Input Voltage Method), the amount of electrical charge supplied to each zone of metal-fuel tape will decrease as the velocity of the metal-fuel zone is increased relative to the recharging head during the Recharging Mode. This inverse relationship can be explained by the fact that the metal-fuel zone has less time to accumulate electrical charge as it is transported past the recharging head. In such situations, the function of the metal-fuel tape speed control subsystem is to control the velocity of the tape so as to control the speed of the tape so as to optimally converts metal-oxide formations along the tape into its primary metal.

In instances where the recharging mode and recharging mode are both operative, it will be desired to enable the system controller 18 to override system controller 18' so that the primary objective of the system is to optimally generate power from the FCB system. In other instances, however, where the primary objective of the FCB system is to optimally recharge the metal-fuel tape in a rapid manner, the system controller 18' of the Recharging Subsystem 7 will override the system controller 18 of the Discharging Subsystem 6, and thus control the velocity of the metal-fuel tape within the FCB system.

Ion-Concentration Control Subsystem within the Metal-Fuel Tape Recharging Subsystem To achieve high-energy efficiency during the Recharging Mode, it is necessary to maintain an optimal concentration of (charge-carrying) ions at the cathode-electrolyte interface of each recharging head within the Metal-Fuel Tape Recharging Subsystem 7. Also, the optimal ion-concentration within the Metal-Fuel Tape Recharging Subsystem 7 may be different than that required within the Metal-Fuel Tape Discharging Subsystem 6. For this reason, in particular applications of the FCB system hereof, it may be desirable and/or necessary to provide a separate ion-concentration control subsystem within the Metal-Fuel Tape Recharging Subsystem 7. The primary function of such an ion-concentration control subsystem would be to sense and modify conditions within the FCB system so that the ion-concentration at the cathode-electrolyte interface of the recharging heads is maintained within an optimal range during the Recharging Mode of operation.

In the illustrative embodiment of such a subsystem, ion concentration control is achieved by embedding a miniature solid-state hydrometer (or moisture sensor) 34' within the FCB system (as close as possible to the anode-cathode interfaces of the recharging heads) in order to sense moisture conditions and produce a digital data signal indicative thereof. This digital data signal is supplied to the Data Capture and Processing Subsystem 282 for detection and analysis. In the event that the moisture-level or relative humidity drops below the predetermined threshold value set in the Metal-Fuel Database Management Subsystem 280, the system controller automatically generate a control signal supplied to a moisturizing element 35' realizable, for example, by a wicking device 36' arranged in contact with the metal-fuel tracks of the metal-fuel tape being transported during the Recharging Mode. Another technique may involve spraying fine water droplets (e.g. ultra-fine mist) from micro-nozzles realized along the top surfaces of each cathode support structure, facing the metal-fuel tape during transport. Such operations will increase the moisture-level or relative humidity within the interior of the recharging head (or system housing) and thus ensure that the concentration of KOH within the electrolyte within electrolyte-impregnated strips is optimally maintained for ion transport and thus metal-oxide reduction during tape recharging operations.

Recharging Head Temperature Control Subsystem within the Metal-Fuel Tape Recharging Subsystem As shown in FIGS. 2B3, 2B4, and 2B7, the Recharge Head Temperature Control Subsystem incorporated within the Metal-Fuel Tape Recharging Subsystem 6 of the first illustrative embodiment comprises a number of subcomponents, namely: the system controller 18'; solid-state temperature sensors (e.g. thermistors) 271' embedded within each channel of the multi-cathode support structure hereof, as shown in FIG. 2B7; and a discharge head cooling device 272', responsive to control signals produced by the system controller 18', for lowering the temperature of each discharging channel to within an optimal temperature range during discharging operations. The recharge head cooling device 272' can be realized using a wide variety of heat-exchanging techniques, including forced-air cooling, water-cooling, and/or refrigerant cooling, each well known in the heat exchanging art. In some embodiments of the present invention, where high levels of electrical power are being generated, it may be desirable to provide a jacket-like structure about each recharging head in order to circulate air, water or refrigerant for temperature control purposes.

Data Capture and Processing Subsystem within the Metal-Fuel Tape Recharging Subsystem In the illustrative embodiment of FIG. 1, Data Capture And Processing Subsystem (DCPS) 282 shown in FIGS. 2B3 and 2B4 carries out a number of functions, including, for example: (1) identifying each zone or subsection of metal-fuel tape immediately before it is transported through each recharging head within the recharging head assembly and producing metal-fuel zone identification data representative thereof; (2) sensing (i.e. detecting) various "recharge parameters" within the Metal-Fuel Tape Recharging Subsystem existing during the time period that the identified metal-fuel zone is transported through the recharging head assembly thereof; (3) computing one or more parameters, estimates or measures indicative of the amount of metal-oxide produced during tape recharging operations, and producing "metal-oxide indicative data" representative of such computed parameters, estimates and/or measures; and (4) recording in the Metal-Fuel Database Management Subsystem 280 (accessible by system controller 18'), sensed recharge parameter data as well as computed metal-oxide indicative data both correlated to its respective metal-fuel zone identified during the Recharging Mode of operation.

As will become apparent hereinafter, such recorded information maintained within the Metal-Fuel Database Management Subsystem 280 by Data Capture and Processing Subsystem 282 can be used by the system controller 18' in various ways including, for example: optimally recharging partially or completely oxidized metal-fuel tape in a rapid manner during the Recharging Mode of operation.

During recharging operations, the Data Capture and Processing Subsystem 282 automatically samples (or captures) data signals representative of "recharge parameters" associated with the various subsystems constituting the Metal-Fuel Tape Recharging Subsystem 7 described above. These sampled values are encoded as information within the data signals produced by such subsystems during the Recharging Mode. In accordance with the principles of the present invention, tape-type "recharge parameters" shall include, but are not limited to: the voltages supplied across the cathode and anode structures along particular metal-fuel tracks monitored, for example, by the cathode anode voltage monitoring subsystem 26'; the electrical response currents flowing across the cathode and anode structures along particular metal-fuel tracks monitored, for example, by the cathode-anode current monitoring subsystem 27'; the velocity (i.e. speed and direction) of the metal-fuel tape during recharging of a particular zone of metal-fuel tape, monitored by the metal-fuel tape speed control subsystem; the oxygen saturation (i.e. concentration) level ($pO_2$) within the cathode structure of each recharging head, monitored by the cathode oxygen pressure control subsystem (28', 30', 31', 18'); the moisture ($H_2O$) level (or relative humidity) level across or near the cathode-electrolyte interface along particular metal-fuel tracks in particular recharging heads monitored, for example, by the ion-concentration control subsystem (18', 34', 35' and 36'); and the time duration ($\Delta t$) of the state of any of the above-identified recharge parameters.

In general, there a number of different ways in which the Data Capture and Processing Subsystem 282 can record tape-type "recharge parameters" during the Recharging Mode of operation. While these methods are similar to those employed during the recording of discharging parameters, such methods will be detailed hereinbelow for sake of completion.

According to a first method of data recording shown in FIG. 2B9, zone identifying code or indicia 80 (e.g. miniature bar code symbol encoded with zone identifying information) graphically printed on "optical" data track 81, can be read by optical data reader 38 realized using optical techniques (e.g. laser scanning bar code symbol readers, or optical decoders). In the illustrative embodiment, the digital data representative of these unique zone identifying codes is produced for recording in an information storage structure, as shown in FIG. 2B16, which is created for each metal-fuel zone identified along the tape by data reader 38 of the Data Capture and Processing Subsystem 282. Preferably, such information storage is realized by data writing operations carried out by the Data Capture and Processing and Subsystem within the Metal-Fuel Database Management Subsystem 280 during the recharging operations.

According to a second method of data recording shown in FIG. 2B9', digital "zone identifying" code 83 magnetically recorded in a magnetic data track 84', can be read by optical data reader 38' realized using magnetic sensing techniques well known in the magstripe reading art. In the illustrative embodiment, the digital data representative of these unique zone identifying codes is produced for recording in an information storage structure, as shown in FIG. 2B16, which is created for each metal-fuel zone identified along the tape by data reader 38' of the Data Capture and Processing Subsystem 282. Preferably, such information storage is realized by data writing operations carried out by the Data Capture and Processing and Subsystem within the Metal-Fuel Database Management Subsystem 280 during the recharging operations.

According to a third method of data recording shown in FIG. 2B9", digital "zone identifying" code recorded as a sequence of light transmission apertures 86 in optically opaque data track 87, can be read by optical sensing head 38" realized using optical sensing techniques well known in the art. In the illustrative embodiment, the digital data representative of these unique zone identifying codes is produced for recording in an information storage structure, as shown in FIG. 2B16, created for each metal-fuel zone identified along the tape by the data reader 38". Preferably, such information storage is realized by data writing operations carried out by the Data Capture and Processing and Subsystem within the Metal-Fuel Database Management Subsystem 282 during the recharging operations.

According to a fourth alternative method of data recording, both unique digital "zone identifying" code and discharge parameters for each identified metal-fuel zone are recorded in a magnetic, optical, or apertured data track, realized as a strip attacked to and extending along the edge of the metal-fuel tape of the present invention. The block of information pertaining to a particular zone or subsection of metal-fuel, schematically indicated in FIG. 2B16, can be recorded in the data track physically adjacent the related metal-fuel zone facilitating easily access of such recorded information. Typically, the block of information will include the metal-fuel zone identification number and a set of recharge parameters detected by the Data Capture and Processing Subsystem 282 as the metal-fuel zone is transported through the recharging head assembly 11.

The first and second data recording methods described above have several advantages over the third method described above. In particular, when using the first and second methods, the data track provided along the metal-fuel tape can have a very low information capacity. This is because very little information needs to be recorded to tag each metal-fuel zone with a unique identifier (i.e. address number or zone identification number), to which sensed tape recharge parameters are recorded in the Metal-Fuel Database Management Subsystem 280. Also, formation of a data track in accordance with the first and second methods should be inexpensive to fabricate and provide a convenient way of recording zone identifying information along metal-fuel tape.

Input/Output Control Subsystem within the Metal-Fuel Tape Recharging Subsystem

In some applications, it may be desirable or necessary to combine two or more FCB systems or their Metal-Fuel Tape Recharging Subsystems in order to form a resultant system with functionalities not provided by the such subsystems operating alone. Contemplating such applications, the Metal-Fuel Tape Recharging Subsystem 7 hereof includes an Input/Output Control Subsystem 41' which allows an external system (e.g. microcomputer or microcontroller) to override and control aspects of the Metal-Fuel Tape Recharging Subsystem as if its system controller were carrying out such control functions. In the illustrative embodiment, the Input/Output Control Subsystem 41' is realized as a standard IEEE I/O bus architecture which provides an external or remote computer system with a way and means of directly interfacing with the system controller of the Metal-Fuel Tape Recharging Subsystem and managing various aspects of system and subsystem operation in a straightforward manner.

Recharging Power Regulation Subsystem within the Metal-Fuel Tape Recharging Subsystem As shown in FIGS. 2B3 and 2B4, the output port of the recharging power regulation subsystem 92 is operably connected to the input port of the Cathode-Anode Input Terminal Configuration Subsystem 91 whereas the input port of the recharging power regulation subsystem 92 is operably connected to the output port of the input power supply subsystem. While the primary function of the recharging power regulation subsystem 92 is to regulate the electrical power supplied to metal-fuel tape during the Recharging Mode of operation, the recharging power regulation subsystem 92 can also regulate the voltage applied across the cathode-anode structures of the metal-fuel track, as well as the electrical currents flowing across the cathode-electrolyte interfaces thereof during recharging operations. Such control functions are managed by the system controller 18' and can be programmably selected in a variety of ways in order to achieve optimal recharging of multi-tracked and single-tracked metal-fuel tape while satisfying dynamic loading requirements.

The recharging power regulating subsystem of the first illustrative embodiment can be realized using solid-state power, voltage and current control circuitry well known in the power, voltage and current control arts. Such circuitry can include electrically-programmable power switching circuits using transistor-controlled technology, in which one or more current-controlled sources are connectable in electrical series with the cathode and anode structures of the recharging heads 11 in order to control the electrical currents therethrough in response to control signals produced by the system controller carrying out a particular Recharging Power Control Method. Such electrically-programmable power switching circuits can also include transistor-controlled technology, in which one or more voltage-controlled sources are connectable in electrical parallel with the cathode and anode structures in order to control the voltage thereacross in response to control signals produced by the system controller. Such circuitry can be combined and controlled by the system controller 18' in order to provide constant power (and/or voltage and/or current) control across the cathode-anode structures of the recharging heads 11 of the FCB system.

In the illustrative embodiments of the present invention, the primary function of the recharging power regulation subsystem 92 is to carry out real-time power regulation to the cathode/anode structures of the recharging heads of the system using any one of the following Recharging Power Control Methods, namely: (1) a Constant Input Voltage/Variable Input Current Method, wherein the input voltage applied across each cathode-anode structure is maintained constant while the current therethrough is permitted to vary in response to loading conditions presented by metal-oxide formations on the recharging tape; (2) a Constant Input Current/Variable Input Voltage Method, wherein the current into each cathode-anode structure is maintained constant while the output voltage thereacross is permitted to vary in response to loading conditions; (3) a Constant Input Voltage/

Constant Input Current Method, wherein the voltage applied across and current into each cathode-anode structure during recharging are both maintained constant in response to loading conditions; (4) a Constant Input Power Method, wherein the input power applied across each cathode-anode structure during recharging is maintained constant in response to loading conditions; (5) a Pulsed Input Power Method, wherein the input power applied across each cathode anode structure during recharging is pulsed with the duty cycle of each power pulse being maintained in accordance with preset or dynamic conditions; (6) a Constant Input Voltage/Pulsed Input Current Method, wherein the input current into each cathode-anode structure during recharging is maintained constant while the current into the cathode-anode structure is pulsed with a particular duty cycle; and (7) a Pulsed Input Voltage/Constant Input Current Method, wherein the input power supplied to each cathode-anode structure during recharging is pulsed while the current thereinto is maintained constant.

In the preferred embodiment of the present invention, each of the seven (7) Recharging Power Regulation Methods are preprogrammed into ROM associated with the system controller 18'. Such power regulation methods can be selected in a variety of different ways, including, for example, by manually activating a switch or button on the system housing, by automatically detection of a physical, electrical, magnetic an/or optical condition established or detected at the interface between the metal-fuel cassette device and the Metal-Fuel Tape Recharging Subsystem 7.

System Controller within the Metal-Fuel Tape Recharging Subsystem

As illustrated in the detailed description set forth above, the system controller 18' performs numerous operations in order to carry out the diverse functions of the FCB system within its Recharging Mode. In the preferred embodiment of the FCB system of FIG. 1, the enabling technology used to realize the system controller 18' in the Metal-Fuel Tape Recharging Subsystem 7 is substantially the same subsystem used to realize the system controller 18 in the Metal-Fuel Tape Discharging Subsystem 6, except that the system controller 18' will have some programmed functions which system controller 18 does not have, and vice versa. While a common computing platform can be used to realize system controller 18 and 18', it is understood, however, the system controllers in the Discharging and Recharging Subsystems can be realized as separate subsystems, each employing one or more programmed microprocessors in order to carry out the diverse set of functions performed thereby within the FCB system hereof. In either case, the input/output control subsystem of one of these subsystems can be designed to be the primary input/output control subsystem, with which one or more external subsystems (e.g. a management subsystem) can be interfaced to enable external or remote management of the functions carried out within FCB system hereof.

Recharging Metal-Fuel Tape Within The Metal-Fuel Tape Recharging Subsystem

FIG. 2B5 sets forth a high-level flow chart describing the basic steps of recharging metal-fuel tape using the Metal-Fuel Tape Recharging Subsystem 7 shown in FIGS. 2B3 through 2B4.

As indicated at Block A, the user places (i.e. inserts) a supply of oxidized metal-fuel tape into the cartridge receiving port of the system housing so that the tape path-length expansion mechanism 10 is adjacent the metal-fuel tape ready for recharging within the Metal-Fuel Tape Recharging Subsystem 7.

As indicated at Block B, the path-length extension mechanism 10 within the Metal-Fuel Tape Recharging Subsystem 7 increases the path-length of the metal-fuel tape 5 over the extended path-length region thereof, as shown in FIGS. 2B3 and 2B4.

As indicated at Block C, the Recharge Head Transport Subsystem 24' arranges the recharging heads 11 about the metal-fuel tape over the expanded path-length of the Metal-Fuel Tape Recharging Subsystem 7 so that the ionically-conducting medium is disposed between each cathode structure of the recharging head and the adjacent metal-fuel tape.

As indicated at Block D, the Recharge Head Transport Subsystem 24' then configures each recharging head so that its cathode structure is in ionic contact with a portion of the path-length extended metal-fuel tape and its anode contacting structure is in electrical contact therewith.

As indicated at Block E, the cathode-anode input terminal configuration subsystem 91 automatically configures the input terminals of each recharging head arranged about the path-length extended metal-fuel tape, and then the system controller 18' controls the Metal-Fuel Card Recharging Subsystem 7 so that electrical power is supplied to the path-length extended metal-fuel tape at the required recharging voltages and currents, and metal-oxide formations on the tape are converted into the primary metal. When all or a substantial portion of the metal-fuel tape has been recharged, then the Cartridge Loading/Unloading Subsystem 2 can be programmed to automatically eject the metal-fuel tape cartridge for replacement with a cartridge containing recharged metal-fuel tape.

Managing Metal-Fuel Availability and Metal-Oxide Presence Within the First Illustrative Embodiment Of The Metal-Air FCB System Of The Present Invention In the FCB system of the first illustrative embodiment, means are provided for automatically managing the availability of metal-fuel within the Metal-Fuel Tape Discharging Subsystem 6 during discharging operations, and metal-oxide presence within the Metal-Fuel Tape Recharging Subsystem 7 during recharging operations. Such system capabilities will be described in greater detail hereinbelow.

During The Discharging Mode

As shown in FIG. 2B17, data signals representative of discharge parameters (e.g. , $i_{acd}$, $V_{acd}$, . . . , $pO_{2d}$, $H_2O_d$, $T_{acd}$, $v_{acr}/i_{acr}$) are automatically provided as input to the Data Capture and Processing Subsystem 277 within the Metal-Fuel Tape Discharging Subsystem 6. After sampling and capturing, these data signals are processed and converted into corresponding data elements and then written into an information structure 285 as shown, for example, in FIG. 2A16. Each information structure 285 comprises a set of data elements which are "time-stamped" and related (i.e. linked) to a unique metal-fuel zone identifier 80 (83,86), associated with a particular metal-fuel tape supply (e.g. reel-to-reel, cassette, etc.). The unique metal-fuel zone identifier is determined by data reading head 38 (38', 38") shown in FIG. 2A6. Each time-stamped information structure is then recorded within the Metal-Fuel Database Management Subsystem 275 for maintenance, subsequent processing and/or access during future recharging and/or discharging operations.

As mentioned hereinabove, various types of information are sampled and collected by the Data Capture and Processing Subsystem 277 during the discharging mode. Such information types include, for example: (1) the amount of electrical current ($i_{acd}$) discharged across particular cathode-anode structures within particular discharge heads; (2) the voltage ($v_{acd}$) generated across each such cathode-anode structure; (3) the velocity ($V_d$) of the metal-fuel zone being transported through the discharging head assembly; (4) the oxygen concentration ($pO_{2d}$) level in each subchamber within each discharging head; (5) the moisture level $\{H_2O\}_d$ near each cathode-electrolyte interface within each discharging head; and (6) the temperature ($T_{acd}$) within each channel of each discharging head. From such collected information, the Data Capture and Processing Subsystem 277 can readily compute (i) the time ($\Delta t$) duration that electrical current was discharged across a particular cathode-anode structure within a particular discharge head.

The information structures produced and stored within the Metal-Fuel Database Management Subsystem 275 on a real-time basis can be used in a variety of ways during discharging operations. For example, the above-described current ($i_{avg}$) and time information ($\Delta t$) is conventionally measured in Amperes and Hours, respectively. The product of these measures ($\Delta H$) provides an approximate measure of the electrical charge ($-Q$) discharged from the metal-air fuel cell battery structures along the metal-fuel tape. Thus the computed "AH" product provides an approximate amount of metal-oxide that one can expect to have been formed on the identified (i.e. labeled) zone of metal-fuel, at a particular instant in time, during discharging operations.

When information relating to the instantaneous velocity ($v_t$) of each metal-fuel zone is used in combination with the AH product, it is possible to compute a more accurate measure of electrical discharge across a cathode-anode structure in a particular discharge head. From this more accurately computed discharged amount, the Data Capture and Processing Subsystem 277 can compute a very accurate estimate of the amount of metal-oxide produced as each metal-fuel zone is transported through a discharge head at a particular tape velocity and given set of discharging conditions determined by the detected recharging parameters.

When used with historical information about metal oxidation and reduction processes, the Metal-Fuel Database Management Subsystem 275 can be used to account for or determine how much metal-fuel (e.g. zinc) should be available for discharging (i.e. producing electrical power) from zinc-fuel tape, or how much metal-oxide is present for reducing along the zinc-fuel tape. Thus such information can be very useful in carrying out metal-fuel management functions including, for example, determination of metal-fuel amounts available along a particular metal-fuel zone.

In the illustrative embodiment, metal-fuel availability is managed within the Metal-Fuel Tape Discharging Subsystem 6, using one of two different methods for managing metal-fuel availability described hereinbelow.

First Method of Metal-Fuel Availability Management During Discharging Operations According to the first method of metal-fuel availability management, (i) the data reading head 38 (38', 38") is used to identify each metal-fuel zone passing under the metal-oxide sensing head assembly 23 and produce zone identification data indicative thereof, while (ii) the metal-oxide sensing head assembly 23 measures the amount of metal-oxide present along each identified metal-fuel zone. As mentioned hereinabove, each metal-oxide measurement is carried out by applying a test voltage across a particular track of metal fuel, and detecting the electrical which flows across the section of metal-fuel track in response the applied test voltage. The data signals representative of the applied voltage ($v_{applied}$) and response current ($i_{response}$) at a particular sampling period are automatically detected by the Data Capture and Processing Subsystem 277 and processed to produce a data element representative of the ratio of the applied voltage to response current ($v_{applied}/(i_{response})$. This data element is automatically recorded within an information structure linked to the identified metal-fuel zone maintained in the Metal-Fuel Data Management Subsystem 275. As this data element (v/i) provides a direct measure of electrical resistance across the subsection of metal-fuel tape under measurement, it can be accurately correlated to a measured amount of metal-oxide present on the identified metal-fuel zone. As shown in FIG. 2A16, this metal-oxide measure (MOM) is recorded in the information structure shown linked to the identified metal-fuel zone upon which the response current measurements were taken.

The Data Capturing and Processing Subsystem 277 can then compute the amount of metal-fuel ($MFA_t$) remaining on the identified metal-fuel zone at time "t" using (i) the measured amount of metal-oxide on the identified fuel zone at time instant "t" ($MOM_t$), and (ii) a priori information recorded in the Metal-Fuel Database Management Subsystem 275 regarding the maximum amount of metal-fuel ($MFA_{maximum}$) that is potentially available over each metal-fuel zone when the zone is disposed in its fully charged state, with no metal-oxide formation thereon. This computation can be mathematically expressed as: $MFA_t = MFA_{maximum} - MOM_t$. As illustrated in FIG. 2A16, each such data element is automatically recorded within an information storage structure in the Metal-Fuel Database Management Subsystem 275. The address of each such recorded information structure is linked to the identification data of the identified metal-fuel zone ID data read during discharging operations.

During discharging operations, the above-described metal-fuel availability update procedure is carried out every $t_i - t_{i+1}$ seconds for each metal-fuel zone that is automatically identified by the data reading head 38 (38', 38"), over which the metal-fuel tape is transported. This ensures that for each metal-fuel zone along each track along a supply of metal-fuel tape there is an up-to-date information structure containing information on the discharging parameters, the metal-fuel availability state, metal-oxide presence state, and the like.

Second Method of Metal-Fuel Availability Management During Discharging Operations According to the second method of metal-fuel availability management, (i) the data reading head 38 (38', 38") is used to identify each metal-fuel zone passing under the discharging head assembly and produce zone identification data indicative thereof, while (ii) the Data Capturing and Processing Subsystem 277 automatically collects information relating to the various discharging parameters and computes parameters pertaining to the availability of metal-fuel and metal-oxide presence along each metal-fuel zone along a particular supply of metal-fuel tape. In accordance with the principles of the present invention, this method of metal-fuel management is realized as a three-step procedure cyclically carried out within the Metal-Fuel Database Management Subsystem 275 of the Discharging Subsystem 6. After each cycle of computations, the Metal-Fuel Database Management Subsystem 275 contains current (up-to-date) information on the amount of metal-fuel disposed along each metal-fuel zone (disposed along any particular fuel track). Such information on each identifiable zone of the metal-fuel tape can be used to: manage the availability of metal-fuel to meet the electrical power demands of the electrical load connected to the FCB system; as well as set the discharging parameters in an optimal manner during discharging operations.

As shown in FIG. 2A16, information structures 285 are recorded for each identified metal-fuel zone ($MFZ_k$) along each metal-fuel track ($MFT_j$), at each sampled instant of time $t_i$. Initially, the metal-fuel tape has been either fully charged or recharged and loaded into the FCB system hereof, and in this fully charged state, each metal-fuel zone has an initial amount of metal-fuel present along its surface. This initial metal-fuel amount can be determined in a variety of different ways, including for example: by encoding such initialization information on the metal-fuel tape itself; by prerecording such initialization information within the Metal-Fuel Database Management Subsystem 275 at the factory and automatically initialized upon reading a code applied along the metal-fuel tape by data reading head 38 (38', 38"); by actually measuring the initial amount of metal-fuel by sampling values at a number of metal-fuel zones using the metal-oxide sensing assembly 23; or by any other suitable technique.

As part of the first step of the procedure, this initial metal-fuel amount available at initial time instant $t_0$, and designated as $MFA_0$, is quantified by the Data Capture and Processing Subsystem 277 and recorded within the information structure of FIG. 2A16 maintained within the Metal-Fuel Database Management Subsystem 275. While this initial metal-fuel measure ($MFA_0$) can be determined empirically through metal-oxide sensing techniques, in many applications it may be more expedient to use theoretical principles to compute this measure after the tape has been subjected to a known course of treatment (e.g. complete recharging).

The second step of the procedure involves subtracting from the initial metal-fuel amount $MFA_0$, the computed metal-oxide estimate $MOE_{0\text{-}1}$ which corresponds to the amount of metal-oxide produced during discharging operations conducted between time interval $t_0$–$t_1$. The during the discharging operation, metal-oxide estimate $MOE_{0\text{-}1}$ is computed using the following discharging parameters collected—electrical discharge current $i_{acd}$, time duration $\Delta t_d$, and the average tape zone velocity $v_{0\text{-}1}$ over time duration $\Delta t_d$.

The third step of the procedure involves adding to the computed measure ($MFA_0$–$MOE_{0\text{-}1}$), the metal-fuel estimate $MFE_{0\text{-}1}$ which corresponds to the amount of metal-fuel produced during any recharging operations conducted between time interval $t_0$–$t_1$. Notably, the metal-fuel estimate $MFE_{0\text{-}1}$ is computed using the following recharging parameters collected—electrical recharge current $i_{acr}$, time duration $\Delta t$, and tape zone velocity $v_{0\text{-}1}$ during the discharging operation. As this metal-fuel measure $MFE_{0\text{-}1}$ will have been previously computed and recorded within the Metal-Fuel Database Management Subsystem 280 within the Metal-Fuel Tape Recharging Subsystem 7, it will be necessary for the system controller 18 to read this prerecorded information element from the Database Subsystem 280 within the Recharging Subsystem 7 during discharging operations.

The computed result of the above-described procedure (i.e. $MFA_0$–$MOE_{0\text{-}1}$+$MFE_{0\text{-}1}$) is then posted within the Metal-Fuel Database Management Subsystem 275 within Discharging Subsystem 6 as the new current metal-fuel amount ($MFA_1$) which will be used in the next metal-fuel availability update procedure.

During discharging operations, the above-described accounting update procedure is carried out for every $t_i$–$t_{i+1}$ seconds for each metal-fuel zone that is automatically identified by the data reading head 38 (38', 38"), by which the metal-fuel tape is transported. Notably, each element of metal-fuel zone identification data (zone ID data) collected by the data reading head 38 (38', 38") during discharging operations is used to address memory storage locations within the Metal-Fuel Database Management Subsystems 275 and 280 where correlated information structures are to be recorded during database updating operations. While such database updating operations are carried out at the same time that discharging operations are carried out, it may be convenient in some applications to perform such updating operations after the occurrence of some predetermined delay period.

Uses For Metal-Fuel Availability Management During the Discharging Mode of Operation During discharging operations, the computed estimates of metal-fuel present over any particular metal-fuel zone (i.e. $MFE_{t1\text{-}t2}$), along any particular fuel track, determined at the j-th discharging head, can be used to compute in real-time the availability of metal-fuel at the (j+1)th, (j+2)th, or (j+n)th discharging head downstream from the j-th discharging head. Using such computed measures, the system controller 18 within the Metal-Fuel Tape Discharging Subsystem 6 can determine (i.e. anticipate) in real-time, which metal-fuel zones along a supply of metal-fuel tape contain metal-fuel (e.g. zinc) in quantities sufficient to satisfy instantaneous electrical-loading conditions imposed upon the Metal-Fuel Tape Discharging Subsystem 6 during the discharging operations, and selectively advance the metal-fuel tape to zones where metal-fuel is known to exist. In the event that gaps of fuel-depletion exist along any particular section of tape, the tape transport control subsystem can rapidly "skip over" such tape sections to where metal-fuel exists. Such tape advancement (or skipping) operations can be carried out by the system controller 18 temporarily increasing the instantaneous velocity of the metal-fuel tape so that tape supporting metal-fuel content (e.g. deposits) along particular tracks are readily available for producing electrical power required by the electrical load 12. During such brief time periods when depleted sections of tape are transported through the discharging head assembly 9, the discharging power regulation subsystem 40, equipped with storage capacitors or the like, can serve to regulate the output power as required by electrical load conditions.

Another advantage derived from such metal-fuel management capabilities is that the system controller 18 within the Metal-Fuel Tape Discharging Subsystem 6 can control discharge parameters during discharging operations using information collected and recorded within the Metal-Fuel Database Management Subsystem 275 during the immediately prior discharging and recharging operations.

Means For Controlling Discharging Parameters During the Discharging Mode Using Information Recorded During the Prior Modes of Operation In the FCB system of the first illustrative embodiment, the system controller 18 within the Metal-Fuel Tape Discharging Subsystem 6 can automatically control discharge parameters using information collected during prior recharging and discharging operations and recorded within the Metal-Fuel Database Management Subsystems of the FCB system of FIG. 1.

As shown in FIG. 2B17, the subsystem architecture and buses 276, 279 and 281 provided within and between the Discharging and Recharging Subsystems 6 and 7 enable system controller 18 within the Metal-Fuel Tape Discharging Subsystem 6 to access and use information recorded within the Metal-Fuel Database Management Subsystem 280 within the Metal-Fuel Tape Recharging Subsystem 7. Similarly, the subsystem architecture and buses provided within and between the Discharging and Recharging Subsystems 6 and 7 enable system controller 18' within the Metal-Fuel Tape Recharging Subsystem 7 to access and use information recorded within the Metal-Fuel Database Management Subsystem 275 within the Metal-Fuel Tape Discharging Subsystem 6. The advantages of such information file and sub-file sharing capabilities will be explained hereinbelow.

During the discharging operations, the system controller 18 can access various types of information stored within the Metal-Fuel Database Management Subsystems of Discharging and Recharging Subsystems 6 and 7. One important information element will relate to the amount of metal-fuel currently available at each metal-fuel zone along a particular fuel track at a particular instant of time (i.e. $MFE_t$). Using this information, the system controller 18 can determine if there will be sufficient metal-fuel along a particular section of tape to satisfy current electrical power demands. The zones along one or more or all of the fuel tracks along a supply of metal-fuel tape may be substantially consumed as a result of prior discharging operations, and not having been recharged since the last discharging operation. The system controller 18 can anticipate such metal-fuel conditions prior to the section of tape being transported over the discharging heads. Depending on the metal-fuel condition of "upstream" sections of tape, the system controller 18 may respond as follows: (i) increase the tape speed when the fuel is thinly present on identified zones, and decrease the tape speed when the fuel is thickly present on identified zones being transported through the discharging heads, to satisfy the demands of the electrical load; (ii) connect the cathode-anode structures of metal-fuel "rich" tracks into the discharging power regulation subsystem 40 when high loading conditions are detected at load 12, and connect the cathode-anode structures of metal-fuel "depleted" tracks from this subsystem when low loading conditions are detected at load 12; (iii) increase the amount of oxygen being injected within the corresponding cathode support structures (i.e. increase the $pO_2$ therewithin) when the thinly formed metal-fuel is present on identified metal-fuel zones, and decrease the amount of oxygen being injected within the corresponding cathode support structures when thickly formed metal-fuel is present on identified metal-fuel zones being transported through the discharging heads; (iv) control the temperature of the discharging heads when the sensed temperature thereof exceeds predetermined thresholds; etc. It is understood that in alternative embodiments of the present invention, the system controller 18 may operate in different ways in response to the detected condition of particular tracks on an identified fuel zone.

During The Recharging Mode

As shown in FIG. 2B17, data signals representative of recharge parameters (e.g., $i_{acr}$, $v_{acr}$, . . . , $pO_{2r}$, $H_2O_r$, $T_r$, $v_{acr}/i_{acr}$) are automatically provided as input to the Data Capture and Processing Subsystem 275 within the Metal-Fuel Tape Recharging Subsystem 7. After sampling and capturing, these data signals are processed and converted into corresponding data elements and then written into an information structure 286 as shown, for example, in FIG. 2B16. As in the case of discharge parameter collection, each information structure 286 for recharging parameters comprises a set of data elements which are "time-stamped" and related (i.e. linked) to a unique metal-fuel zone identifier 80 (83, 86), associated with the metal-fuel tape supply (e.g. reel-to-reel, cassette, etc.) being recharged. The unique metal-fuel zone identifier is determined by data reading head 60 (60', 60") shown in FIG. 2B 6. Each time-stamped information structure is then recorded within the Metal-Fuel Database Management Subsystem 280 of the Metal-Fuel Tape Recharging Subsystem 7, shown in FIG. 2B17, for maintenance, subsequent processing and/or access during future recharging and/or discharging operations.

As mentioned hereinabove, various types of information are sampled and collected by the Data Capture and Processing Subsystem 282 during the recharging mode. Such information types include, for example: (1) the recharging voltage applied across each such cathode-anode structure within each recharging head; (2) the amount of electrical current ($i_{ac}$) supplied across each cathode-anode structures within each recharge head; (3) the velocity of the metal-fuel tape being transported through the recharging head assembly; (4) the oxygen concentration ($pO_2$) level in each subchamber within each recharging head; (5) the moisture level ($H_2O$) near each cathode-electrolyte interface within each recharging head; and (6) the temperature ($T_{ac}$) within each channel of each recharging head. From such collected information, the Data Capture and Processing Subsystem 282 can readily compute various parameters of the system including, for example, the time duration ($\Delta t$) that electrical current was supplied to a particular cathode-anode structure within a particular recharging head.

The information structures produced and stored within the Metal-Fuel Database Management Subsystem 280 of the Metal-Fuel Tape Recharging Subsystem 7 on a real-time basis can be used in a variety of ways during recharging operations. For example, the above-described current ($i_{avg}$) and time duration ($\Delta t$) information acquired during the recharging mode is conventionally measured in Amperes and Hours, respectively. The product of these measures (AH) provides an approximate measure of the electrical charge ($-Q$) supplied to the metal-air fuel cell battery structures along the metal-fuel tape during recharging operations. Thus the computed "AH" product provides an approximate amount of metal-fuel that one can expect to have been produced on the identified (i.e. labeled) zone of metal-fuel, at a particular instant in time, during recharging operations.

When information relating to the instantaneous velocity ($v_t$) of each metal-fuel zone is used in combination with the AH product, it is possible to compute a more accurate measure of electrical charge (Q) supplied to a particular cathode-anode structure in a particular recharging head. From this accurately computed "recharge" amount, the Data Capture and Processing Subsystem 282 can compute a very accurate estimate of the amount of metal-fuel produced as each identified metal-fuel zone is transported through each recharging head at a particular tape velocity, and given set of recharging conditions determined by the detected recharging parameters.

When used with historical information about metal oxidation and reduction processes, the Metal-Fuel Database Management Subsystems within the Metal-Fuel Tape Discharging and Recharging Subsystems 6 and 7 respectively can be used to account for or determine how much metal-oxide (e.g. zinc-oxide) should be present for recharging (i.e. conversion back into zinc from zinc-oxide) along the zinc-fuel tape. Thus such information can be very useful in carrying out metal-fuel management functions including, for example, determination of metal-oxide amounts present along each metal-fuel zone during recharging operations.

In the illustrative embodiment, the metal-oxide presence process may be managed within the Metal-Fuel Tape Recharging Subsystem 7 using one or two different methods which will be described hereinbelow.

First Method of Metal-Oxide Presence Management During Recharging Operations

According to the first method of metal-oxide presence management, (i) the data reading head 60 (60', 60") is used to identify each metal-fuel zone passing under the metal-oxide sensing head assembly 23' and produce zone identification data indicative thereof, while (ii) the metal-oxide sensing head assembly 23' measures the amount of metal-oxide present along each identified metal-fuel zone. As mentioned hereinabove, each metal-oxide measurement is carried out by applying a test voltage across a particular track of metal fuel, and detecting the electrical current which flows across the section of metal-fuel track in response the applied test voltage. The data signals representative of the applied voltage ($v_{applied}$) and response current ($i_{response}$) at a particular sampling period are automatically detected by the Data Capture and Processing Subsystem 282 and processed to produce a data element representative of the ratio of the applied voltage to response current ($v_{applied}/(i_{response})$. This data element is automatically recorded within an information structure linked to the identified metal-fuel zone, maintained in the Metal-Fuel Data Management Subsystem 282 of the Metal-Fuel Tape Recharging Subsystem 7. As this data element (v/i) provides a direct measure of electrical resistance across the subsection of metal-fuel tape under measurement, it can be accurately correlated to a measured amount of metal-oxide present on the identified metal-fuel zone. As shown in FIG. 2B16, this metal-oxide measure (MOM) is recorded in the information structure shown linked to the identified metal-fuel zone upon which the response current measurements were taken during a particular recharging operation.

The Data Capturing and Processing Subsystem 282 within the Metal-Fuel Tape Recharging Subsystem 7 can then compute the amount of metal-oxide ($MOA_t$) existing on the identified metal-fuel zone at time "t". As illustrated in FIG. 2B16, each such data element is automatically recorded within an information storage structure in the Metal-Fuel Database Management Subsystem 282 of the Metal-Fuel Tape Recharging Subsystem 7. The address of each such recorded information structure is linked to the identification data of the identified metal-fuel zone ID data read during recharging operations.

During recharging operations, the above-described metal-oxide presence update procedure is carried out every $t_i$–$t_{i+1}$ seconds for each metal-fuel zone that is automatically identified by the data reading head 60 (60', 60"), over which the metal-fuel tape is transported.

Second Method of Metal-Fuel Presence Management During Recharging Operations

According to the second method of metal-fuel presence management, (i) the data reading head 60 (60', 60") is used to identify each metal-fuel zone passing under the recharging head assembly and produce zone identification data indicative thereof, while (ii) the Data Capturing and Processing Subsystem 282 automatically collects information relating to the various recharging parameters and computes parameters pertaining to the availability of metal-fuel and metal-oxide presence along each metal-fuel zone along a particular supply of metal-fuel tape. As will be described in greater detail hereinafter, this method of metal-oxide management is realized as a three-step procedure cyclically carried out within the Metal-Fuel Database Management Subsystem 280 of the Recharging Subsystem 7. After each cycle of computation, the Metal-Fuel Database Management Subsystem 280 contains current (up-to-date) information on the amount of metal-fuel disposed along each metal-fuel zone (disposed along any particular fuel track). Such information on each identifiable zone of the metal-fuel tape can be used to: manage the presence of metal-oxide for efficient conversion into its primary metal; as well as set the recharging parameters in an optimal manner during recharging operations.

As shown in FIG. 2B 16, information structures 286 are recorded for each identified metal-fuel zone ($MFZ_k$) along each metal-fuel track ($MFT_j$), at each sampled instant of time $t_i$. Typically, the metal-fuel tape has been completely or partially discharged and loaded into the FCB system hereof, and in this discharged state, each metal-fuel zone has an initial amount of metal-oxide present along its surface which cannot be used to produced electrical power within the FCB system. This initial metal-fuel amount can be determined in a variety of different ways, including for example: by encoding such initialization information on the metal-fuel tape itself; by prerecording such initialization information within the Metal-Fuel Database Management Subsystem 282 at the factory and automatically initialized upon reading a code applied along the metal-fuel tape by data reading head 60 (60', 60"); by actually measuring the initial amount of metal-oxide by sampling values at a number of metal-fuel zones using the metal-oxide sensing assembly 23'; or by any other suitable technique.

As part of the first step of the metal-oxide management procedure, this initial metal-oxide amount available at initial time instant to, and designated as $MOA_0$, is quantified by the Data Capture and Processing Subsystem 282 and recorded within the information structure of FIG. 2B16 maintained within the Metal-Fuel Database Management Subsystem 282 of the Metal-Fuel Tape Recharging Subsystem 7. While this initial metal-oxide measure ($MOA_0$) can be determined empirically through metal-oxide sensing techniques, in many applications it may be more expedient to use theoretical principles to compute this measure after the tape has been subjected to a known course of treatment (e.g. complete discharging).

The second step of the procedure involves subtracting from the initial metal-oxide amount $MOA_0$, the computed metal-fuel estimate $MFE_{0-1}$ which corresponds to the amount of metal-fuel produced during recharging operations conducted between time interval $t_0$–$t_i$. During the recharging operation, metal-oxide estimate $MOE_{0-1}$ is computed using the following recharging parameters collected—electrical recharge current $i_{acr}$, time duration thereof $\Delta t$, and tape zone velocity $v_{0-1}$.

The third step of the procedure involves adding to the computed measure ($MOA_0$–$MFE_{0-1}$), the metal-oxide estimate $MOE_{0-1}$ which corresponds to the amount of metal-oxide produced during any discharging operations conducted between time interval $t_0$–$t_1$. Notably, the metal-oxide estimate $MOE_{0-1}$ is computed using the following discharging parameters collected—electrical discharge current $i_{acd}$, time duration thereof $\Delta t_r$ and average tape zone velocity $v_{0-1}$ over this time duration during recharging operations. As this metal-oxide estimate $MOE_{0-1}$ will have been previously computed and recorded within the Metal-Fuel Database Management Subsystem within the Metal-Fuel Tape Discharging Subsystem 6, it will be necessary to read this prerecorded information element from the database within the Metal-Fuel Tape Discharging Subsystem 6 during recharging operations.

The computed result of the above-described accounting procedure (i.e. $MOA_0$–$MFE_{0-1}$+$MOE_{0-1}$) is then posted within the Metal-Fuel Database Management Subsystem 280 within Recharging Subsystem 7 as the new current metal-oxide amount ($MOA_1$) which will be used in the next metal-oxide presence update procedure.

During recharging operations, the above-described accounting update procedure is carried out for every $t_i$–$t_{i+1}$ seconds for each metal-fuel zone that is automatically identified by the data reading head 60 (60', 60"), by which the metal-fuel tape is transported. Notably, each element of metal-fuel zone identification data (zone ID data) is collected by the data reading head 60 (60', 60") during recharging operations and is used to address memory storage locations within the Metal-Fuel Database Management Subsystem 280 where correlated information structures are to be recorded during database updating operations. While such database updating operations are carried out at the same time that recharging operations are carried out, it may be convenient in some applications to perform such updating operations after the occurrence of some predetermined delay period.

Uses For Metal-Oxide Presence Management During the Recharging Mode of Operation During recharging operations, the computed amounts of metal-oxide present over any particular metal-fuel zone (i.e. $MOAt_{t1-t2}$), along any particular fuel track, determined at the j-th recharging head, can be used to compute in real-time the presence of metal-fuel at the (j+1)th, (j+2)th, or (j+n)th recharging head downstream from the j-th recharging head. Using such computed measures, the system controller 18' within the Metal-Fuel Tape Recharging Subsystem 7 can determine (i.e. anticipate) in real-time, which metal-fuel zones along a supply of metal-fuel tape contain metal-oxide (e.g. zinc-oxide) requiring recharging, and which contain metal-fuel not requiring recharging. For those metal-fuel zones requiring recharging, the system controller 18' can temporarily increasing the instantaneous velocity of the metal-fuel tape so that tape supporting metal-oxide content (e.g. deposits) along particular tracks are readily available for conversion into metal-fuel within the recharging head assembly.

Another advantage derived from such metal-oxide management capabilities is that the system controller 18' within the Metal-Fuel Tape Recharging Subsystem 7 can control recharge parameters during recharging operations using information collected and recorded within the Metal-Fuel Database Management Subsystem 280 during the immediately prior discharging operations, and vice versa. Such advantages will be described in greater detail hereinafter.

During Recharging operations, information collected can be used to compute an accurate measure of the amount of metal-oxide that exists along each metal-fuel zone at any instant in time. Such information, stored within information storage structures maintained within the Metal-Fuel Database Subsystem 280, can be accessed and used by the system controller 18' within the Metal-Fuel Tape Discharging Subsystem 7 to control the amount of electrical current supplied across the cathode-anode structures of each recharging head 11. Ideally, the magnitude of electrical current will be selected to ensure complete conversion of the estimated amount of metal-oxide (present at each such zone) into its source metal (e.g. zinc).

Means for Controlling Recharging Parameters During the Recharging Mode Using Information Recorded During the Prior Modes of Operation In the FCB system of the first illustrative embodiment, the system controller 18' within the Metal-Fuel Tape Recharging Subsystem 7 can automatically control recharge parameters using information collected during prior discharging and recharging operations and recorded within the Metal-Fuel Database Management Subsystems of the FCB system of FIG. 1.

During the recharging operations, the system controller 18' within the Metal-Fuel Tape Recharging Subsystem 7 can access various types of information stored within the Metal-Fuel Database Management Subsystem 275. One important information element stored therein will relate to the amount of metal-oxide currently present at each metal-fuel zone along a particular fuel track at a particular instant of time (i.e. $MOE_t$). Using this information, the system controller 18' can determine exactly where metal-oxide deposits are present along particular sections of tape, and thus can advance the metal fuel tape thereto in order to efficiently and quickly carry out recharging operations therealong. The system controller 18' can anticipate such metal-fuel conditions prior to the section of tape being transported over the recharging heads. Depending on the metal-fuel condition of "upstream" sections of tape, the system controller 18' of the illustrative embodiment may respond as follows: (i) increase the tape speed when the metal-oxide is thinly present on identified zones, and decrease the tape speed when the metal-oxide is thickly present thereon; (ii) connect cathode-anode structures of metal-oxide "rich" tracks into the recharging power regulation subsystem 92 for longer periods of recharging, and connect metal-oxide "depleted" tracks from this subsystem for shorter periods of recharging; (iii) increase the rate of oxygen evacuation from cathode-anode structures having thickly formed metal-oxide formations present on identified metal-fuel zones, and decrease the rate of oxygen evacuation from cathode-anode structures having thinly formed metal-oxide formations present on identified metal-fuel zones being transported through the recharging heads; (iv) control the temperature of the recharging heads when the sensed temperature thereof exceeds predetermined thresholds; etc. It is understood that in alternative embodiments of the present invention, the system controller 18' may operate in different ways in response to the detected condition of particular track on an identified fuel zone.

The Second Illustrative Embodiment of the Metal-Fuel Tape FCB System ofF the Present Invention The second illustrative embodiment of the metal-air FCB system hereof is illustrated in FIG. 3A. As shown therein, this FCB system 100 comprises a number of subsystems, namely: a Metal-Fuel Tape Cassette Cartridge Loading/Unloading Subsystem 2 as described hereinabove for loading and unloading of a metal-fuel tape cassette device 3 into the FCB system during its Cartridge Loading and Unloading Modes of operation, respectively; a Metal-Fuel Tape Transport Subsystem 4 as described hereinabove for transporting the metal-fuel tape through the system during its Discharging and Recharging Modes of operation; and Metal-Fuel Tape Recharging Subsystem 7 as described hereinabove for electro-chemically recharging (i.e. reducing) sections of oxidized metal-fuel tape during the Recharging Mode of operation. Details concerning each of these subsystems have been described hereinabove in connection with the first illustrative embodiment of the FCB system shown in FIG. 1. The primary difference between the systems shown in FIG. 1 and 3 is that the system of FIG. 3 does not have a Metal-Fuel Discharging Subsystem 6, and thus functions as a recharger and not a discharging (i.e. power generating) device.

The Third Illustrative Embodiment of the Metal-Air FCB System of the Present Invention The third illustrative embodiment of the metal-air FCB system hereof is illustrated in FIG. 3B. As shown therein, this FCB system 101 comprises a number of subsystems, namely: a Metal-Fuel Tape Cassette Cartridge Loading/Unloading Subsystem 2 for loading and unloading of a metal-fuel tape cassette device 4 into the FCB system; a Metal-Fuel Tape Transport Subsystem 7 for transporting the metal-fuel tape through the system during its Discharging and Recharging Modes of operation; and Metal-Fuel Tape Recharging Subsystem 7 for electro-chemically recharging (i.e. reducing) sections of oxidized metal-fuel tape during the Recharging Mode of operation. Details concerning each of these subsystems have been described hereinabove in connection with the first illustrative embodiment of the FCB system shown in FIG. 1. The primary difference between the systems shown in FIG. 3A and 3B is that the system of FIG. 3B is capable of recharging metal-fuel cassette devices 3 that may incorporate a component or two of a discharging head, as well as other components associated with Metal-Fuel Tape Discharging Subsystem 6.

The Fourth Illustrative Embodiment of the Metal-Air FCB System of the Present Invention The fourth illustrative embodiment of the metal-air FCB system hereof is illustrated in FIGS. 4 through 5B15. As shown in FIGS. 4, 5A1 and 5A2, this FCB system 110 comprises a number of subsystems, namely: a Metal-Fuel Card Loading/Unloading Subsystem 111 for semi-manually loading one or more metal-fuel cards 112 into the discharging ports 114 of the FCB system, and semi-manually unloading metal-fuel cards therefrom; a Metal-Fuel Card Discharging (i.e. Power Generation) Subsystem 115 for generating electrical power across an electrical load 116 from the metal-fuel cards during the Discharging Mode of operation; and Metal-Fuel Card Recharging Subsystem 117 for electro-chemically recharging (i.e. reducing) sections of oxidized metal-fuel cards during the Recharging Mode of operation. Details concerning each of these subsystems and how they cooperate will be described below.

As shown in FIG. 5A9, the metal-fuel material consumed by this FCB System is provided in the form of metal fuel cards 112 which are manually loaded into the card storage bay of the system. In the illustrative embodiment, the card storage bay is divided into two sections: a discharging bay 113 for loading (re)charged metal-fuel cards for discharge (i.e. power generation); and a recharging bay 114 for loading discharged metal-fuel cards for recharging purposes. As shown in FIGS. 4, 5A3, 5A9, each metal-fuel card 112 has a rectangular-shaped housing containing a plurality of electrically isolated metal-fuel strips 119A through 119E adapted to contact the cathode elements 120A through 120E of each "multi-track" discharging head in the Metal-Fuel Tape Discharging Subsystem when the fuel card is moved into properly aligned position between cathode support plate 121 and anode contacting structure 122 during the Discharging Mode, as shown in FIG. 5A4.

In the illustrative embodiment, the fuel card of the present invention is "multi-tracked" in order to enable the simultaneous production of multiple supply voltages (e.g. 1.2 Volts) from the "multi-track" discharging heads employed therein. As will be described in greater detail hereinafter, the purpose of this novel generating head design is to enable the generating and delivery of a wide range of output voltages from the system, suitable to the electrical load connected to the FCB system.

Brief Summary of Modes of Operation of the FCB System of the Fourth Illustrative Embodiment of the Present Invention The FCB system of the fourth illustrative embodiment has several modes of operation, namely: a Card Loading Mode during which metal-fuel cards are semi-manually loaded within the system; a Discharging Mode during which electrical power is produced from the output terminal of the system and supplied to the electrical loaded connected thereto; a Recharging Mode during which metal-fuel cards are recharged; and a Card Unloading Mode during which metal-fuel cards are semi-manually unloaded from the system. These modes will be described in greater detail hereinafter with reference to FIGS. 5A1 and 5A2 in particular.

During the Card Loading Mode, one or more metal-fuel cards 112 are loaded into the FCB system by the Card Loading/Unloading Subsystem 111. During the Discharging Mode, the charged metal-fuel cards are discharged in order to electro-chemically generate electrical power therefrom for supply to the electrical load 116 connected thereto. During the Recharging Mode, the oxidized metal-fuel cards are electro-chemically reduced in order to convert oxide formations on the metal-fuel cards into its primary metal during recharging operations. During the Card Unloading Mode, the metal-fuel cards are unloaded (e.g. ejected) from the FCB system by the Card Loading/Unloading Subsystem 111.

While it may be desirable in some applications to suspend tape recharging operations while carryout tape discharging operations, the FCB system of the fourth illustrative embodiment enables concurrent operation of the Discharging and Recharging Modes. Notably, this feature of the present invention enables simultaneous discharging and recharging of metal-fuel tape during power generation operations.

Multi-Track Metal-Fuel Card Used in the FCB System of the First Illustrative Embodiment In the FCB system shown in FIGS. 4, 5A3 and 5A4 each metal-fuel card 112 has multiple fuel-tracks (e.g. five tracks) as taught in copending application Ser. No. 08/944,507, supra. When using such a metal-fuel card design, it is desirable to design each discharging head 124 within the Metal-Fuel Card Discharging Subsystem 115 as a "multi-track" discharging head. Similarly, each recharging head 125 within the Metal-Fuel Card Recharging Subsystem 117 hereof shown in FIGS. 5B3 and 5B4 should be designed as a multi-track recharging head in accordance with the principles of the present invention. As taught in great detail in copending application Ser. No. 08/944,507, the use of "multi-tracked" metal-fuel cards 112 and multi-track discharging heads 124 enables the simultaneous production of multiple output voltages {V1, V2, . . . , Vn} selectable by the end user. Such output voltages can be used for driving various types of electrical loads 116 connected to the output power terminals 125 of the Metal-Fuel Card Discharging Subsystem. This is achieved by configuring the individual output voltages produced across anode-cathode structures within each discharging head during metal-fuel card discharging operations. This system functionality will be described in greater detail hereinbelow.

In general, multi-track and single-track metal-fuel cards alike can be made using several different techniques. Preferably, the metal-fuel contained with each card-like device 112 is made from zinc as this metal is inexpensive, environmentally safe, and easy to work. Several different techniques will be described below for making zinc-fuel cards according to the present invention.

For example, in accordance with a first fabrication technique, an thin metal layer (e.g. nickel or brass) of about 0.1 to about 5.0 microns thickness is applied to the surface of low-density plastic material (drawn and cut in the form of a card-like structure). The plastic material should be selected so that it is stable in the presence of an electrolyte such as KOH. The function of the thin metal layer is to provide efficient current collection at the anode surface. Thereafter, zinc powder is mixed with a binder material and then applied as a coating (e.g. 1 to about 500 microns thick) upon the surface thin metal layer. The zinc layer should have a uniform porosity of about 50% to allow the ionically-conducting medium (e.g. electrolyte ions) to flow with minimum electrical resistance between the cathode and anode structure. As will be explained in greater detail hereinafter, the resulting structure can be mounted within an electrically insulating casing of thin dimensions to improve the structural integrity of the metal-fuel card, while providing the discharging heads access to the anode structure when the card is loaded within its card storage bay. Optionally, the casing of the metal-fuel card can be provided with slidable panels that enable access to the metal-fuel strips when the card is received in the discharging bay 113 and the discharging head is transported into position for discharging operations, or when the card is received in the recharging bay 114 and the recharging head is transported into position for recharging operations.

In accordance with a second fabrication technique, a thin metal layer (e.g. nickel or brass) of about 0.1 to about 5 microns thickness is applied to the surface of low-density plastic material (drawn and cut in the form of card). The plastic material should be selected so that it is stable in the presence of an electrolyte such as KOH. The function of the thin metal layer is to provide efficient current collection at the anode surface. Thereafter zinc is electroplated onto the surface of the thin layer of metal. The zinc layer should have a uniform porosity of about 50% to allow the ions within the ionically-conducting medium (e.g. electrolyte) to flow with minimum electrical resistance between the cathode and anode structures. As will be explained in greater detail hereinafter, the resulting structures can be mounted within an electrically-insulating casing of ultra-thin dimensions to provide a metal-fuel card having suitable structural integrity, while providing the discharging heads access to the anode structure when the card is loaded within its card storage bay. Optionally, the casing of the metal-fuel card can be provided with slidable panels that enable access to the metal-fuel strips when the card is received in the discharging bay 113 and the discharging head is transported into position for discharging operations, or when the card is received in the recharging bay and the recharging head is transported into position for recharging operations.

In accordance with a third fabrication technique, zinc powder is mixed with a low-density plastic material and draw into the form of thin electrically-conductive plastic tape. The low-density plastic material should be selected so that it is stable in the presence of an electrolyte such as KOH. The zinc impregnated tape should have a uniform porosity of about 50% to allow the ions within an ionically-conducting medium (e.g. electrolyte ions) to flow with minimum electrical resistance between the cathode and anode structure. Thereafter, a thin metal layer (e.g. nickel or brass) of about 0.1 to about 5.0 microns thickness is applied to the surface of electrically-conductive tape. The function of the thin metal layer is to provide efficient current collection at the anode surface. As will be explained in greater detail hereinafter, the resulting structure can be mounted within an electrically insulating casing of thin dimensions to improve the structural integrity of the metal-fuel card, while providing the discharging heads access to the anode structure when the card is loaded within its card storage bay.

In any of the above-described embodiments, the card housing can be made from any suitable material designed to withstand heat and corrosion. Preferably, the housing material is electrically non-conducting to provide an added measure of user-safety during card discharging and recharging operations.

Also, each of the above-described manufacturing techniques can be readily modified to produce "double-sided" metal-fuel cards, in which single track or multi-track metal-fuel layers are provided on both sides of the flexible base (i.e. substrate) material employed therein. Such embodiments of metal-fuel tape will be useful in applications where discharging heads are to be arranged on both sides of a metal-fuel card loaded within the FCB system. When making double-sided metal-fuel cards, it will be necessary in most embodiments to form a current collecting layer (of thin metal material) on both sides of the plastic substrate so that current can be collected from both sides of the metal-fuel card, associated with different cathode structures. When making double-sided multi-tracked fuel cards, it may be desirable or necessary to laminate together two multi-track metal-fuel sheets, as described hereinabove, with the substrates of each sheet in physical contact. Adaptation of the above-described methods to produce double-sided metal-fuel cards will readily apparent to those skilled in the art having had the benefit of the present disclosure. In such illustrative embodiments of the present invention, the anode-contacting structures will be modified so that electrical contact is established with each electrically-isolated current collecting layer formed within the metal-fuel card structure being employed therein.

Card Loading/Unloading Subsystem for the Fourth Illustrative Embodiment of the Metal-Air FCB System of the Present Invention As schematically illustrated in FIGS. 4, 5A3 and 5A4, and shown in detail in copending U.S. Pat. No. 6,296,960, the Card Loading/Unloading Transport Subsystem 111 in the FCB system of FIG. 4 comprises a number of cooperating mechanisms, namely: a card receiving mechanism 111A for automatically (i) receiving the metal-fuel card 112 at a card insertion port formed in the front or top panel of the system housing 126, and (ii) withdrawing the metal-fuel card into the card discharge bay provided therewithin; optionally, an automatic door opening mechanism 111B for opening the (optional) door formed in the card (for metal-fuel card access) when the metal-fuel card is received within the card discharge bay of the FCB system; and an automatic card ejection mechanism 111C for ejecting the metal-fuel card from the card discharge bay through the card insertion port in response to a predetermined condition. Such predetermined conditions may include, for example, the depression of an "ejection" button provided on the front panel of the system housing 126, automatic sensing of the end of the metal-fuel card, etc.).

In the illustrative embodiment of FIG. 4, the card receiving mechanism 111A can be realized as a platform-like carriage structure that surrounds the exterior of the housing of each card received in its discharging bay. The platform-like carriage structure can be supported on a pair of parallel rails, by way of rollers, and translatable therealong by way of an electric motor and cam mechanism, operably connected to system controller 130. The function of the cam mechanism is to convert rotational movement of the motor shaft into a rectilinear motion necessary for translating the platform-like carriage structure along the rails when a card is inserted within the platform-like carriage structure. A proximity sensor, mounted within the system housing, can be used to detect the presence of a metal-fuel card being inserted through the insertion port in the system housing and placed within the platform-like carriage structure. The signal produced from the proximity sensor can be provided to the system controller in order to initiate the card withdrawal process in an automated manner.

With the system housing, the automatic door opening mechanism 11B can be realized by any suitable mechanism that can slide the card door into its open position when the metal-fuel card is completely withdrawn into the card discharge bay. In the illustrative embodiment, the automatic card ejection mechanism 111 C employs the same basic structures and functionalities of the card receiving mechanism described above. The primary difference is the automatic card ejection mechanism responds to the depression of an "ejection" button 127A or 127B provided on the front panel of the system housing, or functionally equivalent triggering condition or event. When the button is depressed, the discharging heads are automatically transported away from the metal-fuel card, the metal-fuel card is automatically ejected from the card discharge bay, through the card insertion port.

Notably, the control functions required by the Card Loading/Unloading Subsystem 111, as well as all other subsystems within the FCB system of the first illustrative embodiment, are carried out by the system controller 130, shown in FIGS. 5A3 and 5A4. In the illustrative embodiments hereof, the system controller 130 is realized by a programmed microcontroller (i.e. microcomputer) having program storage memory (ROM), data storage memory (RAM) and the like operably connected by one or more system buses well known in the microcomputing and control arts. The additional functions performed by the system controller of the Metal-Fuel Card Discharging Subsystem will be described in greater detail hereinafter.

The Metal-Fuel Card Discharging Subsystem for the Fourth Illustrative Embodiment of the Metal-Air FCB System of the Present Invention As shown in FIGS. 5A3 and 5A4, the metal-fuel card discharging subsystem 115 of the first illustrative embodiment comprises a number of subsystems, namely: an assembly of multi-track discharging (i.e. discharging) heads 124, each having multi-element cathode structures 121 and anode-contacting structures 122 with electrically-conductive output terminals connectable in a manner to be described hereinbelow; a discharging head transport subsystem 131 for transporting the subcomponents of the discharging head assembly 124 to and from the metal-fuel cards loaded into the subsystem; a cathode-anode output terminal configuration subsystem 132 for configuring the output terminals of the cathode and anode-contacting structures of the discharging heads under the control of the system controller 130 so as to maintain the output voltage required by a particular electrical load 116 connected to the Metal-Fuel Card Discharging Subsystem 115; a cathode-anode voltage monitoring subsystem 133, connected to the cathode-anode output terminal configuration subsystem 132 for monitoring (i.e. sampling) voltages produced across cathode and anode structures of each discharging head, and producing (digital) data representative of the sensed voltage level; a cathode-anode current monitoring subsystem 134, connected to the cathode-anode output terminal configuration subsystem 132, for monitoring (e.g. sampling) the electrical current flowing across the cathode-electrolyte interface of each discharging head during the Discharging Mode, and producing a digital data signal representative of the sensed current levels; a cathode oxygen pressure control subsystem comprising the system controller 130, solid-state $pO_2$ sensors 135, vacuum chamber (structure) 136 shown in FIGS. 5A7 and 5A8, air-compressor or oxygen supply means (e.g $O_2$ tank or cartridge) 137, airflow control device 138, manifold structure 139, and multi-lumen tubing 140 shown in FIGS. 5A3 and 5A4, arranged together for sensing and controlling the pO2 level within the cathode structure of each discharging head 124; an ion transport control subsystem comprising the system controller 130, solid-state moisture sensor (hydrometer) 142, moisturizing (e.g. micro-sprinklering element) 143 realized as a micro-sprinkler embodied within the walls structures of the cathode support plate 121 (having water expressing holes 144 disposed along each wall surface as shown in FIG. A6), a water pump 145, a water reservoir 146, a water flow control valve 147, a manifold structure 148 and conduits 149 extending into moisture delivery structure 143, arranged together as shown for sensing and modifying conditions within the FCB system (e.g. the moisture or humidity level at the cathode-electrolyte interface of the discharging heads) so that the ion-concentration at the cathode-electrolyte interface is maintained within an optimal range during the Discharge Mode of operation; discharge head temperature control subsystem comprising the system controller 130, solid-state temperature sensors (e.g. thermistors) 290 embedded within each channel of the multi-cathode support structure 121 hereof, and a discharge head cooling device 291, responsive to control signals produced by the system controller 130, for lowering the temperature of each discharging channel to within an optimal temperature range during discharging operations; a relational-type Metal-Fuel Database Management Subsystem (MFDMS) 293 operably connected to system controller 130 by way of local bus 299, and designed for receiving particular types of information derived from the output of various subsystems within the Metal-Fuel Tape Discharging Subsystem 115; a Data Capture and Processing Subsystem (DCPS) 295, comprising data reading head 150 (150', 150") embedded within or mounted closely to the cathode support structure of each discharging head 124, and a programmed microprocessor-based data processor adapted to receive data signals produced from cathode-anode voltage monitoring subsystem 133, cathode-anode current monitoring subsystem 134, the cathode oxygen pressure control subsystem and the ion-concentration control subsystem hereof, and enable (i) the reading metal-fuel card identification data from the loaded metal-fuel card, (ii) the recording sensed discharge parameters and computed metal-oxide indicative data derived therefrom in the Metal-Fuel Database Management Subsystem 293 using local system bus 296, and (iii) the reading prerecorded recharge parameters and prerecorded metal-fuel indicative data stored in the Metal-Fuel Database Management Subsystem 293 using local system bus 294; a discharging (i.e. output) power regulation subsystem 151 connected between the output terminals of the cathode-anode output terminal configuration subsystem 132 and the input terminals of the electrical load 116 connected to the Metal-Fuel Card Discharging Subsystem 115, for regulating the output power delivered across the electrical load (and regulate the voltage and/or current characteristics as required by the Discharge Control Method carried out by the system controller 130); an input/output control subsystem 152, interfaced with the system controller 130, for controlling all functionalities of the FCB system by way of a remote system or resultant system, within which the FCB system is embedded; and system controller 130 for managing the operation of the above mentioned subsystems during the various modes of system operation. These subsystems will be described in greater technical detail below.

Multi-Track Discharging Head Assembly within the Metal-Fuel Card Discharging Subsystem The function of the assembly of multi-track discharging heads 124 is to generate electrical power across the electrical load as each metal-fuel card is discharged during the Discharging Mode of operation. In the illustrative embodiment, each discharging (i.e. discharging) head 124 comprises: a cathode element support plate 121 having a plurality of isolated channels 155A through 155E permitting the free passage of oxygen ($O_2$) through the bottom portion of each such channel; plurality of electrically-conductive cathode elements (e.g. strips) 120A through 120E for insertion within the lower portion of these channels, respectively; a plurality of electrolyte-impregnated strips 155A through 155E for placement over the cathode strips, and support within the channels 154A through 154E, respectively, as shown in FIG. 5A9; and an oxygen-injection chamber 136 mounted over the upper (back) surface of the cathode element support plate 121, in a sealed manner.

As shown in FIGS. 5A7, 5A8 and 5A14, each oxygen-injection chamber 136 has a plurality of subchambers 136A through 136E, physically associated within channels 154A through 154E, respectively. Together, each vacuum subchamber is isolated from all other subchambers and is in fluid communication within one channel supporting a cathode element and electrolyte impregnated element. As shown, each subchamber is arranged in fluid communication with air compressor (or $O_2$ supply) 137 via one lumen of multi-lumen tubing 140, one channel of manifold assembly 139 and one channel of air-flow switch 138, each of whose operation is controlled by system controller 130. This arrangement enables the system controller 130 to independently control the $pO_2$ level in each oxygen-injection subchambers 136A through 136E within an optimal range during discharging operations by selectively pumping pressurized air through the corresponding air flow channel in the manifold assembly 139. The optimal range for the $pO_2$ level can be empirically determined through experimentation using techniques known in the art.

In the illustrative embodiment, electrolyte-impregnated strips are realized by impregnating an electrolyte-absorbing carrier medium with a gel-type electrolyte. Preferably, the electrolyte-absorbing carrier strip is realized as a strip of low-density, open-cell foam material made from PET plastic. The gel-electrolyte for each discharging cell is made from a formula consisting of an alkali solution (e.g. KOH), a gelatin material, water, and additives known in the art.

In the illustrative embodiment, each cathode strip 120A through 120E is made from a sheet of nickel wire mesh 156 coated with porous carbon material and granulated platinum or other catalysts 157 shown in FIG. 5A7 to form a cathode suitable for use in the discharging heads in the metal-air FCB system. Details of cathode construction are disclosed in U.S. Pat. Nos. 4,894,296 and 4,129,633, incorporated herein by reference. To form a current collection pathway, an electrical conductor 40 is soldered to the underlying wire mesh sheet of each cathode strip. As shown in FIG. 5A7, each electrical conductor 158 is passed through a hole 159 formed in the bottom surface of each channel 154 of the cathode support plate, and is connected to the input terminals of the cathode-anode output terminal configuration subsystem 132. As shown, each cathode strip is pressed into the lower portion of its channel 1564 in the cathode support plate 121 to secure the same therein. As shown in FIG. 5A7, the bottom surface of each channel has numerous perforations 160 formed therein to allow the free passage of oxygen to the cathode strip during the Discharge Mode. In the illustrative embodiment, electrolyte-impregnated strips 155A through 155E are placed over cathode strips 120A through 120E respectively, and is secured within the upper portions of the corresponding cathode supporting channels. As best shown in FIGS. 5A8, 5A13 and 5A14, when the cathode strips and thin electrolyte strip are mounted in their respective channels in the cathode support plate 121, the outer surface of each electrolyte-impregnated strip is disposed flush with the upper surface of the plate defining the channels.

Hydrophobic agents are added to the carbon material constituting the oxygen-pervious cathode elements to ensure the expulsion of water therefrom. Also, the interior surfaces of the cathode support channels are coated with a hydrophobic film (e.g. Teflon®) 161 to repel water from penetrating electrolyte-impregnated strips 155A through 155E and thus achieve optimum oxygen transport across the cathode strips during the Discharging Mode. Preferably, the cathode support plate is made from an electrically non-conductive material, such as polyvinyl chloride (PVC) plastic material well known in the art. The cathode support plate and oxygen-injection chamber can be fabricated using injection molding technology also well known in the art.

In order to sense the partial oxygen pressure $pO_2$ within the cathode structure during the Discharging Mode, for use in effective control of electrical power generated from discharging heads, solid-state PO2 sensor 135 is embedded within each channel of the cathode support plate 121, as illustrated in FIG. 5A7, and operably connected to the system controller 130 as an information input device thereto. In the illustrative embodiment, the $pO_2$ sensor can be realized using well-known $pO_2$ sensing technology employed to measure (in vivo) $pO_2$ levels in the blood of humans. Such prior art sensors employ miniature diodes which emit electromagnetic radiation at two or more different wavelengths that are absorbed at different levels in the presence of oxygen in the blood, and such information can be processed and analyzed to produce a computed measure of $pO_2$ in a reliable manner, as taught in U.S. Pat. No. 5,190,038 and references cited therein, each being incorporated herein by reference. In the present invention, the characteristic wavelengths of the light emitting diodes can be selected so that similar sensing functions can be carried out within the structure of the cathode in each discharging head, in a straightforward manner.

The multi-tracked fuel card of FIG. 4 is shown in greater structural detail in FIG. 5D1. As shown, the metal-fuel card 120 comprises: an electrically non-conductive base layer 165 of flexible construction (i.e. made from a plastic material stable in the presence of the electrolyte); plurality of parallel extending, spatially separated strips of metal (e.g. zinc) 119A through 119E disposed upon the ultra-thin metallic current-collecting layer (not shown) itself disposed upon the base layer 165; a plurality of electrically non-conductive strips 166A through 166E disposed upon the base layer 165, between pairs of fuel strips 119A through 119E; and a plurality of parallel extending channels (e.g. grooves) 167A through 167E formed in the underside of the base layer, opposite the metal fuel strips thereabove, for allowing electrical contact with the metal-fuel tracks 119A through 119E through the grooved base layer. Notably, the spacing and width of each metal fuel strip is designed so that it is spatially registered with a corresponding cathode strip in the discharging head of the Metal-Fuel Card Discharging Subsystem in which the metal-fuel card 112 is intended to be used. The metal fuel card described above can be made by applying zinc strips onto a layer of base plastic material in the form of a card, using any of the fabrication techniques described hereinabove. The metal strips can be physically spaced apart, or separated by PTFE, in order to ensure electrical isolation therebetween. Then, the gaps between the metal strips can be filled in by applying a coating of electrically insulating material, and thereafter, the base layer can be machined, laser etched or otherwise treated to form fine channels therein for allowing electrical contact with the individual metal fuel strips through the base layer. Finally, the upper surface of the multi-tracked fuel card can be polished to remove any electrical insulation material from the surface of the metal fuel strips which are to come in contact with the cathode structures during discharging.

In FIG. 5A10, an exemplary metal-fuel (anode) contacting structure 122 is disclosed for use with the multi-tracked cathode structure shown in FIGS. 5A7 and 5A8. As shown, a plurality of electrically conductive elements 168A through 168E are supported from an platform 169 disposed adjacent the travel of the fuel card within the card. Each conductive element 168A through 168E has a smooth surface adapted for slidable engagement with one track of metal-fuel through the fine groove formed in the base layer of the metal-fuel card. Each conductive element is connected to an electrical conductor which is connected to the cathode-anode output terminal configuration subsystem 132 under the management of the system controller 130. The platform 169 is operably associated with the discharging head transport subsystem 131 and can be designed to be moved into position with the fuel card 112 during the Discharging Mode of the system, under the control of the system controller 130.

Notably, the use of multiple discharging heads, as in the illustrative embodiments hereof, rather than a single discharging head, allows more power to be produced from the discharging head assembly 124 for delivery to the electrical load while minimizing heat build-up across the individual discharging heads. This feature of the Metal-Fuel Card Discharging Subsystem 115 extends the service life of the cathodes employed within the discharging heads thereof.

Discharging Head Transport Subsystem within the Metal-Fuel Card Discharging Subsystem The primary function of the discharging head transport subsystem 131 is to transport the assembly of discharging heads 124 about the metal-fuel cards 112 that have been loaded into the FCB system, as shown in FIG. 5A3. When properly transported, the cathode and anode-contacting structures of the discharging heads are brought into "ionically-conductive" and "electrically-conductive" contact with the metal-fuel tracks of loaded metal-fuel cards during the Discharging Mode of operation.

Discharging head transport subsystem 131 can be realized using any one of a variety of electromechanical mechanisms capable of transporting the cathode supporting structure 121 and anode-contacting structure 122 of each discharging head away from the metal-fuel card 112, as shown in FIG. 5A3, and about the metal-fuel card as shown in FIG. 5A4. As shown, these transport mechanisms are operably connected to system controller 130 and controlled by the same in accordance with the system control program carried out thereby.

Cathode-Anode Output Terminal Configuration Subsystem within the Metal-Fuel Card Discharging Subsystem As shown in FIGS. 5A3 and 5A4, the cathode-anode output terminal configuration subsystem 132 is connected between the input terminals of the discharging power regulation subsystem 151 and the output terminals of the cathode-anode pairs within the assembly of discharging heads 124. The system controller 130 is operably connected to cathode-anode output terminal configuration subsystem 132 in order to supply control signals for carrying out its functions during the Discharging Mode of operation.

The function of the cathode-anode output terminal configuration subsystem 132 is to automatically configure (in series or parallel) the output terminals of selected cathode-anode pairs within the discharging heads of the Metal-Fuel Card Discharging Subsystem 115 so that the required output voltage level is produced across the electrical load connected to the FCB system during card discharging operations. In the illustrative embodiment of the present invention, the cathode-anode output terminal configuration mechanism 132 can be realized as one or more electrically-programmable power switching circuits using transistor-controlled technology, wherein the cathode and anode-contacting elements within the discharging heads 124 are connected to the input terminals of the output power regulating subsystem 151. Such switching operations are carried out under the control of the system controller 130 so that the required output voltage is produced across the electrical load connected to the discharging power regulating subsystem 151 of the FCB system.

Cathode-Anode Voltage Monitoring Subsystem within the Metal-Fuel Card Discharging Subsystem As shown in FIGS. 5A3 and 5A4, the cathode-anode voltage monitoring subsystem 133 is operably connected to the cathode-anode output terminal configuration subsystem 132 for sensing voltage levels and the like therewithin. This subsystem is also operably connected to the system controller for receiving control signals required to carry out its functions. In the first illustrative embodiment, the cathode-anode voltage monitoring subsystem 133 has two primary functions: to automatically sense the instantaneous voltage level produced across the cathode-anode structures associated with each metal-fuel track being transported through each discharging head during the Discharging Mode; and to produce a (digital) data signal indicative of the sensed voltages for detection, analysis and response by Data Capture and Processing Subsystem 295.

In the first illustrative embodiment of the present invention, the Cathode-Anode Voltage Monitoring Subsystem 133 can be realized using electronic circuitry adapted for sensing voltage levels produced across the cathode-anode structures associated with each metal-fuel track disposed within each discharging head in the Metal-Fuel Card Discharging Subsystem 115. In response to such detected voltage levels, the electronic circuitry can be designed to produce a digital data signals indicative of the sensed voltage levels for detection and analysis by Data Capture and Processing Subsystem 295.

Cathode-Anode Current Monitoring Subsystem within the Metal-Fuel Card Discharging Subsystem As shown in FIGS. 5A3 and 5A4, the cathode-anode current monitoring subsystem 134 is operably connected to the cathode-anode output terminal configuration subsystem 132. The cathode-anode current monitoring subsystem 134 has two primary functions: to automatically sense the magnitude of electrical currents flowing through the cathode-anode pair of each metal-fuel track along each discharging head assembly within the Metal-Fuel Card Discharging Subsystem 115 during the Discharging Mode; and to produce a digital data signal indicative of the sensed current for detection and analysis by Data Capture and Processing Subsystem 295. In the first illustrative embodiment of the present invention, the cathode-anode current monitoring subsystem 134 can be realized using current sensing circuitry for sensing electrical currents flowing through the cathode-anode pairs of each metal-fuel track along each discharging head assembly, and producing digital data signals indicative of the sensed currents. As will be explained in greater detail hereinafter, these detected current levels are used by the system controller in carrying out its discharging power regulation method, and well as creating a "discharging condition history" and metal-fuel availability records for each zone or subsection of discharged metal-fuel card.

Cathode Oxygen Pressure Control Subsystem within the Metal-Fuel Card Discharging Subsystem The function of the cathode oxygen pressure control subsystem is to sense the oxygen pressure ($pO_2$) within each channel of the cathode structure of the discharging heads 124, and in response thereto, control (i.e. increase or decrease) the same by regulating the air ($O_2$) pressure within such cathode structures. In accordance with the present invention, partial oxygen pressure ($PO_2$) within each channel of the cathode structure of each discharging head is maintained at an optimal level in order to allow optimal oxygen consumption within the discharging heads during the Discharging Mode. By maintaining the $pO_2$ level within the cathode structure, power output produced from the discharging heads can be increased in a controllable manner. Also, by monitoring changes in $pO_2$ and producing digital data signals representative thereof for detection and analysis by the system controller, the system controller is provided with a controllable variable for use in regulating the electrical power supplied to the electrical load during the Discharging Mode.

Ion-Concentration Control Subsystem within the Metal-Fuel Card Discharging Subsystem In order to achieve high-energy efficiency during the Discharging Mode, it is necessary to maintain an optimal concentration of (charge-carrying) ions at the cathode-electrolyte interface of each discharging head within the Metal-Fuel card Discharging Subsystem 115. Thus it is the primary function of the ion-concentration control subsystem to sense and modify conditions within the FCB system so that the ion-concentration at the cathode-electrolyte interface within the discharging head is maintained within an optimal range during the Discharge Mode of operation.

In the case where the ionically-conducting medium between the cathode and anode of each track in the discharging head is an electrolyte containing potassium hydroxide (KOH), it will be desirable to maintain its concentration at 6N (–6M) during the Discharging Mode of operation. As the moisture level or relative humidity (RH%) within the cathode structure can significantly affect the concentration of KOH in the electrolyte, it is desirable to regulate the relative humidity at the cathode-electrolyte-anode interface within each discharging head. In the illustrative embodiment, ion-concentration control is achieved in a variety of ways by embedding a miniature solid-state humidity (or moisture) sensor 142 within the cathode support structure (or as close as possible to the anode-cathode interfaces) in order to sense moisture conditions and produce a digital data signal indicative thereof. This digital data signal is supplied to the Data Capture and Processing Subsystem 295 for detection and analysis. In the event that the moisture level drops below the predetermined threshold value set in memory (ROM) within the system controller 130, the system controller automatically generate a control signal supplied to a moisturizing element 143 realizable as a micro-sprinkler structure 143 embodied within the walls of the cathode support structure 121. In the illustrative embodiment, the walls function as water carrying conduits which express water droplets out of holes 144 adjacent the particular cathode elements when water-flow valve 147 and pump 145 are activated by the system controller 130. Under such conditions, water is pumped from reservoir 146 through manifold 148 along conduit 149 and is expressed from holes 144 adjacent the cathode element requiring an increase in moisture level, as sensed by moisture sensor 142. Such moisture-level sensing and control operations ensure that the concentration of KOH within the electrolyte within electrolyte-impregnated strips 155A through 155E is optimally maintained for ion transport and thus power generation.

Discharge Head Temperature Control Subsystem within the Metal-Fuel Card Discharging Subsystem As shown in FIGS. 5A3, 5A4, and 5A7, the discharge head temperature control subsystem incorporated within the Metal-Fuel Card Discharging Subsystem 115 of the fourth illustrative embodiment comprises a number of subcomponents, namely: the system controller 130; solid-state temperature sensors (e.g. thermistors) 290 embedded within each channel of the multi-cathode support structure hereof, as shown in FIG. 2A7; and discharge head cooling device 291, responsive to control signals produced by the system controller 130, for lowering the temperature of each discharging channel to within an optimal temperature range during discharging operations. The discharge head cooling device 291 can be realized using a wide variety of heat-exchanging techniques, including forced-air cooling, water-cooling, and/or refrigerant cooling, each well known in the heat exchanging art. In some embodiments of the present invention, where high levels of electrical power are being generated, it may be desirable to provide a jacket-like structure about each discharge head in order to circulate air, water or refrigerant for temperature control purposes.

Data Capture and Processing Subsystem within the Metal-Fuel Tape Discharging Subsystem In the illustrative embodiment of FIG. 4, Data Capture And Processing Subsystem (DCPS) 295 shown in FIGS. 5A3 and 5A4 carries out a number of functions, including, for example: (1) identifying each metal-fuel card immediately before it is loaded within a particular discharging head within the discharging head assembly and producing metal-fuel card identification data representative thereof; (2) sensing (i.e. detecting) various "discharge parameters" within the Metal-Fuel Card Discharging Subsystem existing during the time period that the identified metal-fuel card is loaded within the discharging head assembly thereof; (3) computing one or more parameters, estimates or measures indicative of the amount of metal-oxide produced during card discharging operations, and producing "metal-oxide indicative data" representative of such computed parameters, estimates and/or measures; and (4) recording in the Metal-Fuel Database Management Subsystem 293 (accessible by system controller 130), sensed discharge parameter data as well as computed metal-oxide indicative data both correlated to its respective metal-fuel track/card identified during the Discharging Mode of operation. As will become apparent hereinafter, such recorded information maintained within the Metal-Fuel Database Management Subsystem 293 by Data Capture and Processing Subsystem 295 can be used by the system controller 130 in various ways including, for example: optimally discharging (i.e. producing electrical power from) partially or completely oxidized metal-fuel cards in an efficient manner during the Discharging Mode of operation; and optimally recharging partially or completely oxidized metal-fuel cards in a rapid manner during the Recharging Mode of operation.

During discharging operations, the Data Capture and Processing Subsystem 295 automatically samples (or captures) data signals representative of "discharge parameters" associated with the various subsystems constituting the Metal-Fuel Card Discharging Subsystem 115 described above. These sampled values are encoded as information within the data signals produced by such subsystems during the Discharging Mode. In accordance with the principles of the present invention, card-type "discharge parameters" shall include, but are not limited to: the voltages produced across the cathode and anode structures along particular metal-fuel tracks monitored, for example, by the cathode-electrolyte voltage monitoring subsystem 133; the electrical currents flowing across the cathode and anode structures along particular metal-fuel tracks monitored, for example, by the cathode-electrolyte current monitoring subsystem 134; the oxygen saturation level ($pO_2$) within the cathode structure of each discharging head 124, monitored by the cathode oxygen pressure control subsystem (130, 135, 136, 137, 138, 140); the moisture ($H_2O$) level (or relative humidity) level across or near the cathode-electrolyte interface along particular metal-fuel tracks in particular discharging heads monitored, for example, by the ion-concentration control subsystem (130,142, 145, 146, 147, 148, 149); the temperature (T) of the discharging heads during card discharging operations; and the time duration ($\Delta t$) of the state of any of the above-identified discharge parameters.

In general, there a number of different ways in which the Data Capture and Processing Subsystem can record card-type "discharge parameters" during the Discharging Mode of operation. These different methods will be detailed hereinbelow.

According to a first method of data recording shown in FIG. 5A9, a unique card identifying code or indicia 171 (e.g. miniature bar code symbol encoded with zone identifying information) is graphically printed on an "optical" data track 172 realized, for example, as a strip of transparent of reflective film material affixed or otherwise attached along the edge of the metal-fuel card, as shown in FIG. 5A9. This optical data track 172, with its card identifying code recorded therein by printing or photographic techniques, can be formed at the time of manufacture of the multi-track metal-fuel card hereof. The metal-fuel card identifying indicia 171 along the edge of the card is then read by an optical data reader 150 realized using optical techniques (e.g. laser scanning bar code symbol readers, or optical decoders). In the illustrative embodiment, information representative of these unique card identifying codes is encoded within data signals provided to the Data Capture and Processing Subsystem 295, and subsequently recorded within the Metal-Fuel Database Management Subsystem 293 during discharging operations.

According to a second method of data recording shown in FIG. 5A9', a unique digital "card identifying" code 171' is magnetically recorded in a magnetic data track 172' disposed along the edge of the metal-fuel card 112'. This magnetic data track, with card identifying code recorded therein, can be formed at the time of manufacture of the multi-track metal-fuel card hereof. The card identifying indicia along the edge of the card is then read by a magnetic reading head 150' realized using magnetic information reading techniques well known in the art. In the illustrative embodiment, the digital data representative of these unique card identifying codes is encoded within data signals provided to the Data Capture and Processing Subsystem 295, and subsequently recorded within the Metal-Fuel Database Management Subsystem 293 during discharging operations.

According to a third method of data recording shown in FIG. 5A9", a unique digital "card identifying" code is recorded as a sequence of light transmission apertures 171" formed in an optically opaque data track 172" disposed along the edge the metal-fuel card 112". In this aperturing technique, information is encoded in the form of light transmission apertures whose relative spacing and/or width is the means by which information encoding is achieved. This optical data track, with card identifying codes recorded therein, can be formed at the time of manufacture of the multi-track metal-fuel card hereof. The zone identifying indicia 171" along the edge of the card is then read by an optical sensing head 150" realized using optical sensing techniques well known in the art. In the illustrative embodiment, the digital data representative of these unique zone identifying codes is encoded within data signals provided to the Data Capture and Processing Subsystem 295, and subsequently recorded within the Metal-Fuel Database Management Subsystem 293 during discharging operations.

According to a fourth alternative method of data recording, both unique digital "card identifying" code and set of discharge parameters for each track on the identified metal-fuel card are recorded in a magnetic, optical, or apertured data track, realized as a strip attached to the surface of the metal-fuel card of the present invention. The block of information pertaining to a particular metal-fuel card can be recorded in the data track physically adjacent the related metal-fuel zone facilitating easily access of such recorded information during the Recharging Mode of operation. Typically, the block of information will include the metal-fuel card identification number and a set of discharge parameters, as schematically indicated in FIG. 5A15, which are automatically detected by the Data Capture and Processing Subsystem 295 as the metal-fuel card is loaded within the discharging head assembly 124.

The first and second data recording methods described above have several advantages over the third method described above. In particular, when using the first and second methods, the data track provided along the metal-fuel card can have a very low information capacity. This is because very little information needs to be recorded to tag each metal-fuel card with a unique identifier (i.e. address number or card identification number), to which sensed discharge parameters are recorded in the Metal-Fuel Database Management Subsystem 293. Also, formation of a data track in accordance with the first and second methods should be very inexpensive, as well as providing apparatus for reading card identifying information recorded along such data tracks.

Discharging Power Regulation Subsystem within the Metal-Fuel Card Discharging Subsystem As shown in FIGS. 5A3 and 5A4, the input port of the discharging power regulation subsystem 151 is operably connected to the output port of the cathode-electrolyte output terminal configuration subsystem 132, whereas the output port of the discharging power regulation subsystem 151 is operably connected to the input port of the electrical load 116. While the primary function of the discharging power regulation subsystem is to regulate the electrical power delivered the electrical load during its Discharging Mode of operation (i.e. produced from discharged metal-fuel cards loaded within the discharging heads hereof), the discharging power regulation subsystem 151 has a mode of programmed operation, wherein the output voltage across the electrical load as well as the electrical current flowing across the cathode-electrolyte interface are regulated during discharging operations. Such control functions are managed by the system controller 130 and can be programmably selected in a variety of ways in order to achieve optimal discharging of multi-tracked and single-tracked metal-fuel card according to the present invention while satisfying dynamic loading requirements.

The discharging power regulating subsystem 151 of the third illustrative embodiment can be realized using solid-state power, voltage and current control circuitry well known in the power, voltage and current control arts. Such circuitry can include electrically-programmable power switching circuits using transistor-controlled technology, in which a current-controlled source is connectable in electrical series with electrical load 116 in order to control the electrical current therethrough in response to control signals produced by the system controller 130 carrying out a particular Discharging Power Control Method. Such electrically-programmable power switching circuits can also include transistor-controlled technology, in which a voltage-controlled source is connectable in electrical parallel with the electrical load in order to control the output voltage therethrough in response to control signals produced by the system controller 130. Such circuitry can be combined and controlled by the system controller 130 in order to provide constant power control across the electrical load.

In the illustrative embodiments of the present invention, the primary function of the discharging power regulation subsystem 151 is to carry out real-time power regulation to the electrical load using any one of the following Discharge Power Control Methods, namely: (1) a Constant Output Voltage/Variable Output Current Method, wherein the output voltage across the electrical load is maintained constant while the current is permitted to vary in response to loading conditions; (2) a Constant Output Current/Variable Output Voltage Method, wherein the current into the electrical load is maintained constant while the output voltage thereacross is permitted to vary in response to loading conditions; (3) a Constant Output Voltage/Constant Output Current Method, wherein the voltage across and current into the load are both maintained constant in response to loading conditions; (4) a Constant Output Power Method, wherein the output power across the electrical load is maintained constant in response to loading conditions; (5) a Pulsed Output Power Method, wherein the output power across the electrical load is pulsed with the duty cycle of each power pulse being maintained in accordance with preset conditions; (6) a Constant Output Voltage/Pulsed Output Current Method, wherein the output current into the electrical load is maintained constant while the current into the load is pulsed with a particular duty cycle; and (7) a Pulsed Output Voltage/Constant Output Current Method, wherein the output power into the load is pulsed while the current thereinto is maintained constant.

In the preferred embodiment of the present invention, each of the seven (7) Discharging Power Regulation Methods are preprogrammed into ROM associated with the system controller 130. Such power regulation methods can be selected in a variety of different ways, including, for example, by manually activating a switch or button on the system housing, by automatically detection of a physical, electrical, magnetic or optical condition established or detected at the interface between the electrical load and the Metal-Fuel Card Discharging Subsystem 115

Input/Output Control Subsystem within the Metal-Fuel Card Discharging Subsystem

In some applications, it may be desirable or necessary to combine two or more FCB systems or their Metal-Fuel Card Discharging Subsystems 115 in order to form a resultant system with functionalities not provided by the such subsystems operating alone. Contemplating such applications, the Metal-Fuel Card Discharging Subsystem 115 hereof includes Input/Output Control Subsystem 152 which allows an external system (e.g. microcomputer or microcontroller) to override and control aspects of the Metal-Fuel Card Discharging Subsystem as if its system controller were carrying out such control functions. In the illustrative embodiment, the Input/Output Control Subsystem 152 is realized as a standard IEEE I/O bus architecture which provides an external or remote computer system with a way and means of directly interfacing with the system controller 130 of the Metal-Fuel Card Discharging Subsystem 115 and managing various aspects of system and subsystem operation in a straightforward manner.

System Controller within the Metal-Fuel Card Discharging Subsystem

As illustrated in the detailed description set forth above, the system controller 130 performs numerous operations in order to carry out the diverse functions of the FCB system within its Discharging Mode. In the preferred embodiment of the FCB system of FIG. 4, the system controller 130 is realized using a programmed microcontroller having program and data storage memory (e.g. ROM, EPROM, RAM and the like) and a system bus structure well known in the microcomputing and control arts. In any particular embodiment of the present invention, it is understood that two or more microcontrollers may be combined in order to carry out the diverse set of functions performed by the FCB system hereof. All such embodiments are contemplated embodiments of the system of the present invention.

Discharging Metal-Fuel Cards within the Metal-Fuel Card Discharging Subsystem

FIG. 5A5 sets forth a high-level flow chart describing the basic steps of discharging metal-fuel cards (i.e. generating electrical power therefrom) using the Metal-Fuel Card Discharging Subsystem shown in FIGS. 5A3 through 5A4.

As indicated at Block A, the Card Loading/Unloading Subsystem 111 transports up to four metal-fuel cards 112 from the card receiving port of the system housing into the card discharging bay of the Metal-Fuel Card Discharging Subsystem. This card transport process is schematically illustrated in FIGS. 5A1 and 5A2. FIG. 5A3 illustrates the state of the subsystem when the metal-fuel cards are loaded within the discharging bay thereof.

As indicated at Block B, the Discharge Head Transport Subsystem 131 arranges the discharging heads about the metal-fuel cards loaded into the discharging bay of the Metal-Fuel Card Discharging Subsystem so that the ionically-conducting medium is disposed between each cathode structure and loaded metal-fuel card.

As indicated at Block C, the Discharge Head Transport Subsystem 131 then configures each discharging head so that its cathode structure is in ionic contact with a loaded metal-fuel card and its anode contacting structure is in electrical contact therewith, as indicated in FIG. 5A4.

As indicated at Block D, the cathode-electrolyte output terminal configuration subsystem 132 automatically configures the output terminals of each discharging head arranged about a loaded metal-fuel card, and then the system controller controls the Metal-Fuel Card Discharging Subsystem so that electrical power is generated and supplied to the electrical load 116 at the required output voltage and current levels. When one or more of the loaded metal-fuel cards are discharged, then the Card Loading/Unloading Subsystem 111 automatically ejects the discharged metal-fuel cards out through the discharging bay for replacement with recharged metal-fuel cards.

Metal-Fuel Card Recharging Subsystem for the Fourth Illustrative Embodiment of the Metal-Air FCB System of the Present Invention As shown in FIGS. 5B3 and 5B4, the Metal-Fuel Card Recharging Subsystem 117 of the first illustrative embodiment comprises a number of subsystems, namely: an assembly of multi-zoned metal-oxide reducing (i.e. recharging) heads 175, each having multi-element cathode structures 121' and anode-contacting structures 124' with electrically-conductive input terminals connectable in a manner to be described hereinbelow; a recharging head transport subsystem 131' for transporting the subcomponents of the recharging head assembly 175 to and from loaded metal-fuel cards; an input power supply subsystem 176 for converting externally supplied AC power signals applied to its input terminal 177 into DC power supply signals having voltages suitable for recharging metal-fuel cards arranged about the recharging heads of the Metal-Fuel Card Recharging Subsystem; a cathode-electrolyte input terminal configuration subsystem 178, for connecting the output terminals (port) of the input power supply subsystem to the input terminals (port) of the cathode and anode-contacting structures of the recharging heads 175, under the control of the system controller 130' so as to supply input voltages thereto for electro-chemically converting metal-oxide formations into its primary metal during the Recharging Mode; a cathode-electrolyte voltage monitoring subsystem 133', connected to the cathode-electrolyte input terminal configuration subsystem 178, for monitoring (i.e. sampling) the voltage applied across cathode and anode of each recharging head 175, and producing (digital) data representative of the sensed voltage level; a cathode-electrolyte current monitoring subsystem 134', connected to the cathode-electrolyte input terminal configuration subsystem 178, for monitoring (e.g. sampling) the current flowing across the cathode-electrolyte interface of each recharging head during the Recharging Mode, and producing digital data representative of the sensed current level; a cathode oxygen pressure control subsystem comprising the system controller 130', solid-state $pO_2$ sensors 135', vacuum chamber (structure) 136' shown in FIGS. 5B7 and 5B8, vacuum pump 137', airflow control device 138', manifold structure 139', and multi-lumen tubing 140' shown in FIGS. 5B3 and 5B4, arranged together as shown for sensing and controlling the $pO_2$ level within the cathode structure of each recharging head; an ion-concentration control subsystem comprising system controller 130', solid-state moisture sensor (hydrometer) 142', moisturizing (e.g. micro-sprinklering element) 143' realized as a micro-sprinkler embodied within the walls structures of the cathode support plate 121' (having water expressing holes 144' disposed along each wall surface as shown in FIG. 5B6), a water pump 145', a water reservoir 146', an electronically-controlled water flow control valve 147', a manifold structure 148' and conduits 149' extending into moisture delivery structure 143', arranged together as shown for sensing and modifying conditions within the FCB system (e.g. the relative humidity at the cathode-electrolyte interface of the recharging heads) so that the ion-concentration at the cathode-electrolyte interface is maintained within an optimal range during the Recharge Mode of operation; recharge head temperature control subsystem comprising the system controller 130', solid-state temperature sensors (e.g. thermistors) 290' embedded within each channel of the multi-cathode support structure 121' hereof, and a recharge head cooling device 291', responsive to control signals produced by the system controller 130', for lowering the temperature of each recharging channel to within an optimal temperature range during recharging operations; a relational-type Metal-Fuel Database Management Subsystem (MFDMS) 297 operably connected to system controller 130' by way of local system bus 298, and designed for receiving particular types of information derived from the output of various subsystems within the Metal-Fuel Tape Recharging Subsystem 115; a Data Capture and Processing Subsystem (DCPS) 299, comprising data reading head 180 (180', 180") embedded within or mounted closely to the cathode support structure of each recharging head 175, and a programmed microprocessor-based data processor adapted to receive data signals produced from cathode-electrolyte voltage monitoring subsystem 133', cathode-electrolyte current monitoring subsystem 134', the cathode oxygen pressure control subsystem, the recharge head temperature control subsystem and the ion-concentration control subsystem hereof, and enable (i) the reading metal-fuel card identification data from the loaded metal-fuel card, (ii) the recording sensed recharge parameters and computed metal-fuel indicative data derived therefrom in the Metal-Fuel Database Management Subsystem (MFDMS) 297 using local system bus 300, and (iii) the reading prerecorded discharge parameters and prerecorded metal-oxide indicative data stored in the Metal-Fuel Database Management Subsystem (MFDMS) 297 using local system bus 298; an input (i.e. recharging) power regulation subsystem 181 connected between the output terminals (i.e. port) of the input power supply subsystem 176 and the input terminal (i.e. port) of the cathode-electrolyte input terminal configuration subsystem 178, for regulating the input power (and voltage and/or current characteristics) delivered across the cathode and anode structures of each metal-fuel track being recharged during the Recharging Mode; an input/output control subsystem 152', interfaced with the system controller 130', for controlling all functionalities of the FCB system by way of a remote system or resultant system, within which the FCB system is embedded; and system controller 130', interfaced with system controller 130' within the Metal-Fuel Card Recharging Subsystem 117 by way of a global system bus 303 as shown in FIG. 5B16, and having various means for managing the operation of the above mentioned subsystems during the various modes of system operation. These subsystems will be described in greater technical detail below.

Multi-Track Recharging Head Assembly within the Metal-Fuel Card Recharging Subsystem The function of the assembly of multi-track recharging heads 175 is to electro-chemically reduced metal-oxide formations on the tracks of metal-fuel cards loaded into the recharging bay of the system during the Recharging Mode of operation. In the illustrative embodiment shown in FIG. 5B7 and 5B8, each recharging head 175 comprises: a cathode element support plate 121' having a plurality of isolated channels 154A' through 154E' permitting the free passage of oxygen (O2) through the bottom portion of each such channel; a plurality of electrically-conductive cathode elements (e.g. strips) 120A' through 120E' for insertion within the lower portion of these channels, respectively; a plurality of electrolyte-impregnated strips 155A' through 155E' for placement over the cathode strips 36, and support within the channels 154A' through 154E', respectively, as shown in FIG. 5B6; and an oxygen-evacuation chamber 136' mounted over the upper (back) surface of the cathode element support plate 121', in a sealed manner, as shown in FIG. 5B7.

As shown in FIGS. 5B3, 5B4 and 5B14, each oxygen-evacuation chamber 136' has a plurality of subchambers 136A' through 136E' being physically associated with channels 154A' through 154E', respectively. Together, each vacuum subchamber is isolated from all other subchambers and is in fluid communication with one channel supporting a cathode element and electrolyte-impregnated element therein. As shown in FIGS. 5B3 , 5B4 and 5B8, each subchamber is arranged in fluid communication with vacuum pump 137' via one lumen of multi-lumen tubing 140', one channel of manifold assembly 139' and one channel of air-flow switch 138', each of whose operation is controlled by system controller 130' . This arrangement enables the system controller 130' to independently control the pO2 level in each of the oxygen-evacuation subchambers 136A' through 136E' within an optimal range during recharging operations within the recharging head assembly. This operation is carried out by selectively evacuating air from the subchambers through the corresponding air flow channels in the manifold assembly 139'. This arrangement allows the system controller 130' to maintain the $pO_2$ level within an optimal range during recharging operations.

In the illustrative embodiment, electrolyte-impregnated strips 155A' within the discharging head assembly through 155E' are realized by impregnating an electrolyte-absorbing carrier medium with a gel-type electrolyte. Preferably, the electrolyte-absorbing carrier strip is realized as a strip of low-density, open-cell foam material made from PET plastic. The gel-electrolyte for each discharging cell is made from a formula consisting of an alkali solution (e.g. KOH), a gelatin material, water, and additives known in the art.

In the illustrative embodiment, each cathode strip is made from a sheet of nickel wire mesh 156' coated with porous carbon material and granulated platinum or other catalysts 157' to form a cathode suitable for use in the recharging heads in metal-air FCB system. Details of cathode construction are disclosed in U.S. Pat. Nos. 4,894,296 and 4,129,633, incorporated herein by reference. To form a current collection pathway, an electrical conductor 158' is soldered to the underlying wire mesh sheet 156' of each cathode strip. As shown in FIG. 5B7, each electrical conductor 158' is passed through a hole 159' formed in the bottom surface of each channel 154A1 through 154E' of the cathode support plate 121', and is connected to the input terminals of the cathode-electrolyte input terminal configuration subsystem 178. As shown, the cathode strip pressed into the lower portion of the channel to secure the same therein. As shown in FIG. 5B7, the bottom surface of each channel has numerous perforations 160' formed therein to allow the evacuation of oxygen away from the cathode-electrolyte interface, and out towards the vacuum pump 137' during recharging operations. In the illustrative embodiment, an electrolyte-impregnated strips 155A' through 155E' are placed over cathode strips 120A' through 120E', respectively, and are secured within the upper portions of the corresponding cathode supporting channels. As best shown in FIGS. 5B13 and 5B14, when the cathode strips and thin electrolyte strips are mounted in their respective channels in the cathode support plate 121', the outer surface of each electrolyte-impregnated strip is disposed flush with the upper surface of the plate defining the channels.

Hydrophobic agents are added to the carbon material constituting the oxygen-pervious cathode elements in order to repel water therefrom. Also, the interior surfaces of the cathode support channels are coated with a hydrophobic film (e.g. PTFE) 161 to ensure the expulsion of water within electrolyte-impregnated strips 155 A' through 155 E' and thus achieve optimum oxygen transport across the cathode strips during the Recharging Mode. Preferably, the cathode support plate 121' is made from an electrically non-conductive material, such as polyvinyl chloride (PVC) plastic material well known in the art. The cathode support plate 121' and evacuation chamber 136' can be fabricated using injection molding technology also well known in the art.

In order to sense the partial oxygen pressure ($pO_2$) within the cathode structure during the Recharging Mode, for use in effective control of metal-oxide reduction within the recharging heads, a solid-state $pO_2$ sensor 135' is embedded within each channel of the cathode support plate 121', as illustrated in FIG. 5B7, and operably connected to the system controller as an information input devices thereto. In the illustrative embodiment, each $pO_2$ sensor can be realized using well-known $pO_2$ sensing technology employed to measure (in vivo) $pO_2$ levels in the blood of humans. Such prior art sensors employ miniature diodes which emit electromagnetic radiation at different wavelengths that are absorbed at different levels in the presence of oxygen in the blood, and such information can be processed and analyzed to produce a computed measure of pO2 in a reliable manner, as taught in U.S. Pat. No. 5,190,038 and references cited therein, each being incorporated herein by reference. In the present invention, the characteristic wavelengths of the light emitting diodes can be selected so that similar sensing functions are carried out within the structure of the cathode in each recharging head, in a straightforward manner.

FIG. 5B9 shows a section of multi-tracked fuel card 112 which has undergone partial discharge and thus has metal-oxide formations along the metal-fuel tracks thereof. Notably, this partially-discharged metal-fuel card shown in FIGS. 5A9 and described above requires recharging within the Metal-Fuel Card Recharging Subsystem 117 of the FCB system of FIG. 4.

In FIG. 5B10, an exemplary metal-fuel (anode) contacting structure 122' is disclosed for use with the cathode structure shown in FIGS. 5B7 and 5B8. As shown, a plurality of electrically conductive elements 168A' through 168E' are supported from an platform 169' disposed adjacent the travel of the fuel card within the card. Each conductive element 168A' through 168 E' has a smooth surface adapted for slidable engagement with one track of metal-fuel through the fine grooves formed in the base layer of the fuel card. Each conductive element is connected to an electrical conductor which is connected to the output port of the cathode-electrolyte input terminal configuration subsystem 178. The platform 169' is operably associated with the recharging head transport subsystem 131' and can be designed to be moved into position with the metal-fuel card during the Recharging Mode of the system, under the control of the system controller 130'.

Notably, the use of multiple recharging heads 175, as shown in the illustrative embodiments hereof, rather than a single recharging head, allows discharged metal-fuel cards to be recharged more quickly using lower recharging currents, thereby minimizing heat build-up across the individual recharging heads. This feature of the Metal-Fuel Card Recharging Subsystem 117 extends the service life of the cathodes employed within the recharging heads thereof.

Recharging Head Transport Subsystem within the Metal-Fuel Card Recharging Subsystem The primary function of the recharging head transport subsystem 131' is to transport the assembly of recharging heads 175 to and from the metal-fuel cards 112 loaded into the recharging bay of the subsystem as shown in FIGS. 5B3 and 5B4. When properly transported, the cathode and anode-contacting structures of the recharging heads are brought into "ionically-conductive" and "electrically-conductive" contact with the metal-fuel tracks of loaded metal-fuel card during the Recharging Mode.

The recharging head transport subsystem 131' can be realized using any one of a variety of electromechanical mechanisms capable of transporting the cathode supporting structure 121' and anode-contacting structure 124' of each recharging head away from the metal-fuel card 112, as shown in FIG. 5B3, and about the metal-fuel card as shown in FIG. 5B4. As shown, these transport mechanisms are operably connected to system controller 130' and controlled by the same in accordance with the system control program carried out thereby.

Input Power Supply Subsystem within the Metal-Fuel Card Recharging Subsystem

In the illustrative embodiment, the primary function of the Input Power Supply Subsystem 176 is to receive as input, standard alternating current (AC) electrical power (e.g. at 120 or 220 Volts) through an insulated power cord, and to convert such electrical power into regulated direct current (DC) electrical power at a regulated voltage required at the recharging heads 175 of the Metal-Fuel Card Recharging Subsystem 117 during the recharging mode of operation. For zinc anodes and carbon cathodes, the required "open-cell" voltage $v_{acr}$ across each anode-cathode structure during recharging is about 2.2–2.3 Volts in order to sustain electrochemical reduction. This subsystem can be realized in various ways using power conversion and regulation circuitry well known in the art.

Cathode-Anode Input Terminal Configuration Subsystem within the Metal-Fuel Card Recharging Subsystem As shown in FIGS. 5B3 and 5B4, the cathode-electrolyte input terminal configuration subsystem 178 is connected between the output terminals of the recharging power regulation subsystem 181 and the input terminals of the cathode-electrolyte pairs associated with multiple tracks of the recharging heads 175. The system controller 130' is operably connected to cathode-electrolyte input terminal configuration subsystem 178 in order to supply control signals thereto for carrying out its functions during the Recharge Mode of operation.

The function of the cathode-electrolyte input terminal configuration subsystem 178 is to automatically configure (in series or parallel) the input terminals of selected cathode-electrolyte pairs within the recharging heads of the Metal-Fuel Card Recharging Subsystem 117 so that the required input (recharging) voltage level is applied across cathode-electrolyte structures of metal-fuel tracks requiring recharging. In the illustrative embodiment of the present invention, the cathode-electrolyte input terminal configuration mechanism 178 can be realized as one or more electrically-programmable power switching circuits using transistor-controlled technology, wherein the cathode and anode-contacting elements within the recharging heads 175 are connected to the output terminals of the input power regulating subsystem 181. Such switching operations are carried out under the control of the system controller 130' so that the required output voltage produced by the input power regulating subsystem 181 is applied across the cathode-electrolyte structures of metal-fuel tracks requiring recharging.

Cathode-Anode Voltage Monitoring Subsystem within the Metal-Fuel Card Recharging Subsystem As shown in FIGS. 5B3 and 5B4, the cathode-electrolyte voltage monitoring subsystem 133' is operably connected to the cathode-electrolyte input terminal configuration subsystem 178 for sensing voltage levels across the cathode and anode structures connected thereto. This subsystem is also operably connected to the system controller 130' for receiving control signals therefrom required to carry out its functions. In the first illustrative embodiment, the cathode-electrolyte voltage monitoring subsystem 133' has two primary functions: to automatically sense the instantaneous voltage levels applied across the cathode-electrolyte structures associated with each metal-fuel track being transported through each recharging head during the Recharging Mode; and to produce (digital) data signals indicative of the sensed voltages for detection and analysis by the Data Capture and Processing Subsystem 299.

In the first illustrative embodiment of the present invention, the cathode-electrolyte voltage monitoring subsystem 133' can be realized using electronic circuitry adapted for sensing voltage levels applied across the cathode-electrolyte structures associated with each metal-fuel track transported through each recharging head within the Metal-Fuel Card Recharging Subsystem 117. In response to such detected voltage levels, the electronic circuitry can be designed to produce a digital data signals indicative of the sensed voltage levels for detection and analysis by the Data Capture and Processing Subsystem 299. As will be described in greater detail hereinafter, such data signals can be used by the system controller to carry out its recharging power regulation method during the Recharging Mode of operation.

Cathode-Anode Current Monitoring Subsystem within the Metal-Fuel Card Recharging Subsystem As shown in FIGS. 5B3 and 5B4, the cathode-electrolyte current monitoring subsystem 134' is operably connected to the cathode-electrolyte input terminal configuration subsystem 178. The cathode-electrolyte current monitoring subsystem 134' has two primary functions: to automatically sense the magnitude of electrical current flowing through the cathode-electrolyte pair of each metal-fuel track along each recharging head assembly within the Metal-Fuel Card Recharging Subsystem 117 during the discharging mode; and to produce digital data signal indicative of the sensed currents for detection and analysis by Data Capture and Processing Subsystem 299.

In the first illustrative embodiment of the present invention, the cathode-electrolyte current monitoring subsystem 134' can be realized using current sensing circuitry for sensing the electrical current passed through the cathode-electrolyte pair of each metal-fuel track (i.e. strip) along each recharging head assembly, and producing digital data signals indicative of the sensed current levels. As will be explained in greater detail hereinafter, these detected current levels can be used by the system controller in carrying out its recharging power regulation method, and well as creating a "recharging condition history" information file for each zone or subsection of recharged metal-fuel card.

Cathode Oxygen Pressure Control Subsystem within the Metal-Fuel Card Recharging Subsystem The function of the cathode oxygen pressure ($pO_2$) control subsystem is to sense the oxygen pressure ($pO_2$) within each subchannel of the cathode structure of the recharging heads 175, and in response thereto, control (i.e. increase or decrease) the same by regulating the air ($O_2$) pressure within the subchannels of such cathode structures. In accordance with the present invention, partial oxygen pressure ($pO_2$) within each subchannel of the cathode structure of each recharging head is maintained at an optimal level in order to allow optimal oxygen evacuation from the recharging heads during the Recharging Mode. By lowering the $pO_2$ level within each channel of the cathode structure (by evacuation), metal-oxide along metal-fuel cards can be completely recovered with optimal use of input power supplied to the recharging heads during the Recharging Mode. Also, by monitoring changes in $pO_2$ and producing digital data signals representative thereof for detection and analysis by Data Capture and Processing Subsystem 299 and ultimate response the system controller 130'. Thus the system controller 130' is provided with a controllable variable for use in regulating the electrical power supplied to the discharged fuel tracks during the Recharging Mode.

Ion-Concentration Control Subsystem within the Metal-Fuel Card Recharging Subsystem To achieve high-energy efficiency during the Recharging Mode, it is necessary to maintain an optimal concentration of (charge-carrying) ions at the cathode-electrolyte interface of each recharging head 175 within the Metal-Fuel Card Recharging Subsystem 117. Also, the optimal ion-concentration within the Metal-Fuel Card Recharging Subsystem 117 may be different than that required within the Metal-Fuel Card Discharging Subsystem 115. For this reason, in particular applications of the FCB system hereof, it may be desirable and/or necessary to provide a separate ion-concentration control subsystem within the Metal-Fuel Card Recharging Subsystem 117. The primary function of such an ion-concentration control subsystem within the Metal-Fuel Card Recharging Subsystem 117 would be to sense and modify conditions therewithin so that the ion-concentration at the cathode-electrolyte interface of the recharging heads is maintained within an optimal range during the Recharging Mode of operation.

In the illustrative embodiment of such a subsystem, ion-concentration control is achieved by embedding a miniature solid-state humidity (or moisture) sensor 142' within the cathode support structure 121' as shown in FIG. 5B7 (or as close as possible to the anode-cathode interfaces) in order to sense moisture or humidity conditions therein and produce a digital data signal indicative thereof. This digital data signal is supplied to the Data Capture and Processing Subsystem 299 for detection and analysis. In the event that the moisture level or relative humidity drops below the predetermined threshold value set in memory (ROM) within the system controller, the system controller 130', monitoring information in the Metal-Fuel Database Management Subsystem 297 automatically generates a control signal supplied to a moisturizing element, realizable as a micro-sprinkling structure 143' embodied within the walls of the cathode support structure 121'. In the illustrative embodiment, the walls function as water carrying conduits which express fine water droplets out of micro-sized holes 144 in a manner similar to that carried out in the cathode support structure 121 in the discharge heads. Thus the function of the pump 145', reservoir 146', flow-control valve 147', manifold 148' and multi-lumen tubing 149' is similar to pump 145, reservoir 146, flow-control valve 147, manifold 148 and multi-lumen tubing 149, respectively.

Such operations will increase the moisture level or relative humidity within the interior of the cathode support structure channels and thus ensure that the concentration of KOH within the electrolyte within electrolyte-impregnated strips supported therewithin is optimally maintained for ion transport and thus metal-oxide reduction during card recharging operations.

Data Capture and Processing Subsystem within the Metal-Fuel Tape Recharging Subsystem In the illustrative embodiment of FIG. 4, Data Capture And Processing Subsystem (DCPS) 299 shown in FIGS. 5B3 and 5B4 carries out a number of functions, including, for example: (1) identifying each metal-fuel card immediately before it is loaded within a particular recharging head within the recharging head assembly and producing metal-fuel card identification data representative thereof; (2) sensing (i.e. detecting) various "recharge parameters" within the Metal-Fuel Card Recharging Subsystem existing during the time period that the identified metal-fuel card is loaded within the recharging head assembly thereof; (3) computing one or more parameters, estimates or measures indicative of the amount of metal-fuel produced during card recharging operations, and producing "metal-fuel indicative data" representative of such computed parameters, estimates and/or measures; and (4) recording in the Metal-Fuel Database Management Subsystem 297 (accessible by system controller 130'), sensed recharge parameter data as well as computed metal-fuel indicative data both correlated to its respective metal-fuel track/card identified during the Recharging Mode of operation. As will become apparent hereinafter, such recorded information maintained within the Metal-Fuel Database Management Subsystem 297 by Data Capture and Processing Subsystem 299 can be used by the system controller 130' in various ways including, for example: optimally recharging partially or completely oxidized metal-fuel cards in a rapid manner during the Recharging Mode of operation.

During recharging operations, the Data Capture and Processing Subsystem 299 automatically samples (or captures) data signals representative of "recharge parameters" associated with the various subsystems constituting the Metal-Fuel Card Recharging Subsystem 117 described above. These sampled values are encoded as information within the data signals produced by such subsystems during the Recharging Mode. In accordance with the principles of the present invention, card-type "recharge parameters" shall include, but are not limited to: the voltages produced across the cathode and anode structures along particular metal-fuel tracks monitored, for example, by the cathode-electrolyte voltage monitoring subsystem 133'; the electrical currents flowing through the cathode and anode structures along particular metal-fuel tracks monitored, for example, by the cathode-electrolyte current monitoring subsystem 134'; the oxygen saturation level ($pO_2$) within the cathode structure of each recharging head 175, monitored by the cathode oxygen pressure control subsystem (130', 135', 136', 137', 138', 140'); the moisture ($H_2O$ ) level (or relative humidity) level across or near the cathode-electrolyte interface along particular metal-fuel tracks in particular recharging heads monitored, for example, by the ion-concentration control subsystem (130', 142', 145', 146', 147', 148', 149'); the temperature ($T_r$) of the recharging heads during card recharging operations; and the time duration ($\Delta t_r$) of the state of any of the above-identified recharge parameters.

In general, there a number of different ways in which the Data Capture and Processing Subsystem 299 can record card-type "recharge parameters" during the Recharging Mode of operation. These different methods will be detailed hereinbelow.

According to a first method of data recording shown in FIG. 5B9, card identifying code or indicia (e.g. miniature bar code symbol encoded with zone identifying information) 171 graphically printed on "optical" data track 172, can be read by optical data reader 180 realized using optical techniques (e.g. laser scanning bar code symbol readers, or optical decoders) well known in the art. In the illustrative embodiment, information representative of these unique card identifying codes is encoded within data signals provided to the Data Capture and Processing Subsystem 299, and subsequent recorded within the Metal-Fuel Database Management Subsystem 297 during recharging operations.

According to a second method of data recording shown in FIG. 5B9', digital "card identifying" code 171' magnetically recorded in a magnetic data track 172', can be read by magnetic reading head 180' realized using magnetic information reading techniques well known in the art. In the illustrative embodiment, the digital data representative of these unique card identifying codes is encoded within data signals provided to the Data Capture and Processing Subsystem 299, and subsequent recorded within the Metal-Fuel Database Management Subsystem 297 during recharging operations.

According to a third method of data recording shown in FIG. 5A9", digital "card identifying" code 171" (recorded as a sequence of light transmission apertures in an optically opaque data track 172"), can be read by an optical sensing head 180" realized using optical sensing techniques well known in the art. In the illustrative embodiment, the digital data representative of these unique zone identifying codes is encoded within data signals provided to the Data Capture and Processing Subsystem 299, and subsequent recorded within the Metal-Fuel Database Management Subsystem 297 during recharging operations.

According to a fourth alternative method of data recording, both unique digital "card identifying" code and set of recharge parameters for each track on the identified metal-fuel card are recorded in a magnetic, optical, or apertured data track, realized as a strip attached to the surface of the metal-fuel card of the present invention. The block of information pertaining to a particular metal-fuel card can be recorded in the data track physically adjacent the related metal-fuel zone facilitating easily access of such recorded information during the Recharging Mode of operation. Typically, the block of information will include the metal-fuel card identification number and a set of recharge parameters, as schematically indicated in FIG. 5B16, which are automatically detected by the Data Capture and Processing Subsystem 299 as the metal-fuel card is loaded within the recharging head assembly 175.

The first and second data recording methods described above have several advantages over the third method described above. In particular, when using the first and second methods, the data track provided along the metal-fuel card can have a very low information capacity. This is because very little information needs to be recorded to tag each metal fuel card with a unique identifier (i.e. address number or card identification number), to which sensed recharge parameters are recorded in the Metal-Fuel Database Management Subsystem 297. Also, formation of a data track in accordance with the first and second methods should be very inexpensive, as well as providing apparatus for reading card identifying information recorded along such data tracks.

Input/Output Control Subsystem within the Metal-Fuel Card Recharging Subsystem

In some applications, it may be desirable or necessary to combine two or more FCB systems or their Metal-Fuel Card Recharging Subsystems in order to form a resultant system with functionalities not provided by the such subsystems operating alone. Contemplating such applications, the Metal-Fuel Card Recharging Subsystem 117 hereof includes an Input/Output Control Subsystem 117 which allows an external system (e.g. microcomputer or microcontroller) to override and control aspects of the Metal-Fuel Card Recharging Subsystem as if its system controller 130' were carrying out such control functions. In the illustrative embodiment, the Input/Output Control Subsystem 152' is realized as a standard IEEE I/O bus architecture which provides an external or remote computer system with a way and means of directly interfacing with the system controller 130' of the Metal-Fuel Card Recharging Subsystem 117 and managing various aspects of system and subsystem operation in a straightforward manner.

Recharging Power Regulation Subsystem within the Metal-Fuel Card Recharging Subsystem As shown in FIGS. 5B3 and 5B4, the output port of the recharging power regulation subsystem 181 is operably connected to the input port of the cathode-electrolyte input terminal configuration subsystem 178, whereas the input port of the recharging power regulation subsystem 181 is operably connected to the output port of the input power supply 176. While the primary function of the recharging power regulation subsystem 181 is to regulate the electrical power supplied to metal-fuel card during the Recharging Mode of operation, the recharging power regulation subsystem 181 can also regulate the voltage applied across the cathode-electrolyte structures of the metal-fuel tracks, as well as the electrical currents flowing through the cathode-electrolyte interfaces thereof during recharging operations. Such control functions are managed by the system controller 130' and can be programmably selected in a variety of ways in order to achieve optimal recharging of multi-tracked and single-tracked metal-fuel cards according to the present invention.

The recharging power regulating subsystem 181 can be realized using solid-state power, voltage and current control circuitry well known in the power, voltage and current control arts. Such circuitry can include electrically-programmable power switching circuits using transistor-controlled technology, in which one or more current-controlled sources are connectable in electrical series with the cathode and anode structures in order to control the electrical currents therethrough in response to control signals produced by the system controller carrying out a particular Recharging Power Control Method. Such electrically-programmable power switching circuits can also include transistor-controlled technology, in which one or more voltage-controlled sources are connectable in electrical parallel with the cathode and anode structures in order to control the voltage thereacross in response to control signals produced by the system controller. Such circuitry can be combined and controlled by the system controller 130' in order to provide constant power (and/or voltage and/or current) control across the cathode-electrolyte structures of the metal-fuel card 112.

In the illustrative embodiments of the present invention, the primary function of the recharging power regulation subsystem 181 is to carry out real-time power regulation to the cathode/anode structures of metal-fuel card using any one of the following Recharge Power Control Methods, namely: (1) a Constant Input Voltage/Variable Input Current Method, wherein the input voltage applied across each cathode-electrolyte structure is maintained constant while the current therethrough is permitted to vary in response to loading conditions presented by metal-oxide formations on the recharging card; (2) a Constant Input Current/Variable Input Voltage Method, wherein the current into each cathode-electrolyte structure is maintained constant while the output voltage thereacross is permitted to vary in response to loading conditions; (3) a Constant Input Voltage/Constant Input Current Method, wherein the voltage applied across and current into each cathode-electrolyte structure during recharging are both maintained constant in response to loading conditions; (4) a Constant Input Power Method, wherein the input power applied across each cathode-electrolyte structure during recharging is maintained constant in response to loading conditions; (5) a Pulsed Input Power Method, wherein the input power applied across each cathode-electrolyte structure during recharging pulsed with the duty cycle of each power pulse being maintained in accordance with preset or dynamic conditions; (6) a Constant Input Voltage/Pulsed Input Current Method, wherein the input current into each cathode-electrolyte structure during recharging is maintained constant while the current into the cathode-electrolyte structure is pulsed with a particular duty cycle; and (7) a Pulsed Input Voltage/Constant Input Current Method, wherein the input power supplied to each cathode-electrolyte structure during recharging is pulsed while the current thereinto is maintained constant.

In the preferred embodiment of the present invention, each of the seven (7) Recharging Power Regulation Methods are preprogrammed into ROM associated with the system controller 130'. Such power regulation methods can be selected in a variety of different ways, including, for example, by manually activating a switch or button on the system housing, by automatically detection of a physical, electrical, magnetic and/or optical condition established or detected at the interface between the metal-fuel card device and the Metal-Fuel Card Recharging Subsystem 117.

System Controller within the Metal-Fuel Card Recharging Subsystem

As illustrated in the detailed description set forth above, the system controller 130' performs numerous operations in order to carry out the diverse functions of the FCB system within its Recharging Mode. In the preferred embodiment of the FCB system of FIG. 4, the subsystem used to realize the system controller 130' in the Metal-Fuel Card Recharging Subsystem 117 is the same subsystem used to realize the system controller 130 in the Metal-Fuel Card Discharging Subsystem 115. It is understood, however, the system controllers employed in the Discharging and Recharging Subsystems can be realized as separate subsystems, each employing one or more programmed microcontrollers in order to carry out the diverse set of functions performed by the FCB system hereof. In either case, the input/output control subsystem of one of these subsystems can be designed to be the primary input/output control subsystem, with which one or more external subsystems (e.g. a management subsystem) can be interfaced to enable external and/or remote management of the functions carried out within FCB system hereof.

Recharging Metal-Fuel Cards within the Metal-Fuel Card Recharging Subsystem

FIGS. 5B5 sets forth a high-level flow chart describing the basic steps of recharging metal-fuel cards within the Metal-Fuel Card Recharging Subsystem 117 shown in FIGS. 5B3 through 5B4.

As indicated at Block A, the Card Loading/Unloading Subsystem 111 transports four metal-fuel cards into the card recharging bays of the Metal-Fuel Card Recharging Subsystem 117.

As indicated at Block B, the Recharge Head Transport Subsystem 131' arranges the recharging heads about the metal-fuel cards loaded into the recharging bay of the Metal-Fuel Card Recharging Subsystem 117 so that the ionically-conducting medium is disposed between each cathode structure and loaded metal-fuel card.

As indicated at Block C, the Recharge Head Transport Subsystem 131' then configures each recharging head 175 so that its cathode structure is in ionic contact with a loaded metal-fuel card 112 and its anode contacting structure is in electrical contact therewith.

As indicated at Block D, the cathode-electrolyte input terminal configuration subsystem 178 automatically configures the input terminals of each recharging head arranged about a loaded metal-fuel card, and then the system controller controls the Metal-Fuel Card Recharging Subsystem 117 so that electrical power is supplied to the cathode-electrolyte structures of the recharging heads loaded with metal-fuel cards, at the required recharging voltages and currents. When one or more of the loaded metal-fuel cards are recharged, then the Card Loading/Unloading Subsystem 111 automatically ejects the recharged metal-fuel cards out through the recharging bay for replacement with discharged metal-fuel cards.

Managing Metal-Fuel Availability and Metal-Oxide Presence within the Fourth Illustrative Embodiment of the Metal-Air FCB System of the Present Invention During the Discharging Mode In the FCB system of the fourth illustrative embodiment shown in FIG. 4, means are provided for automatically managing the metal-fuel availability within the Metal-Fuel Card Discharging Subsystem 115 during discharging operations. Such system capabilities will be described in greater detail hereinbelow.

As shown in FIG. 5B17, data signals representative of discharge parameters (e.g., $i_{acd}$, $V_{acd}$, . . . , $pO_{2d}$, $H_2O_d$, $T_{acd}$, $v_{acr}/i_{acr}$) are automatically provided as input to the Data Capture and Processing Subsystem 295 within the Metal-Fuel Card Discharging Subsystem 115. After sampling and capturing, these data signals are processed and converted into corresponding data elements and then written into an information structure 301 as shown, for example, in FIG. 5A15. Each information structure 301 comprises a set of data elements which are "time-stamped" and related (i.e. linked) to a unique metal-fuel card identifier 171 (171', 171"), associated with a particular metal-fuel card. The unique metal-fuel card identifier is determined by data reading head 150 (150', 150") shown in FIG. 5A6. Each time-stamped information structure is then recorded within the Metal-Fuel Database Management Subsystem 293 within the Metal-Fuel Card Discharging Subsystem 115, for maintenance, subsequent processing and/or access during future recharging and/or discharging operations.

As mentioned hereinabove, various types of information are sampled and collected by the Data Capture and Processing Subsystem 295 during the discharging mode. Such information types include, for example: (1) the amount of electrical current ($i_{acd}$) discharged across particular cathode-electrolyte structures within particular discharge heads; (2) the voltage generated across each such cathode-electrolyte structure; (3) the oxygen concentration ($pO_{2d}$) level in each subchamber within each discharging head; (4) the moisture level ($H_2O_d$) near each cathode-electrolyte interface within each discharging head; and (5) the temperature ($T_{acd}$) within each channel of each discharging head. From such collected information, the Data Capture and Processing Subsystem 295 can readily compute (i) the time ($\Delta t_d$) duration that electrical current was discharged across a particular cathode-electrolyte structure within a particular discharge head.

The information structures produced by the Data Capture and Processing Subsystem 295 are stored within the Metal-Fuel Database Management Subsystem 293 on a real-time basis and can be used in a variety of ways during discharging operations. For example, the above-described current ($i_{acd}$) and time ($\Delta t_d$) information is conventionally measured in Amperes and Hours, respectively. The product of these measures, denoted by "AH", provides an approximate measure of the electrical charge (−Q) that has been "discharged" from the metal-air fuel cell battery structures along the metal-fuel card. Thus the computed "AH" product provides an accurate amount of metal-oxide that one can expect to have been formed on a particular track of an identified (i.e. labeled) metal-fuel card at a particular instant in time, during discharging operations.

When used with historical information about metal oxidation and reduction processes, the Metal-Fuel Database Management Subsystems 293 and 297 within the Metal-Fuel Card Discharging and Recharging Subsystems 115 and 117, respectively, can account for or determine how much metal-fuel (e.g. zinc) should be available for discharging (i.e. producing electrical power) from a particular zinc-fuel card, or how much metal-oxide is present for reducing therealong. Thus such information can be very useful in carrying out metal-fuel management functions including, for example, determination of metal-fuel amounts available along a particular metal-fuel zone.

In the illustrative embodiment, metal-fuel availability is managed within the Metal-Fuel Card Discharging Subsystem 115, using the method of metal-fuel availability management described hereinbelow.

Preferred Method of Metal-Fuel Availability Management during Discharging Operations In accordance with the principles of the present invention, the data reading head 150 (150', 150') automatically identifies each metal-fuel card as it is loaded within the discharging assembly and produces card identification data indicative thereof which is supplied to the Data Capture and Processing Subsystem within the Metal-Fuel Card Discharging Subsystem 115. Upon receiving card identification data on the loaded metal-fuel card, the Data Capture and Processing Subsystem automatically creates an information structure (i.e. data file) on the card, for storage within the Metal-Fuel Database Management Subsystem 293. The function of the information structure is to record current (up-to-date) information on sensed discharging parameters, the metal-fuel availability state, metal-oxide presence state, and the like, as shown in FIG. 5A15. In the event that an information storage structure has been previously created for this particular metal-fuel card within the Metal-Fuel Database Management Subsystem, this information file is accessed from Database Subsystem 293 for updating. As shown in FIG. 5A15, for each identified metal-fuel card, an information structure 285 is maintained for each metal-fuel track ($MFT_j$), at each sampled instant of time $t_i$.

Once an information structure has been created (or found) for a particular metal-fuel card, the initial state or condition of each metal-fuel track thereon must be determined and entered within the information structure maintained within the Metal-Fuel Database Management Subsystem 293. Typically, the metal-fuel card loaded within the discharging head assembly will be partially or fully charged, and thus containing a particular amount of metal-fuel along its tracks. For accurate metal-fuel management, these initial metal-fuel amounts in the loaded card must be determined and then information representative stored with the Metal-Fuel Database Management Subsystems of the Discharging and Recharging Subsystems 115 and 117, respectively. In general, initial states of information can be acquired in a number of different ways, including for example: by encoding such initialization information on the metal-fuel card prior to completing a discharging operation on a different FCB system; by prerecording such initialization information within the Metal-Fuel Database Management Subsystem 293 during the most recent discharging operation carried out in the same FCB system; by recording within the Metal-Fuel Database Management Subsystem 293 (at the factory), the actual (known) amount of metal-fuel present on each track of a particular type metal-fuel card, and automatically initializing such information within a particular information structure upon reading a code on the metal-fuel card using data reading head 150 (150', 150"); by actually measuring the initial amount of metal-fuel on each metal-fuel track using the metal-oxide sensing assembly described above in conjunction with the cathode-electrolyte output terminal configuration subsystem 132; or by any other suitable technique.

Prior to conducting discharging operations on the loaded fuel card, the actual measurement technique mentioned above can be carried out by configuring metal-oxide sensing drive circuitry (shown in FIG. 2A15) with the cathode-electrolyte output terminal configuration subsystem 132 and Data Capture and Processing Subsystem 295 within the Discharging Subsystem 115. Using this arrangement, the metal-oxide sensing heads can automatically acquire information on the "initial" state of each metal-fuel track on each identified metal-fuel card loaded within the discharging head assembly. Such information would include the initial amount of metal-oxide and metal-fuel present on each track at the time of loading, denoted by "$t_0$".

In a manner similar to that described in connection with the FCB system of FIG. 1, such metal-fuel/metal-oxide measurements are carried out on each metal-fuel track of the loaded card by automatically applying a test voltage across a particular track of metal fuel, and detecting the electrical which flows across the section of metal-fuel track in response the applied test voltage. The data signals representative of the applied voltage ($v_{applied}$) and response current ($i_{response}$) at a particular sampling period are automatically detected by the Data Capture and Processing Subsystem 295 and processed to produce a data element representative of the ratio of the applied test voltage to response current with appropriate numerical scaling. This data element is proportional to $V_{applied}/i_{response}$ automatically recorded within the information structure (i.e. file) linked to the identified metal-fuel card maintained in the Metal-Fuel Data Management Subsystem 293. As this data element (v/i) provides a direct measure of electrical resistance across the metal-fuel track under measurement, it can be accurately correlated to a measured amount of metal-oxide present on the identified metal-fuel track.

Data Capture and Processing Subsystem 295 then quantifies the measured initial metal-oxide amount (available at initial time instant $t_0$), and designates it as $MOA_0$ for recording within the information structure (shown in FIG. 5A15). Then using a priori information about the maximum metal-fuel available on each track when fully (re)charged, the Data Capture and Processing Subsystem 295 computes an accurate measure of metal-fuel available on each track at time "$t_0$", for each fuel track, designates each measures as $MFA_0$ and records these initial metal-fuel measures ($MFA_0$) for the identified fuel card within the Metal-Fuel Database Management Subsystems 293 and 297 of both the Metal-Fuel Card Discharging and Recharging Subsystems. While this initialization procedure is simple to carry out, it is understood that in some applications it may be more desirable to empirically determine these initial metal-fuel measures using theoretically-based computations premised on the metal-fuel cards having been subjected to a known course of treatment, for example: (1) momentarily subjecting the loaded fuel card to electrical-shorting conditions at the power output terminals of the FCB system; (2) automatically detecting the response characteristics thereof; and (3) correlating such detected response characteristics within a known initial state of oxidation stored in a Table as a function of shorting current; while maintaining all other (re)charging parameters constant (hereinafter referred to as the "Short-Circuit Resistance Test").

After the initialization procedure is completed, the Metal-Fuel Card Discharging Subsystem 115 is ready to carry out its metal-fuel management functions along the lines to be described hereinbelow. In the illustrative embodiment, this method involves two basic steps that are carried out in a cyclical manner during discharging operations.

The first step of the procedure involves subtracting from the initial metal-fuel amount $MFA_0$, the computed metal-oxide estimate $MOE_{0-1}$ which corresponds to the amount of metal-oxide produced during discharging operations conducted between time interval $t_0$–$t_1$. The during the discharging operation, metal-oxide estimate $MOE_{0-1}$ is computed using the following discharging parameters collected—electrical discharge current $i_{acd}$, and time duration $\Delta t_d$.

The second step of the procedure involves adding to the computed measure ($MFA_0$–$MOE_{0-1}$), the metal-fuel estimate $MFE_{0-1}$ which corresponds to the amount of metal-fuel produced during any recharging operations that may have been conducted between time interval $t_0$–$t_1$. Notably, metal-fuel estimate $MFE_{0-1}$ is computed using: electrical recharge current $i_{acr}$; and the time duration thereof $\Delta t_d$ during the discharging operation. Notably, this metal-fuel measure MFE0-1 will have been previously computed and recorded within the Metal-Fuel Database Management Subsystem 293 within the Metal-Fuel Card Recharging Subsystem 115 during the immediately previous recharging operation (if one such operation was carried out). Thus, in the illustrative embodiment, it will be necessary to read this prerecorded information element from the Database Subsystem 297 within the Recharging Subsystem 117 during current discharging operations.

The computed result of the above-described accounting procedure (i.e. $MFA_0$–$MOE_{0-1}$+$MFE_{0-1}$) is then posted within the Metal-Fuel Database Management Subsystem 293 within Metal-Fuel Card Discharging Subsystem 115 as the new current metal-fuel amount ($MFA_1$) which will be used in the next metal-fuel availability update procedure. During discharging operations, the above-described update procedure is carried out every $t_i$–$t_{1+1}$ seconds for each metal-fuel track that is being discharged.

Such information maintained on each metal-fuel track can be used in a variety of ways, for example: managing the availability of metal-fuel to meet the electrical power demands of the electrical load connected to the FCB system; as well as setting the discharging parameters in an optimal manner during discharging operations. The details pertaining to this metal-fuel management techniques will be described in greater detail hereinbelow.

Uses For Metal-Fuel Availability Management during the Discharging Mode of Operation During discharging operations, the computed estimates of metal-fuel present over any particular metal-fuel track at time $t_2$ (i.e. $M_{t1-t2}$), determined at the j-th discharging head, can be used to compute the availability of metal-fuel at the (j+1)th, (j+2)th, or (j+n)th discharging head downstream from the j-th discharging head. Using such computed measures, the system controller 130 within the Metal-Fuel Card Discharging Subsystem 115 can determine (i.e. anticipate) in real-time, which metal-fuel track along a metal-fuel card contains metal-fuel (e.g. zinc) in quantities sufficient to satisfy instantaneous electrical-loading conditions imposed upon the Metal-Fuel Card Discharging Subsystem 115 during the discharging operations, and selectively "switch-in" the metal-fuel track(s) along which metal-fuel is known to exist. Such track switching operations may involve the system controller 130 temporarily connecting the output terminals of the cathode-electrolyte structures thereof to the input terminals of the cathode-electrolyte output terminal configuration subsystem 132 so that tracks supporting metal-fuel content (e.g. deposits) are made readily available for producing electrical power required by the electrical load 116.

Another advantage derived from such metal-fuel management capabilities is that the system controller 130 within the Metal-Fuel Card Discharging Subsystem 115 can control discharge parameters during discharging operations using information collected and recorded within the Metal-Fuel Database Management Subsystems 293 and 297 during the immediately prior recharging and discharging operations.

Means for Controlling Discharging Parameters during the Discharging Mode Using Information Recorded during the Prior Modes of Operation In the FCB system of the fourth illustrative embodiment, the system controller 130 within the Metal-Fuel Card Discharging Subsystem 115 can automatically control discharge parameters using information collected during prior recharging and discharging operations and recorded within the Metal-Fuel Database Management Subsystems 293 and 297 of the FCB system of FIG. 4.

As shown in FIG. 5B16, the subsystem architecture and buses provided within and between the Discharging and Recharging Subsystems 115 and 117 enable system controller 130 within the Metal-Fuel Card Discharging Subsystem 115 to access and use information recorded within the Metal-Fuel Database Management Subsystem 297 within the Metal-Fuel Card Recharging Subsystem 117. Similarly, the subsystem architecture and buses provided within and between the Discharging and Recharging Subsystems 115 and 117 enable system controller 130' within the Metal-Fuel Card Recharging Subsystem 117 to access and use information recorded within the Metal-Fuel Database Management Subsystem 293 within the Metal-Fuel Card Discharging Subsystem 115. The advantages of such information file and sub-file sharing capabilities will be explained hereinbelow.

During the discharging operations, the system controller 130 can access various types of information stored within the Metal-Fuel Database Management Subsystems within the Discharging and Recharging Subsystems 115 and 117. One important information element will relate to the amount of metal-fuel currently available at each metal-fuel track along at a particular instant of time (i.e. $MFE_t$). Using this information, the system controller 130 can determine if there will be sufficient metal-fuel along a particular track to satisfy electrical power demands of the connected load 116. The metal-fuel along one or more or all of the fuel tracks along a metal-fuel card may be substantially consumed as a result of prior discharging operations, and not having been recharged since the last discharging operation. The system controller 130 can anticipate such metal-fuel conditions within the discharging heads. Depending on the metal-fuel condition of "upstream" fuel cards, the system controller 130 may respond as follows: (i) connect the cathode-electrolyte structures of metal-fuel "rich" tracks into the discharge power regulation subsystem 151 when high electrical loading conditions are detected at load 116, and connect cathode-electrolyte structures of metal-fuel "depleted" tracks into this subsystem when low loading conditions are detected at electrical load 116; (ii) increase the rate of oxygen being injected within the corresponding cathode support structures (i.e. by increasing the air pressure therewithin) when the metal-fuel is thinly present on identified metal-fuel tracks, and decrease the rate of oxygen being injected within the corresponding cathode support structures (i.e. by decreasing the air pressure therewithin) when the metal-fuel is thickly present on identified metal-fuel zones, in order to maintain power produced from the discharging heads; (iii) control the temperature of the discharging heads when the sensed temperature thereof exceeds predetermined thresholds; etc. It is understood that in alternative embodiments of the present invention, the system controller 130 may operate in different ways in response to the detected condition of particular tracks on an identified metal-fuel card.

During the Recharging Mode

In the FCB system of the fourth illustrative embodiment shown in FIG. 4, means are provided for automatically managing the metal-oxide presence within the Metal-Fuel Card Recharging Subsystem 117 during recharging operations. Such system capabilities will be described in greater detail hereinbelow.

As shown in FIG. 5B16, data signals representative of recharge parameters (e.g., $i_{acr}$, $v_{acr}$, . . . , $pO_{2r}$, $\{H_2O\}_r$, $T_r$, $v_{acr}/i_{acr}$) are automatically provided as input to the Data Capture and Processing Subsystem 299 within the Metal-Fuel Card Recharging Subsystem 117. After sampling and capturing, these data signals are processed and converted into corresponding data elements and then written into an information structure 302 as shown, for example, in FIG. 5B15. As in the case of discharge parameter collection, each information structure 302 for recharging parameters comprises a set of data elements which are "time-stamped" and related (i.e. linked) to a unique metal-fuel card identifier 171 (171', 171"), associated with the metal-fuel card being recharged. The unique metal-fuel card identifier is determined by data reading head 180 (180', 180") shown in FIG. 5B6. Each time-stamped information structure is then recorded within the Metal-Fuel Database Management Subsystem 297 of the Metal-Fuel Card Recharging Subsystem 117, shown in FIG. 5B16, for maintenance, subsequent processing and/or access during future recharging and/or discharging operations.

As mentioned hereinabove, various types of information are sampled and collected by the Data Capture and Processing Subsystem 299 during the recharging mode. Such information types include, for example: (1) the recharging voltage applied across each such cathode-electrolyte structure within each recharging head; (2) the amount of electrical current ($i_{acr}$) supplied across each cathode-electrolyte structures within each recharge head; (3) the oxygen concentration ($pO_{2r}$) level in each subchamber within each recharging head; (4) the moisture level ($\{H_2O\}_r$) near each cathode-electrolyte interface within each recharging head; and (5) the temperature ($T_{acr}$) within each channel of each recharging head. From such collected information, the Data Capture and Processing Subsystem 299 can readily compute various parameters of the system including, for example, the time duration ($\Delta t_r$) that electrical current ($i_r$) was supplied to a particular cathode-electrolyte structure within a particular recharging head.

The information structures produced and stored within the Metal-Fuel Database Management Subsystem 297 of the Metal-Fuel Card Recharging Subsystem 117 on a real-time basis can be used in a variety of ways during recharging operations.

For example, the above-described current ($i_{acr}$) and time duration ($\Delta t_r$) information acquired during the recharging mode is conventionally measured in Amperes and Hours, respectively. The product of these measures (AH) provides an accurate measure of the electrical charge (−Q) supplied to the metal-air fuel cell battery structures along the metal-fuel card during recharging operations. Thus the computed "AH" product provides an accurate amount of metal-fuel that one can expect to have been produced on the identified track of metal-fuel, at a particular instant in time, during recharging operations.

When used with historical information about metal oxidation and reduction processes, the Metal-Fuel Database Management Subsystems 293 and 297 within the Metal-Fuel Card Discharging and Recharging Subsystems 115 and 117 respectively can be used to account for or determine how much metal-oxide (e.g. zinc-oxide) should be present for recharging (i.e. conversion back into zinc from zinc-oxide) along the zinc-fuel card. Thus such information can be very useful in carrying out metal-fuel management functions including, for example, determination of metal-oxide amounts present along each metal-fuel track during recharging operations.

In the illustrative embodiment, metal-oxide presence may be managed within the Metal-Fuel Card Recharging Subsystem 7 using the method described hereinbelow.

Preferred Method of Metal-Oxide Presence Management during Recharging Operations In accordance with the principles of the present invention, the data reading head 180 (180', 180') automatically identifies each metal-fuel card as it is loaded within the recharging assembly 175 and produces card identification data indicative thereof which is supplied to the Data Capture and Processing Subsystem 299 within the Metal-Fuel Card Discharging Subsystem 117. Upon receiving card identification data on the loaded metal-fuel card, the Data Capture and Processing Subsystem 299 automatically creates an information structure (i.e. data file) on the card, for storage within the Metal-Fuel Database Management Subsystem 297. The function of the information structure is to record current (up-to-date) information on sensed recharging parameters, the metal-fuel availability state, metal-oxide presence state, and the like, as shown in FIG. 5B15. In the event that an information storage structure has been previously created for this particular metal-fuel card within the Metal-Fuel Database Management Subsystem, this information file is accessed from Database Management Subsystem 297 for updating. As shown in FIG. 5B15, for each identified metal-fuel card, an information structure 302 is maintained for each metal-fuel track ($MFT_j$), at each sampled instant of time $t_i$.

Once an information structure has been created (or found) for a particular metal-fuel card, the initial state or condition of each metal-fuel track thereon must be determined and entered within the information structure maintained within the Metal-Fuel Database Management Subsystem 297. Typically, the metal-fuel card loaded within the recharging head assembly 175 will be partially or fully discharged, and thus containing a particular amount of metal-oxide along its tracks for conversion back into its primary metal. For accurate metal-fuel management, these initial metal-oxide amounts in the loaded card(s) must be determined and then information representative stored with the Metal-Fuel Database Management Subsystems 293 and 297 of the Discharging and Recharging Subsystems 115 and 117, respectively. In general, initial states of information can be acquired in a number of different ways, including for example: by encoding such initialization information on the metal-fuel card prior to completing a discharging operation on a different FCB system; by prerecording such initialization information within the Metal-Fuel Database Management Subsystem 297 during the most recent recharging operation carried out in the same FCB system; by recording within the Metal-Fuel Database Management Subsystem 297 (at the factory), the amount of metal-oxide normally expected on each track of a particular type metal-fuel card, and automatically initializing such information within a particular information structure upon reading a code on the metal-fuel card using data reading head 180 (180', 180"); by actually measuring the initial amount of metal-oxide on each metal-fuel track using the metal-oxide sensing assembly described above in conjunction with the cathode-electrolyte input terminal configuration subsystem 178; or by any other suitable technique.

Prior to conducting recharging operations on the loaded fuel card(s), the "actual" measurement technique mentioned above can be carried out by configuring metal-oxide sensing ($v_{applied}/i_{response}$) drive circuitry (shown in FIG. 2A15) with the cathode-electrolyte input terminal configuration subsystem 178 and Data Capture and Processing Subsystem 299 within the Recharging Subsystem 117. Using this arrangement, the metal-oxide sensing heads can automatically acquire information on the "initial" state of each metal-fuel track on each identified metal-fuel card loaded within the recharging head assembly. Such information would include the initial amount of metal-oxide and metal-fuel present on each track at the time of loading, denoted by "$t_0$".

In a manner similar to that described in connection with the FCB system of FIG. 1, such metal-fuel/metal-oxide measurements are carried out on each metal-fuel track of the loaded card by automatically applying a test voltage across a particular track of metal fuel, and detecting the electrical which flows across the section of metal-fuel track in response the applied test voltage. The data signals representative of the applied voltage ($v_{applied}$) and response current ($i_{response}$) at a particular sampling period are automatically detected by the Data Capture and Processing Subsystem 299 and processed to produce a data element representative of the ratio of the applied voltage to response current (v applied/i response) with appropriate numerical scaling. This data element is automatically recorded within an information structure linked to the identified metal-fuel card maintained in the Metal-Fuel Data Management Subsystem 297. As this data element (v/i) provides a direct measure of electrical resistance across the metal-fuel track under measurement, it can be accurately correlated to a measured "initial" amount of metal-oxide present on the identified metal-fuel track.

Data Capture and Processing Subsystem 299 then quantifies the measured initial metal-oxide amount (available at initial time instant $t_0$), and designates it as $MOA_0$ for recording in the information structures maintained within the Metal-Fuel Database Management Subsystems of both the Metal-Fuel Card Discharging and Recharging Subsystems 115 and 117. While this initialization procedure is simple to carry out, it is understood that in some applications it may be more desirable to empirically determine these initial metal-oxide measures using theoretically-based computations premised on the metal-fuel cards having been subjected to a known course of treatment (e.g. the Short-Circuit Resistance Test described hereinabove).

After completing the initialization procedure, the Metal-Fuel Card Recharging Subsystem 117 is ready to carry out its metal-fuel management functions along the lines to be described hereinbelow. In the illustrative embodiment, this method involves two basic steps that are carried out in a cyclical manner during recharging operations.

The first step of the procedure involves subtracting from the initial metal-oxide amount $MOA_0$, the computed metal-fuel estimate $MFE_{0-1}$ which corresponds to the amount of metal-fuel produced during recharging operations conducted between time interval $t_0$–$t_1$. During the recharging operation, metal-fuel estimate $MFE_{0-1}$ is computed using the following recharging parameters collected—electrical recharge current $i_{acr}$ and the time duration $\Delta t_R$ thereof.

The second step of the procedure involves adding to the computed measure ($MOA_0$–$MFE_{0-1}$), the metal-oxide estimate $MOE_{0-1}$ which corresponds to the amount of metal-oxide produced during any discharging operations that may have been conducted between time interval $t_0$–$t_1$. Notably, the metal-oxide estimate $MOE_{0-1}$ is computed using the following discharging parameters collected—electrical recharge current $i_{acd}$ and time duration $\Delta t_{0-1}$, during the discharging operation. Notably, metal-oxide measure $MOE_{0-1}$ will have been previously computed and recorded within the Metal-Fuel Database Management Subsystem within the Metal-Fuel Card Recharging Subsystem 115 during the immediately previous discharging operation (if one such operation has been carried out since $t_0$). Thus, in the illustrative embodiment, it will be necessary to read this prerecorded information element from the Database Management Subsystem 293 within the Discharging Subsystem 115 during the current recharging operations.

The computed result of the above-described procedure (i.e. $MOA_0$–$M_{0-1}$+$MOE_{0-1}$) is then posted within the Metal-Fuel Database Management Subsystem 297 within Metal-Fuel Card Recharging Subsystem 117 as the new "current" metal-fuel amount ($MOA_1$) which will be used in the next metal-oxide presence update procedure. During recharging operations, the above-described update procedure is carried out every $t_i$–$t_{i+1}$ seconds for each metal-fuel track that is being recharged.

Such information maintained on each metal-fuel track can be used in a variety of ways, for example: managing the presence of metal-oxide formations along the track of metal-fuel cards; as well as setting the recharging parameters in an optimal manner during recharging operations. The details pertaining to such metal-oxide presence management techniques will be described in greater detail hereinbelow.

Uses for Metal-Oxide Presence Management During the Recharging Mode of Operation During recharging operations, the computed amounts of metal-oxide present along any particular metal-fuel track (i.e. MFT), determined at the i-th recharging head, can be used to compute the presence of metal-oxide at the (i+1)th, (i+2)th, or (i+n)th recharging head downstream from the i-th recharging head. Using such computed measures, the system controller 130' within the Metal-Fuel Card Recharging Subsystem 117 can determine (i.e. anticipate) in real-time, which metal-fuel tracks along a metal-fuel card contain metal-oxide (e.g. zinc-oxide) requiring recharging, and which contain significant amounts of metal-fuel and not requiring recharging. For those metal-fuel tracks requiring recharging, the system controller 130' can electronically switch-in the cathode-electrolyte structures of those metal-fuel tracks having significant metal-oxide content (e.g. deposits) for conversion into metal-fuel within the recharging head assembly 175.

Another advantage derived from such metal-oxide management capabilities is that the system controller 130' within the Metal-Fuel Card Recharging Subsystem 117 can control recharge parameters during recharging operations using information collected and recorded within the Metal-Fuel Database Management Subsystems 293 and 297 during the immediately prior recharging and discharging operations.

During Recharging operations, information collected can be used to compute an accurate measure of the amount of metal-oxide that exists along each metal-fuel track at any instant in time. Such information, stored within information storage structures maintained within the Metal-Fuel Database Subsystem 297, can be accessed and used by the system controller 130' within the Metal-Fuel Card Discharging Subsystem 117 to control the amount of electrical current supplied across the cathode-electrolyte structures of each recharging head 175. Ideally, the magnitude of electrical current will be selected to ensure complete conversion of the estimated amount of metal-oxide (e.g. zinc-oxide) along each such track, into its primary source metal (e.g. zinc) without destroying the structural integrity and porosity characteristics of the metal-fuel tape.

Means for Controlling Recharging Parameters during the Recharging Mode Using Information Recorded During Prior Modes of Operation In the FCB system of the fourth illustrative embodiment, the system controller 130' within the Metal-Fuel Card Recharging Subsystem 117 can automatically control recharge parameters using information collected during prior discharging and recharging operations and recorded within the Metal-Fuel Database Management Subsystems 293 and 297 of the FCB system of FIG. 4.

During the recharging operations, the system controller 130' within the Metal-Fuel Card Recharging Subsystem 117 can access various types of information stored within the Metal-Fuel Database Management Subsystem 297. One important information element stored therein will relate to the amount of metal-oxide currently present along each metal-fuel track at a particular instant of time (i.e. $MOA_r$). Using this information, the system controller 130' can determine on which tracks metal-oxide deposits are present, and thus can connect the input terminal of the corresponding cathode-electrolyte structures (within the recharging heads) to the recharging power control subsystem 181 by way of the cathode-electrolyte input terminal configuration subsystem 178, to efficiently and quickly carry out recharging operations therealong. The system controller 130' can anticipate such metal-oxide conditions prior to conducting recharging operations. Depending on the metal-oxide condition of "upstream" fuel cards loaded within the discharging head assembly, the system controller 130' of the illustrative embodiment may respond as follows: (i) connect cathode-electrolyte structures of metal-oxide "rich" tracks into the recharging power regulation subsystem 181 for long recharging durations, and connect cathode-electrolyte structures of metal-oxide "depleted" tracks from this subsystem for relatively shorter recharging operations; (ii) increase rate of oxygen evacuation from about the cathode support structures corresponding to tracks having thickly formed metal-oxide formations therealong during recharging operations, and decrease the rare of oxygen evacuation from about the cathode support structures corresponding to tracks having thinly formed metal-oxide formations therealong during recharging operations; (iii) control the temperature of the recharging heads when the sensed temperature thereof exceeds predetermined thresholds; etc. It is understood that in alternative embodiments, the system controller 130' may operate in different ways in response to the detected condition of particular track on identified fuel card.

The Fifth Illustrative Embodiment of the Air-Metal FCB System of the Present Invention The fifth illustrative embodiment of the metal-air FCB system hereof is illustrated in FIGS. 6 through 7B13. As shown in FIGS. 6, 7A1 and 7A2 this FCB system 185 comprises a number of subsystems, namely: a Metal-Fuel Card Discharging (i.e. Power Generation) Subsystem 186 for generating electrical power from the recharged metal-fuel cards 187 during the Discharging Mode of operation; Metal-Fuel Card Recharging Subsystem 191 for electro-chemically recharging (i.e. reducing) sections of oxidized metal-fuel cards 187 during the Recharging Mode of operation; a Recharged Card Loading Subsystem 189 for automatically loading one or more metal-fuel cards 187 from recharged storage bin 188A into the discharging bay of the FCB system; a Discharged Card Unloading Subsystem 192 for automatically unloading one or more discharged metal-fuel cards 187 from the discharging bay of the FCB system into the discharged metal-fuel card storage bin 188B; Discharged Card Loading Subsystem 192 for automatically loading one or more discharged metal-fuel cards from the discharged metal-fuel card storage bin 188B, into the recharging bay of the Metal-Fuel Card Recharging Subsystem 191; and a Recharged Card Unloading Subsystem 193 for automatically unloading recharged metal-fuel cards from the recharging bay of the Recharging Subsystem into the recharged metal-fuel card storage bin 188A. Details concerning each of these subsystems and how they cooperate will be described below.

As shown in FIG. 6, the metal fuel consumed by this FCB System is provided in the form of metal fuel cards 187, slightly different in construction from the card 112 used in the system of FIG. 4. As shown in FIGS. 6 and 7A12, each metal-fuel card 178 has a rectangular-shaped housing containing a plurality of electrically isolated metal-fuel elements (e.g. squares) 195A through 195D. As will be illustrated in greater detail hereinafter, these elements are adapted to contact the cathode elements 196A through 196D of the "multi-zoned" discharging head 197 in the Metal-Fuel Card Discharging Subsystem 186 when the metal-fuel card 178 is moved into properly aligned position between cathode support plate 198 and anode contacting structure 199 thereof during the Discharging Mode, as shown in FIG. 7A4, and also contact the cathode elements 196A' through 196D' of the recharging head 197' in the Metal-Fuel Card Recharging Subsystem 191 when the fuel card is moved into properly aligned position between the cathode support plate 198' and the anode contacting support structure 199' during the recharging mode as shown in FIG. 7B4.

In the illustrative embodiment, the fuel card of the present invention is "multi-zoned" in order to enable the simultaneous production of multiple supply voltages (e.g. 1.2 Volts) from the "multi-zone" discharging head 197. As described in connection with the other embodiments of the present invention, this enable the generation and delivery of a wide range of output voltages from the system, suitable to the requirements of the particular electrical load connected to the FCB system.

Brief Summary of Modes of Operation of the FCB System of the Fourth Illustrative Embodiment of the Present Invention The FCB system of the fifth illustrative embodiment has several modes of operation, namely: a Recharge Card Loading Mode during which one or more metal-fuel cards are automatically loaded from the recharged metal-fuel card storage bin 188A into the discharging bay of the Metal-Fuel Card Discharging Subsystem 186, Discharged Card Loading Mode during which one or more metal-fuel cards are automatically loaded from the discharged metal-fuel card storage bin into the recharging bay of the Metal-Fuel Card Recharging Subsystem 191; a Discharging Mode during which electrical power is produced from metal-fuel cards 187 loaded into the Metal-Fuel Card Discharging Subsystem 186 by electro-chemical oxidation, and supplied to the electrical load connected to the output of the subsystem; a Recharging Mode during which metal-fuel cards loaded into the Metal-Fuel Card Recharging Subsystem 191 are recharged by electro-chemical reduction; and a Discharged Card Unloading Mode during which one or more metal-fuel cards are automatically unloaded from the discharging bay of the system into the discharged metal-fuel card storage bin 188B thereof; and a Recharged Card Unloading Mode, during which one or more recharged metal-fuel cards are automatically unloaded from the recharging bay of the Metal-Fuel Card Recharging Subsystem 191 into the recharged metal-fuel card storage bin 188A. These modes will be described in greater detail hereinafter.

Multi-Zone Metal-Fuel Card Used in the FCB System of the Fifth Illustrative Embodiment In the FCB system of FIG. 6, each metal-fuel card 187 has multiple fuel-tracks (e.g. five zones) as taught in U.S. Pat. No. 6,296,960, supra. When using such a metal-fuel card design, it is desirable to design each discharging head 197 within the Metal-Fuel Card Discharging Subsystem 186 as a "multi-zoned" discharging head. Similarly, each recharging head 197' within the Metal-Fuel Card Recharging Subsystem 191 hereof should be designed as a multi-zoned recharging head in accordance with the principles of the present invention. As taught in great detail in copending application Ser. No. 08/944,507, the use of "multi-zoned" metal-fuel cards 187 and multizoned discharging heads 197 enables the simultaneous production of multiple output voltages {V1, V2, . . . , Vn} selectable by the end user. Such output voltages can be used for driving various types of electrical loads 200 connected to the output power terminals 201 of the Metal-Fuel Card Discharging Subsystem. This is achieved by selectively configuring the individual output voltages produced across each anode-cathode structure within the discharging heads during card discharging operations. This system functionality will be described in greater detail hereinbelow.

In general, multi-zone and single-zone metal-fuel cards 187 alike can be made using several different techniques. Preferably, the metal-fuel elements contained with each card-like device 187 is made from zinc as this metal is inexpensive, environmentally safe, and easy to work. Several different techniques will be described below for making zinc-fuel elements according to this embodiment of the present invention.

For example, in accordance with a first fabrication technique, a thin metal layer (e.g. nickel or brass) of about 0.1 to about 5 microns thickness is applied to the surface of low-density plastic material (drawn and cut in the form of a card-like structure). The plastic material should be selected so that it is stable in the presence of an electrolyte such as KOH. The function of the thin metal layer is to provide efficient current collection at the anode surface. Thereafter, zinc powder is mixed with a binder material and then applied as a coating (e.g. 1–500 microns thick) upon the surface of the thin metal layer. The zinc layer should have a uniform porosity of about 50% to allow the ions within the ionically-conducting medium (e.g. electrolyte ions) to flow with minimum electrical resistance between the cathode and anode structures. As will be explained in greater detail hereinafter, the resulting metal-fuel structure can be mounted within an electrically insulating casing of thin dimensions to improve the structural integrity of the metal-fuel card 187, while providing the discharging heads access to the anode structure when the card is loaded within its card storage bay. The casing of the metal-fuel card can be provided with a slidable panel that enables access to the metal-fuel strips when the card is received in the storage bay and the discharging head is transported into position for discharging operations.

In accordance with a second fabrication technique, a thin metal layer (e.g. nickel or brass) of about 0.1 to about 5 microns thickness is applied to the surface of low-density plastic material (drawn and cut in the form of card). The plastic material should be selected so that it is stable in the presence of an electrolyte such as KOH. The function of the thin metal layer is to provide efficient current collection at the anode surface. Thereafter zinc is electroplated onto the surface of the thin layer of metal. The zinc layer should have a uniform porosity of about 50% to allow ions within the ionically-conducting medium (e.g. electrolyte) to flow with minimum electrical resistance between the cathode and anode structures. As will be explained in greater detail hereinafter, the resulting metal-fuel structures can be mounted within an electrically insulating casing of thin dimensions to provide a metal-fuel card having suitable structural integrity, while providing the discharging heads access to the anode structure when the card is loaded within its card storage bay. The casing of the metal-fuel card can be provided with slidable panels that enable access to the metal-fuel strips when the card is received in the storage bay and the discharging head is transported into position for discharging operations.

In accordance with a third fabrication technique, zinc power is mixed with a low-density plastic base material and drawn into electrically-conductive sheets. The low-density plastic material should be selected so that it is stable in the presence of an electrolyte such as KOH. Each electrically-conductive sheet should have a uniform porosity of about 50% to allow ions within the ionically-conducting medium (e.g. electrolyte) to flow with minimum electrical resistance between the current collecting elements of the cathode and anode structures. Then a thin metal layer (e.g. nickel or brass) of about 1 to 10 microns thickness is applied to the surface of the electrically-conductive sheet. The function of the thin metal layer is to provide efficient current collection at the anode surface. As will be explained in greater detail hereinafter, the resulting metal-fuel structures can be mounted within an electrically insulating casing of thin dimensions to provide a metal-fuel card having suitable structural integrity, while providing the discharging heads access to the anode structure when the card is loaded within its card storage bay. The card housing can be made from any suitable material designed to withstand heat and corrosion. Preferably, the housing material is electrically non-conducting to provide an added measure of user-safety during card discharging and recharging operations.

Each of the above-described techniques for manufacturing metal-fuel elements can be ready modified to produce "double-sided" metal-fuel cards, in which single track or multi-track metal-fuel layers are provided on both sides of the base (i.e. substrate) material. Such embodiments of metal-fuel cards will be useful in applications where discharging heads are to be arranged on both sides of metal-fuel tape loaded within the FCB system. When making double-sided metal-fuel tape, it will be necessary in most embodiments to form a current collecting layer (of thin metal material) on both sides of the plastic substrate so that current can be collected from both sides of the metal-fuel tape, associated with different cathode structures. When making double-sided multi-tracked fuel cards, it may be desirable or necessary to laminate together two metal-fuel sheets together, as described hereinabove, with the substrates of each sheet in physical contact. Adaptation of the above-described methods to produce double-sided metal-fuel cards will be readily apparent to those skilled in the art having had the benefit of the present disclosure. In such illustrative embodiments of the present invention, the anode-contacting structures within the each discharging head will be modified so that electrical contact is established with each electrically-isolated current collecting layer formed within the metal-fuel card structure being employed therewith.

Card Loading/Unloading Subsystem for the Fifth Illustrative Embodiment of the Metal-Air FCB System of the Present Invention As schematically illustrated in FIG. 7A1, the function of the Recharge Card Loading Subsystem 189 is to automatically transport a plurality of recharged metal-fuel cards from the bottom of the stack of recharged metal-fuel cards 187 in the recharged metal-fuel card storage bin 188A into the discharging bay of the Metal-Fuel Card Discharging Subsystem 182. As shown in FIG. 7A2, the function of the Discharged Card Unloading Subsystem 190 is to automatically transport a plurality of oxidized metal-fuel cards 187' from the discharging bay of the Metal-Fuel Card Discharging Subsystem 186, to the top of the stack of discharged metal-fuel cards in the discharged metal-fuel card storage bin 188B. As shown in FIG. 7B1, the function of the Discharged Card Loading Subsystem 192 is to automatically transport a plurality of oxidized metal-fuel cards from the bottom of the stack of discharged metal-fuel cards 187' in the discharged metal-fuel card storage bin 191 into the recharging bay of the Metal-Fuel Card Recharging Subsystem 191. As shown in FIG. 7B2, the function of the Recharged Card Unloading Subsystem 193 is to automatically transport a plurality of recharged metal-fuel cards 197 from the recharging bay of the Metal-Fuel Card Recharging Subsystem 191, to the top of the stack of recharged metal-fuel cards in the recharged metal-fuel card storage bin 188A.

As shown in FIG. 7A1, the Recharged Card Loading Subsystem 189 can be realized by any electro-mechanism mechanism comprising, for example, an electric motor, rollers, guides and other components arranged in such a manner as to enable the sequential transport of a recharged metal-fuel card from the bottom of the stack of recharged metal-fuel cards in the recharged metal-fuel card storage bin 188A, into the discharging bay of the Metal-Fuel Card Discharging Subsystem, where the cathode and anode structures of the discharging heads 197 are arranged. This electromechanical card transport mechanism is operably connected to the system controller 203.

As shown in FIG. 7A2, the Discharged Card Unloading Subsystem 190 can be realized by any electro-mechanism mechanism comprising, for example, an electric motor, rollers, guides and other components arranged in such a manner as to enable the sequential transport of discharged metal-fuel cards from the discharging bay of the Metal-Fuel Card Discharging Subsystem to the top of the stack of discharged metal-fuel cards in the discharged metal-fuel card storage bin 188B, where the cathode and anode structures of the discharging heads 197 are arranged. This electromechanical card transport mechanism is operably connected to the system controller 203.

As shown in FIG. 7B1, the Discharged Card Loading Subsystem 190 can be realized by any electro-mechanism mechanism comprising, for example, an electric motor, rollers, guides and other components arranged in such a manner as to enable the sequential transport of discharged metal-fuel cards from the bottom of the stack of discharged metal-fuel cards in the discharged metal-fuel card storage bin 188B, into the recharging bay of the Metal-Fuel Card Recharging Subsystem, where the cathode and anode structures of the discharging heads are arranged. This electromechanical card transport mechanism is operably connected to the system controller 203.

As shown in FIG. 7B2, the Recharged Card Unloading Subsystem 193 can be realized by any electro-mechanism mechanism comprising, for example, an electric motor, rollers, guides and other components arranged in such a manner as to enable the sequential transport of recharged metal-fuel cards from the recharging bay of the Metal-Fuel Card Recharging Subsystem, to the top of the stack of recharged metal-fuel cards in the recharged metal-fuel card storage bin 188A, where the cathode and anode structures of the discharging heads are arranged. This electromechanical card transport mechanism is operably connected to the system controller 203.

The Metal-Fuel Card Discharging Subsystem for the Fifth Illustrative Embodiment of the Metal-Air FCB System of the Present Invention As shown in FIGS. 7A3 and 7A4, the metal-fuel card discharging subsystem 182 of the fifth illustrative embodiment of the present invention comprises a number of subsystems, namely: an assembly of multi-track discharging (i.e. discharging) heads 197, each having multi-element cathode structures 198 and anode-contacting structures 199 with electrically-conductive output terminals connectable in a manner to be described hereinbelow; a discharging head transport subsystem 204 for transporting the subcomponents of the discharging head assembly 197 to and from metal-fuel cards 197 loaded within the system; a cathode-electrolyte output terminal configuration subsystem 205 for configuring the output terminals of the cathode and anode-contacting structures of the discharging heads under the control of system controller 203 so as to maintain the output voltage required by a particular electrical load connected to the Metal-Fuel Card Discharging Subsystem 186; a cathode-electrolyte voltage monitoring subsystem 206A, connected to the cathode-electrolyte output terminal configuration subsystem 205 for monitoring (i.e. sampling) the voltages produced across cathode and anode structures of each discharging head, and producing (digital) data representative of the sensed voltage levels; a cathode-electrolyte current monitoring subsystem 206B, connected to the cathode-electrolyte output terminal configuration subsystem 205, for monitoring (e.g. sampling) the currents flowing through the cathode-electrolyte interfaces of each discharging head during the Discharging Mode, and producing digital data representative of the sensed current levels; a cathode oxygen pressure control subsystem comprising the system controller 203, solid-state $pO_2$ sensors 250, vacuum chamber (structure) 207 shown in FIGS. 7A7 and 7A8, vacuum pump 208, electronically-controlled airflow control device 209, manifold structure 210, and multi-lumen tubing 211 shown in FIGS. 7A3 and 7A4, arranged together as shown for sensing and controlling the pO2 level within the cathode structure of each discharging head 197; an ion transport control subsystem comprising the system controller 203, solid-state moisture sensor (hydrometer) 212, moisturizing (e.g. micro-sprinklering element) 213 realized as a micro-sprinkler embodied within the walls structures of the cathode support plate 198 (having water expressing holes 214 disposed along each wall surface as shown in FIG. 7A6), a water pump 215, a water reservoir 216, an electronically-controlled water-flow control valve 217, a manifold structure 28 and multi-lumen conduits 219 extending into moisture delivery structure 213, arranged together as shown for sensing and modifying conditions within the FCB system (e.g. the moisture level or relative humidity level at the cathode-electrolyte interface of the discharging heads) so that the ion-concentration at the cathode-electrolyte interface is maintained within an optimal range during the Discharging Mode of operation; discharge head temperature control subsystem comprising the system controller 203, solid-state temperature sensors (e.g. thermistors) 305 embedded within each channel of the multi-cathode support plate 198 hereof, and a discharge head cooling device 306, responsive to control signals produced by the system controller 203, for lowering the temperature of each discharging channel to within an optimal temperature range during discharging operations; a relational-type Metal-Fuel Database Management Subsystem (MFDMS) 308 operably connected to system controller 203 by way of local system bus 309, and designed for receiving particular types of information derived from the output of various subsystems within the Metal-Fuel Card Discharging Subsystem 186; a Data Capture and Processing Subsystem (DCPS) 400, comprising data reading head 260 (260', 260") embedded within or mounted closely to the cathode support structure of each discharging head 197, and a programmed microprocessor-based data processor adapted to receive data signals produced from cathode-electrolyte voltage monitoring subsystem 206A, cathode-electrolyte current monitoring subsystem 206B, the cathode oxygen pressure control subsystem and the ion-concentration control subsystem hereof, and enable (i) the reading metal-fuel card identification data from the loaded metal-fuel card, (ii) the recording sensed discharge parameters and computed metal-oxide indicative data derived therefrom in the Metal-Fuel Database Management Subsystem 308 using local system bus 401, and (iii) the reading prerecorded recharge parameters and prerecorded metal-fuel indicative data stored in the Metal-Fuel Database Management Subsystem (MFDMS) 308 using local system bus 309; a discharging (i.e. output) power regulation subsystem 223 connected between the output terminals of the cathode-electrolyte output terminal configuration subsystem 205 and the input terminals of the electrical load 200 connected to the Metal-Fuel Card Discharging Subsystem 186, for regulating the output power delivered across the electrical load (and regulate the voltage and/or current characteristics as required by the Discharge Power Control Method carried out by the system controller 203); an input/output control subsystem 224, interfaced with the system controller 203, interfaced with system controller 203' within the Metal-Fuel Card Recharging Subsystem 117 by way of global system bus 402 as shown in FIG. 7B14, and having various means for controlling all functionalities of the FCB system by way of a remote system or resultant system, within which the FCB system is embedded; and system controller 203 for managing the operation of the above mentioned subsystems during the various modes of system operation. These subsystems will be described in greater technical detail below.

Multi-Zone Discharging Head Assembly within the Metal-Fuel Card Discharging Subsystem The function of the assembly of multi-zone discharging heads 197 is to generate electrical power across the electrical load 200 as one or more metal-fuel cards 187 are discharged during the Discharging Mode of operation. In the illustrative embodiment, each discharging (i.e. discharging) head 197 comprises: a cathode element support plate 34 having a plurality of isolated recesses 224A through 224D permitting the free flow of oxygen (O2) through perforations 225 formed in the bottom portion thereof; a plurality of electrically-conductive cathode elements (e.g. strips) 196A through 196D for insertion within the lower portion of these recesses 224A through 224D, respectively; a plurality of electrolyte impregnated strips 226A through 226D for placement over the cathode strips 196A through 196D, and support within the recesses 225A through 225D, respectively, as shown in FIG. 7A12; and oxygen-injection chamber 207 shown in FIG. 7A7 mounted over the upper (back) surface of the cathode element support plate 198, in a sealed manner as shown in FIG. 7A12.

As shown in FIGS. 7A3 and 7A4, each oxygen-injection chamber 207 has a plurality of subchambers 207A through 207D, being physically associated with recesses 224A through 224D, respectively. Each vacuum subchamber is isolated from all other subchambers and is in fluid communication with one channel supporting a cathode element and electrolyte-impregnated element. As shown, each subchamber is arranged in fluid communication with vacuum pump 208 via one lumen of multi-lumen tubing 211, one channel of manifold assembly 210 and one channel of air-flow switch 209, each of whose operation is managed by system controller 203. This arrangement enables the system controller 203 to independently control the pO2 level in each oxygen-injection subchamber 207A through 207D by selectively pumping pressurized air through the corresponding air flow channel in the manifold assembly 210.

As shown in FIG. 7A8A, each electrolyte-impregnated strip 226A through 226D is realized by impregnating an electrolyte-absorbing carrier strip with a gel-type electrolyte. Preferably, the electrolyte-absorbing carrier strip is realized as a strip of low-density, open-cell foam material made from PET plastic. The gel-electrolyte for the discharging cell is made from a formula consisting of alkali solution, a gelatin material, water, and additives well known in the art.

As shown in FIG. 7A8A, each cathode strip 196A through 196D is made from a sheet of nickel wire mesh 228 coated with porous carbon material and granulated platinum or other catalysts 229 to form a cathode element that is suitable for use in metal-air FCB systems. Details of cathode construction for use in air-metal FCB systems are disclosed in U.S. Pat. Nos. 4,894,296 and 4,129,633, incorporated herein by reference. To form a current collection pathway, an electrical conductor (nickel) 230 is soldered to the underlying wire mesh sheet 228 of each cathode strip. As shown in FIG. 7A12, each electrical conductor 230, attached to its cathode strip is passed through a hole 231 formed in the bottom surface of a recess of the cathode support plate 198, and is connected to an electrical conductor (e.g. wire) which extends out from its respective subchamber and terminates at a conventional conductor 235A. During assembly, the cathode strip pressed into the lower portion of the recess to secure the same therein.

As shown in FIG. 7A6, the bottom surface of each recess 224A through 224D has numerous perforations 225 formed therein to allow the free passage of air and oxygen therethrough to the cathode strip 196A through 196D (at atmospheric temperature and pressure). In the illustrative embodiment, an electrolyte-impregnated strip 226A through 226D are placed over cathode strips 196A through 196D, respectively, and secured within the upper portion of the cathode supporting recess by adhesive, retaining structures or the like. As shown in FIG. 7A12, when the cathode strips and thin electrolyte strips are mounted in their respective recesses in the cathode support plate 198, the outer surface of each electrolyte-impregnated strip is disposed flush with the upper surface of the plate defining the recesses.

The interior surfaces of the cathode support recesses 224A through 224D are coated with a hydrophobic material (e.g.

PTFE) to ensure the expulsion of water within electrolyte-impregnated strips 226A through 226D and thus optimum oxygen transport across the cathode strips. Hydrophobic agents are added to the carbon material constituting the oxygen-pervious cathode elements in order to repel water therefrom. Preferably, the cathode support plate is made from an electrically non-conductive material, such as polyvinyl chloride (PVC) plastic material well known in the art. The cathode support plate can be fabricated using injection molding technology also well known in the art.

In FIG. 7A7, the oxygen-injection chamber 207 is shown realized as a plate-like structure having dimensions similar to that of the cathode support plate 198. As shown in FIG. 7A7, the oxygen-injection chamber has four (4) recesses 207A through 207D which spatially correspond to and are in spatial registration with cathode recesses 224A through 224D, respectively, when oxygen-injection chamber 207 is mounted upon the top surface of the cathode support plate 198, as shown in FIG. 7A12. Four small conduits are formed within the recessed plate 207, namely: between inlet opening 207E1 and outlet opening 207A1; between inlet opening 207E2 and outlet opening 207B1; between inlet opening 207E3 and outlet opening 207C1; and between inlet opening 207E4 and outlet opening 207D1. When recessed plate 207 is mounted upon the cathode support plate 198, subchambers 207A through 207D are formed between recesses 207A through 207D and the back portion of the perforated cathode support plate 198. Each lumen of the multi-lumen conduit 211 is connected to one of the four inlet openings 207E1 through 207E4, and thereby arranges the subchambers 207A through 207D in fluid communication with the four controlled $O_2$-flow channels within the $pO_2$ control subsystem in the Discharging Subsystem 186.

The structure of the multi-tracked fuel card 187 loaded into the FCB system of FIG. 6 is illustrated in FIGS. 7A9 and 7A10. As shown, the metal fuel card comprises: electrically non-conductive anode support plate 228 of rigid construction, having a plurality of recesses 231A through 231D formed therein and a central hole 230 formed through the bottom surface of each recess; and the plurality of strips of metal (e.g. zinc fuel) 195A through 195D, each being disposed within a recess within the anode support plate 228. Notably, the spacing and width of each metal fuel strip is designed so that it is spatially registered with a corresponding cathode strip in the discharging head of the system in which the fuel card is intended to be used. The metal-fuel card described above can be made by forming zinc strips in the shape of recesses in the anode support plate, and then inserting a metal fuel strip into each of the recesses. When inserted within its respective recess in the cathode-electrolyte support plate 228, each metal fuel strip is electrically isolated from all other metal fuel strips.

Figure 11:
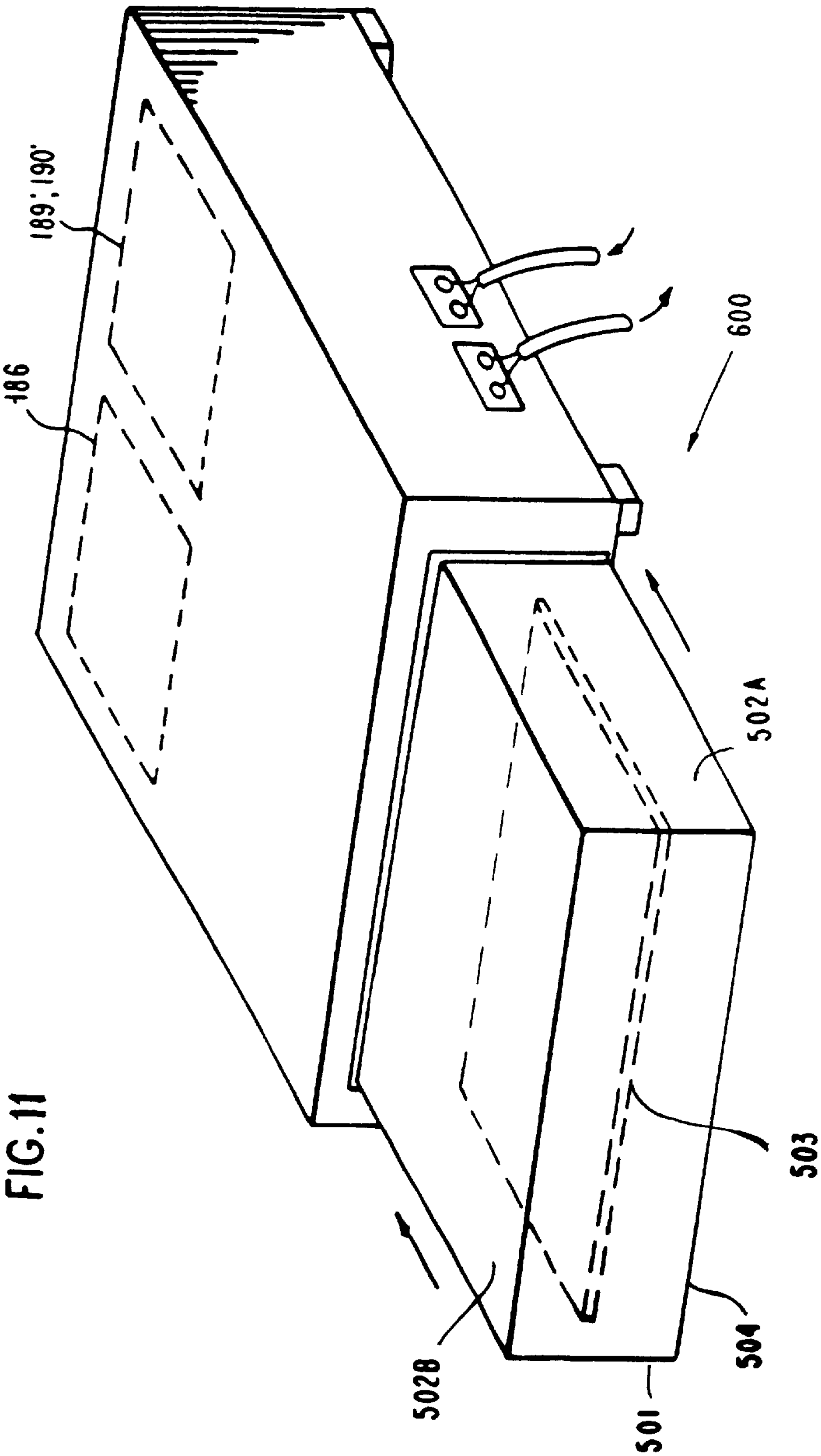

In FIG. 7A11, an exemplary metal-fuel (anode) contacting structure (assembly) 199 is disclosed for use with the multi-tracked fuel card 187 having cathode support structure 228 shown in FIG. 7A6. As shown in FIG. 7A11, a plurality of electrically conductive elements 232A through 232D in the form of conductive posts are supported from a metal-fuel contacting support platform 233. The position of these electrically conductive posts spatially coincide with the holes 230 formed in the bottom surfaces of recesses 229A through 229D in the anode supporting plate 228. As shown, electrical conductors 234A through 234D are electrically connected to conductive posts 232A through 232D respectively, and anchored along the surface of the anode support plate (e.g. within a recessed groove) and terminate in a conventional connector 235B similar to conductors terminating at electrical connector 235A. This connector is electrically connected to the output cathode-electrolyte terminal configuration subsystem 205 as shown in FIGS. 7A3 and 7A4. The width and length dimensions of the anode-contacting support plate 233 are substantially similar to the width and length dimensions of the cathode support plate 198 as well as the anode (metal-fuel) support plate 228.

FIG. 7A12 illustrates the spatial relationship between the anode contacting support plate 199, cathode support plate 198, oxygen-injection chamber plate 207, and anode (metal-fuel) support plate (i.e. fuel card) 228 when the fuel card 187 is loaded therebetween. In this loaded configuration, each cathode element 196A through 196D along the cathode support plate establishes ionic contact with the front exposed surface of the corresponding metal fuel strip (i.e. zone) 195A through 195D by way of the electrolyte-impregnated pad 226A through 226D disposed therebetween. Also, in this loaded configuration, each anode-contacting element (e.g. conductive post) 232A through 232D projects from the anode contacting support plate 233 through the central hole 230 in the bottom panel of each recess formed in the anode contacting support plate 199 and establishes electrical contact with the corresponding metal fuel strip 195A through 195D mounted therein, completing an electrical circuit through a single air-metal fuel cell of the present invention.

Discharging Head Transport Subsystem within the Metal-Fuel Card Discharging Subsystem The primary function of the discharging head transport subsystem 204 is to transport the assembly of discharging heads 197 about the metal-fuel cards 187 that have been loaded into the FCB system, as shown in FIG. 7A3. When properly transported, the cathode and anode-contacting structures of the discharging heads are brought into "ionically-conductive" and "electrically-conductive" contact with the metal-fuel tracks (i.e. zones) of loaded metal-fuel cards loaded within the system during the Discharging Mode of operation.

Discharging head transport subsystem 204 can be realized using any one of a variety of electromechanical mechanisms capable of transporting the cathode supporting and anode-contacting structures of each discharging head 197 away from the metal-fuel card 112, as shown in FIG. 7A3, and about the metal-fuel card 187 as shown in FIG. 7A4. As shown, these transport mechanisms are operably connected to system controller 203 and controlled by the same in accordance with the system control program carried out thereby.

Cathode-Anode Output Terminal Configuration Subsystem within the Metal-Fuel Card Discharging Subsystem As shown in FIGS. 7A3 and 7A4, the cathode-electrolyte output terminal configuration subsystem 205 is connected between the input terminals of the discharging power regulation subsystem 233 and the output terminals of the cathode-electrolyte pairs within the assembly of discharging heads 197. The system controller 203 is operably connected to cathode-electrolyte output terminal configuration subsystem 205 in order to supply control signals for carrying out its functions during the Discharging Mode of operation.

The function of the cathode-electrolyte output terminal configuration subsystem 205 is to automatically configure (in series or parallel) the output terminals of selected cathode-electrolyte pairs within the discharging heads 197 of the Metal-Fuel Card Discharging Subsystem 186 so that the required output voltage level is produced across the electrical load 200 connected to the FCB system during card discharging operations. In the illustrative embodiment of the present invention, the cathode-electrolyte output terminal configuration mechanism 205 can be realized as one or more electrically-programmable power switching circuits using transistor-controlled technology, wherein the cathode and anode-contacting elements within the discharging heads 197 are connected to the input terminals of the discharging power regulating subsystem 223. Such switching operations are carried out under the control of the system controller 203 so that the required output voltage is produced across the electrical load connected to the discharging power regulating subsystem 151 of the FCB system.

Cathode-Anode Voltage Monitoring Subsystem within the Metal-Fuel Card Discharging Subsystem As shown in FIGS. 7A3 and 7A4, the cathode-electrolyte voltage monitoring subsystem 206A is operably connected to the cathode-electrolyte output terminal configuration subsystem 205 for sensing voltage levels and the like therewithin. This subsystem is also operably connected to the system controller for receiving control signals required to carry out its functions. In the first illustrative embodiment, the cathode-electrolyte voltage monitoring subsystem 206 A has two primary functions: to automatically sense the instantaneous voltage level produced across the cathode-electrolyte structures associated with each metal-fuel zone within each discharging head 197 during the Discharging Mode; and to produce a (digital) data signal indicative of the sensed voltages for detection, analysis and response by Data Capture and Processing Subsystem 400.

In the first illustrative embodiment of the present invention, the Cathode-Anode Voltage Monitoring Subsystem 206A can be realized using electronic circuitry adapted for sensing voltage levels produced across the cathode-electrolyte structures associated with each metal-fuel zone disposed within each discharging head 197 in the Metal-Fuel Card Discharging Subsystem 186. In response to such detected voltage levels, the electronic circuitry can be designed to produce a digital data signals indicative of the sensed voltage levels for detection and analysis by Data Capture and Processing Subsystem 400.

Cathode-Anode Current Monitoring Subsystem within the Metal-Fuel Card Discharging Subsystem p As shown in FIGS. 7A3 and 7A4, the cathode-electrolyte current monitoring subsystem 206B is operably connected to the cathode-electrolyte output terminal configuration subsystem 205. The cathode-electrolyte current monitoring subsystem 206B has two primary functions: to automatically sense the magnitude of electrical currents flowing through the cathode-electrolyte pair of each metal-fuel zone within each discharging head 197 in the Metal-Fuel Card Discharging Subsystem 186 during the Discharging Mode; and to produce digital data signals indicative of the sensed currents for detection and analysis by Data Capture and Processing Subsystem 400. In the first illustrative embodiment of the present invention, the cathode-electrolyte current monitoring subsystem 206B can be realized using current sensing circuitry for sensing electrical currents flowing through the cathode-electrolyte pairs of each metal-fuel zone within each discharging head 197, and producing digital data signals indicative of the sensed currents. As will be explained in greater detail hereinafter, these detected current levels are used by the system controller 203 in carrying out its discharging power regulation method, and well as creating a "discharging condition history" and metal-fuel availability records for each fuel zone on the discharged metal-fuel card.

Cathode Oxygen Pressure Control Subsystem within the Metal-Fuel Card Discharging Subsystem The function of the cathode oxygen pressure control subsystem is to sense the oxygen pressure ($pO_2$) within each channel of the cathode structure of each discharging head 197, and in response thereto, control (i.e. increase or decrease) the same by regulating the air ($O_2$) pressure within the chambers of such cathode structures. In accordance with the present invention, partial oxygen pressure ($PO_2$) within each channel of the cathode structure of each discharging head is maintained at an optimal level in order to allow optimal oxygen consumption within the discharging heads during the Discharging Mode. By maintaining the $pO_2$ level within the cathode structure, power output produced from the discharging heads can be increased in a controllable manner. Also, by monitoring changes in $pO_2$ and producing digital data signals representative thereof for detection and analysis by the Data Capture and Processing Subsystem 400, the system controller 203 is provided with a controllable variable for use in regulating the electrical power supplied to the electrical load 200 during the Discharging Mode.

Ion-Concentration Control Subsystem within the Metal-Fuel Card Discharging Subsystem In order to achieve high-energy efficiency during the Discharging Mode, it is necessary to maintain an optimal concentration of (charge-carrying) ions at the cathode-electrolyte interface of each discharging head 197 within the Metal-Fuel card Discharging Subsystem 186. Thus it is the primary function of the ion-concentration control subsystem to sense and modify conditions within the FCB system so that the ion concentration at the cathode-electrolyte interface within the discharging head is maintained within an optimal range during the Discharge Mode of operation.

In the illustrative embodiment, ion-concentration control is achieved in a variety of ways by embedding a miniature solid-state humidity (or moisture) sensor 212 within each recess of the cathode support structure 198 (or as close as possible to the anode-cathode interfaces) in order to sense moisture conditions and produce a digital data signal indicative thereof. This digital data signal is supplied to the Data Capture and Processing Subsystem 400 for detection and analysis. In the event that the moisture level drops below the predetermined threshold value set in memory (ROM) within the system controller 203, the system controller automatically generates a control signal supplied to a moisturizing element 213 realizable as a micro-sprinkler structure 143 embodied within the walls of the cathode support structure 198. In the illustrative embodiment, the walls of the cathode support structure 198 function as water carrying conduits which express water droplets out of holes 214 adjacent the particular cathode elements when water-flow valve 217 and pump 215 are activated by the system controller 203. Under such conditions, water is pumped from reservoir 216 through manifold 218 along multi-lumen conduit 219 and is expressed from holes 214 adjacent the cathode element requiring an increase in moisture level, as sensed by moisture sensor 212. Such moisture-level sensing and control operations ensure that the concentration of KOH within the electrolyte within electrolyte-impregnated strips 226A through 226E is optimally maintained for ion transport and thus power generation.

Discharge Head Temperature Control Subsystem within the Metal-Fuel Card Discharging Subsystem As shown in FIGS. 7A3, 7A4, and 7A7, the discharge head temperature control subsystem incorporated within the Metal-Fuel Card Discharging Subsystem 186 of the first illustrative embodiment comprises a number of subcomponents, namely: the system controller 203; solid-state temperature sensors (e.g. thermistors) 305 embedded within each channel of the multi-cathode support structure hereof 198, as shown in FIG. 7A6; and a discharge head cooling device 306, responsive to control signals produced by the system controller 203, for lowering the temperature of each discharging channel to within an optimal temperature range during discharging operations. The discharge head cooling device 306 can be realized using a wide variety of heat-exchanging techniques, including forced-air cooling, water-cooling, and/or refrigerant cooling, each well known in the heat exchanging art. In some embodiments of the present invention, where high levels of electrical power are being generated, it may be desirable to provide a jacket-like structure about each discharge head in order to circulate air, water or refrigerant for temperature control purposes.

Data Capture and Processing Subsystem within the Metal-Fuel Tape Discharging Subsystem In the illustrative embodiment of FIG. 6, Data Capture And Processing Subsystem (DCPS) 400 shown in FIGS. 7A3 and 7A4 carries out a number of functions, including, for example: (1) identifying each metal-fuel card immediately before it is loaded within a particular discharging head 197 within the discharging head assembly and producing metal-fuel card identification data representative thereof; (2) sensing (i.e. detecting) various "discharge parameters" within the Metal-Fuel Card Discharging Subsystem 186 existing during the time period that the identified metal-fuel card is loaded within the discharging head assembly thereof; (3) computing one or more parameters, estimates or measures indicative of the amount of metal-oxide produced during card discharging operations, and producing "metal-oxide indicative data" representative of such computed parameters, estimates and/or measures; and (4) recording in the Metal-Fuel Database Management Subsystem 400 (accessible by system controllers 203 and 203'), sensed discharge parameter data as well as computed metal-fuel indicative data both correlated to its respective metal-fuel zone/card identified during the Discharging Mode of operation. As will become apparent hereinafter, such recorded information maintained within the Metal-Fuel Database Management Subsystem 308 by Data Capture and Processing Subsystem 400 can be used by the system controller 203 in various ways including, for example: optimally discharging (i.e. producing electrical power from) partially or completely oxidized metal-fuel cards in an efficient manner during the Discharging Mode of operation; and optimally recharging partially or completely oxidized metal-fuel cards in a rapid manner during the Recharging Mode of operation.

During discharging operations, the Data Capture and Processing Subsystem 400 automatically samples (or captures) data signals representative of "discharge parameters" associated with the various subsystems constituting the Metal-Fuel Card Discharging Subsystem 186 described above. These sampled values are encoded as information within the data signals produced by such subsystems during the Discharging Mode. In accordance with the principles of the present invention, card-type "discharge parameters" shall include, but are not limited to: the discharging voltages produced across the cathode and anode structures along particular metal-fuel tracks monitored, for example, by the cathode-electrolyte voltage monitoring subsystem 206A; the electrical (discharging) currents flowing across the cathode and anode structures along particular metal-fuel tracks monitored, for example, by the cathode-electrolyte current monitoring subsystem 206B; the oxygen saturation level ($pO_{2d}$) within the cathode structure of each discharging head 197, monitored by the cathode oxygen pressure control subsystem (203, 270, 207, 208, 209, 210, 211); the moisture ($H_2O_d$) level (or relative humidity) level across or near the cathode-electrolyte interface along particular metal-fuel tracks in particular discharging heads monitored, for example, by the ion-concentration control subsystem (203, 212, 213, 214, 215, 216, 217, 218 and 219); the temperature ($T_r$) of the discharging heads during card discharging operations; and the time duration ($\Delta t_d$) of the state of any of the above-identified discharge parameters.

In general, there a number of different ways in which the Data Capture and Processing Subsystem 400 can record card-type "discharge parameters" during the Recharging Mode of operation. These different methods will be detailed hereinbelow.

According to a first method of data recording shown in FIG. 7B9, card identifying code or indicia (e.g. miniature bar code symbol encoded with zone identifying information) 240 can be graphically printed on "optical" data track 241 during card manufacture, and can be read by an optical data reader 260 embodied within or adjacent each discharging head. The optical data reading head 260 can be realized using optical scanning/decoding techniques (e.g. laser scanning bar code symbol readers, or optical decoders) well known in the art. In the illustrative embodiment, information representative of these unique card identifying codes is encoded within data signals provided to the Data Capture and Processing Subsystem 400, and subsequent recorded within the Metal-Fuel Database Management Subsystem 308 during discharging operations.

According to a second method of data recording illustrated in FIG. 7B9, a digital "card identifying" code 240' is magnetically recorded in magnetic data track 241' during card manufacture, and can be read during discharging operations using a magnetic reading head 270' embodied within or supported adjacent each discharging head. Each magnetic reading head 260' can be realized using magnetic information reading techniques (e.g. magstripe reading apparatus) well known in the art. In the illustrative embodiment, the digital data representative of these unique card identifying codes is encoded within data signals provided to the Data Capture and Processing Subsystem 400, and subsequent recorded within the Metal-Fuel Database Management Subsystem 308 during discharging operations.

According to a third method of data recording shown in FIG. 7B9, a unique digital "card identifying" code 240" is recorded as a sequence of light transmission apertures formed in an optically opaque data track 241" during card manufacture, and can be read during discharging operations by an optical sensing head 260" realized using optical sensing techniques well known in the art. In the illustrative embodiment, the digital data representative of these unique zone identifying codes is encoded within data signals provided to the Data Capture and Processing Subsystem 400, and subsequent recorded within the Metal-Fuel Database Management Subsystem 308 during discharging operations.

According to a fourth alternative method of data recording, both unique digital "card identifying" code and set of discharge parameters for each track on the identified metal-fuel card are recorded in a magnetic, optical, or apertured data track, realized as a strip attached to the surface of the metal-fuel card of the present invention. The block of information pertaining to a particular metal-fuel card can be recorded in the data track physically adjacent the related metal-fuel zone facilitating easily access of such recorded information during the Discharging Mode of operation. Typically, the block of information will include the metal-fuel card identification number and a set of discharge parameters, as schematically indicated in FIG. 7B13, which are automatically detected by the Data Capture and Processing Subsystem 400 as the metal-fuel card is loaded within the discharging head assembly 197.

The first and second data recording methods described above have several advantages over the third method described above. In particular, when using the first and second methods, the data track provided along the metal-fuel card can have a very low information capacity. This is because very little information needs to be recorded to tag each metal fuel card with a unique identifier (i.e. address number or card identification number), to which sensed discharge parameters are recorded in the Metal-Fuel Database Management Subsystem 308. Also, formation of a data track in accordance with the first and second methods should be very inexpensive, as well as providing apparatus for reading card identifying information recorded along such data tracks.

Discharging Power Regulation Subsystem within the Metal-Fuel Card Discharging Subsystem As shown in FIGS. 7A3 and 7B4, the input port of the recharging power regulation subsystem 223 is operably connected to the output port of the cathode-electrolyte input terminal configuration subsystem 205, whereas the output port of the recharging power regulation subsystem 223 is operably connected to the input port of the electrical load 200. While the primary function of the discharging power regulation subsystem 223 is to regulate the electrical power delivered the electrical load 200 during its Discharging Mode of operation (i.e. produced from discharged metal-fuel cards loaded within the discharging heads hereof), the discharging power regulation subsystem 223 has a mode of programmed operation, wherein the output voltage across the electrical load as well as the electrical current flowing across the cathode-electrolyte interface are regulated during discharging operations. Such control functions are managed by the system controller 203 and can be programmably selected in a variety of ways in order to achieve optimal regulation to the electrical load 200 as multi-tracked and single-tracked metal-fuel cards are discharged in accordance with the principles of the present invention.

The discharging power regulating subsystem 223 can be realized using solid-state power, voltage and current control circuitry well known in the power, voltage and current control arts. Such circuitry can include electrically-programmable power switching circuits using transistor-controlled technology, in which one or more current-controlled sources are connectable in electrical series with the cathode and anode structures in order to control the electrical currents therethrough in response to control signals produced by the system controller 203 carrying out a particular Discharging Power Control Method. Such electrically-programmable power switching circuits can also include transistor-controlled technology, in which one or more voltage-controlled sources are connectable in electrical parallel with the cathode and anode structures in order to control the voltage thereacross in response to control signals produced by the system controller. Such circuitry can be combined and controlled by the system controller 203 in order to provide constant power (and/or voltage and/or current) control across the electrical load 200.

In the illustrative embodiments of the present invention, the primary function of the discharging power regulation subsystem 223 is to carry out real-time power regulation to the electrical load 200 using any one of the following Discharge Power Control Methods, namely: (1) a Constant Output Voltage/Variable Output Current Method, wherein the output voltage across the electrical load is maintained constant while the current is permitted to vary in response to loading conditions; (2) a Constant Output Current/Variable Output Voltage Method, wherein the current into the electrical load is maintained constant while the output voltage thereacross is permitted to vary in response to loading conditions; (3) a Constant Output Voltage/Constant Output Current Method, wherein the voltage across and current into the load are both maintained constant in response to loading conditions; (4) a Constant Output Power Method, wherein the output power across the electrical load is maintained constant in response to loading conditions; (5) a Pulsed Output Power Method, wherein the output power across the electrical load is pulsed with the duty cycle of each power pulse being maintained in accordance with preset conditions; (6) a Constant Output Voltage/Pulsed Output Current Method, wherein the output current into the electrical load is maintained constant while the current into the load is pulsed with a particular duty cycle; and (7) a Pulsed Output Voltage/Constant Output Current Method, wherein the output power into the load is pulsed while the current thereinto is maintained constant.

In the preferred embodiment of the present invention, each of the seven (7) Discharging Power Regulation Methods are preprogrammed into ROM associated with the system controller 203. Such power regulation methods can be selected in a variety of different ways, including, for example, by manually activating a switch or button on the system housing, by automatically detection of a physical, electrical, magnetic or optical condition established or detected at the interface between the electrical load and the Metal-Fuel Card Discharging Subsystem 186.

Input/Output Control Subsystem within the Metal-Fuel Card Discharging Subsystem

In some applications, it may be desirable or necessary to combine two or more FCB systems or their Metal-Fuel Card Discharging Subsystems 186 in order to form a resultant system with functionalities not provided by the such subsystems operating alone. Contemplating such applications, the Metal-Fuel Card Discharging Subsystem 186 hereof includes Input/Output Control Subsystem 224 which allows an external system (e.g. microcomputer or microcontroller) to override and control aspects of the Metal-Fuel Card Discharging Subsystem 186 as if its system controller were carrying out such control functions. In the illustrative embodiment, the Input/Output Control Subsystem 224 is realized as a standard IEEE I/O bus architecture which provides an external or remote computer system with a way and means of directly interfacing with the system controller 203 of the Metal-Fuel Card Discharging Subsystem 186 and managing various aspects of system and subsystem operation in a straightforward manner.

System Controller within the Metal-Fuel Card Discharging Subsystem

As illustrated in the detailed description set forth above, the system controller 203 performs numerous operations in order to carry out the diverse functions of the FCB system within its Discharging Mode. In the preferred embodiment of the FCB system of FIG. 6, the system controller 203 is realized using a programmed microcontroller having program and data storage memory (e.g. ROM, EPROM, RAM and the like) and a system bus structure well known in the microcomputing and control arts. In any particular embodiment of the present invention, it is understood that two or more microcontrollers may be combined in order to carry out the diverse set of functions performed by the FCB system hereof. All such embodiments are contemplated embodiments of the system of the present invention.

Discharging Metal-Fuel Cards Using the Metal-Fuel Card Discharging Subsystem

FIGS. 7A51 and 7A52 set forth a high-level flow chart describing the basic steps of discharging metal-fuel cards using the Metal-Fuel Card Discharging Subsystem shown in FIGS. 7A3 through 7A4.

As indicated at Block A of FIG. 7A51, the Recharged Card Loading Subsystem 189 transports four recharged metal-fuel cards 187 from the bottom of the recharged metal-fuel card storage bin 188A into the card discharging bay of the Metal-Fuel Card Discharging Subsystem 186, as illustrated in FIG. 7A1.

As indicated at Block B, the Discharge Head Transport Subsystem 204 arranges the recharging heads 197 about the metal-fuel cards loaded into the discharging bay of the Metal-Fuel Card Discharging Subsystem 186 so that the ionically-conducting medium is disposed between each cathode structure and loaded metal-fuel card, as shown in FIG. 7A2.

As indicated at Block C, the Discharge Head Transport Subsystem 204 then configures each discharging head so that its cathode structure is in ionic contact with a loaded metal-fuel card and its anode contacting structure is in electrical contact therewith.

As indicated at Block D in FIG. 7A51, the cathode-electrolyte input terminal configuration subsystem 205 automatically configures the output terminals of each discharging head 197 arranged about a loaded metal-fuel card, and then the system controller 203 controls the Metal-Fuel Card Discharging Subsystem 186 so that electrical power is generated and supplied to the electrical load 200 at the required output voltage and current levels.

As indicated at Block E in FIG. 7A52, when one or more of the metal-fuel cards are discharged, then the Discharged Card Unloading Subsystem 190 transports the discharged metal-fuel cards to the top of the discharged metal-fuel cards in the discharged metal-fuel card storage bin 188B. Thereafter, as indicated at Block F, the operations recited at Blocks A through E are repeated in order to load additional recharged metal-fuel cards into the discharge bay for discharging.

Metal-Fuel Card Recharging Subsystem for the Fifth Illustrative Embodiment of the Metal-Air FCB System of the Present Invention As shown in FIGS. 7B3 and 7B4, the Metal-Fuel Card Recharging Subsystem 191 of the fifth illustrative embodiment comprises a number of subsystems, namely: an assembly of multi-track metal-oxide reducing (i.e. recharging) heads 197', each having multi-element cathode structures 198' and anode-contacting structures 199' with electrically-conductive input terminals connectable in a manner to be described hereinbelow; a recharging head transport subsystem 204' for transporting the subcomponents of the recharging head assembly 197'; an input power supply subsystem 243 for converting externally supplied AC power signals into DC power supply signals having voltages suitable for recharging metal-fuel tracks along fuel cards loaded within the recharging heads of the Metal-Fuel Card Recharging Subsystem 191; a cathode-electrolyte input terminal configuration subsystem 244, for connecting the output terminals (port) of the input power supply subsystem 243 to the input terminals (port) of the cathode and anode-contacting structures of the recharging heads 197', under the control of the system controller 203' so as to supply input voltages thereto for electro-chemically converting metal-oxide formations into its primary metal during the Recharging Mode; a cathode-electrolyte voltage monitoring subsystem 206A', connected to the cathode-electrolyte input terminal configuration subsystem 244, for monitoring (i.e. sampling) the voltage applied across the cathode and anode structure of each track in each recharging head, and producing (digital) data representative of the sensed voltage levels; a cathode-electrolyte current monitoring subsystem 206B', connected to the cathode-electrolyte input terminal configuration subsystem 244, for monitoring (i.e. sampling) the electrical currents flowing through the cathode and anode structure of each track in each recharging head, and producing (digital) data representative of the sensed current levels; a cathode oxygen pressure control subsystem comprising the system controller 203', solid-state $PO_2$ sensors 250', a vacuum chamber (structure) 207' as shown in FIGS. 7B7 and 7B8, a vacuum pump 208', an electronically-controlled airflow control device 209', a manifold structure 210', and multi-lumen tubing 211' shown in FIGS. 7B3 and 7B4, arranged together as shown for sensing and controlling the $pO_2$ level within each channel of the cathode support structure of each recharging head 197'; an ion-concentration control subsystem comprising system controller 203', solid-state moisture sensors (hydrometer) 212', a moisturizing (e.g. micro-sprinklering element) 213' realized as a micro-sprinkler embodied within the walls structures of the cathode support plate 198' (having water expressing holes 214' disposed along each wall surface as shown in FIG. 7B6), a water pump 215', a water reservoir 216', a water flow control valve 217', a manifold structure 218' and multi-lumen conduits 219' extending into moisture delivery structure 213', arranged together as shown for sensing and modifying conditions within the FCB system (e.g. the moisture level or relative humidity at the cathode-electrolyte interface of the recharging heads 197') so that the ion-concentration at the cathode-electrolyte interfaces thereof is maintained within an optimal range during the Recharge Mode of operation to facilitate optimal ion transport threreacross; recharge head temperature control subsystem comprising the system controller 203', solid-state temperature sensors (e.g. thermistors) 305' embedded within each channel of the multi-cathode support structure 198' hereof, and a recharge head cooling device 306', responsive to control signals produced by the system controller 203', for lowering the temperature of each recharging channel to within an optimal temperature range during recharging operations; a relational-type metal-fuel database management subsystem (MFDMS) 404 operably connected to system controller 203' by way of local system bus 405, and designed for receiving particular types of information derived from the output of various subsystems within the Metal-Fuel Card Recharging Subsystem 191; a Data Capture and Processing Subsystem (DCPS) 406, comprising data reading head 270 (270', 270") embedded within or mounted closely to the cathode support structure of each recharging head 197', and a programmed microprocessor-based data processor adapted to receive data signals produced from cathode-electrolyte voltage monitoring subsystem 206A', cathode-electrolyte current monitoring subsystem 206B', the cathode oxygen pressure control subsystem, the recharge head temperature control subsystem and the ion-concentration control subsystem hereof, and enable (i) the reading metal-fuel card identification data from the loaded metal-fuel card, (ii) the recording sensed recharge parameters and computed metal-fuel indicative data derived therefrom in the Metal-Fuel Database Management Subsystem 404 using local system bus 407, and (iii) the reading prerecorded discharge parameters and prerecorded metal-oxide indicative data stored in the Metal-Fuel Database Management Subsystem 404 using local system bus 405; an input/output control subsystem 224', interfaced with the system controller 203', for controlling all functionalities of the FCB system by way of a remote system or resultant system, within which the FCB system is embedded; and system controller 203' for managing the operation of the above mentioned subsystems during the various modes of system operation. These subsystems will be described in greater technical detail below.

Multi-Zone Recharging Head Assembly within the Metal-Fuel Card Recharging Subsystem The function of the assembly of multi-zone recharging heads 197' is to electro-chemically reduce metal-oxide formations along the zones of metal-fuel cards loaded within the recharging head assembly during the Recharging Mode of operation. In the illustrative embodiment, each recharging head 197' comprises: a cathode element support plate 198' having a plurality of isolated recesses 231A' through 231D' with perforated bottom panels permitting the free flow of oxygen ($O_2$) therethrough; a plurality of electrically-conductive cathode elements (e.g. strips) 196A' through 196D' for insertion within the lower portion of these recesses 231A' through 231D', respectively; a plurality of electrolyte-impregnated strips 226A' through 226D' for placement over the cathode strips 196A' through 196D', and support within the recesses, respectively, as shown in FIG. 7B6; and oxygen-evacuation chamber 207' mounted over the upper (back) surface of the cathode element support plate 198', in a sealed manner, as shown in FIG. 7B 12.

As shown in FIGS. 7B3 and 7B4, the oxygen-evacuation chamber 207' has a plurality of subchambers 207A' through 207D' physically associated with recesses 231A' through 231D', respectively. Each vacuum subchamber 207A' through 207D' is isolated from all other subchambers and is in fluid communication with one channel supporting a cathode element and an electrolyte-impregnated element. As shown, each with vacuum pump 208' via one lumen of multi-lumen tubing 211', one channel of manifold assembly 210' and one channel of air-flow switch 209', each of whose operation is controlled by system controller 203'. This arrangement enables the system controller 203' to independently control the $pO_2$ level in each oxygen-evacuation subchamber 207A' through 207D' by selectively evacuating air from the chamber through the corresponding air flow channel in the manifold assembly 210.

As shown in FIG. 4, electrolyte-impregnated strips 226A' through 226D' are realized by impregnating an electrolyte-absorbing carrier strip with a gel-type electrolyte. Preferably, the electrolyte-absorbing carrier strip is realized as a strip of low-density, open-cell foam material made from PET plastic. The gel-electrolyte for the discharging cell is made from a formula consisting of alkali solution, a gelatin material, water, and additives well known in the art.

As shown in FIG. 7A8A, each cathode strip 196A' through 196D' is made from a sheet of nickel wire mesh 228' coated with porous carbon material and granulated platinum or other catalysts 229' to form a cathode element that is suitable for use in metal-air FCB systems. Details of cathode construction for use in air-metal FCB systems are disclosed in U.S. Pat. Nos. 4,894,296 and 4,129,633, incorporated herein by reference. To form a current collection pathway, an electrical conductor (nickel) 230' is soldered to the underlying wire mesh sheet 228' of each cathode strip. As shown in FIG. 7B6, each electrical conductor 230 attached to its cathode strip is passed through a hole 231' formed in the bottom surface of a recess of the cathode support plate, and is connected to the cathode-electrolyte input terminal configuration subsystem 244' shown in FIGS. 7B3 and 7B4. During assembly, the cathode strip pressed into the lower portion of the recess to secure the same therein.

As shown in FIG. 7B6, the bottom surface of each recess 224A' through 224D' has numerous perforations 225' formed therein to allow the free passage of air and oxygen therethrough to the cathode strip 196A' through 196D', respectively, (at atmospheric temperature and pressure). In the illustrative embodiment, electrolyte-impregnated strips 226A' through 226D' are placed over cathode strips 196A' through 196D', respectively, and are secured within the upper portion of the cathode supporting recesses by adhesive, retaining structures or the like. As shown in FIG. 7B12, when the cathode strips and thin electrolyte strips are mounted in their respective recesses in the cathode support plate 198', the outer surface of each electrolyte-impregnated strip is disposed flush with the upper surface of the cathode support plate 198'.

The interior surfaces of the cathode support recesses 224A' through 224D' are coated with a hydrophobic material (e.g. PTFE) 45" to ensure the expulsion of water within electrolyte-impregnated strips 226A' through 226D' and thus optimum oxygen transport across the cathode strips. Hydrophobic agents are added to the carbon material constituting the oxygen-pervious cathode elements in order to repel water therefrom. Preferably, the cathode support plate is made from an electrically non-conductive material, such as polyvinyl chloride (PVC) plastic material well known in the art. The cathode support plate can be fabricated using injection molding technology also well known in the art.

In FIG. 7B7, the oxygen-injection chamber 207' is shown realized as a plate-like structure having dimensions similar to that of the cathode support plate 198'. As shown, the oxygen-injection chamber has four (4) recesses 207A' through 207D' which spatially correspond to and are in spatial registration with cathode recesses 224A' through 224D', respectively, when oxygen-injection chamber 207' is mounted upon the top surface of the cathode support plate 198', as shown in FIG. 7B12. Four small conduits are formed within the recessed plate 207', namely: between inlet opening 207E1' and outlet opening 207A1'; between inlet opening 207E2' and outlet opening 207B 1'; between inlet opening 207E3' and outlet opening 207C 1'; and between inlet opening 207E4' and outlet opening 207D1'. When recessed plate 207' is mounted upon the cathode support plate 198', subchambers 207A' through 207D' are formed between recesses 207A' through 207D' and the back portion of the perforated cathode support plate 198'. Each lumen of the multi-lumen conduit 211' is connected to one of the four inlet openings 207E1' through 207E4', and thereby arranges the subchambers 207A' through 207D' in fluid communication with the four controlled $O_2$-flow channels within the $pO_2$ control subsystem in the Recharging Subsystem 191.

The structure of an assembled multi-tracked fuel card 187 partially oxidized is illustrated in FIG. 7B9. While not shown, metal-oxide patterns are formed along each anode fuel strip 195A' through 195D' in response to electrical loading conditions during discharging operations.

In FIG. 7B11, an exemplary metal-fuel (anode) contacting structure (assembly) 199' is disclosed for use with the multi-tracked fuel card 187 having cathode support structure 228' shown in FIG. 7B6. As shown, a plurality of electrically conductive elements 232A' through 232D' in the form of conductive posts are supported from a metal-fuel contacting support platform 233'. The position of these electrically conductive posts spatially coincide with the holes 230' formed in the bottom surfaces of recesses 229A' through 229D' in the anode supporting plate 228'. As shown, electrical conductors 234A' through 234D' are electrically connected to conductive posts 232A' through 232D', respectively, and anchored along the surface of the anode support plate (e.g. within a recessed groove) and terminate in a conventional connector 235B, similar to conductor terminations at electrical connector 235A'. This connector is electrically connected to the cathode-electrolyte input terminal configuration subsystem 244 as shown in FIGS. 7B3 and 7B4. The width and length dimensions of the anode contacting support plate 233 are substantially similar to the width and length dimensions of the cathode support plate 198' as well as the anode (metal-fuel) support plate 228'.

FIG. 7D illustrates the spatial relationship between the anode contacting support plate 233', cathode support plate 198', oxygen-injection chamber plate 207', and anode (metal-fuel) support plate (i.e. fuel card) 228 when the fuel card is loaded therebetween. In this loaded configuration, each cathode element 196A' through 196D' along the cathode support plate establishes ionic contact with the front exposed surface of the corresponding metal fuel strip (i.e. zone) 195A' through 195D' by way of the electrolyte-impregnated pad 226A' through 226D' disposed therebetween Also, in this loaded configuration, each anode-contacting element (e.g. conductive post) 232A'–232D' projects from the anode contacting support plate 233' through the central hole 230' in the bottom panel of a recess formed in the anode contacting support plate 199' and establishes electrical contact with the corresponding metal fuel strip mounted therein, completing an electrical circuit through a single air-metal fuel cell of the present invention.

Recharging Head Transport Subsystem within the Metal-Fuel Card Recharging Subsystem The primary function of the recharging head transport subsystem 204' is to transport the assembly of recharging heads 197' about the metal-fuel cards that have been loaded into the recharging bay of the subsystem as shown in FIGS. 7B3 and 7B4. When properly transported, the cathode and anode-contacting structures of the recharging heads are brought into "ionically-conductive" and "electrically-conductive" contact with the metal-fuel zones of loaded metal-fuel cards during the Recharging Mode.

The recharging head transport subsystem 204' can be realized using any one of a variety of electro-mechanical mechanisms capable of transporting the cathode supporting and anode-contacting structures of each recharging head 197' away from the metal-fuel card 187, as shown in FIG. 7B3, and about the metal-fuel card as shown in FIG. 7B4. As shown, these transport mechanisms are operably connected to system controller 203' and controlled by the same in accordance with the system control program carried out thereby.

Input Power Supply Subsystem within the Metal-Fuel Card Recharging Subsystem

In the illustrative embodiment, the primary function of the Input Power Supply Subsystem 243 is to receive as input, standard alternating current (AC) electrical power (e.g. at 120 or 220 Volts) through an insulated power cord, and to convert such electrical power into regulated direct current (DC) electrical power at a regulated voltage required at the recharging heads 197' of the Metal-Fuel Card Recharging Subsystem 191 during the recharging mode of operation. For zinc anodes and carbon cathodes, the required "open-cell" voltage $v_{acr}$ across each anode-cathode structure during recharging is about 2.2–2.3 Volts in order to sustain electrochemical reduction. This subsystem can be realized in various ways using power conversion and regulation circuitry well known in the art.

Cathode-Anode Input Terminal Configuration Subsystem within the Metal-Fuel Card Recharging Subsystem As shown in FIGS. 7B3 and 7B4, the cathode-electrolyte input terminal configuration subsystem 244 is connected between the input terminals of the recharging power regulation subsystem 245 and the input terminals of the cathode-electrolyte pairs associated with multiple tracks of the recharging heads 197'. The system controller 203' is operably connected to cathode-electrolyte input terminal configuration subsystem 244 in order to supply control signals thereto for carrying out its functions during the Recharge Mode of operation.

The function of the cathode-electrolyte input terminal configuration subsystem 244 is to automatically configure (in series or parallel) the input terminals of selected cathode-electrolyte pairs within the recharging heads of the Metal-Fuel Card Recharging Subsystem 191 so that the required input (recharging) voltage level is applied across cathode-electrolyte structures of metal-fuel tracks requiring recharging. In the illustrative embodiment of the present invention, the cathode-electrolyte input terminal configuration mechanism 244 can be realized as one or more electrically-programmable power switching circuits using transistor-controlled technology, wherein the cathode and anode-contacting elements within the recharging heads 197' are connected to the output terminals of the input power regulating subsystem 245. Such switching operations are carried out under the control of the system controller 203' so that the required output voltage produced by the recharging power regulating subsystem 245 is applied across the cathode-electrolyte structures of metal-fuel tracks requiring recharging.

Cathode-Anode Voltage Monitoring Subsystem within the Metal-Fuel Card Recharging Subsystem As shown in FIGS. 7B3 and 7B4, the cathode-electrolyte voltage monitoring subsystem 206A' is operably connected to the cathode-electrolyte input terminal configuration subsystem 244 for sensing voltage levels across the cathode and anode structures connected thereto. This subsystem is also operably connected to the system controller 203' for receiving control signals therefrom required to carry out its functions. In the first illustrative embodiment, the cathode-electrolyte voltage monitoring subsystem 206A' has two primary functions: to automatically sense the instantaneous voltage levels applied across the cathode-electrolyte structures associated with each metal-fuel zone loaded within each recharging head during the Recharging Mode; and to produce (digital) data signals indicative of the sensed voltages for detection and analysis by the Data Capture and Processing Subsystem 406 within the Metal-Fuel Card Recharging Subsystem 191.

In the first illustrative embodiment of the present invention, the cathode-electrolyte voltage monitoring subsystem 206A' can be realized using electronic circuitry adapted for sensing voltage levels applied across the cathode-electrolyte structures associated with each metal-fuel zone within each recharging head within the Metal-Fuel Card Recharging Subsystem 191. In response to such detected voltage levels, the electronic circuitry can be designed to produce a digital data signals indicative of the sensed voltage levels for detection and analysis by the Data Capture and Processing Subsystem 406. As will be described in greater detail hereinafter, such data signals can be used by the system controller 203' to carry out its Recharging Power Regulation Method during the Recharging Mode of operation.

Cathode-Anode Current Monitoring Subsystem within the Metal-Fuel Card Recharging Subsystem As shown in FIGS. 7B3 and 7B4, the cathode-electrolyte current monitoring subsystem 206B' is operably connected to the cathode-electrolyte input terminal configuration subsystem 244. The cathode-electrolyte current monitoring subsystem 206B' has two primary functions: to automatically sense the magnitude of electrical current flowing through the cathode-electrolyte pair of each metal-fuel track along each recharging head assembly within the Metal-Fuel Card Recharging Subsystem 191 during the discharging mode; and to produce digital data signals indicative of the sensed currents for detection and analysis by Data Capture and Processing Subsystem 406 within the Metal-Fuel Card Recharging Subsystem 191.

In the first illustrative embodiment of the present invention, the cathode-electrolyte current monitoring subsystem 206B' can be realized using current sensing circuitry for sensing the electrical current passed through the cathode-electrolyte pair of each metal-fuel track (i.e. strip) along each recharging head assembly, and producing digital data signals indicative of the sensed current levels. As will be explained in greater detail hereinafter, these detected current levels can be used by the system controller in carrying out its recharging power regulation method, and well as creating a "recharging condition history" information file for each zone or subsection of recharged metal-fuel card.

Cathode Oxygen Pressure Control Subsystem within the Metal-Fuel Card Recharging Subsystem The function of the cathode oxygen pressure control subsystem is to sense the oxygen pressure ($pO_2$) within each subchannel of the cathode structure of the recharging heads 175, and in response thereto, control (i.e. increase or decrease) the same by regulating the air ($O_2$) pressure within the subchannels of such cathode structures within each recharging head 197'. In accordance with the present invention, partial oxygen pressure ($pO_2$) within each subchannel of the cathode structure of each recharging head is maintained at an optimal level in order to allow optimal oxygen evacuation from the recharging heads during the Recharging Mode. By lowering the $pO_2$ level within each channel of the cathode structure (by evacuation), metal-oxide along metal-fuel cards can be completely recovered with optimal use of input power supplied to the recharging heads during the Recharging Mode. Also, by monitoring changes in $pO_2$ and producing digital data signals representative thereof for detection and analysis by Data Capture and Processing Subsystem 406 and ultimate response the system controller 203'. Thus the system controller 203' is provided with a controllable variable for use in regulating the electrical power supplied to the discharged fuel tracks during the Recharging Mode.

Ion-Concentration Control Subsystem within the Metal-Fuel Card Recharging Subsystem In the illustrative embodiment of FIG. 6, ion-concentration control within each recharging head 197' is achieved by embedding a miniature solid-state humidity (or moisture) sensor 212' within the cathode support structure 121' as shown in FIG. 7B6 (or as close as possible to the anode-cathode interfaces) in order to sense moisture or humidity conditions therein and produce a digital data signal indicative thereof. This digital data signal is supplied to the Data Capture and Processing Subsystem 406 for detection and analysis. In the event that the moisture level or relative humidity drops below the predetermined threshold value set in memory (ROM) within the system controller, the system controller 203', monitoring information in the Metal-Fuel Database Management Subsystem 404 automatically generates a control signal supplied to a moisturizing element 213', realizable as a micro-sprinkling structure embodied within the walls of the cathode support structure 198'. In the illustrative embodiment, the walls function as water-carrying conduits which express fine water droplets out of micro-sized holes 214' in a manner similar to that carried out in the cathode support structure 198 in the discharge head 197. Thus the function of the water pump 215', water reservoir 216', water flow-control valve 217', manifold assembly 218' and multi-lumen tubing 219' is similar to water pump 215, water reservoir 216, water flow-control valve 217, manifold assembly 218 and multi-lumen tubing 219, respectively.

Such operations will increase (or decrease) the moisture level or relative humidity within the interior of the cathode support structure channels and thus ensure that the concentration of KOH within the electrolyte within electrolyte-impregnated strips supported therewithin is optimally maintained for ion transport and thus metal-oxide reduction during card recharging operations.

Data Capture and Processing Subsystem within the Metal-Fuel Card Recharging Subsystem In the illustrative embodiment of FIG. 6, Data Capture And Processing Subsystem (DCPS) 406 shown in FIGS. 7B3 and 7B4 carries out a number of functions, including, for example: (1) identifying each metal-fuel card immediately before it is loaded within a particular recharging head within the recharging head assembly 197' and producing metal-fuel card identification data representative thereof; (2) sensing (i.e. detecting) various "recharge parameters" within the Metal-Fuel Card Recharging Subsystem 191 existing during the time period that the identified metal-fuel card is loaded within the recharging head assembly thereof; (3) computing one or more parameters, estimates or measures indicative of the amount of metal-fuel produced during card recharging operations, and producing "metal-fuel indicative data" representative of such computed parameters, estimates and/or measures; and (4) recording in the Metal-Fuel Database Management Subsystem 404 (accessible by system controller 203'), sensed recharge parameter data as well as computed metal-fuel indicative data both correlated to its respective metal-fuel track/card identified during the Recharging Mode of operation. As will become apparent hereinafter, such recorded information maintained within the Metal-Fuel Database Management Subsystem 404 by Data Capture and Processing Subsystem 406 can be used by the system controller 203' in various ways including, for example: optimally recharging partially or completely oxidized metal-fuel cards in a rapid manner during the Recharging Mode of operation.

During recharging operations, the Data Capture and Processing Subsystem 406 automatically samples (or captures) data signals representative of "recharge parameters" associated with the various subsystems constituting the Metal-Fuel Card Recharging Subsystem 191 described above. These sampled values are encoded as information within the data signals produced by such subsystems during the Recharging Mode. In accordance with the principles of the present invention, card-type "recharge parameters" shall include, but are not limited to: the voltages produced across the cathode and anode structures along particular metal-fuel zones monitored, for example, by the cathode anode voltage monitoring subsystem 206A'; the electrical currents flowing through the cathode and anode structures along particular metal-fuel tracks monitored, for example, by the cathode-electrolyte current monitoring subsystem 206B'; the oxygen saturation level ($pO_2$) within the cathode structure of each recharging head 197', monitored by the cathode oxygen pressure control subsystem (203', 250', 208', 209', 210', 211'); the moisture ($H_2O$) level (or relative humidity) level across or near the cathode-electrolyte interface along particular metal-fuel tracks in particular recharging heads monitored, for example, by the ion-concentration control subsystem (203', 212', 214', 215', 216', 217', 218', 219'); the temperature ($T_r$) of the recharging heads 197' during card recharging operations; and the time duration ($\Delta t_r$) of the state of any of the above-identified recharge parameters.

In general, there a number of different ways in which the Data Capture and Processing Subsystem can record card-type "recharge parameters" during the Recharging Mode of operation. These different methods will be detailed hereinbelow.

According to a first method of data recording shown in FIG. 7B9, card identifying code or indicia (e.g. miniature bar code symbol encoded with zone identifying information) 240 graphically printed on an "optical" data track 241, can be read by optical data reader 270 realized using optical techniques (e.g. laser scanning bar code symbol readers, or optical decoders). In the illustrative embodiment, information representative of these unique card identifying codes is encoded within data signals provided to the Data Capture and Processing Subsystem 406, and subsequent recorded within the Metal-Fuel Database Management Subsystem 404 during recharging operations.

According to a second method of data recording shown in FIG. 7B9, digital "card identifying" code 240' magnetically recorded in a magnetic data track 241', can be read by magnetic reading head 270' realized using magnetic information reading techniques well known in the art. In the illustrative embodiment, the digital data representative of these unique card identifying codes is encoded within data signals provided to the Data Capture and Processing Subsystem 406, and subsequent recorded within the Metal-Fuel Database Management Subsystem 404 during recharging operations.

According to a third method of data recording shown in FIG. 7B9, digital "card identifying" code recorded as a sequence of light transmission apertures 240" in an optically opaque data track 241", can be read by optical sensing head 270" realized using optical sensing techniques well known in the art. In the illustrative embodiment, the digital data representative of these unique zone identifying codes is encoded within data signals provided to the Data Capture and Processing Subsystem 406, and subsequent recorded within the Metal-Fuel Database Management Subsystem 404 during recharging operations.

According to a fourth alternative method of data recording, both unique digital "card identifying" code and set of recharge parameters for each track on the identified metal-fuel card are recorded in a magnetic, optical, or apertured data track, realized as a strip attached to the surface of the metal-fuel card of the present invention. The block of information pertaining to a particular metal-fuel card can be recorded in the data track physically adjacent the related metal-fuel zone facilitating easily access of such recorded information during the Recharging Mode of operation. Typically, the block of information will include the metal-fuel card identification number and a set of recharge parameters, as schematically indicated in FIG. 7B13, which are automatically detected by the Data Capture and Processing Subsystem 406 as the metal-fuel card is loaded within the recharging head assembly 197'.

The first and second data recording methods described above have several advantages over the third method described above. In particular, when using the first and second methods, the data track provided along the metal-fuel card can have a very low information capacity. This is because very little information needs to be recorded to tag each metal-fuel card with a unique identifier (i.e. address number or card identification number), to which sensed recharge parameters are recorded in the Metal-Fuel Database Management Subsystem 404. Also, formation of a data track in accordance with the first and second methods should be very inexpensive, as well as providing apparatus for reading card identifying information recorded along such data tracks.

Input/Output Control Subsystem within the Metal-Fuel Card Recharging Subsystem

In some applications, it may be desirable or necessary to combine two or more FCB systems or their Metal-Fuel Card Recharging Subsystems 191 in order to form a resultant system with functionalities not provided by the such subsystems operating alone. Contemplating such applications, the Metal-Fuel Card Recharging Subsystem 191 hereof includes an Input/Output Control Subsystem 224' which allows an external system (e.g. microcomputer or microcontroller) to override and control aspects of the Metal-Fuel Card Recharging Subsystem as if its system controller 203' were carrying out such control functions. In the illustrative embodiment, the Input/Output Control Subsystem 224' is realized as a standard IEEE I/O bus architecture which provides an external or remote computer system with a way and means of directly interfacing with the system controller 203' of the Metal-Fuel Card Recharging Subsystem 191 and managing various aspects of system and subsystem operation in a straightforward manner.

Recharging Power Regulation Subsystem within the Metal-Fuel Card Recharging Subsystem As shown in FIGS. 7B3 and 5B4, the output port of the recharging power regulation subsystem 244 is operably connected to the input port of the cathode-electrolyte input terminal configuration subsystem 244, whereas the input port of the recharging power regulation subsystem 245 is operably connected to the output port of the input power supply 243. While the primary function of the recharging power regulation subsystem 245 is to regulate the electrical power supplied to metal-fuel card during the Recharging Mode of operation, the recharging power regulation subsystem 245 can also regulate the voltage applied across the cathode-electrolyte structures of the metal-fuel tracks, as well as the electrical currents flowing through the cathode-electrolyte interfaces thereof during recharging operations. Such control functions are managed by the system controller 203' and can be programmably selected in a variety of ways in order to achieve optimal recharging of multi-tracked and single-tracked metal-fuel card according to the present invention.

The input power regulating subsystem 245 can be realized using solid-state power, voltage and current control circuitry well known in the power, voltage and current control arts. Such circuitry can include electrically-programmable power switching circuits using transistor-controlled technology, in which one or more current-controlled sources are connectable in electrical series with the cathode and anode structures in order to control the electrical currents therethrough in response to control signals produced by the system controller carrying out a particular Recharging Power Control Method. Such electrically-programmable power switching circuits can also include transistor-controlled technology, in which one or more voltage-controlled sources are connectable in electrical parallel with the cathode and anode structures in order to control the voltage thereacross in response to control signals produced by the system controller. Such circuitry can be combined and controlled by the system controller 203' in order to provide constant power (and/or voltage and/or current) control across the cathode-electrolyte structures of the metal-fuel card 187.

In the illustrative embodiments of the present invention, the primary function of the recharging power regulation subsystem 245 is to carry out real-time power regulation to the cathode/anode structures of metal-fuel card 187 using any one of the following methods, namely: (1) a Constant Input Voltage/ Variable Input Current Method, wherein the input voltage applied across each cathode-electrolyte structure is maintained constant while the current therethrough is permitted to vary in response to loading conditions presented by metal-oxide formations on the recharging card; (2) a Constant Input Current/Variable Input Voltage Method, wherein the current into each cathode-electrolyte structure is maintained constant while the output voltage thereacross is permitted to vary in response to loading conditions; (3) a Constant Input Voltage/ Constant Input Current Method, wherein the voltage applied across and current into each cathode-electrolyte structure during recharging are both maintained constant in response to loading conditions; (4) a Constant Input Power Method, wherein the input power applied across each cathode-electrolyte structure during recharging is maintained constant in response to loading conditions; (5) a Pulsed Input Power Method, wherein the input power applied across each cathode-electrolyte structure during recharging pulsed with the duty cycle of each power pulse being maintained in accordance with preset or dynamic conditions; (6) a Constant Input Voltage/Pulsed Input Current Method, wherein the input current into each cathode-electrolyte structure during recharging is maintained constant while the current into the cathode-electrolyte structure is pulsed with a particular duty cycle; and (7) a Pulsed Input Voltage/Constant Input Current Method, wherein the input power supplied to each cathode-electrolyte structure during recharging is pulsed while the current thereinto is maintained constant.

In the preferred embodiment of the present invention, each of the seven (7) Recharging Power Regulation Methods are preprogrammed into ROM associated with the system controller 203'. Such power regulation methods can be selected in a variety of different ways, including, for example, by manually activating a switch or button on the system housing, by automatically detection of a physical, electrical, magnetic an/or optical condition established or detected at the interface between the metal-fuel card device and the Metal-Fuel Card Recharging Subsystem 191.

System Controller within the Metal-Fuel Card Recharging Subsystem

As illustrated in the detailed description set forth above, the system controller 203' performs numerous operations in order to carry out the diverse functions of the FCB system within its Recharging Mode. In the preferred embodiment of the FCB system of FIG. 6, the subsystem used to realize the system controller 203' in the Metal-Fuel Card Recharging Subsystem 191 is the same subsystem used to realize the system controller 203 in the Metal-Fuel Card Discharging Subsystem 186. It is understood, however, the system controllers employed in the Discharging and Recharging Subsystems 186 and 191 can be realized as separate subsystems, each employing one or more programmed microcontrollers in order to carry out the diverse set of functions performed by the FCB system hereof. In either case, the input/output control subsystem of one of these subsystems can be designed to be the primary input/output control subsystem, with which one or more external subsystems (e.g. a management subsystem) can be interfaced to enable external or remote management of the functions carried out within FCB system hereof.

Recharging Metal-Fuel Cards Using The Metal-Fuel Card Recharging Subsystem

FIGS. 7B51 and 7B52 set forth a high-level flow chart describing the basic steps of recharging metal-fuel cards using the Metal-Fuel Card Recharging Subsystem 191 shown in FIGS. 7B3 through 7B4.

As indicated at Block A in FIG. 7B51, the Discharge Card Loading Subsystem 192 transports four discharged metal-fuel cards 187 from the bottom of the discharged metal-fuel card storage bin 188B into the card recharging bay of the Metal-Fuel Card Recharging Subsystem 191, as illustrated in FIG. 7B1.

As indicated at Block B, the Recharge Head Transport Subsystem 204' arranges the recharging heads 197' about the metal-fuel cards loaded into the recharging bay of the Metal-Fuel Card Recharging Subsystem 191 so that the ionically-conducting medium is disposed between each cathode structure and loaded metal-fuel card.

As indicated at Block C, the Recharge Head Transport Subsystem 204' then configures each recharging head 197' so that its cathode structure is in ionic contact with a loaded metal-fuel card and its anode contacting structure is in electrical contact therewith.

As indicated at Block D in FIG. 7B51, the cathode-electrolyte input terminal configuration subsystem 244 automatically configures the input terminals of each recharging head 197' arranged about a loaded metal-fuel card, and then the system controller 203' controls the Metal-Fuel Card Recharging Subsystem 191 so that electrical power is supplied to the metal fuel zones of the metal-fuel cards at the voltage and current level required for optimal recharging.

As indicated at Block E in FIG. 7B52, when one or more of the metal-fuel cards are recharged, then the Recharge Card Unloading Subsystem 193 transports the recharged metal-fuel card(s) to the top of the recharged metal-fuel cards in the recharged metal-fuel card storage bin 188B, as shown in FIG. 7B2. Thereafter, as indicated at Block F, the operations recited at Blocks A through E are repeated in order to load additional discharged metal-fuel cards into the recharge bay for recharging.

Managing Metal-Fuel Availability and Metal-Oxide Presence within the Fifth Illustrative Embodiment of the Metal-Air FCB System of the Present Invention During the Discharging Mode In the FCB system of the fifth illustrative embodiment shown in FIG. 6, means are provided for automatically managing the metal-fuel availability within the Metal-Fuel Card Discharging Subsystem 186 during discharging operations. Such system capabilities will be described in greater detail hereinbelow.

As shown in FIG. 7B14, data signals representative of discharge parameters (e.g., $i_{acd}$, $v_{acd}$ . . . , $pO_{2d}$, $H_2O_d$, $T_{acd}$, $V_{acr}/i_{acr}$) are automatically provided as input to the Data Capture and Processing Subsystem 400 within the Metal-Fuel Card Discharging Subsystem 186. After sampling and capturing, these data signals are processed and converted into corresponding data elements and then written into an information structure 409 as shown, for example, in FIG. 7A13. Each information structure 409 comprises a set of data elements which are "time-stamped" and related (i.e. linked) to a unique metal-fuel card identifier 240 (240', 240"), associated with a particular metal-fuel card. The unique metal-fuel card identifier is determined by data reading head 260 (260', 260") shown in FIG. 7A6. Each time-stamped information structure is then recorded within the Metal-Fuel Database Management Subsystem 308 within the Metal-Fuel Card Discharging Subsystem 186, for maintenance, subsequent processing and/or access during future recharging and/or discharging operations.

As mentioned hereinabove, various types of information are sampled and collected by the Data Capture and Processing Subsystem 400 during the discharging mode. Such information types include, for example: (1) the amount of electrical current ($i_{acd}$) discharged across particular cathode-electrolyte structures within particular discharge heads; (2) the voltage generated across each such cathode-electrolyte structure; (3) the oxygen concentration ($pO_{2d}$) level in each subchamber within each discharging head; (4) the moisture level ($H_2O_d$) near each cathode-electrolyte interface within each discharging head; and (5) the temperature ($T_{acd}$) within each channel of each discharging head. From such collected information, the Data Capture and Processing Subsystem 400 can readily compute (i) the time ($\Delta t_d$) duration that electrical current was discharged across a particular cathode-electrolyte structure within a particular discharge head.

The information structures produced by the Data Capture and Processing Subsystem 400 are stored within the Metal-Fuel Database Management Subsystem 308 within the Metal-Fuel Card Discharging Subsystem 186 on a real-time basis and can be used in a variety of ways during discharging operations.

For example, the above-described current ($i_{acd}$) and time ($\Delta t_d$) information is conventionally measured in Amperes and Hours, respectively. The product of these measures, denoted by "AH", provides an approximate measure of the electrical charge (−Q) that has been "discharged" from the metal-air fuel cell battery structures along the metal-fuel tape. Thus the computed "AH" product provides an accurate amount of metal-oxide that one can expect to have been formed on a particular track of an identified (i.e. labeled) metal-fuel card at a particular instant in time, during discharging operations.

When used with historical information about metal oxidation and reduction processes, the Metal-Fuel Database Management Subsystems 308 and 404 within the Metal-Fuel Card Discharging and Recharging Subsystems 186 and 191, respectively, can account for or determine how much metal-fuel (e.g. zinc) should be available for discharging (i.e. producing electrical power) from a particular zinc-fuel card, or how much metal-oxide is present for reducing therealong. Thus such information can be very useful in carrying out metal-fuel management functions including, for example, determination of metal-fuel amounts available along a particular metal-fuel zone.

In the illustrative embodiment, metal-fuel availability is managed within the Metal-Fuel Card Discharging Subsystem 186, using the method of metal-fuel availability management described hereinbelow.

Preferred Method of Metal-Fuel Availability Management During Discharging Operations In accordance with the principles of the present invention, the data reading head 260 (260', 260') automatically identifies each metal-fuel card as it is loaded within the discharging assembly 197 and produces card identification data indicative thereof which is supplied to the Data Capture and Processing Subsystem within the Metal-Fuel Card Discharging Subsystem 186. Upon receiving card identification data on the loaded metal-fuel card, the Data Capture and Processing Subsystem automatically creates an information structure (i.e. data file) on the card within the Metal-Fuel Database Management Subsystem. The function of the information structure, shown in FIG. 7A13, is to record current (up-to-date) information on sensed discharging parameters, the metal-fuel availability state, metal-oxide presence state, and the like. In the event that an information storage structure has been previously created for this particular metal-fuel card within the Metal-Fuel Database Management Subsystem, this information file is then accessed for updating. As shown in FIG. 7A13, for each identified metal-fuel card, an information structure 409 is maintained for each metal-fuel zone ($MFZ_j$), at each i-th sampled instant of time $t_j$.

Once an information structure has been created (or found) for a particular metal-fuel card 187, the initial state or condition of each metal-fuel zone thereon 195A through 195D must be determined and entered within the information structure maintained within the Metal-Fuel Database Management Subsystem 308 of the Metal-Fuel Card Discharging Subsystem 186.

Typically, the metal-fuel card loaded within the discharging head assembly 197 will be partially or fully charged, and thus containing a particular amount of metal-fuel along its support surface. For accurate metal-fuel management, these initial metal-fuel amounts (MFAs) in the loaded card must be determined and then information representative thereof stored with the Metal-Fuel Database Management Subsystems 308 and 404 of the Discharging and Recharging Subsystems 186 and 191, respectively. In general, initial states of information can be acquired in a number of different ways, including for example: by encoding such initialization information on the metal-fuel card prior to completing a discharging operation on a different FCB system; by prerecording such initialization information within the Metal-Fuel Database Management Subsystem 308 during the most recent discharging operation carried out in the same FCB system; by recording within the Metal-Fuel Database Management Subsystem 308 (at the factory), the amount of metal-fuel present on each track of a particular type metal-fuel card, and automatically initializing such information within a particular information structure upon reading a code on the metal-fuel card using data reading head 260 (260', 260"); by actually measuring the initial amount of metal-fuel on each metal-fuel track using the metal-oxide sensing assembly described above in conjunction with the cathode-electrolyte output terminal configuration subsystem 205; or by any other suitable technique.

The actual measurement technique mentioned above can be carried out by configuring metal-oxide sensing ($v_{applied}/i_{response}$) drive circuitry (shown in FIG. 2A15) with the cathode-electrolyte output terminal configuration subsystem 205 and Data Capture and Processing Subsystem 400 within the Metal-Fuel Card Discharging Subsystem 186. Using this arrangement, the metal-oxide sensing heads can automatically acquire information on the "initial" state of each metal-fuel track on each identified metal-fuel card loaded within the discharging head assembly 197. Such information would include the initial amount of metal-oxide and metal-fuel present on each zone (195A through 195D) at the time of loading, denoted by "$t_0$".

In a manner similar to that described in connection with the FCB systems of FIGS. 1 and 4, such metal-fuel/metal-oxide measurements are carried out on each metal-fuel zone (MFZ) of the loaded card 187 by automatically applying a test voltage across a particular metal fuel zone 195A through 195D, and detecting the electrical which flows thereacross in response the applied electrical test voltage. The data signals representative of the applied test voltage ($v_{applied}$) and response current ($i_{response}$) at a particular sampling period are automatically detected by the Data Capture and Processing Subsystem 400 and processed to produce a data element representative of the ratio of the applied voltage to response current (i.e., $V_{applied}/(i_{response})$ with appropriate numerical scaling. This data element is automatically recorded within an information structure linked to the identified metal-fuel card maintained in the Metal-Fuel Data Management Subsystem 308. As this data element (v/i) provides a direct measure of electrical resistance across the metal-fuel zone under measurement, it can be accurately correlated to a measured amount of metal-oxide present on the identified metal-fuel zone.

Data Capture and Processing Subsystem 400 then quantifies the measured initial metal-oxide amount (available at initial time instant to), and designates it as $MOA_0$ for recording within the information structure (shown in FIG. 7A13). Then using a priori information about the maximum metal-fuel available on each track when fully (re)charged, the Data Capture and Processing Subsystem 400 computes an accurate measure of metal-fuel available on each track at time "$t_0$", for each fuel track, designates each measures as $MFA_0$ and records these initial metal-fuel measures $\{MFA_0\}$ for the identified fuel card within the Metal-Fuel Database Management Subsystems of both the Metal-Fuel Card Discharging and Recharging Subsystems 186 and 191, respectively. While this initialization procedure is simple to carry out, it is understood that in some applications it may be more desirable to empirically determine these initial metal-fuel measures using theoretically-based computations premised on the metal-fuel cards having been subjected to a known course of treatment (e.g. the Short Circuit Resistance Test described hereinabove).

After the initialization procedure is completed, the Metal-Fuel Card Discharging Subsystem 186 is ready to carry out its metal-fuel management functions along the lines to be described hereinbelow. In the illustrative embodiment, this method involves two basic steps that are carried out in a cyclical manner during discharging operations.

The first step of the procedure involves subtracting from the initial metal-fuel amount $MFA_0$, the computed metal-oxide estimate $MOE_{0-1}$ which corresponds to the amount of metal-oxide produced during discharging operations conducted between time interval $t_0$–$t_1$. The during the discharging operation, metal-oxide estimate $MOE_{0-1}$ is computed using the following discharging parameters collected—electrical discharge current $i_{acd}$, and time duration $\Delta t_d$.

The second step of the procedure involves adding to the computed measure ($MFA_0$–$MOE_{0-1}$), the metal-fuel estimate $MFE_{0-1}$ which corresponds to the amount of metal-fuel produced during any recharging operations that may have been conducted between time interval $t_0$–$t_1$. Notably, the metal-fuel estimate $MFE_{0-1}$ is computed using: the electrical recharge current $i_{acr}$; and time duration $\Delta t$, during the discharging operation. Notably, metal-fuel measure $MFE_{0-1}$ will have been previously computed and recorded within the Metal-Fuel Database Management Subsystem within the Metal-Fuel Card Recharging Subsystem 186 during the immediately previous recharging operation (if one such operation was carried out). Thus, it will be necessary to read this prerecorded information element from the database within the Recharging Subsystem 191 during current discharging operations.

The computed result of the above-described accounting procedure (i.e. $MFA_0$–$MOE_{0-1}$+$MFE_{0-1}$) is then posted within the Metal-Fuel Database Management Subsystem 400 within Metal-Fuel Card Discharging Subsystem 186 as the new current metal-fuel amount ($MFA_1$) which will be used in the next metal-fuel availability update procedure. During discharging operations, the above-described update procedure is carried out for every $t_i$–$t_{i+1}$ seconds for each metal-fuel track that is being discharged.

Such information maintained on each metal-fuel track can be used in a variety of ways, for example: manage the availability of metal-fuel to meet the electrical power demands of the electrical load connected to the FCB system; as well as setting the discharging parameters in an optimal manner during discharging operations. The details pertaining to this metal-fuel management techniques will be described in greater detail hereinbelow.

Uses for Metal-Fuel Availability Management during the Discharging Mode of Operation During discharging operations, the computed estimates of metal-fuel present over any particular metal-fuel zone 195A through 195D at time $t_2$ (i.e. $MFZ_{t1-t2}$), determined at the J-th discharging head, can be used to compute the availability of metal-fuel at the (j−1)th, (j+2)th, or (j+n)th discharging head downstream from the j-th discharging head. Using such computed measures, the system controller 203 within the Metal-Fuel Card Discharging Subsystem 186 can determine (i.e. anticipate) in real-time, which metal-fuel zone on a metal-fuel card contains metal-fuel (e.g. zinc) in quantities sufficient to satisfy instantaneous electrical-loading conditions imposed upon the Metal-Fuel Card Discharging Subsystem 186 during the discharging operations, and selectively switch-in the metal-fuel zones(s) across which metal-fuel is known to be present. Such track switching operations may involve the system controller 203 temporarily connecting the output terminals of the cathode-electrolyte structures thereof to the input terminals of the cathode-electrolyte output terminal configuration subsystem 205 so that zones supporting metal-fuel content (e.g. deposits) are made readily available for producing electrical power required by the electrical load 200.

Another advantage derived from such metal-fuel management capabilities is that the system controller 203 within the Metal-Fuel Card Discharging Subsystem 115 can control discharge parameters during discharging operations using information collected and recorded within the Metal-Fuel Database Management Subsystem 308 during the immediately prior recharging and discharging operations.

Means For Controlling Discharging Parameters during the Discharging Mode Using Information Recorded during the Prior Modes of Operation In the FCB system of the fourth illustrative embodiment, the system controller 203 within the Metal-Fuel Card Discharging Subsystem 186 can automatically control discharge parameters using information collected during prior recharging and discharging operations and recorded within the Metal-Fuel Database Management Subsystems of the FCB system of FIG. 6.

As shown in FIG. 7B14, the subsystem architecture and buses provided within and between the Discharging and Recharging Subsystems 186 and 191 enable system controller 203 within the Metal-Fuel Card Discharging Subsystem 186 to access and use information recorded within the Metal-Fuel Database Management Subsystem 404 within the Metal-Fuel Card Recharging Subsystem 191. Similarly, the subsystem architecture and buses provided within and between the Discharging and Recharging Subsystems 186 and 191 enable system controller 103' within the Metal-Fuel Card Recharging Subsystem 191 to access and use information recorded within the Metal-Fuel Database Management Subsystem 308 within the Metal-Fuel Card Discharging Subsystem 186. The advantages of such information and sub-file sharing capabilities will be explained hereinbelow.

During the discharging operations, the system controller 203 can access various types of information stored within the Metal-Fuel Database Management Subsystems with the Discharging and Recharging Subsystems 186 and 191. One important information element will relate to the amount of metal-fuel currently available at each metal-fuel zone 195A through 195D along at a particular instant of time (i.e. $MFE_t$). Using this information, the system controller 203 can determine if there will be sufficient metal-fuel along a particular track to satisfy current electrical power demands. The metal-fuel along one or more or all of the fuel zones 195A through 195D along a metal-fuel card may be substantially consumed as a result of prior discharging operations, and not having been recharged since the last discharging operation. The system controller 203 can anticipate such metal-fuel conditions within the discharging heads. Depending on the metal-fuel condition of "upstream" fuel cards, the system controller 203 may respond as follows: (i) connect the cathode-electrolyte structures of metal-fuel "rich" tracks into the discharge power regulation subsystem 223 when high electrical loading conditions are detected at electrical load 200, and connect cathode-electrolyte structures of metal-fuel "depleted" zones into this subsystem when low loading conditions are detected at electrical load 200; (ii) increase the amount of oxygen being injected within the corresponding cathode support structures when the metal-fuel is thinly present on identified metal-fuel zones, and decrease the amount of oxygen being injected within the corresponding cathode support structures when the metal-fuel is thickly present on identified metal-fuel zones, in order to maintain power produced from the discharging heads 197; (iii) control the temperature of the discharging heads 197 when the sensed temperature thereof exceeds predetermined thresholds; etc. It is understood that in alternative embodiments of the present invention, the system controller 203 may operate in different ways in response to the detected condition of particular zone on identified fuel card.

During the Recharging Mode

In the FCB system of the fifth illustrative embodiment shown in FIG. 6, means are provided for automatically managing the metal-oxide presence within the Metal-Fuel Card Recharging Subsystem 191 during recharging operations. Such system capabilities will be described in greater detail hereinbelow.

As shown in FIG. 7B14, data signals representative of recharge parameters (e.g., $i_{acr}$, $v_{acr}$, . . . , $pO_{2r}$, $H_2O_r$, $T_r$, $v_{acr}/i_{acr}$) are automatically provided as input to the Data Capture and Processing Subsystem 406 within the Metal-Fuel Card Recharging Subsystem 191. After sampling and capturing, these data signals are processed and converted into corresponding data elements and then written into an information structure 410 as shown, for example, in FIG. 7B13. As in the case of discharge parameter collection, each information structure 410 for recharging parameters comprises a set of data elements which are "time-stamped" and related (i.e. linked) to a unique metal-fuel card identifier 240 (240', 240"), associated with the metal-fuel card being recharged. The unique metal-fuel card identifier is determined by data reading head 270 (270', 270" respectively) shown in FIG. 7B6. Each time-stamped information structure is then recorded within the Metal-Fuel Database Management Subsystem 404 of the Metal-Fuel Card Recharging Subsystem 191, shown in FIG. 7B14, for maintenance, subsequent processing and/or access during future recharging and/or discharging operations.

As mentioned hereinabove, various types of information are sampled and collected by the Data Capture and Processing Subsystem 406 during the recharging mode. Such information types include, for example: (1) the recharging voltage applied across each such cathode-electrolyte structure within each recharging head 197'; (2) the amount of electrical current ($i_{acr}$) supplied across each cathode-electrolyte structures within each recharge head 197'; (3) the oxygen concentration ($pO_{2r}$) level in each subchamber within each recharging head; (4) the moisture level ($H_2O_r$) near each cathode-electrolyte interface within each recharging head; and (5) the temperature ($T_{acr}$) within each channel of each recharging head 197'. From such collected information, the Data Capture and Processing Subsystem 406 can readily compute various parameters of the system including, for example, the time duration ($\Delta t_r$) that electrical current was supplied to a particular cathode-electrolyte structure within a particular recharging head.

The information structures produced and stored within the Metal-Fuel Database Management Subsystem 404 of the Metal-Fuel Card Recharging Subsystem 191 on a real-time basis can be used in a variety of ways during recharging operations. For example, the above-described current ($i_{acr}$) and time duration ($\Delta t_r$) information acquired during the recharging mode is conventionally measured in Amperes and Hours, respectively. The product of these measures (AH) provides an accurate measure of the electrical charge (−Q) supplied to the metal-air fuel cell battery structures along the metal-fuel tape during recharging operations. Thus the computed "AH" product provides an accurate amount of metal-fuel that one can expect to have been produced on the identified metal-fuel zone, at a particular instant in time, during recharging operations.

When used with historical information about metal oxidation and reduction processes, the Metal-Fuel Database Management Subsystems 308 and 404 within the Metal-Fuel Card Discharging and Recharging Subsystems 186 and 191, respectively, can be used to account for or determine how much metal-oxide (e.g. zinc-oxide) should be present for recharging (i.e. conversion back into zinc from zinc-oxide) along the zinc-fuel card. Thus such information can be very useful in carrying out metal-fuel management functions including, for example, determination of metal-oxide amounts present along each metal-fuel zone 195A through 195D during recharging operations.

In the illustrative embodiment, the metal-oxide presence process may be managed within the Metal-Fuel Card Recharging Subsystem 191 using method described hereinbelow.

Preferred Method of Metal-Oxide Presence Management during Recharging Operations In accordance with the principles of the present invention, the data reading head 270 (270', 270') automatically identifies each metal-fuel card as it is loaded within the recharging assembly 197' and produces card identification data indicative thereof which is supplied to the Data Capture and Processing Subsystem within the Metal-Fuel Card Discharging Subsystem 191. Upon receiving card identification data on the loaded metal-fuel card, the Data Capture and Processing Subsystem automatically creates an information structure (i.e. data file) on the card within the Metal-Fuel Database Management Subsystem. The function of this information structure, shown in FIG. 7B13, is to record current (up-to-date) information on sensed recharging parameters, the metal-fuel availability state, metal-oxide presence state, and the like. In the event that an information storage structure (i.e. data file) has been previously created for this particular metal-fuel card within the Metal-Fuel Database Management Subsystem 404, this information file is accessed therefrom for updating. As shown in FIG. 7B 13, for each identified metal-fuel card, an information structure 410 is maintained for each metal-fuel zone ($MFZ_j$) 195A through 195D, at each sampled instant of time ti. Once an information structure has been created (or found) for a particular metal fuel card, the initial state or condition of each metal-fuel zone thereon must be determined and entered within the information structure maintained within the Metal-Fuel Database Management Subsystems 308 and 404 of the Discharging and Recharging Subsystems 186 and 191, respectively.

Typically, the metal-fuel card loaded within the recharging head assembly 197 will be partially or fully discharged, and thus containing a particular amount of metal-oxide along its fuel zones for conversion back into its primary metal. For accurate metal-fuel management, these initial metal-oxide amounts (MOAs) in the loaded card(s) must be determined and then information representative thereof stored with the Metal-Fuel Database Management Subsystem of the Discharging and Recharging Subsystems 186 and 191, respectively. In general, initial states of information can be acquired in a number of different ways, including for example: by encoding such initialization information on the metal-fuel card prior to completing a discharging operation on a different FCB system; by prerecording such initialization information within the Metal-Fuel Database Management Subsystem 404 during the most recent recharging operation carried out in the same FCB system; by recording within the Metal-Fuel Database Management Subsystem 404 (at the factory), the amount of metal-oxide normally expected on each zone of a particular type metal-fuel card, and automatically initializing such information within a particular information structure upon reading a code on the metal-fuel card using data reading head 270 (270', 270"); by actually measuring the initial amount of metal-oxide on each metal-fuel zone using the metal-oxide sensing assembly described above in conjunction with the cathode-electrolyte input terminal configuration subsystem 244; or by any other suitable technique.

The "actual" measurement technique mentioned above can be carried out by configuring metal-oxide sensing drive circuitry (shown in FIG. 2A15) with the cathode-electrolyte input terminal configuration subsystem 244 and Data Capture and Processing Subsystem 406 within the Recharging Subsystem 191. Using this arrangement, the metal-oxide sensing heads can automatically acquire information on the "initial" state of each metal-fuel track on each identified metal-fuel card loaded within the recharging head assembly 197'. Such information would include the initial amount of metal-oxide and metal-fuel present on each track at the time of loading, denoted by "$t_0$".

In a manner similar to that described in connection with the FCB system of FIGS. 1 and 4, such metal-fuel/metal-oxide measurements are carried out on each metal-fuel zone of the loaded card by automatically applying a test voltage across a particular zone of metal fuel, and detecting the electrical which flows thereacross in response the applied test voltage. The data signals representative of the applied voltage ($v_{applied}$) and response current ($i_{response}$) at a particular sampling period are automatically detected by the Data Capture and Processing Subsystem 406 and processed to produce a data element representative of the ratio of the applied voltage to response current ($v_{applied}/(i_{response}$) with appropriate numerical scaling. This data element is automatically recorded within an information structure linked to the identified metal-fuel card maintained in the Metal-Fuel Data Management Subsystem 404. As this data element (v/i) provides a direct measure of electrical resistance across the metal-fuel zone under measurement, it can be accurately correlated to a measured "initial" amount of metal-oxide present on the identified metal-fuel zone.

Data Capture and Processing Subsystem 406 then quantifies the measured initial metal-oxide amount (available at initial time instant $t_0$), and designates it as $MOA_0$ for recording in the information structures maintained within the Metal-Fuel Database Management Subsystems 308 and 404 of both the Metal-Fuel Card Discharging and Recharging Subsystems 186 and 191, respectively. While this initialization procedure is simple to carry out, it is understood that in some applications it may be more desirable to empirically determine these initial metal-oxide measures using theoretically-based computations premised on the metal-fuel cards having been subjected to a known course of treatment (e.g. The Short-Circuit Resistance Test described hereinabove).

After completing the initialization procedure, the Metal-Fuel Card Recharging Subsystem 191 is ready to carry out its metal-fuel management functions along the lines to be described hereinbelow. In the illustrative embodiment, this method involves two basic steps that are carried out in a cyclical manner during discharging operations.

The first step of the procedure involves subtracting from the initial metal-oxide amount $MOA_0$, the computed metal-fuel estimate $MFE_{0-1}$ which corresponds to the amount of metal-fuel produced during recharging operations conducted between time interval $t_0$–$t_1$. The during the recharging operation, metal-fuel estimate $MFE_{0-1}$ is computed using the following recharging parameters: electrical recharge current $i_{acr}$; and time duration $\Delta t_r$.

The second step of the procedure involves adding to the computed measure ($MOA_0$–$MFE_{0-1}$), the metal-oxide estimate $MOE_{0-1}$ which corresponds to the amount of metal-oxide produced during any discharging operations that may have been conducted between time interval $t_0$–$t_1$. Notably, the metal-oxide estimate $MOE_{0-1}$ is computed using the following discharging parameters collected—electrical recharge current $i_{acd}$ and time duration $\Delta t_{0-1}$, during the discharging operation. Notably, metal-oxide measure $MOE_{0-1}$ will have been previously computed and recorded within the Metal-Fuel Database Management Subsystem 308 within the Metal-Fuel Card Discharging Subsystem 186 during the immediately previous discharging operation (if one such operation carried out since $t_0$). Thus, it will be necessary to read this prerecorded information element from Database Management Subsystem 308 within the Discharging Subsystem 186 during the current recharging operations.

The computed result of the above-described accounting procedure (i.e. $MOA_0$–$MFE_{0-1}$+$MOE_{0-1}$) is then posted within the Metal-Fuel Database Management Subsystem 404 within Metal-Fuel Card Recharging Subsystem 191 as the new current metal-fuel amount ($MOA_1$) which will be used in the next metal-oxide presence update procedure. During recharging operations, the above-described update procedure is carried out for every $t_i$–$t_{i+1}$ seconds for each metal-fuel zone that is being recharged.

Such information maintained on each metal-fuel zone can be used in a variety of ways, for example: manage the presence of metal-oxide formations along the zones of metal-fuel cards; as well as setting the recharging parameters in an optimal manner during recharging operations. The details pertaining to such metal-oxide presence management techniques will be described in greater detail hereinbelow.

Uses for Metal-Oxide Presence Management during the Recharging Mode of Operation During recharging operations, the computed amounts of metal-oxide present along any particular metal-fuel zone (i.e. MFZ), determined at the i-th recharging head 197', can be used to compute the presence of metal-oxide at the (i+1)th, (i+2)th, or (i+n)th recharging head downstream from the i-th recharging head 197'. Using such computed measures, the system controller 203' within the Metal-Fuel Card Recharging Subsystem 191 can determine (i.e. anticipate) in real-time, which metal-fuel tracks along a metal-fuel card contain metal-oxide (e.g. zinc-oxide) requiring recharging, and which contain metal-fuel not requiring recharging. For those metal-fuel zones requiring recharging, the system controller 203' can electronically switch-in the cathode-electrolyte structures of those metal-fuel zones having significant metal-oxide content (e.g. deposits) for conversion into metal-fuel within the recharging head assembly 197'.

Another advantage derived from such metal-oxide management capabilities is that the system controller 203' within the Metal-Fuel Card Recharging Subsystem 191 can control recharge parameters during recharging operations using information collected and recorded within the Metal-Fuel Database Management Subsystem 404 during the immediately prior recharging and discharging operations.

During Recharging operations, information collected can be used to compute an accurate measure of the amount of metal-oxide that exists along each metal-fuel zone 195A through 195D at any instant in time. Such information, stored within information storage structures maintained within the Metal-Fuel Database Subsystem 404, can be accessed and used by the system controller 203' within the Metal-Fuel Card Discharging Subsystem 186 to control the amount of electrical current supplied across the cathode-electrolyte structures of each recharging head 197'. Ideally, the magnitude of electrical current will be selected to ensure complete conversion of the estimated amount of metal-oxide (e.g. zinc-oxide) along each such zone, into its primary source metal (e.g. zinc).

Means for Controlling Recharging Parameters during the Recharging Mode Using Information Recorded During Prior Modes of Operation In the FCB system of the fifth illustrative embodiment, the system controller 203' within the Metal-Fuel Card Recharging Subsystem 191 can automatically control recharge parameters using information collected during prior discharging and recharging operations and recorded within the Metal-Fuel Database Management Subsystems 308 and 404 of the FCB system of FIG. 6.

During the recharging operations, the system controller 203' within the Metal-Fuel Tape Recharging Subsystem 191 can access various types of information stored within the Metal-Fuel Database Management Subsystem 404. One important information element stored therein will relate to the amount of metal-oxide currently present along each metal-fuel zone at a particular instant of time (i.e. $MOA_t$). Using this information, the system controller 203' can determine on which zones significant metal-oxide deposits are present, and thus can connect the input terminal of the corresponding cathode-electrolyte structures (within the recharging heads) to the recharging power control subsystem 245 by way of the cathode-electrolyte input terminal configuration subsystem 244, to efficiently and quickly carry out recharging operations therealong. The system controller 203' can anticipate such metal-oxide conditions prior to conducting recharging operations. Depending on the metal-oxide condition of "upstream" fuel cards loaded within the discharging head assembly, the system controller 203' of the illustrative embodiment may respond as follows: (i) connect cathode-electrolyte structures of metal-oxide "rich" zones into the recharging power regulation subsystem 245 for long recharging durations, and connect cathode-electrolyte structures of metal-oxide "depleted" zones from this subsystem for relatively shorter recharging operations; (ii) increase the rate of oxygen evacuation from the cathode support structures corresponding to zones having thickly formed metal-oxide formations therealong during recharging operations, and decrease the rate of oxygen evacuation from the cathode support structures corresponding to zones having thinly formed metal-oxide formations therealong during recharging operations; (iii) control the temperature of the recharging heads 197' when the sensed temperature thereof exceeds predetermined thresholds; etc. It is understood that in alternative embodiments, the system controller 203' may operate in different ways in response to the detected condition of particular zones on an identified fuel card.

The Sixth Illustrative Embodiment of the Air-Metal FCB System of the Present Invention In FIGS. 8 through 9A2, a sixth embodiment of the FCB system hereof is disclosed. This system 420 is a hybrid of the system of FIG. 1, wherein the discharging and recharging head assembly are combined into a single assembly enabling simultaneous discharge and recharge operations. As shown in FIG. 8, FCB system 420 comprises a tape transport subsystem 2, a cassette tape loading/unloading subsystem 2, and a hybrid-type metal-fuel tape discharging/recharging subsystem 425. The tape transport subsystem 4 and cassette tape loading/unloading subsystem 2 are substantially similar as the subsystems disclosed in connection with the first, second and third illustrative embodiments shown in FIGS. 1, 3A and 3B and thus will not be redescribed to avoid obfuscation of the present invention. The hybrid-type metal-fuel tape discharging/recharging subsystem 425 employed in the system of FIG. 8 is sufficiently different from the subsystems described hereinabove to warrant further description below.

As shown in FIGS. 9A1 and 9A2, the metal-fuel tape discharging/recharging subsystem 425 comprises a discharging head subassembly 9', a recharging head subassembly 11', discharging power regulation subsystem 40, and recharging power regulation subsystem of the type employed in the FCB system of FIG. 1.

As shown, the discharging and recharging head subassemblies 9' and 11 ' are mounted upon a common discharge/recharge transport subsystem 424 which is functionally equivalent to the discharging head transport subsystem 24 and recharging head transport subsystem 24' disclosed in FIG. 2A3 and 2A4. The discharging power regulation subsystem and recharging power regulation subsystem having functionalities similar to those described hereinabove.

In the illustrative embodiment shown in Figs, 9A1 and 9A2, the recharging surface area of the recharging head subassembly 11 ' is substantially greater than the discharging surface area of the discharging head subassembly 9', in order to ensure rapid recharging operations. The terminals of each cathode-electrolyte structure of heads 9' and 11' are connected to a cathode-electrolyte terminal configuration subsystem 426 which can be programmed to configure the terminals of the heads 9' and 11 ' to function as either a discharging head or recharging head as required by any particular application at hand. Programmable cathode-electrolyte terminal configuration Subsystem 426 is controlled by system controller 18 and is surrounded by many of the supporting subsystems employed in the Discharging and Recharging Subsystems 6 and 7 of the FCB system of FIG. 1.

In the event that a particular head within the metal-fuel tape discharging/recharging subsystem 425 is configured to function as a discharging head, then pressurized air will be pumped into the cathode structure thereof to increase the P02 therewithin during the Discharge Mode while the output terminals thereof are connected to the input terminals of the discharging power regulation subsystem 40, shown in FIGS. 9A1 and 9A2. In the event that a particular head within the metal-fuel tape discharging/recharging subsystem 425 is configured to function as a recharging head, then pressurized air will be evacuated from the cathode structure thereof to lower the $pO_2$ therewithin during the Recharging Mode while the input terminals thereof are connected to the output terminals of the recharging power regulation subsystem 92, shown in FIGS. 9A1 and 9A2. This hybrid architecture has a number of advantages, namely: it enables multiple discharging heads in applications where long-term high power generation is required; it enables multiple recharging heads where ultra-fast recharging operations are required; and it enables simultaneous discharging and recharging operations where moderate electrical loading requirements must be satisfied.

Figure 10A:
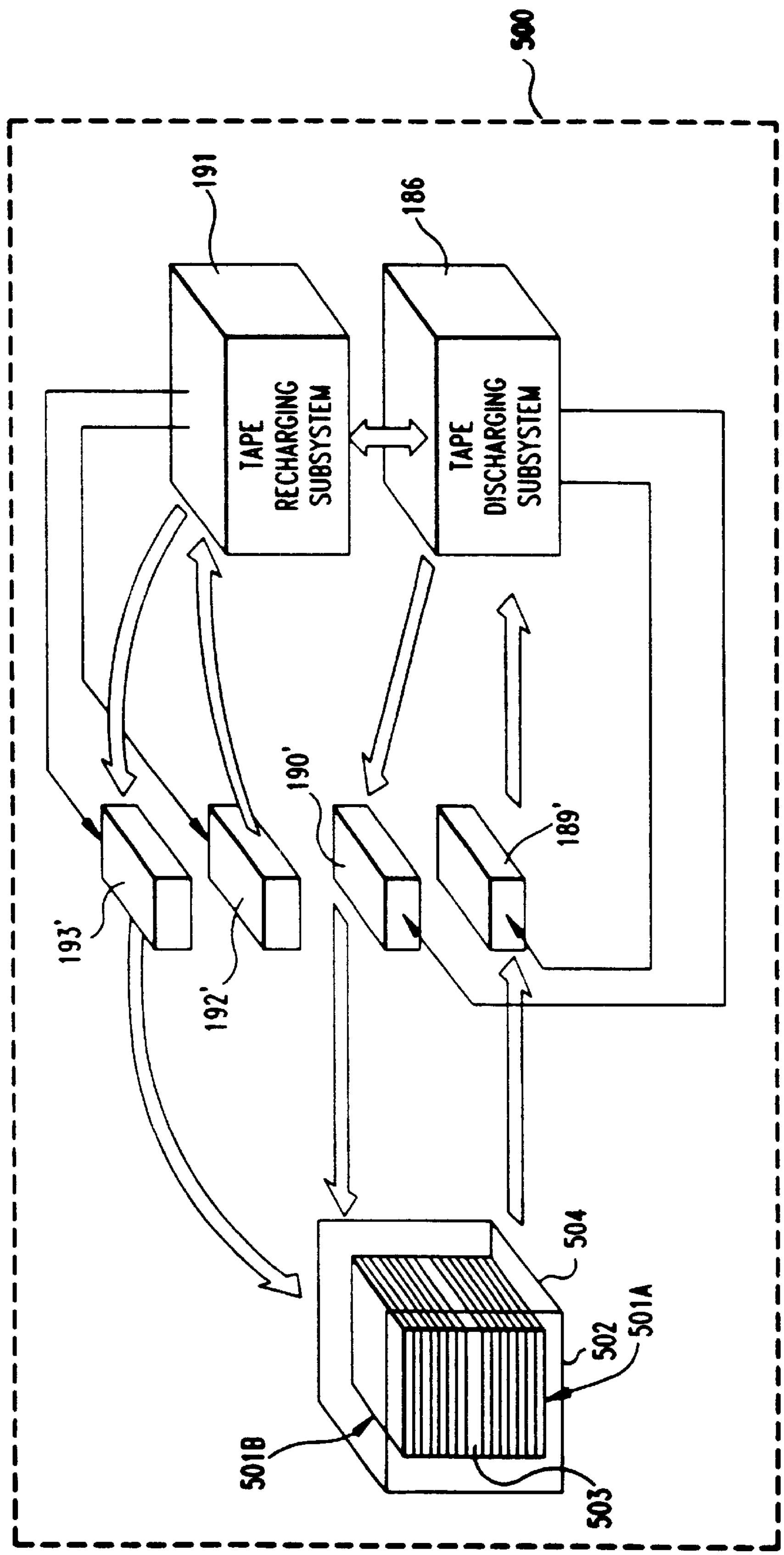
FIG. 10A is a generalized schematic representation of the metal-air FCB system of FIG. 10, wherein recharged metal-fuel cards are shown being automatically transported from the bottom of the stack of recharged metal-fuel cards in the recharged metal-fuel card storage compartment, into the discharging bay of the Metal-Fuel Card Discharging Subsystem thereof, whereas discharged metal-fuel cards are shown being automatically transported from the discharging bay of the Metal-Fuel Card Discharging Subsystem onto the top of the stack of discharged metal fuel cards in the discharged metal-fuel card storage compartment.

The Seventh Illustrative Embodiment of the Air-Metal FCB System of the Present Invention The seventh illustrative embodiment of the metal-air FCB system hereof is illustrated in FIGS. 10 through 10A. In this embodiment, the FCB system is provided with metal-fuel in the form of metal-fuel cards (or sheets) contained within a cassette cartridge-like device having a partitioned interior volume for storing (re)charged and discharged metal-fuel cards in separate storage compartments. A number of advantages are provided by this metal-fuel supply design, namely: the amount of physical space required for storing the (re) charged and discharged metal-fuel cards is substantially reduced; a new supply of pre-charged metal fuel cards can be quickly supplied to the system by simply sliding a prefilled tray-like cartridge into the tray receiving port of the system housing; and an old supply of discharged cards can be quickly removed from the system by withdrawing a single cartridge tray from the housing and inserting a new one therein.

As shown in FIGS. 10 through 10A, this FCB system 500 comprises a number of subsystems, namely: a Metal-Fuel Card Discharging (i.e. Power Generation) Subsystem 186 for generating electrical power from recharged metal-fuel cards 187 during the Discharging Mode of operation; Metal-Fuel Card Recharging Subsystem 191 for electro-chemically recharging (i.e. reducing) sections of oxidized metal-fuel cards 187 during the Recharging Mode of operation; a Recharged Card Loading Subsystem 189' for automatically loading one or more charged (recharged) metal-fuel cards 187 from recharged card storage compartment 501A within cassette tray/cartridge 502, into the discharging bay of the Discharging Subsystem 186; Discharged Card Unloading Subsystem 190' for automatically unloading one or more discharged metal-fuel cards 187 from the discharging bay of Discharging Subsystem 186, into the discharged metal-fuel card storage compartment 501B, located above card storage compartment 501A and separated by platform 503 arranged within cartridge housing 504 to divide its interior volume into approximately equal subvolumes; Discharged Card Loading Subsystem 192' for automatically loading one or more discharged metal-fuel cards from the discharged metal-fuel card storage bin 501B, into the recharging bay of the Metal-Fuel Card Recharging Subsystem 191; and a Recharged Card Unloading Subsystem 193' for automatically unloading recharged metal fuel cards from the recharging bay of the Recharging Subsystem into the recharged metal-fuel card storage compartment 501A.

The metal fuel consumed by this FCB System is provided in the form of metal fuel cards 187 which can be similar in construction to cards 112 used in the system of FIG. 4 or cards 187 used in the system of FIG. 6. In either case, the discharging and recharging heads will be designed and constructed to accommodate the physical placement of metal fuel on the card or sheet-like structure. Preferably, each metal-fuel card used in this FCB system will be "multi-zoned" or "multi-tracked" in order to enable the simultaneous production of multiple supply voltages (e.g. 1.2 Volts) from the "multi-zoned" or "multi-tracked" discharging heads. As described in detail hereinabove, this inventive feature enables the generation and delivery of a wide range of output voltages from the system, suitable to the requirements of the particular electrical load connected to the FCB system.

While the metal-fuel delivery mechanism of the above-described illustrative embodiment is different from the other described embodiments of the present invention, the Metal-Fuel Card Discharging Subsystem 186 and the Metal-Fuel Card Recharging Subsystem 191 can be substantially the same or modified as required to satisfy the requirements of any particular embodiment of this FCB system design.

Figure 11A:
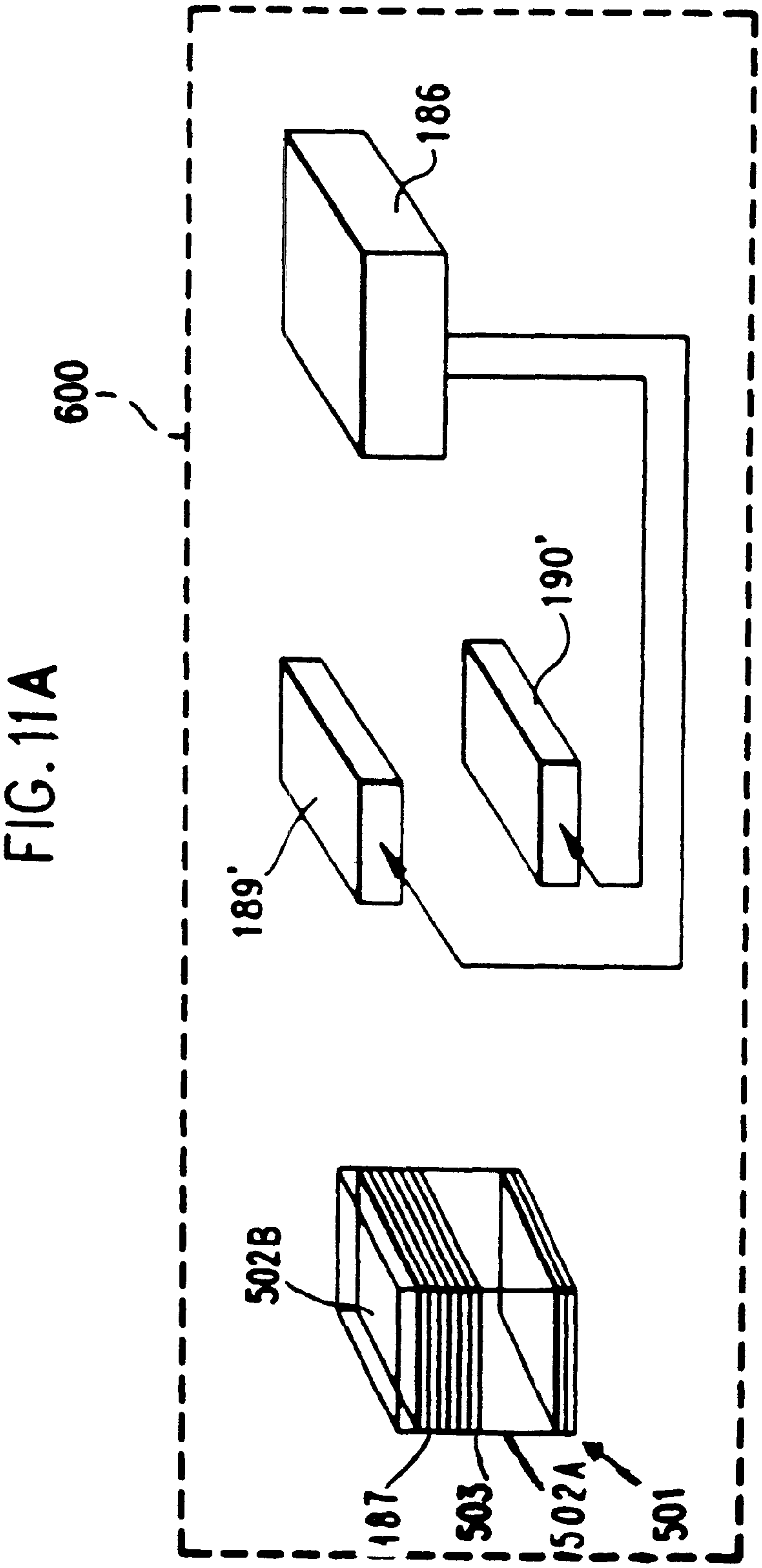
FIG. 11A is a generalized schematic representation of the metal-air FCB system of FIG. 11, wherein recharged metal-fuel cards are shown being automatically transported from the bottom of the stack of recharged metal-fuel cards in the recharged metal-fuel card storage compartment, into the discharging bay of the Metal-Fuel Card Discharging Subsystem thereof, whereas discharged metal-fuel cards are shown being automatically transported from the discharging bay of the Metal-Fuel Card Discharging Subsystem onto the top of the stack of discharged metal fuel cards in discharged metal-fuel card storage compartment.

The Eighth Illustrative Embodiment of the Air-Metal FCB System of the Present Invention The eighth illustrative embodiment of the metal-air FCB system hereof is illustrated in FIGS. 11 through 11A. In this embodiment, the FCB system is provided with a Metal-Fuel Card Discharging Subsystem, but not a Metal-Fuel Card recharging Subsystem, thereby providing a simpler design. metal-fuel in the form of metal-fuel cards (or sheets) contained within a cassette cartridge-like device having a partitioned interior volume for storing (re)charged and discharged metal-fuel cards in separate storage compartments. The A number of advantages are provided by this metal-fuel supply design, namely: the amount of physical space required for storing the (re)charged and discharged metal-fuel cards is substantially reduced; a new supply of pre-charged metal-fuel cards can be quickly supplied to the system by simply sliding a prefilled tray-like cartridge into the tray receiving port of the system housing; and an old supply of discharged cards can be quickly removed from the system by withdrawing a single cartridge tray from the housing and inserting a new one therein.

As shown therein, this FCB system 600 comprises a number of subsystems, namely: a Metal-Fuel Card Discharging (i.e. Power Generation) Subsystem 186 for generating electrical power from recharged metal-fuel cards 187 during the Discharging Mode of operation; Metal-Fuel Card Recharging Subsystem 191 for electro-chemically recharging (i.e. reducing) sections of oxidized metal-fuel cards 187 during the Recharging Mode of operation; a Recharged Card Loading Subsystem 189' for automatically loading one or more charged (recharged) metal-fuel cards 187 from recharged card storage compartment 501A within cassette tray/cartridge 502, into the discharging bay of the Discharging Subsystem 186; Discharged Card Unloading Subsystem 190' for automatically unloading one or more discharged metal-fuel cards 187 from the discharging bay of Discharging Subsystem 186, into the discharged metal-fuel card storage compartment 501B, located above card storage compartment 501A and separated by platform 503 arranged within cartridge housing 504 to divide its interior volume into approximately equal subvolumes; Discharged Card Loading Subsystem 192' for automatically loading one or more discharged metal-fuel cards from the discharged metal-fuel card storage bin 501B, into the recharging bay of the Metal-Fuel Card Recharging Subsystem 191; and a Recharged Card Unloading Subsystem 193' for automatically unloading recharged metal-fuel cards from the recharging bay of the Recharging Subsystem into the recharged metal-fuel card storage compartment 501A.

The metal fuel consumed by this FCB System is provided in the form of metal fuel cards 187 which can be similar in construction to cards 112 used in the system of FIG. 4 or cards 187 used in the system of FIG. 6. In either case, the discharging and recharging heads will be designed and constructed to accommodate the physical placement of metal fuel on the card or sheet-like structure. Preferably, each metal-fuel card used in this FCB system will be "multi-zoned" or "multi-tracked" in order to enable the simultaneous production of multiple supply voltages (e.g. 1.2 Volts) from the "multi-zoned" or "multi-tracked" discharging heads. As described in detail hereinabove, this inventive feature enables the generation and delivery of a wide range of output voltages from the system, suitable to the requirements of the particular electrical load connected to the FCB system.

While the metal-fuel delivery mechanism of the above-described illustrative embodiment is different from the other described embodiments of the present invention, the Metal-Fuel Card Discharging Subsystem 186 and the Metal-Fuel Card Recharging Subsystem 191 can be substantially the same or modified as required to satisfy the requirements of any particular embodiment of this FCB system design.

Additional Embodiments of Metal-Air FCB Systems according to the Present Invention In the FCB systems described hereinabove, multiple discharging heads and multiple recharging heads have been provided for the noted advantages that such features provide. It is understood, however, that FCB systems of the present invention can be made with a single discharging head alone or in combination with one or more recharging heads, as well as , with a single discharging head alone or in combination with one or more discharging heads.

In the FCB systems described hereinabove, the cathode structures of the discharging heads and the recharging heads are shown as being planar or substantially planar structures which are substantially stationary relative to the anode-contacting electrodes or elements, while the metal-fuel (i.e. the anode) material is either: (i) stationary relative to the cathode structures in the metal-fuel card embodiments of the present invention shown in FIGS. 4 and 6; or (ii) moving relative to the cathode structures in the metal-fuel tape embodiments of the present invention shown in FIGS. 1, 2, 3 and 8.

It is understood, however, the metal-air FCB system designs of the present invention are not limited to the use of planar stationary cathode structures, but can be alternatively constructed using one or more cylindrically-shaped cathode structures adapted to rotate relative to, and come into ionic contact with metal-fuel tape or metal-fuel cards during discharging and/or recharging operations, while carrying out all of the electrochemical functions that cathode structures must enable in metal-air FCB systems. Notably, the same techniques that are used to construct planar stationary cathodes structures described hereinabove can be readily adapted to fashion cylindrically-shaped cathode structures realized about hollow, air-pervious support tubes driven by electric motors and bearing the same charge collecting substructure that the cathode structures typically are provided with, as taught in detail hereinabove.

In such alternative embodiments of the present invention, the ionically-conducting medium disposed between the cylindrically-shaped rotating cathode structure(s) and transported metal-fuel tape can be realized in a number of different ways, for example, as: (1) a solid-state electrolyte-impregnated gel or other medium affixed to the outer surface of the rotating cathode; (2) a solid-state electrolyte-impregnated gel or other medium affixed to the surface of the transported metal-fuel tape arranged in ionic-contact with the rotating cylindrically-shaped cathode structure; (3) a belt-like structure comprising a flexible porous substrate embodying a solid-state ionically conducting medium, transportable relative to both the rotating cylidindrically-shaped cathode structure and the moving metal-fuel tape or (card) during discharging and/or recharging operations; or (4) a liquid-type ionically conducting medium (e.g. such as an electrolyte) disposed between the rotating cathode structure and transported metal-fuel tape (or card) to enable ionic charge transport between the cathode and anode structures during discharging and recharging operations.

One particular advantage in using a solid-state ionically-conducting belt like structure of the type-described above is that it provides "frictionless" contact between transported metal-fuel tape and its rotating cylindrical cathode structure, thereby minimizing wear and tear of metal-fuel tape that is expected to be discharged and recharged over a large number of cycles without replacement.

In embodiments where multiple cylindrical cathodes are mounted within an array-like structure, and each cathode support tube being synchronously driven by meshing gears and metal-fuel tape being transported over the surfaces thereof in accordance with a predefined tape pathway using a tape transport similar to the subsystem shown in FIG. 1, it is possible to generate very high electrical power output from physical structures occupying relatively small volumes of space, thereby providing numerous advantages over prior art FCB systems.

The above-described FCB systems of the present invention can be used to power various types of electrical circuits, devices and systems, including, but not limited to, lawn mowers, stand-alone portable generators, vehicular systems, and a nominal 200kW discharging system.

Having described in detail the various aspects of the present invention described above, it is understood that modifications to the illustrative embodiments will readily occur to persons with ordinary skill in the art having had the benefit of the present disclosure. All such modifications and variations are deemed to be within the scope and spirit of the present invention as defined by the accompanying Claims to Invention.

What is claimed is:

1. A metal-air fuel cell battery system having a discharging mode of operation, the system comprising:

a housing having an insertion port;

a discharging subsystem disposed within said housing for generating electrical power from at least one metal-fuel card in said discharging mode of operation; and a tray-shaped cartridge containing a supply of substantially planar discrete metal-fuel cards, wherein the insertion port is configured to receive the tray-shaped cartridge;

wherein, when the tray-shaped cartridge is inserted within said insertion port, one or more of the substantially planar discrete metal-fuel cards are loadable into the discharging subsystem for generating and discharging electrical power during said discharging mode of operation.

2. The system of claim 1, further comprising a recharging subsystem disposed within said housing for recharging at least one metal-fuel card in a recharging mode of operation, wherein one or more substantially planar discrete metal-fuel cards are automatically loadable from the tray-shaped cartridge into the recharging subsystem when the tray-shaped cartridge is inserted within said insertion port.

3. The system of claim 1, further comprising a recharging subsystem for recharging substantially planar discrete metal fuel cards that have been oxidized during the discharging mode of operation.

4. The system of claim 1, wherein each metal-fuel card comprises a metal-fuel layer applied to a substantially planar card shaped substrate.

5. The system of claim 4, wherein said metal-layer comprises zinc.

6. The system of claim 5, wherein said metal-fuel layer is formed by mixing zinc powder and a binding material, and then applying the mixture as a coating to said substrate.

7. The system of claim 5, wherein said metal-fuel layer is formed by electroplating zinc onto said substrate.

8. The system of claim 5, wherein said metal-fuel layer is formed by mixing zinc powder with a plastic material.

9. The system of claim 4, wherein said substrate comprises a metal layer that collects current from said metal-fuel layer.

10. The system of claim 9, wherein said metal layer comprises one of nickel and brass.

11. The system of claim 4, wherein each metal-fuel card comprises an electrically insulating casing.

12. The system of claim 2, wherein each metal-fuel card comprises a metal-fuel layer applied to a substantially planar card shaped substrate.

13. The system of claim 12, wherein said metal-fuel layer comprises zinc.

14. The system of claim 13, wherein said metal-fuel layer is formed by mixing zinc powder and a binding material, and then applying the mixture as a coating to said substrate.

15. The system of claim 13, wherein said metal-fuel layer is formed by electroplating zinc onto said substrate.

16. The system of claim 13, wherein said metal-fuel layer is formed by mixing zinc powder with a plastic material.

17. The system of claim 12, wherein said substrate comprises a metal layer that collects current from said metal-fuel layer.

18. The system of claim 17, wherein said metal layer comprises one of nickel and brass.

19. The system of claim 12, wherein each metal-fuel card comprises an electrically insulating casing.

20. The system of claim 3, wherein each metal-fuel card comprises a metal-fuel layer applied to a substantially planar card shaped substrate.

21. The system of claim 20, wherein said metal-fuel layer comprises zinc.

22. The system of claim 21, wherein said metal-fuel layer is formed by mixing zinc powder and a binding material, and then applying the mixture as a coating to said substrate.

23. The system of claim 21, wherein said metal-fuel layer is formed by electroplating zinc onto said substrate.

24. The system of claim 21, wherein said metal-fuel layer is formed by mixing zinc powder with a plastic material.

25. The system of claim 20, wherein said substrate comprises a metal layer that collects current from said metal-fuel layer.

26. The system of claim 25, wherein said metal layer comprises one of nickel and brass.

27. The system of claim 20, wherein each metal-fuel card comprises an electrically insulating casing.

28. The system of claim 1, further comprising card transport means for transporting at least one metal-fuel card from the tray-shaped cartridge to the discharging subsystem.

29. The system of claim 28, further comprising card transport means for transporting at least one metal-fuel card from the discharging subsystem to the tray-shaped cartridge.

30. The system of claim 29, further comprising a recharging subsystem disposed within said housing for recharging at least one metal-fuel card in a recharging mode of operation.

31. The system of claim 30, further comprising card transport means for transporting at least one metal-fuel card from the tray-shaped cartridge to the recharging subsystem.

32. The system of claim 31, further comprising card transport means for transporting at least one metal-fuel card from the recharging subsystem to the tray-shaped cartridge.

33. The system of claim 1, wherein at least one metal-fuel card has a plurality of metal-fuel tracks, and wherein said discharging subsystem generates electrical power by enabling discharge of a selective set of a plurality of metal-fuel tracks on the at least one metal-fuel card.

34. The system of claim 33, wherein said recharging subsystem recharges the at least one metal-fuel card by enabling recharge of a selective set of the plurality of metal-fuel tracks of the at least one metal-fuel card.

* * * * *